(12) United States Patent
Yao et al.

(10) Patent No.: US 11,963,048 B2
(45) Date of Patent: Apr. 16, 2024

(54) MEASUREMENT CONFIGURATION DETERMINING METHOD, MESSAGE PROCESSING METHOD, AND APPARATUS

(71) Applicant: Huawei Technologies Co., Ltd., Shenzhen (CN)

(72) Inventors: Chuting Yao, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 17/273,475

(22) PCT Filed: Feb. 14, 2019

(86) PCT No.: PCT/CN2019/075118
§ 371 (c)(1),
(2) Date: Mar. 4, 2021

(87) PCT Pub. No.: WO2020/052198
PCT Pub. Date: Mar. 19, 2020

(65) Prior Publication Data
US 2021/0329507 A1   Oct. 21, 2021

(30) Foreign Application Priority Data
Sep. 13, 2018 (CN) .......................... 201811069478.4

(51) Int. Cl.
*H04W 36/00* (2009.01)
(52) U.S. Cl.
CPC ... *H04W 36/0061* (2013.01); *H04W 36/0058* (2018.08); *H04W 36/0085* (2018.08)

(58) Field of Classification Search
CPC ......... H04W 36/0061; H04W 36/0058; H04W 36/0085; H04W 48/16; H04W 36/0094;
(Continued)

(56) References Cited

U.S. PATENT DOCUMENTS

| 8,103,312 B2 | 1/2012 | Khojastepour | |
|---|---|---|---|
| 2011/0103249 A1* | 5/2011 | Kim | H04W 24/10 370/252 |

(Continued)

FOREIGN PATENT DOCUMENTS

| CN | 101646199 A | 2/2010 |
|---|---|---|
| CN | 102076078 A | 5/2011 |

(Continued)

OTHER PUBLICATIONS

R2-1802023, ZTE Corporation, et al., "Clarification on SSB-ToMeasure bitmap in SMTC configuration," 3GPP TSG-RAN WG2 Meeting #101, Athens, Greece, Feb. 26-Mar. 2, 2018, 5 pages.

(Continued)

*Primary Examiner* — Peter P Chau
(74) *Attorney, Agent, or Firm* — Conley Rose, P.C.

(57) ABSTRACT

A measurement configuration determining method includes receiving, by a terminal device, a first message from a network device. The first message includes a first relationship, the first relationship indicates an association relationship between an index of a reference signal and measurement configuration information. The measurement configuration information is adapted for the terminal device to perform a measurement and the terminal device determines the measurement configuration information based on the index.

20 Claims, 19 Drawing Sheets

(58) Field of Classification Search
CPC ... H04W 36/0083; H04W 56/00; Y02D 30/70
See application file for complete search history.

(56) References Cited

U.S. PATENT DOCUMENTS

| | | |
|---|---|---|
| 2013/0053082 A1 | 2/2013 | Chai et al. |
| 2018/0227867 A1 | 8/2018 | Park et al. |
| 2019/0166513 A1* | 5/2019 | Lin ............... H04W 24/10 |
| 2020/0022010 A1* | 1/2020 | Kim ............... H04W 16/14 |
| 2020/0213917 A1 | 7/2020 | Liu |
| 2020/0275319 A1* | 8/2020 | Murray ............ H04B 7/0695 |
| 2021/0297170 A1* | 9/2021 | Niu ............... H04B 7/0632 |

FOREIGN PATENT DOCUMENTS

| | | |
|---|---|---|
| CN | 102237936 A | 11/2011 |
| CN | 103109558 A | 5/2013 |
| CN | 103703800 A | 4/2014 |
| CN | 107734538 A | 2/2018 |
| CN | 108401521 A | 8/2018 |
| EP | 2552149 A2 | 1/2013 |
| EP | 2892268 A1 | 7/2015 |
| EP | 3499778 A1 | 6/2019 |
| WO | 2016093753 A1 | 6/2016 |
| WO | 2017213295 A1 | 12/2017 |
| WO | 2018084776 A1 | 5/2018 |
| WO | 2020143055 A1 | 7/2020 |

OTHER PUBLICATIONS

R1-1715482, Fujitsu, "Measurement based on SSB," 3GPP TSG RAN WG1 Meeting NR#3, Nagoya, Japan, Sep. 18-21, 2017, 8 pages.

Huawei et al, "Reducing the number of neighbour cells/carriers to measure," R2-2001064, resubmission of R2-1915530, 3GPP TSG-RAN2 Meeting #109-e, Online, Feb. 24-Mar. 6, 2020, 15 pages.

* cited by examiner

MEASUREMENT CONFIGURATION DETERMINING METHOD, MESSAGE PROCESSING METHOD, AND APPARATUS

CROSS-REFERENCE TO RELATED APPLICATIONS

This application is a U.S. National Stage of International Patent Application No. PCT/CN2019/075118 filed on Feb. 14, 2019, which claims priority to Chinese Patent Application No. 201811069478.4 filed on Sep. 13, 2018, both of which are hereby incorporated by reference in their entireties.

TECHNICAL FIELD

This application relates to the field of communications technologies, and in particular, to a measurement configuration determining method, a message processing method, and an apparatus.

BACKGROUND

In a current communications system, a terminal device may measure a cell, to perform cell reselection or cell handover based on a measurement result. For example, the terminal device may reselect or hand over to a cell with a relatively good measurement result.

In an example of frequency information, currently, a base station may provide a plurality of pieces of adjacent-frequency information for the terminal device. During measurement, the terminal device needs to measure each piece of adjacent-frequency information provided by the base station. However, in some conditions, the terminal device may fail to completely find frequencies corresponding to all the adjacent-frequency information provided by the network device. Therefore, if the terminal device performs searching and measurement based on the adjacent-frequency information provided by the network device, the terminal device may ineffectively search for and measure some adjacent frequencies that cannot be found by the terminal device. Consequently, power consumption of the terminal device is relatively high, and measurement efficiency is relatively low.

SUMMARY

Embodiments of this application provide a measurement configuration determining method, a message processing method, and an apparatus, to reduce measurement power consumption of a terminal device and improve measurement efficiency.

According to a first aspect, a first measurement configuration determining method is provided. The method includes: receiving, by a terminal device, a first message from a network device, where the first message includes a first relationship, the first relationship is used to indicate an association relationship between an index of a reference signal and measurement configuration information, and the measurement configuration information is used by the terminal device to perform measurement; and determining, by the terminal device based on a first index corresponding to the terminal device, that measurement configuration information corresponding to the terminal device is first measurement configuration information having an association relationship with the first index, where the first index is an index of a reference signal corresponding to the terminal device.

The method may be performed by a first communications apparatus. The first communications apparatus may be the terminal device or a communications apparatus that can support the terminal device in implementing a function required for the method, for example, a chip system. In the description of the first aspect, for example, the first communications apparatus is the terminal device.

In this embodiment of this application, the network device may send the first relationship to the terminal device, where the first relationship is used to indicate the association relationship between the index of the reference signal and the measurement configuration information, and the terminal device may determine the index of the reference signal corresponding to the terminal device, so that the terminal device can determine, from the first relationship based on the index of the reference signal corresponding to the terminal device, the first measurement configuration information corresponding to the terminal device, and the terminal device performs measurement based on the first measurement configuration information. Based on the first relationship, the network device does not need to frequently send the measurement configuration information to the terminal device when the terminal device moves. If the terminal device moves, the terminal device determines, from the first relationship based on an index of a corresponding reference signal obtained after the movement, the measurement configuration information corresponding to the terminal device, and the terminal device does not need to perform measurement each time based on measurement configuration information corresponding to an entire cell, but only needs to perform measurement based on the measurement configuration information corresponding to the terminal device. This can effectively reduce power consumption of the terminal device and improve measurement efficiency.

With reference to the first aspect, in a first possible implementation of the first aspect, the terminal device is in a connected mode.

For example, the connected mode herein may be an RRC connected mode.

With reference to the first aspect, in a second possible implementation of the first aspect, the terminal device is in an idle mode.

For example, the connected mode herein may be an RRC idle mode.

The technical solutions provided in the embodiments of this application may be applied to both the terminal device in the connected mode and the terminal device in the idle mode, and are widely applied.

With reference to the first aspect, the first possible implementation of the first aspect, or the second possible implementation of the first aspect, in a third possible implementation of the first aspect, the measurement configuration information includes one or any combination of the following:

an MO, where the MO includes one or more pieces of frequency information;
cell information corresponding to the frequency information included in the MO;
an SMTC of each of at least one piece of frequency information in the one or more pieces of frequency information included in the MO, where the SMTC of each piece of frequency information is used to indicate a time window that corresponds to each piece of frequency information and that is used for measurement;

first indication information corresponding to the SMTC in the MO, where the first indication information is used to indicate a measurement location in the time window indicated by the SMTC;

a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;

a quantity of to-be-measured cells;

a quantity of to-be-measured frequencies;

a measurement threshold, where the measurement threshold is used to indicate to measure a cell or a frequency whose value of a first parameter is greater than or equal to the measurement threshold; or a gap, where the gap is used by the terminal device to measure a reference signal on a frequency other than a frequency of a serving cell of the terminal device.

Content included in the measurement configuration information is not limited in this embodiment of this application. For example, in addition to at least one of the foregoing content, the measurement configuration information may further include content other than the foregoing content, or the measurement configuration information may not include any one of the foregoing content, but includes content other than the foregoing content. This is not specifically limited.

With reference to any one of the first aspect or the first possible implementation of the first aspect to the third possible implementation of the first aspect, in a fourth possible implementation of the first aspect, the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or the first relationship includes at least one index of a reference signal and measurement configuration information associated with each of the at least one index.

For example, the first message is specifically a measurement configuration message, and the measurement configuration message includes one or more pieces of measurement configuration information. For example, the measurement configuration message may include all measurement configuration information corresponding to one cell. In this case, the measurement configuration message may include at least one piece of second indication information, the second indication information is in a one-to-one correspondence with information included in the measurement configuration information, and one piece of second indication information may be used to indicate an index that is of a reference signal and that is associated with the corresponding information. It may be considered that the second indication information and the information corresponding to the second indication information constitute the first relationship. It can be learned that in this implementation form of the first relationship, an original structure of the first message may not be changed as much as possible, and only corresponding second indication information is added to the original message. This helps be compatible with an existing message.

Alternatively, the first relationship may directly include at least one index of a reference signal and measurement configuration information associated with each of the at least one index. For example, the first relationship is a list, the list is included in the first message, the list includes the at least one index of the reference signal, and in the list, each of the at least one index corresponds to one piece of measurement configuration information. This implementation form is relatively direct, and helps the terminal device clearly determine the association relationship between the index of the reference signal and the measurement configuration information.

With reference to any one of the first aspect or the first possible implementation of the first aspect to the fourth possible implementation of the first aspect, in a fifth possible implementation of the first aspect, the first message further includes the measurement configuration information indicated by the first relationship; or the terminal device further receives a second message from the network device, where the second message includes the measurement configuration information indicated by the first relationship.

The network device may send, by using the first message, both the first relationship and the measurement configuration information indicated by the first relationship. The terminal device may obtain relatively complete content by using one message, and does not need to additionally obtain the measurement configuration information in another manner. This is relatively simple. Alternatively, the network device may send, by using another message, the measurement configuration information indicated by the first relationship, so that an amount of information carried in one message can be reduced, a probability that a phenomenon such as a packet loss or congestion caused by an excessively large amount of information carried in one message occurs can be reduced, and transmission reliability can be improved.

With reference to any one of the first aspect or the first possible implementation of the first aspect to the fifth possible implementation of the first aspect, in a sixth possible implementation of the first aspect, the method further includes:

determining, by the terminal device, the first index, where the terminal device determines the first index in the following manner:

determining, by the terminal device, that an index of a measured reference signal with best channel quality is the first index; or determining, by the terminal device, that an index of a reference signal in measured reference signals whose channel quality is greater than or equal to a channel quality threshold is the first index; or determining, by the terminal device, that an index of an SSB with best channel quality that is measured by the terminal device is the first index; or determining, by the terminal device, that an index of an SSB used by the terminal device to perform random access is the first index; or determining, by the terminal device, that an index of an SSB used to receive system information is the first index; or determining, by the terminal device, that an index of an SSB used to receive the first message is the first index.

For example, the terminal device may determine the first index in any one of the foregoing manners, or the terminal device may determine the first index in a manner other than the foregoing manners. A manner of determining the first index by the terminal device is not limited in this embodiment of this application. For example, a manner of determining the first index by the terminal device is specified in a protocol, or may be independently determined by the terminal device, or may be configured by the network device. This is not specifically limited.

With reference to any one of the first aspect, or the first possible implementation of the first aspect to the sixth possible implementation of the first aspect, in a seventh possible implementation of the first aspect, the first measurement configuration information is in an active state, and measurement configuration information that is in the first relationship and that has no association relationship with the first index is in an inactive state, where the terminal device performs measurement based on the measurement configuration information in the active state, and does not perform measurement based on the measurement configuration information in the inactive state.

In this embodiment of this application, that the terminal device determines that the terminal device corresponds to the first measurement configuration information may also be understood as that the terminal device determines that the first measurement configuration information included in the first relationship is in the active state, and determines that the measurement configuration information that is in the first relationship and that has no association relationship with the first index is in the inactive state. Therefore, the terminal device does not confuse measurement configuration information indicated by the first relationship, to perform measurement based on the measurement configuration information in the active state.

With reference to any one of the first aspect or the first possible implementation of the first aspect to the seventh possible implementation of the first aspect, in an eighth possible implementation of the first aspect, the measurement configuration information that has no association relationship with the first index includes a first MO and/or first report configuration information, but does not include a measurement ID; and the method further includes:

determining, by the terminal device based on the first MO and/or the first report configuration information in the inactive state, that the measurement ID corresponding to the measurement configuration information that has no association relationship with the first index is in the inactive state.

When performing measurement, the terminal device performs measurement based on measID. In this case, if one piece of measurement configuration information that is in the first relationship and that has no association relationship with the first index includes measID, the terminal device may directly determine that measID is in an inactive state, and does not perform measurement based on measID. Alternatively, if the measurement configuration information does not include measID, but includes the first MO and/or the first report configuration information, the terminal device may directly determine corresponding measID based on the first MO and/or the first report configuration information, to determine that measID is in an inactive state, and does not perform measurement based on measID, to help reduce a measurement workload. Alternatively, if the measurement configuration information does not include measID, the MO, or the report configuration information, the terminal device cannot determine which measID is in an inactive state. In this case, the terminal device performs measurement based on measID even if measID is in the inactive state. However, in this embodiment of this application, the association relationship has been established between the index of the reference signal and the measurement configuration information. Therefore, even if the terminal device needs to measure all measID, a measurement workload required by the terminal device is greatly reduced compared with that in the prior art.

With reference to the seventh possible implementation of the first aspect or the eighth possible implementation of the first aspect, in a ninth possible implementation of the first aspect, the method further includes:

determining, by the terminal device, that the index of the reference signal corresponding to the terminal device is changed from the first index to a second index; and activating, by the terminal device, second measurement configuration information that has an association relationship with the second index based on the first relationship, and deactivating the first measurement configuration information.

The terminal device may move from one beam to another beam. In this case, the index of the reference signal corresponding to the terminal device may change, and the measurement configuration information corresponding to the terminal device also correspondingly changes. In this embodiment of this application, the terminal device may determine, periodically or after the terminal device moves, the index of the reference signal corresponding to the terminal device. For example, if the terminal device determines that the index of the reference signal of the terminal device is changed from the first index to the second index, the terminal device may re-determine, based on the first relationship, the measurement configuration information corresponding to the terminal device, for example, the terminal device determines that the measurement configuration information that is in the first relationship and that corresponds to the second index is the second measurement configuration information. In other words, the terminal device determines that the measurement configuration information corresponding to the terminal device is the second measurement configuration information, and therefore the terminal device may perform measurement based on the second measurement configuration information. In this manner, even if the terminal device moves, the terminal device can determine corresponding measurement configuration information in a timely manner, and the network device does not need to deliver the measurement configuration information for a plurality of times when the terminal device moves, to help reduce signaling overheads. In addition, the terminal device does not need to perform measurement based on all measurement configuration information, to reduce power consumption of the terminal device.

With reference to the ninth possible implementation of the first aspect, in a tenth possible implementation of the first aspect, the method further includes:

receiving, by the terminal device, a third message from the network device, where the third message is used to indicate the second index, and the second index is an index of a corresponding reference signal obtained after the terminal device moves; and activating, by the terminal device, the second measurement configuration information that has an association relationship with the second index based on the first relationship, and deactivating the first measurement configuration information.

After moving, the terminal device may independently determine the second index as described in the previous possible implementation, to determine corresponding measurement configuration information based on the second index and the first relationship. Alternatively, after the terminal device moves, the network device may determine that the index of the reference signal corresponding to the terminal device is changed from the first index to the second index, and may determine that the measurement configuration information that is in the first relationship and that corresponds to the second index is the second measurement configuration information. The network device may send the third message to the terminal device, where the third message may indicate the second index. After receiving the third message, the terminal device may determine that the measurement configuration information corresponding to the terminal device is changed to the second measurement configuration information, to perform measurement based on the second measurement configuration information. In this manner, the third message only needs to indicate the second index. In this way, the terminal device can independently determine corresponding measurement configuration information, and the network device does not need to deliver specific measurement configuration information, to help reduce signaling overheads.

With reference to any one of the first aspect or the first possible implementation of the first aspect to the tenth possible implementation of the first aspect, in an eleventh possible implementation of the first aspect, the reference signal includes an SSB and/or a CSI-RS.

A specific signal type of the reference signal is not limited in this embodiment of this application.

With reference to the second possible implementation of the first aspect, in a twelfth possible implementation of the first aspect, the measurement configuration information includes one or any combination of the following:
  frequency information;
  cell information; or
  measurement time information, where the measurement time information is used to indicate a time of measuring the frequency information included in the measurement configuration information, and/or is used to indicate a time of measuring the cell information included in the measurement configuration information.

When the terminal device is in an idle mode, the measurement configuration information may further include at least one of the foregoing content. Certainly, when the terminal device is in the idle mode, for example, in addition to at least one of the foregoing content, the measurement configuration information may further include content other than the foregoing content, or the measurement configuration information may not include any one of the foregoing content, but includes content other than the foregoing content. This is not specifically limited.

According to a second aspect, a second measurement configuration determining method is provided. The method includes: determining, by a network device, a first relationship, where the first relationship is used to indicate an association relationship between an index of a reference signal and measurement configuration information, and the measurement configuration information is used by the terminal device to perform measurement; and sending, by the network device, a first message to the terminal device, where the first message includes the first relationship.

The method may be performed by a second communications apparatus. The second communications apparatus may be the network device or a communications apparatus that can support the network device in implementing a function required for the method, for example, a chip system. In the description of the second aspect, for example, the first communications apparatus is the network device.

With reference to the second aspect, in a first possible implementation of the second aspect, the measurement configuration information includes one or any combination of the following:
  an MO, where the MO includes one or more pieces of frequency information;
  cell information corresponding to the frequency information included in the MO;
  an SMTC of each of at least one piece of frequency information in the one or more pieces of frequency information included in the MO, where the SMTC of each piece of frequency information is used to indicate a time window that corresponds to each piece of frequency information and that is used for measurement;
  first indication information corresponding to the SMTC in the MO, where the first indication information is used to indicate a measurement location in the time window indicated by the SMTC;
  a measurement ID, where the measurement ID is used to indicate a correspondence between the MO and report configuration information, and the report configuration information is used to indicate a reference signal that needs to be measured in a corresponding MO and a manner of reporting a measurement result;
  the report configuration information;
  a quantity of to-be-measured cells;
  a quantity of to-be-measured frequencies;
  a measurement threshold, where the measurement threshold is used to indicate to measure a cell or a frequency whose value of a first parameter is greater than or equal to the measurement threshold; or
  a gap, where the gap is used by the terminal device to measure a reference signal on a frequency other than a frequency of a serving cell of the terminal device.

With reference to the second aspect or the first possible implementation of the second aspect, in a second possible implementation of the second aspect,
  the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or
  the first relationship includes at least one index of a reference signal and measurement configuration information associated with each of the at least one index.

With reference to the second aspect, the first possible implementation of the second aspect, or the second possible implementation of the second aspect, in a third possible implementation of the second aspect,
  the first message further includes the measurement configuration information indicated by the first relationship; or
  the network device further sends a second message to the terminal device, where the second message includes the measurement configuration information indicated by the first relationship.

With reference to any one of the second aspect or the first possible implementation of the second aspect to the third possible implementation of the second aspect, in a fourth possible implementation of the second aspect, the method further includes:

determining, by the network device, that an index of a reference signal corresponding to the terminal device is changed from the first index to a second index; and sending, by the network device, a third message to the terminal device, where the third message is used to indicate second measurement configuration information, and the second measurement configuration information is measurement configuration information that has an association relationship with the second index and that is indicated by the first relationship.

With reference to any one of the second aspect or the first possible implementation of the second aspect to the fourth possible implementation of the second aspect, in a fifth possible implementation of the second aspect, the reference signal includes an SSB and/or a CSI-RS.

With reference to the second aspect, in a sixth possible implementation of the second aspect, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

For technical effects brought by the second aspect or the possible implementations of the second aspect, refer to the descriptions of the technical effects brought by the first aspect or the implementations of the first aspect.

According to a third aspect, a first communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect, for example, include a processing module and a transceiver module that are coupled to each other. For example, the communications apparatus is a terminal device.

The transceiver module is configured to receive a first message from a network device, where the first message includes a first relationship, the first relationship is used to indicate an association relationship between an index of a reference signal and measurement configuration information, and the measurement configuration information is used by the terminal device to perform measurement.

The processing module is configured to determine, based on a first index corresponding to the terminal device, that measurement configuration information corresponding to the terminal device is first measurement configuration information having an association relationship with the first index, where the first index is an index of a reference signal corresponding to the terminal device.

With reference to the third aspect, in a first possible implementation of the third aspect, the terminal device is in a connected mode.

With reference to the third aspect, in a second possible implementation of the third aspect, the terminal device is in an idle mode.

With reference to the third aspect, the first possible implementation of the third aspect, or the second possible implementation of the third aspect, in a third possible implementation of the third aspect, the measurement configuration information includes one or any combination of the following:

an MO, where the MO includes one or more pieces of frequency information;

cell information corresponding to the frequency information included in the MO;

an SMTC of each of at least one piece of frequency information in the one or more pieces of frequency information included in the MO, where the SMTC of each piece of frequency information is used to indicate a time window that corresponds to each piece of frequency information and that is used for measurement;

first indication information corresponding to the SMTC in the MO, where the first indication information is used to indicate a measurement location in the time window indicated by the SMTC;

a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;

a quantity of to-be-measured cells;

a quantity of to-be-measured frequencies;

a measurement threshold, where the measurement threshold is used to indicate to measure a cell or a frequency whose value of a first parameter is greater than or equal to the measurement threshold; or a gap, where the gap is used by the terminal device to measure a reference signal on a frequency other than a frequency of a serving cell of the terminal device.

With reference to any one of the third aspect or the first possible implementation of the third aspect to the third possible implementation of the third aspect, in a fourth possible implementation of the third aspect, the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or the first relationship includes at least one index of a reference signal and measurement configuration information associated with each of the at least one index.

With reference to any one of the third aspect or the first possible implementation of the third aspect to the fourth possible implementation of the third aspect, in a fifth possible implementation of the third aspect, the first message further includes the measurement configuration information indicated by the first relationship; or the transceiver module is further configured to receive a second message from the network device, where the second message includes the measurement configuration information indicated by the first relationship.

With reference to any one of the third aspect or the first possible implementation of the third aspect to the fifth possible implementation of the third aspect, in a sixth possible implementation of the third aspect, the processing module is further configured to:

determine the first index, where the processing module determines the first index in the following manner:

determining that an index of a measured reference signal with best channel quality is the first index; or determining that an index of a reference signal in measured reference signals whose channel quality is greater than or equal to a channel quality threshold is the first index; or determining that an index of an SSB with best channel quality that is measured by the terminal device is the first index; or determining that an index of an SSB used by the terminal device to perform random access is the first index; or determining that an index of an SSB used to receive system information is the first index; or determining that an index of an SSB used to receive the first message is the first index.

With reference to any one of the third aspect, or the first possible implementation of the third aspect to the sixth possible implementation of the third aspect, in a seventh possible implementation of the third aspect, the first measurement configuration information is in an active state, and measurement configuration information that is in the first relationship and that has no association relationship with the first index is in an inactive state, where the processing module performs measurement based on the measurement configuration information in the active state, and does not perform measurement based on the measurement configuration information in the inactive state.

With reference to any one of the third aspect or the first possible implementation of the third aspect to the seventh possible implementation of the third aspect, in an eighth possible implementation of the third aspect, the measurement configuration information that has no association relationship with the first index includes a first MO and/or first report configuration information, but does not include a measurement ID; and the processing module is further configured to:

determine, based on the first MO and/or the first report configuration information in the inactive state, that the measurement ID corresponding to the measurement configuration information that has no association relationship with the first index is in the inactive state.

With reference to the seventh possible implementation of the third aspect or the eighth possible implementation of the third aspect, in a ninth possible implementation of the third aspect, the processing module is further configured to:

determine that the index of the reference signal corresponding to the terminal device is changed from the first index to a second index; and activate second measurement configuration information that has an association relationship with the second index based on the first relationship, and deactivate the first measurement configuration information.

With reference to the ninth possible implementation of the third aspect, in a tenth possible implementation of the third aspect, the transceiver module is further configured to receive a third message from the network device, where the third message is used to indicate the second index, and the second index is an index of a corresponding reference signal obtained after the terminal device moves; and the processing module is further configured to: activate the second measurement configuration information that has an association relationship with the second index based on the first relationship, and deactivate the first measurement configuration information.

With reference to any one of the third aspect or the first possible implementation of the third aspect to the tenth possible implementation of the third aspect, in an eleventh possible implementation of the third aspect, the reference signal includes an SSB and/or a CSI-RS.

With reference to the second possible implementation of the third aspect, in a twelfth possible implementation of the third aspect, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

For technical effects brought by the third aspect or the possible implementations of the third aspect, refer to the descriptions of the technical effects brought by the first aspect or the implementations of the first aspect.

According to a fourth aspect, a second communications apparatus is provided. For example, the communications apparatus is the second communications apparatus described above. The communications apparatus is configured to perform the method according to any one of the second aspect or the possible implementations of the second aspect. Specifically, the communications apparatus may include modules configured to perform the method according to any one of the second aspect or the possible implementations of the second aspect, for example, include a processing module and a transceiver module that are coupled to each other. For example, the communications apparatus is a network device.

The processing module is configured to determine a first relationship, where the first relationship is used to indicate an association relationship between an index of a reference signal and measurement configuration information, and the measurement configuration information is used by the terminal device to perform measurement.

The transceiver module is configured to send a first message to the terminal device, where the first message includes the first relationship.

With reference to the fourth aspect, in a first possible implementation of the fourth aspect, the measurement configuration information includes one or any combination of the following:

an MO, where the MO includes one or more pieces of frequency information;

cell information corresponding to the frequency information included in the MO;

an SMTC of each of at least one piece of frequency information in the one or more pieces of frequency information included in the MO, where the SMTC of each piece of frequency information is used to indicate a time window that corresponds to each piece of frequency information and that is used for measurement;

first indication information corresponding to the SMTC in the MO, where the first indication information is used to indicate a measurement location in the time window indicated by the SMTC;

a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;
a quantity of to-be-measured cells;
a quantity of to-be-measured frequencies;
a measurement threshold, where the measurement threshold is used to indicate to measure a cell or a frequency whose value of a first parameter is greater than or equal to the measurement threshold; or
a gap, where the gap is used by the terminal device to measure a reference signal on a frequency other than a frequency of a serving cell of the terminal device.

With reference to the fourth aspect or the first possible implementation of the fourth aspect, in a second possible implementation of the fourth aspect,
the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or
the first relationship includes at least one index of a reference signal and measurement configuration information associated with each of the at least one index.

With reference to the fourth aspect, the first possible implementation of the fourth aspect, or the second possible implementation of the fourth aspect, in a third possible implementation of the fourth aspect,
the first message further includes the measurement configuration information indicated by the first relationship; or
the transceiver module is further configured to send a second message to the terminal device, where the second message includes the measurement configuration information indicated by the first relationship.

With reference to any one of the fourth aspect or the first possible implementation of the fourth aspect to the third possible implementation of the fourth aspect, in a fourth possible implementation of the fourth aspect,
the processing module is further configured to determine that an index of a reference signal corresponding to the terminal device is changed from the first index to a second index; and
the transceiver module is further configured to send a third message to the terminal device, where the third message is used to indicate second measurement configuration information, and the second measurement configuration information is measurement configuration information that has an association relationship with the second index and that is indicated by the first relationship.

With reference to any one of the fourth aspect or the first possible implementation of the fourth aspect to the fourth possible implementation of the fourth aspect, in a fifth possible implementation of the fourth aspect, the reference signal includes an SSB and/or a CSI-RS.

With reference to the fourth aspect, in a sixth possible implementation of the fourth aspect, the measurement configuration information includes one or any combination of the following:
frequency information;
cell information; or
measurement time information, where the measurement time information is used to indicate a time of measuring the frequency information included in the measurement configuration information, and/or is used to indicate a time of measuring the cell information included in the measurement configuration information.

For technical effects brought by the fourth aspect or the possible implementations of the fourth aspect, refer to the descriptions of the technical effects brought by the second aspect or the implementations of the second aspect.

According to a fifth aspect, a third communications apparatus is provided. For example, the communications apparatus is the first communications apparatus described above. The communications apparatus includes a processor and a transceiver, configured to implement the method described in the first aspect or the possible designs of the first aspect. For example, the communications apparatus is a chip disposed in a communications device. For example, the communications device is a terminal device. For example, the transceiver is implemented by using an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to implement information receiving and sending by using the radio frequency transceiver component.

The transceiver is configured to receive a first message from a network device, where the first message includes a first relationship, the first relationship is used to indicate an association relationship between an index of a reference signal and measurement configuration information, and the measurement configuration information is used by the terminal device to perform measurement.

The processor is configured to determine, based on a first index corresponding to the terminal device, that measurement configuration information corresponding to the terminal device is first measurement configuration information having an association relationship with the first index, where the first index is an index of a reference signal corresponding to the terminal device.

With reference to the fifth aspect, in a first possible implementation of the fifth aspect, the terminal device is in a connected mode.

With reference to the fifth aspect, in a second possible implementation of the fifth aspect, the terminal device is in an idle mode.

With reference to the fifth aspect, the first possible implementation of the fifth aspect, or the second possible implementation of the fifth aspect, in a third possible implementation of the fifth aspect, the measurement configuration information includes one or any combination of the following:
an MO, where the MO includes one or more pieces of frequency information;
cell information corresponding to the frequency information included in the MO;
an SMTC of each of at least one piece of frequency information in the one or more pieces of frequency information included in the MO, where the SMTC of each piece of frequency information is used to indicate a time window that corresponds to each piece of frequency information and that is used for measurement;
first indication information corresponding to the SMTC in the MO, where the first indication information is used to indicate a measurement location in the time window indicated by the SMTC;
a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;

a quantity of to-be-measured cells;

a quantity of to-be-measured frequencies;

a measurement threshold, where the measurement threshold is used to indicate to measure a cell or a frequency whose value of a first parameter is greater than or equal to the measurement threshold; or a gap, where the gap is used by the terminal device to measure a reference signal on a frequency other than a frequency of a serving cell of the terminal device.

With reference to any one of the fifth aspect or the first possible implementation of the fifth aspect to the third possible implementation of the fifth aspect, in a fourth possible implementation of the fifth aspect, the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or the first relationship includes at least one index of a reference signal and measurement configuration information associated with each of the at least one index.

With reference to any one of the fifth aspect or the first possible implementation of the fifth aspect to the fourth possible implementation of the fifth aspect, in a fifth possible implementation of the fifth aspect, the first message further includes the measurement configuration information indicated by the first relationship; or the transceiver is further configured to receive a second message from the network device, where the second message includes the measurement configuration information indicated by the first relationship.

With reference to any one of the fifth aspect or the first possible implementation of the fifth aspect to the fifth possible implementation of the fifth aspect, in a sixth possible implementation of the fifth aspect, the processor is further configured to:

determine the first index, where the processor determines the first index in the following manner:

determining that an index of a measured reference signal with best channel quality is the first index; or determining that an index of a reference signal in measured reference signals whose channel quality is greater than or equal to a channel quality threshold is the first index; or determining that an index of an SSB with best channel quality that is measured by the terminal device is the first index; or determining that an index of an SSB used by the terminal device to perform random access is the first index; or determining that an index of an SSB used to receive system information is the first index; or determining that an index of an SSB used to receive the first message is the first index.

With reference to any one of the fifth aspect, or the first possible implementation of the fifth aspect to the sixth possible implementation of the fifth aspect, in a seventh possible implementation of the fifth aspect, the first measurement configuration information is in an active state, and measurement configuration information that is in the first relationship and that has no association relationship with the first index is in an inactive state, where the processor performs measurement based on the measurement configuration information in the active state, and does not perform measurement based on the measurement configuration information in the inactive state.

With reference to any one of the fifth aspect or the first possible implementation of the fifth aspect to the seventh possible implementation of the fifth aspect, in an eighth possible implementation of the fifth aspect, the measurement configuration information that has no association relationship with the first index includes a first MO and/or first report configuration information, but does not include a measurement ID; and the processor is further configured to:

determine, based on the first MO and/or the first report configuration information in the inactive state, that the measurement ID corresponding to the measurement configuration information that has no association relationship with the first index is in the inactive state.

With reference to the seventh possible implementation of the fifth aspect or the eighth possible implementation of the fifth aspect, in a ninth possible implementation of the fifth aspect, the processor is further configured to:

determine that the index of the reference signal corresponding to the terminal device is changed from the first index to a second index; and activate second measurement configuration information that has an association relationship with the second index based on the first relationship, and deactivate the first measurement configuration information.

With reference to the ninth possible implementation of the fifth aspect, in a tenth possible implementation of the fifth aspect, the transceiver is further configured to receive a third message from the network device, where the third message is used to indicate the second index, and the second index is an index of a corresponding reference signal obtained after the terminal device moves; and the processor is further configured to: activate the second measurement configuration information that has an association relationship with the second index based on the first relationship, and deactivate the first measurement configuration information.

With reference to any one of the fifth aspect or the first possible implementation of the fifth aspect to the tenth possible implementation of the fifth aspect, in an eleventh possible implementation of the fifth aspect, the reference signal includes an SSB and/or a CSI-RS.

With reference to the second possible implementation of the fifth aspect, in a twelfth possible implementation of the fifth aspect, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

For technical effects brought by the fifth aspect or the possible implementations of the fifth aspect, refer to the descriptions of the technical effects brought by the first aspect or the implementations of the first aspect.

According to a fifth aspect, a fourth communications apparatus is provided. For example, the communications apparatus is the second communications apparatus described above. The communications apparatus includes a processor and a transceiver, configured to implement the method described in the second aspect or the possible designs of the second aspect. For example, the communications apparatus is a chip disposed in a communications device. For example, the communications device is a network device. For example, the transceiver is implemented by using an antenna, a feeder, a codec, and the like in the communications device. Alternatively, if the communications apparatus is the chip disposed in the communications device, the transceiver is, for example, a communications interface in the chip, and the communications interface is connected to a radio frequency transceiver component in the communications device, to implement information receiving and sending by using the radio frequency transceiver component.

The processor is configured to determine a first relationship, where the first relationship is used to indicate an association relationship between an index of a reference signal and measurement configuration information, and the measurement configuration information is used by the terminal device to perform measurement.

The transceiver is configured to send a first message to the terminal device, where the first message includes the first relationship.

With reference to the sixth aspect, in a first possible implementation of the sixth aspect, the measurement configuration information includes one or any combination of the following:
  an MO, where the MO includes one or more pieces of frequency information;
  cell information corresponding to the frequency information included in the MO;
  an SMTC of each of at least one piece of frequency information in the one or more pieces of frequency information included in the MO, where the SMTC of each piece of frequency information is used to indicate a time window that corresponds to each piece of frequency information and that is used for measurement;
  first indication information corresponding to the SMTC in the MO, where the first indication information is used to indicate a measurement location in the time window indicated by the SMTC;
  a measurement ID, where the measurement ID is used to indicate a correspondence between the MO and report configuration information, and the report configuration information is used to indicate a reference signal that needs to be measured in a corresponding MO and a manner of reporting a measurement result;
  the report configuration information;
  a quantity of to-be-measured cells;
  a quantity of to-be-measured frequencies;
  a measurement threshold, where the measurement threshold is used to indicate to measure a cell or a frequency whose value of a first parameter is greater than or equal to the measurement threshold; or
  a gap, where the gap is used by the terminal device to measure a reference signal on a frequency other than a frequency of a serving cell of the terminal device.

With reference to the sixth aspect or the first possible implementation of the sixth aspect, in a second possible implementation of the sixth aspect,
  the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or
  the first relationship includes at least one index of a reference signal and measurement configuration information associated with each of the at least one index.

With reference to the sixth aspect, the first possible implementation of the fourth aspect, or the second possible implementation of the sixth aspect, in a third possible implementation of the sixth aspect,
  the first message further includes the measurement configuration information indicated by the first relationship; or
  the transceiver is further configured to send a second message to the terminal device, where the second message includes the measurement configuration information indicated by the first relationship.

With reference to any one of the sixth aspect or the first possible implementation of the sixth aspect to the third possible implementation of the sixth aspect, in a fourth possible implementation of the sixth aspect,
  the processor is further configured to determine that an index of a reference signal corresponding to the terminal device is changed from the first index to a second index; and
  the transceiver is further configured to send a third message to the terminal device, where the third message is used to indicate second measurement configuration information, and the second measurement configuration information is measurement configuration information that has an association relationship with the second index and that is indicated by the first relationship.

With reference to any one of the sixth aspect or the first possible implementation of the sixth aspect to the fourth possible implementation of the sixth aspect, in a fifth possible implementation of the sixth aspect, the reference signal includes an SSB and/or a CSI-RS.

With reference to the sixth aspect, in a sixth possible implementation of the sixth aspect, the measurement configuration information includes one or any combination of the following:
  frequency information;
  cell information; or
  measurement time information, where the measurement time information is used to indicate a time of measuring the frequency information included in the measurement configuration information, and/or is used to indicate a time of measuring the cell information included in the measurement configuration information.

For technical effects brought by the sixth aspect or the possible implementations of the sixth aspect, refer to the descriptions of the technical effects brought by the second aspect or the implementations of the second aspect.

According to a seventh aspect, a fifth communications apparatus is provided. The communications apparatus may be the first communications apparatus in the foregoing method designs. For example, the communications apparatus is a chip disposed in a terminal device. The communications apparatus includes: a memory, configured to store computer executable program code; and a processor, where the processor is coupled to the memory. The program code stored in the memory includes an instruction. When the processor executes the instruction, the fifth communications apparatus is enabled to perform the method according to any one of the first aspect or the possible implementations of the first aspect.

The fifth communications apparatus may further include a communications interface. The communications interface may be a transceiver in the terminal device, for example, implemented by using an antenna, a feeder, a codec, and the like in the communications apparatus. Alternatively, if the fifth communications apparatus is the chip disposed in the terminal device, the communications interface may be an input/output interface in the chip, for example, an input/output pin.

According to an eighth aspect, a sixth communications apparatus is provided. The communications apparatus may be the second communications apparatus in the foregoing method designs. For example, the communications apparatus is a chip disposed in a network device. The communications apparatus includes: a memory, configured to store computer executable program code; and a processor, where the processor is coupled to the memory. The program code stored in the memory includes an instruction. When the processor executes the instruction, the sixteenth communications apparatus is enabled to perform the method according to any one of the second aspect or the possible implementations of the second aspect.

The sixth communications apparatus may further include a communications interface. The communications interface may be a transceiver in the network device, for example, implemented by using an antenna, a feeder, a codec, and the like in the communications apparatus. Alternatively, if the sixth communications apparatus is the chip disposed in the network device, the communications interface may be an input/output interface in the chip, for example, an input/output pin.

According to a ninth aspect, a communications system is provided. The communications system may include the first communications apparatus according to the third aspect, the third communications apparatus according to the fifth aspect, or the fifth communications apparatus according to the seventh aspect, and include the second communications apparatus according to the fourth aspect, the fourth communications apparatus according to the sixth aspect, or the sixth communications apparatus according to the eighth aspect.

According to a tenth aspect, a computer storage medium is provided. The computer readable storage medium stores an instruction, and when the instruction is run on a computer, the computer is enabled to perform the method according to any one of the first aspect or the possible designs of the first aspect.

According to an eleventh aspect, a computer storage medium is provided. The computer readable storage medium stores an instruction, and when the instruction is run on a computer, the computer is enabled to perform the method according to any one of the second aspect or the possible designs of the second aspect.

According to a twelfth aspect, a computer program product including an instruction is provided. The computer program product stores the instruction, and when the computer program product is run on a computer, the computer is enabled to perform the method according to any one of the first aspect or the possible designs of the first aspect.

According to a thirteenth aspect, a computer program product including an instruction is provided. The computer program product stores the instruction, and when the computer program product is run on a computer, the computer is enabled to perform the method according to any one of the second aspect or the possible designs of the second aspect.

In the embodiments of this application, based on the first relationship, the network device does not need to frequently send the measurement configuration information to the terminal device when the terminal device moves. If the terminal device moves, the terminal device determines, from the first relationship based on the index of the corresponding reference signal obtained after the movement, the measurement configuration information corresponding to the terminal device, and the terminal device does not need to perform measurement each time based on measurement configuration information corresponding to an entire cell, but only needs to perform measurement based on the measurement configuration information corresponding to the terminal device. This can effectively reduce power consumption of the terminal device and improve measurement efficiency.

According to a fourteenth aspect, a message processing method is provided. The method may include: receiving, by a first device, a first message sent by a second device, where the first message herein includes or indicates at least one of the following: a first association relationship, a second association relationship, and a third association relationship, the first association relationship is an association relationship between at least one synchronization signal block index (synchronous signal block index, SSB index) and at least one piece of frequency information, the second association relationship is an association relationship between at least one synchronization signal block index and at least one piece of cell information, and the third association relationship is an association relationship between at least one synchronization signal block index and at least one piece of measurement information; and then determining, by the first device, at least one of first frequency information, first cell information, and first measurement information based on at least the first message, where the at least one piece of frequency information herein includes the first frequency information, the at least one piece of cell information includes the first cell information, and the at least one piece of measurement information includes the first measurement information.

In this embodiment of this application, the first device (namely, a terminal device) within a beam coverage area (that is, corresponding to a synchronization signal block) may determine, based on a synchronization signal block index corresponding to a beam in which the first device is located and at least one of the first association relationship, the second association relationship, and the third association relationship included or indicated by the first message, at least one of an adjacent frequency that may be found by the first device, a cell that may need to be measured by the first device, and a specific time of measuring some cells by the first device. In this way, the terminal device can be prevented from searching for and measuring another adjacent frequency or cell outside the beam coverage area, and the terminal device can also be prevented from searching for and measuring a cell in which no synchronization signal block is sent, so that measurement energy consumption of the terminal device can be reduced, and cell reselection efficiency can be improved.

With reference to a possible implementation of the fourteenth aspect, in a first possible implementation, the first device may receive, based on a first synchronous signal block (synchronous signal block, SSB), the first message sent by the second device, where the at least one synchronization signal block index herein includes a first synchronization signal block index, the first synchronization signal block index is determined by the first synchronization signal block, and a resource receiving location of the first message is determined by the first synchronization signal block.

With reference to a possible implementation of the fourteenth aspect, in a second possible implementation, the first device may further receive a second message sent by a third device, where the second message herein includes a first synchronization signal block. Then, the first device may determine a first synchronization signal block index based on the first synchronization signal block, where the at least one synchronization signal block index herein includes the first synchronization signal block index.

With reference to the first possible implementation of the fourteenth aspect or the second possible implementation of the fourteenth aspect, in a third possible implementation, the first device determines at least one of the first frequency information, the first cell information, and the first measurement information based on the first synchronization signal block index and the first message.

With reference to the third possible implementation of the fourteenth aspect, in a fourth possible implementation, the first device may further receive a third message sent by the second device, where the third message herein includes at least one of the following: the at least one piece of frequency information, the at least one piece of cell information, and the at least one piece of measurement information, and the third message and the first message are different messages. Then, the first device may determine at least one of the first frequency information, the first cell information, and the first measurement information based on the first synchronization signal block index, the first message, and the third message. The first message is used to carry at least one of the following: the first association relationship, the second association relationship, and the third association relationship, and the third message carries at least one of the following: the at least one piece of frequency information, the at least one piece of cell information, and the at least one piece of measurement information, so that a base station can send the first message only when the terminal device requires the first message, in other words, the base station does not need to periodically send the first message, to reduce signaling overheads, and save signal resources.

With reference to any one of the fourteenth aspect to the fourth possible implementation of the fourteenth aspect, in a fifth possible implementation, the first message further includes at least one of the following: the at least one piece of frequency information, the at least one piece of cell information, and the at least one piece of measurement information.

With reference to any one of the fourteenth aspect to the fifth possible implementation of the fourteenth aspect, in a sixth possible implementation, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

With reference to any one of the fourteenth aspect to the sixth possible implementation of the fourteenth aspect, in a seventh possible implementation, the first association relationship may be indicated based on a bitmap, the second association relationship may be indicated based on a bitmap, or the third association relationship may be indicated based on a bitmap. The first association relationship is indicated by using the bitmap, the second association relationship is indicated by using the bitmap, or the third association relationship is indicated by using the bitmap, so that an information element corresponding to the frequency information, the cell information, or the measurement information does not need to appear repeatedly, a relationship indication manner is flexible, and signaling overheads are low.

With reference to any one of the fourteenth aspect to the seventh possible implementation of the fourteenth aspect, in an eighth possible implementation, the first association relationship may be indicated based on a first bitmap, and the first bitmap is used to indicate the association relationship between the at least one piece of frequency information and the at least one synchronization signal block index. Each bit in the first bitmap is used to indicate whether the at least one piece of frequency information is associated with the at least one synchronization signal block index.

Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

With reference to any one of the fourteenth aspect to the eighth possible implementation of the fourteenth aspect, in a ninth possible implementation, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information. In this application, the first association relationship is indicated in a form of a list, so that a data structure corresponding to the first association relationship can be simplified, a subsequent process in which the first device parses the first association relationship can be simplified, a data processing amount of the first device can be reduced, and cell reselection efficiency can be improved.

With reference to any one of the fourteenth aspect to the ninth possible implementation of the fourteenth aspect, in a tenth possible implementation, the first association relationship is indicated based on frequency priority information.

The first message includes at least one piece of frequency priority information, and the frequency priority information is used to indicate a priority of the at least one piece of frequency information corresponding to at least one synchronization signal block. The at least one piece of frequency priority information herein includes first frequency priority information, and the first frequency priority information is used to indicate a priority of the first frequency information corresponding to the first synchronization signal block. In this application, the first device may determine, by using the first association relationship indicated based on the frequency priority, frequency information that may need to be searched for by the first device and a priority of searching for each piece of frequency information. In this way, the first device can preferably search for frequency information that is more likely to be found by the first device, to improve cell reselection efficiency.

With reference to any one of the fourteenth aspect to the tenth possible implementation of the fourteenth aspect, in an eleventh possible implementation, the third association relationship may be indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

With reference to any one of the fourteenth aspect to the eleventh possible implementation of the fourteenth aspect, in a twelfth possible implementation, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information. In this application, the third association relationship is indicated in a form of a list, so that a data structure corresponding to the third association relationship can be simplified, a subsequent process in which the first device parses the third association relationship can be simplified, a data processing amount of the first device can be reduced, and cell reselection efficiency can be improved.

With reference to any one of the fourteenth aspect to the twelfth possible implementation of the fourteenth aspect, in a thirteenth possible implementation, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index. Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes. Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

With reference to any one of the fourteenth aspect to the thirteenth possible implementation of the fourteenth aspect, in a fourteenth possible implementation, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information. In this application, the second association relationship is indicated in a form of a list, so that a data structure corresponding to the second association relationship can be simplified, a subsequent process in which the first device parses the second association relationship can be simplified, a data processing amount of the first device can be reduced, and cell reselection efficiency can be improved.

With reference to any one of the fourteenth aspect to the fourteenth possible implementation of the fourteenth aspect, in a fifteenth possible implementation, the second association relationship is indicated based on cell priority information. The cell priority information is used to indicate a priority of the at least one piece of cell information corresponding to the at least one synchronization signal block. The at least one cell priority indication herein includes first cell priority information, and the first cell priority information is used to indicate a priority of the first cell information corresponding to the first synchronization signal block. In this application, the first device may determine, by using the second association relationship indicated based on the cell priority information, cell information that may need to be measured by the first device and a priority of measuring each piece of cell information. In this way, the first device can preferably measure a cell that is more likely to be measured by the first device, to improve cell reselection efficiency.

With reference to any one of the fourteenth aspect to the fifteenth possible implementation of the fourteenth aspect, in a sixteenth possible implementation, the first frequency information is used by the first device to perform inter-frequency measurement when the first device performs cell reselection.

With reference to any one of the fourteenth aspect to the sixteenth possible implementation of the fourteenth aspect, in a seventeenth possible implementation, the first measurement information is used to indicate a time of measuring a synchronization signal block in one or more neighboring cells when the first device performs cell reselection.

With reference to any one of the fourteenth aspect to the seventeenth possible implementation of the fourteenth aspect, in an eighteenth possible implementation, the first cell information is used by the first device to perform intra-frequency neighboring cell measurement or inter-frequency neighboring cell measurement when the first device performs cell reselection.

With reference to any one of the fourteenth aspect to the seventeenth possible implementation of the fourteenth aspect, in an eighteenth possible implementation, the frequency information includes at least an absolute radio frequency channel number (Absolute Radio Frequency Channel Number, ARFCN-ValueNR) or a frequency band number (frequency band number).

With reference to any one of the fourteenth aspect to the eighteenth possible implementation of the fourteenth aspect, in a nineteenth possible implementation, the measurement information includes at least one piece of synchronization signal block received signal strength indicator measurement information (SS-RSSI-measurement) or at least one piece of information about a synchronization signal block that needs to be measured (ssb-ToMeasure).

With reference to any one of the fourteenth aspect to the nineteenth possible implementation of the fourteenth aspect, in a twentieth possible implementation, the cell information includes at least a cell identifier or a cell-level offset parameter used for cell selection or reselection.

In some possible implementations, when the first message includes the at least one piece of frequency information and the first association relationship, and/or the first message includes the at least one piece of cell information and the second association relationship, and/or the first message includes the third association relationship and the at least one piece of measurement information, the first device determines the first frequency information based on the first synchronization signal block index, the at least one piece of frequency information, and the first association relationship; and/or when the first cell information is the intra-frequency neighboring cell information, the first device determines the first cell information based on the first synchronization signal block index, the at least one piece of cell information, and the second association relationship; and/or when the first cell information is the inter-frequency neighboring cell information, the first device determines the first frequency information based on the first synchronization signal block index, the at least one piece of frequency information, and the first association relationship, and determines the first cell information based on the first synchronization signal block index, the at least one piece of cell information, and the second association relationship; and/or the first device determines the first measurement information based on the first synchronization signal block index, the at least one piece of measurement information, and the third association relationship.

In some possible implementations, when the first association relationship includes the at least one piece of frequency information, and/or the second association relationship includes the at least one piece of cell information, and/or the third association relationship includes the at least one piece of measurement information, the first device may determine the first frequency information based on the first synchronization signal block index and the first association relationship; and/or when the first cell information is the intra-frequency neighboring cell information, the first device determines the first cell information based on the first synchronization signal block index and the second association relationship. when the first cell information is the inter-frequency neighboring cell information, the first device determines the first frequency information based on the first synchronization signal block index and the first association relationship, and determines the first cell information based on the first synchronization signal block index and the second association relationship; and/or the first device determines the first measurement information based on the first synchronization signal block index and the third association relationship.

In some possible implementations, when the third message includes the at least one piece of frequency information and the first message includes the first association relationship, and/or the third message includes the at least one piece of cell information and the first message includes the second association relationship, and/or the third message includes the at least one piece of measurement information and the first message includes the third association relationship, the first device determines the first frequency information based on the first synchronization signal block index, the at least one piece of frequency information, and the first association relationship; and/or when the first cell information is the intra-frequency neighboring cell information, the first device determines the first cell information based on the first synchronization signal block index, the at least one piece of cell information, and the second association relationship; and/or when the first cell information is the inter-frequency neighboring cell information, the first device determines the first frequency information based on the first synchronization signal block index, the at least one piece of frequency information, and the first association relationship, and determines the first cell information based on the first synchronization signal block index, the at least one piece of cell information, and the second association relationship; and/or the first device determines the first measurement information based on the first synchronization signal block index, the at least one piece of measurement information, and the third association relationship.

According to the message processing method provided in this embodiment of this application, the first device may determine, based on the association relationship, the specific frequency information, the cell information, the measurement information, or the like, a frequency that needs to be searched for by the first device, a cell that needs to be measured by the first device, or a specific time of measuring a cell by the first device during cell reselection. In addition, the frequency that needs to be searched for and the cell that needs to be measured are respectively a frequency that may be found by the terminal device and a cell that may be measured by the terminal device within a beam range in which the terminal device is currently located, and the specific time of measuring the cell is also a time at which a synchronization signal block is sent in the cell that may be measured by the terminal device within a beam coverage area. Therefore, when performing cell reselection, the terminal device within the beam coverage area does not search for or measure a cell that cannot be found or measured by the terminal device, and does not measure some cells at a time at which no synchronization signal block is sent in the cells, so that measurement energy consumption caused when the terminal device performs cell reselection can be reduced, and cell reselection efficiency can be improved.

According to a fifteenth aspect, a message processing method is provided. The method includes: determining, by a second device, a first message, where the first message herein includes or indicates at least one of the following: a first association relationship, a second association relationship, and a third association relationship, the first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information, where the first message herein is used by a first device to determine at least one of the first frequency information, the first cell information, and the first measurement information, the at least one piece of frequency information includes the first frequency information, the at least one piece of cell information includes the first cell information, and the at least one piece of measurement information includes the first measurement information; and then sending, by the second device, the first message, where the second device herein may send the first message in a broadcast or unicast manner, and this is not limited herein.

In this application, the second device may determine the first message including or indicating at least one of the following: the first association relationship, the second association relationship, and the third association relationship, so that the first device can subsequently determine, based on the first message including the first association relationship, the second association relationship, or the third association relationship, first frequency information that needs to be searched for by the first device, or first cell information that needs to be measured by the first device, or time information of measuring a cell. The frequency that needs to be searched for and the cell that needs to be measured are respectively a frequency that may be found by the terminal device and a cell that may be measured by the terminal device within a beam range in which the terminal device is currently located, and the specific time of measuring the cell is also a time at which a synchronization signal block is sent in the cell that may be measured by the terminal device within a beam coverage area. Therefore, when performing cell reselection, the terminal device within the beam coverage area does not search for or measure a cell that cannot be found by or synchronized with the terminal device, and does not measure some cells at a time at which no synchronization signal block is sent in the cells, so that measurement energy consumption of the terminal device that is caused during cell reselection can be reduced, and cell reselection efficiency can be improved.

With reference to the fifteenth aspect, in a first possible implementation, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

With reference to the fifteenth aspect or the first possible implementation of the fifteenth aspect, in a second possible implementation, the second device determines the first message based on at least one of adjacent-frequency information, neighboring cell information, and neighboring cell measurement information obtained by a fourth device through measurement performed based on one or more synchronization signal blocks. The fourth device may be one or more first devices, or may be one or more drive test devices. This is not limited herein.

With reference to any one of the fifteenth aspect to the second possible implementation of the fifteenth aspect, in a third possible implementation, the second device sends the first message to the first device by using a first synchronization signal block, where a resource sending location of the first message herein is determined by the first synchronization signal block, the at least one synchronization signal block index includes a first synchronization signal block index, and the first synchronization signal block index is determined by the first synchronization signal block.

With reference to the third possible implementation of the fifteenth aspect, in a fourth possible implementation, the first message and the first synchronization signal block index are used by the first device to determine at least one of the first frequency information, the first cell information, and the first measurement information.

With reference to the fourth possible implementation of the fifteenth aspect, in a fifth possible implementation, the second device sends a third message to the first device, where the third message herein includes at least one of the following: the at least one piece of frequency information, the at least one piece of cell information, and the at least one piece of measurement information, and the third message and the first message are different messages. The first message, the first synchronization signal block index, and the third message are used by the first device to determine at least one of the first frequency information, the first cell information, and the first measurement information. In this application, the first message and the third message respectively carry the association relationship and specific frequency information, cell information, or measurement information, so that the second device does not need to periodically send the first message carrying the association relationship, to reduce signaling overheads.

With reference to any one of the fifteenth aspect to the fourth possible implementation of the fifteenth aspect, in a sixth possible implementation, the first message further includes at least one of the following: the at least one piece of frequency information, the at least one piece of cell information, and the at least one piece of measurement information.

With reference to the fourth possible implementation or the sixth possible implementation of the fifteenth aspect, in a seventh possible implementation, when the first message includes the at least one piece of frequency information and the first association relationship, and/or the first message includes the at least one piece of cell information and the second association relationship, and/or the first message includes the third association relationship and the at least one piece of measurement information, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the at least one piece of cell information, and the second association relationship are used by the first device to determine the first cell information; and/or the first synchronization signal block index, the third association relationship, and the at least one piece of measurement information are used by the first device to determine the first measurement information.

With reference to the fourth possible implementation or the sixth possible implementation of the fifteenth aspect, in an eighth possible implementation, when the first association relationship includes the at least one piece of frequency information, and/or the second association relationship includes the at least one piece of cell information, and/or the third association relationship includes the at least one piece of measurement information, the first synchronization signal block index, the at least one piece of frequency information, and the first association relationship are used by the first device to determine the first frequency information; and/or when the first cell information is the intra-frequency neighboring cell information, the first synchronization signal block index, the at least one piece of cell information, and the second association relationship are used by the first device to determine the first cell information; and/or when the first cell information is the inter-frequency neighboring cell information, the first synchronization signal block index, the at least one piece of frequency information, and the first association relationship are used by the first device to determine the first frequency information, and the first synchronization signal block index, the at least one piece of cell information, and the second association relationship are used by the first device to determine the first cell information; and/or the first synchronization signal block index and the third association relationship are used by the first device to determine the first measurement information.

With reference to the fifth possible implementation of the fifteenth aspect, in a ninth possible implementation, when the third message includes the at least one piece of frequency information and the first message includes the first association relationship, and/or the third message includes the at least one piece of cell information and the first message includes the second association relationship, and/or the third message includes the at least one piece of measurement information and the first message includes the third association relationship, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the second association relationship, and the at least one piece of cell information are used by the first device to determine the first cell information; and/or the first synchronization signal block index, the third association relationship, and the at least one piece of measurement information are used by the first device to determine the first measurement information.

With reference to any one of the fifteenth aspect to the ninth possible implementation of the fifteenth aspect, in a tenth possible implementation, the first association relationship is indicated based on a bitmap, the second association relationship is indicated based on a bitmap, or the third association relationship is indicated based on a bitmap.

With reference to the fifteenth aspect to the tenth possible implementation of the fifteenth aspect, in an eleventh possible implementation, the first association relationship is indicated based on a first bitmap. The first bitmap is used to indicate the association relationship between the at least one piece of frequency information and the at least one synchronization signal block index. Each bit in the first bitmap is used to indicate whether the at least one piece of frequency information is associated with the at least one synchronization signal block index.

Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

With reference to any one of the fifteenth aspect to the ninth possible implementation of the fifteenth aspect, in a twelfth possible implementation, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information.

With reference to any one of the fifteenth aspect to the twelfth possible implementation of the fifteenth aspect, in a thirteenth possible implementation, the first association relationship is indicated based on frequency priority information. The first message includes at least one piece of frequency priority information, and the frequency priority information is used to indicate a priority of the at least one piece of frequency information corresponding to at least one synchronization signal block. The at least one piece of frequency priority information herein includes first frequency priority information, and the first frequency priority information is used to indicate a priority of the first frequency information corresponding to the first synchronization signal block.

With reference to any one of the fifteenth aspect to the thirteenth possible implementation of the fifteenth aspect, in a fourteenth possible implementation, the third association relationship is indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

With reference to any one of the fifteenth aspect to the thirteenth possible implementation of the fifteenth aspect, in a fifteenth possible implementation, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information.

With reference to any one of the fifteenth aspect to the fifteenth possible implementation of the fifteenth aspect, in a sixteenth possible implementation, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index.

Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes.

Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

With reference to any one of the fifteenth aspect to the sixteenth possible implementation of the fifteenth aspect, in a sixteenth possible implementation, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information.

With reference to any one of the fifteenth aspect to the seventeenth possible implementation of the fifteenth aspect, in an eighteenth possible implementation, the second association relationship is indicated based on cell priority information. The cell priority information is used to indicate a priority of the at least one piece of cell information corresponding to the at least one synchronization signal block. The at least one piece of cell priority information herein includes first cell priority information, and the first cell priority information is used to indicate a priority of the first cell information corresponding to the first synchronization signal block.

With reference to any one of the fifteenth aspect to the eighteenth possible implementation of the fifteenth aspect, in a nineteenth possible implementation, the first frequency information is used by the first device to perform inter-frequency measurement when the first device performs cell reselection.

With reference to any one of the fifteenth aspect to the nineteenth possible implementation of the fifteenth aspect, in a twentieth possible implementation, the first measurement information is used to indicate a time of measuring a synchronization signal block in one or more neighboring cells when the first device performs cell reselection.

With reference to any one of the fifteenth aspect to the twentieth possible implementation of the fifteenth aspect, in a twenty-first possible implementation, the first cell information is used by the first device to perform intra-frequency neighboring cell measurement or inter-frequency neighboring cell measurement when the first device performs cell reselection.

With reference to any one of the fifteenth aspect to the twenty-first possible implementation of the fifteenth aspect, in a twenty-second possible implementation, the frequency information includes at least an absolute radio frequency channel number or a frequency band number.

With reference to any one of the fifteenth aspect to the twenty-second possible implementation of the fifteenth aspect, in a twenty-third possible implementation, the measurement information includes at least one piece of synchronization signal block received signal strength indicator measurement information or at least one piece of information about a synchronization signal block that needs to be measured.

With reference to any one of the fifteenth aspect to the twenty-third possible implementation of the fifteenth aspect, in a twenty-fourth possible implementation, the cell information includes at least a cell identifier or a cell-level offset parameter used for cell selection or reselection.

According to the message processing method provided in this application, the second device may determine and send the message including the association relationship, the specific frequency information, the cell information, or the measurement information, so that the first device can determine, based on the association relationship, the specific frequency information, the cell information, or the measurement information, a frequency that needs to be searched for by the first device, a cell that needs to be measured by the first device, or a specific time of measuring a cell by the first device during cell reselection. In addition, the frequency that needs to be searched for and the cell that needs to be measured are respectively a frequency that may be found by the terminal device and a cell that may be measured by the terminal device within a beam range in which the terminal device is currently located, and the specific time of measuring the cell is also a time at which a synchronization signal block is sent in the cell that may be measured by the terminal device within a beam coverage area. Therefore, when performing cell reselection, the terminal device within the beam coverage area does not search for or measure a cell that cannot be found or measured by the terminal device, and does not measure some cells at a time at which no synchronization signal block is sent in the cells, so that measurement energy consumption of the terminal device that is caused during cell reselection can be reduced, and cell reselection efficiency can be improved.

According to a sixteenth aspect, a message processing method is provided. The method includes:
sending, by a second device, a fourth message, where the fourth message is used to determine at least one of second frequency information, second cell information, and second measurement information, and a resource sending location of the fourth message is determined by a first synchronization signal block; and
sending, by the second device, a fifth message, where the fifth message is used to determine at least one of third frequency information, third cell information, and third measurement information, and a resource sending location of the fifth message is determined by a second synchronization signal block.

Herein, the second frequency information is different from the third frequency information, or the second cell information is different from the third cell information, or the second measurement information is different from the third measurement information.

With reference to the sixteenth aspect, in a first possible implementation, the second frequency information includes at least one piece of frequency information, and the third frequency information includes at least one piece of frequency information. The at least one piece of frequency information included in the second frequency information is different from the at least one piece of frequency information included in the third frequency information. Alternatively, an arrangement rank of the at least one piece of frequency information included in the second frequency information is different from an arrangement rank of the at least one piece of frequency information included in the third frequency information.

With reference to the first possible implementation of the sixteenth aspect, in a second possible implementation, in the at least one piece of frequency information included in the second frequency information and the at least one piece of frequency information included in the third frequency information, frequency information with a higher rank has a higher priority. A priority of the frequency information is used by a fifth device to perform frequency selection when the fifth device performs cell measurement, and the fifth device is a device that receives the fourth message or the fifth message sent by the second device.

With reference to any one of the sixteenth aspect to the second possible implementation of the sixteenth aspect, in a third possible implementation, the frequency information includes at least an absolute radio frequency channel number or a frequency band number.

With reference to any one of the sixteenth aspect to the third possible implementation of the sixteenth aspect, in a fourth possible implementation, the second cell information includes at least one piece of cell information, and the third cell information includes at least one piece of cell information. The at least one piece of cell information included in the second cell information is different from the at least one piece of cell information included in the third cell information. Alternatively, an arrangement rank of the at least one piece of cell information included in the second cell information is different from an arrangement rank of the at least one piece of cell information included in the third cell information.

With reference to the fourth possible implementation of the sixteenth aspect, in a fifth possible implementation, in the at least one piece of cell information included in the second cell information and the at least one piece of cell information included in the third cell information, cell information with a higher rank has a higher priority. A priority of the cell information is used by the fifth device to perform cell selection when the fifth device performs cell measurement, and the fifth device is the device that receives the fourth message or the fifth message sent by the second device.

With reference to any one of the first possible implementation of the sixteenth aspect to the fifth possible implementation of the sixteenth aspect, in a sixth possible implementation, the cell information is a cell identifier or a cell-level offset parameter used for cell selection or reselection.

With reference to any one of the first possible implementation of the sixteenth aspect to the sixth possible implementation of the sixteenth aspect, in a seventh possible implementation, the cell information includes intra-frequency neighboring cell information or inter-frequency neighboring cell information.

With reference to any one of the first possible implementation of the sixteenth aspect to the seventh possible implementation of the sixteenth aspect, in an eighth possible implementation, the second measurement information includes at least one piece of measurement information, and the third measurement information includes at least one piece of measurement information. The at least one piece of measurement information included in the second measurement information is different from the at least one piece of measurement information included in the third measurement information.

With reference to the first possible implementation or the eighth possible implementation of the sixteenth aspect, in a ninth possible implementation, the measurement information includes at least synchronization signal block-based measurement timing configuration (SS blocks measurement timing configuration, SMTC) information, synchronization signal block received signal strength indicator measurement information, or information about a synchronization signal block that needs to be measured.

In this application, the second device may send, based on different synchronization signal blocks, the fourth message and the fifth message that include different content. The fourth message and the fifth message may be used by the fifth device to determine different frequency information, cell information, or cell measurement information. In this way, the fifth device in a different beam coverage area can receive a message used to indicate only frequency information, cell information, or measurement information within the beam coverage area, so that a message processing process of the fifth device can be simplified. In addition, a quantity of information elements in different messages sent by the second device to different beams is smaller, so that signaling overheads can be reduced.

According to a seventeenth aspect, a message processing method is provided. The method includes: receiving, by a fifth device, a fourth message sent by a second device, where a resource receiving location of the fourth message herein is determined by a first synchronization signal block, and the fourth message includes at least one of the following: second frequency information, second cell information, and second measurement information; and then performing, by the fifth device, measurement based on a frequency or a cell or a cell measurement time indicated by at least one of the second frequency information, the second cell information, and the second measurement information.

With reference to the seventeenth aspect, in a first possible implementation, the first frequency information includes or indicates a frequency list, and the frequency list includes at least one piece of frequency information. The fifth device preferably selects frequency information with a higher rank in the frequency list to perform a frequency search.

With reference to the first possible implementation of the seventeenth aspect, in a second possible implementation, the first cell information includes or indicates a cell list, and the cell list includes at least one cell identifier. The fifth device preferably selects a cell corresponding to a cell identifier with a higher rank in the cell list to perform cell measurement.

According to an eighteenth aspect, a message processing method is provided. The method includes:
  determining, by a third device, a second message, where the second message includes a first synchronization signal block; determining, by the first device, a first synchronization signal block index based on the first synchronization signal block, where the at least one synchronization signal block index includes the first synchronization signal block index; and
  sending, by the third device, the second message, where the second message herein may be used by the first device to determine at least one of first frequency information, first cell information, and first measurement information with reference to a first message; and
  the first message includes or indicates at least one of the following: a first association relationship, a second association relationship, and a third association relationship, the first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information.

According to a nineteenth aspect, a terminal device is provided. The terminal device includes:
  a first receiving unit, configured to receive a first message sent by a second device, where the first message includes or indicates at least one of the following: a first association relationship, a second association relationship, and a third association relationship, the first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information; and
  a first determining unit, configured to determine at least one of first frequency information, first cell information, and first measurement information based on the first message received by the first receiving unit, where the at least one piece of frequency information herein includes the first frequency information, the at least one piece of cell information includes the first cell information, and the at least one piece of measurement information includes the first measurement information.

With reference to the nineteenth aspect, in a first possible implementation, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

With reference to the nineteenth aspect or the first possible implementation of the nineteenth aspect, in a second possible implementation, the first receiving unit may receive the first message based on a first synchronization signal block, where a resource receiving location of the first message is determined by the first synchronization signal block, the at least one synchronization signal block index includes a first synchronization signal block index, and the first synchronization signal block index is determined by the first synchronization signal block.

With reference to the nineteenth aspect or the first possible implementation of the nineteenth aspect, in a third possible implementation, the first receiving unit may receive a second message sent by a third device, where the second message includes a first synchronization signal block. The first device determines a first synchronization signal block index based on the first synchronization signal block, where the at least one synchronization signal block index includes the first synchronization signal block index.

With reference to the second possible implementation or the third possible implementation of the nineteenth aspect, in a fourth possible implementation, the first determining unit determines any one of the first frequency information, the first cell information, and the first measurement information based on the first signal block index and the first message.

With reference to the fourth possible implementation of the nineteenth aspect, in a fifth possible implementation, the first receiving unit is further configured to receive a third message sent by the second device, where the third message herein includes at least one of the following: the at least one piece of frequency information, the at least one piece of cell information, and the at least one piece of measurement information, and the third message and the first message are different messages. The first determining unit is further configured to determine at least one of the first frequency information, the first cell information, and the first measurement information based on the first synchronization signal block index, the first message, and the third message.

With reference to any one of the nineteenth aspect to the fourth possible implementation of the nineteenth aspect, in a sixth possible implementation, the first message further includes at least one of the following: the at least one piece of frequency information, the at least one piece of cell information, and the at least one piece of measurement information.

With reference to the fourth possible implementation of the nineteenth aspect or the sixth possible implementation of the nineteenth aspect, in a seventh possible implementation, when the first message includes at least one of the following: the at least one piece of frequency information and the first association relationship, the at least one piece of cell information and the second association relationship, and the third association relationship and the at least one piece of measurement information, the first determining unit is configured to determine the first frequency information based on the first synchronization signal block index, the at least one piece of frequency information, and the first association relationship; and/or when the first cell information is the intra-frequency neighboring cell information, the first determining unit is configured to determine the first cell information based on the first synchronization signal block index, the at least one piece of cell information, and the second association relationship; and/or when the first cell information is the inter-frequency neighboring cell information, the first determining unit is configured to: determine the first frequency information based on the first synchronization signal block index, the at least one piece of frequency information, and the first association relationship, and determine the first cell information based on the first synchronization signal block index, the at least one piece of cell information, and the second association relationship; and/or the first determining unit is configured to determine the first measurement information based on the first synchronization signal block index, the at least one piece of measurement information, and the third association relationship.

With reference to the fourth possible implementation of the nineteenth aspect or the sixth possible implementation of the nineteenth aspect, in an eighth possible implementation, when the first association relationship includes the at least one piece of frequency information, and/or the second association relationship includes the at least one piece of cell information, and/or the third association relationship includes the at least one piece of measurement information, the first determining unit is configured to determine the first frequency information based on the first synchronization signal block index and the first association relationship; and/or when the first cell information is the intra-frequency neighboring cell information, the first determining unit is configured to determine the first cell information based on the first synchronization signal block index and the second association relationship; and/or when the first cell information is the inter-frequency neighboring cell information, the first determining unit is configured to: determine the first frequency information based on the first synchronization signal block index and the first association relationship, and determine the first cell information based on the first synchronization signal block index and the second association relationship; and/or the first determining unit determines the first measurement information based on the first synchronization signal block index and the third association relationship.

With reference to the fifth possible implementation of the nineteenth aspect, in a ninth possible implementation, when the third message includes at least the at least one piece of frequency information and the first message includes at least the first association relationship, and/or the third message includes at least the at least one piece of cell information and the first message includes at least the second association relationship, and/or the third message includes at least the at least one piece of measurement information and the first message includes at least the third association relationship, the first determining unit determines the first frequency information based on the first synchronization signal block index, the at least one piece of frequency information, and the first association relationship; and/or when the first cell information is the intra-frequency neighboring cell information, the first determining unit determines the first cell information based on the first synchronization signal block index, the at least one piece of cell information, and the second association relationship; and/or when the first cell information is the inter-frequency neighboring cell information, the first determining unit determines the first frequency information based on the first synchronization signal block index, the at least one piece of frequency information, and the first association relationship, and determines the first cell information based on the first synchronization signal block index, the at least one piece of cell information, and the second association relationship; and/or the first determining unit determines the first measurement information based on the first synchronization signal block index, the at least one piece of measurement information, and the third association relationship.

With reference to the nineteenth aspect to the ninth possible implementation of the nineteenth aspect, in a tenth possible implementation, the first association relationship, the second association relationship, or the third association relationship is indicated based on a bitmap.

With reference to any one of the nineteenth aspect to the tenth possible implementation of the nineteenth aspect, in an eleventh possible implementation, the first association relationship is indicated based on a first bitmap. The first bitmap is used to indicate the association relationship between the at least one piece of frequency information and the at least one synchronization signal block index. Each bit in the first bitmap is used to indicate whether the at least one piece of frequency information is associated with the at least one synchronization signal block index.

Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

With reference to any one of the nineteenth aspect to the ninth possible implementation of the nineteenth aspect, in a twelfth possible implementation, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information.

With reference to any one of the nineteenth aspect to the twelfth possible implementation of the nineteenth aspect, in a thirteenth possible implementation, the first association relationship is indicated based on frequency priority information. The first message includes at least one piece of frequency priority information, and the frequency priority information is used to indicate a priority of the at least one piece of frequency information corresponding to at least one synchronization signal block. The at least one piece of frequency priority information includes first frequency priority information, and the first frequency priority information is used to indicate a priority of the first frequency information corresponding to the first synchronization signal block.

With reference to any one of the nineteenth aspect to the thirteenth possible implementation of the nineteenth aspect, in a fourteenth possible implementation, the third association relationship is indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

With reference to any one of the nineteenth aspect to the thirteenth possible implementation of the nineteenth aspect, in a fifteenth possible implementation, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information.

With reference to the nineteenth aspect to the fifteenth possible implementation of the nineteenth aspect, in a sixteenth possible implementation, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index.

Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes.

Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

With reference to the nineteenth aspect to the fifteenth possible implementation of the nineteenth aspect, in a seventeenth possible implementation, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information.

With reference to the nineteenth aspect to the seventeenth possible implementation of the nineteenth aspect, in an eighteenth possible implementation, the second association relationship is indicated based on at least one piece of cell priority information, and the cell priority information is used to indicate a priority of the at least one piece of cell information corresponding to the at least one synchronization signal block. The at least one piece of cell priority information includes first cell priority information, and the first cell priority information is used to indicate a priority of the first cell information corresponding to the first synchronization signal block.

With reference to any one of the nineteenth aspect to the eighteenth possible implementation of the nineteenth aspect, in a nineteenth possible implementation, the first frequency information is used by the first device to perform inter-frequency measurement when the first device performs cell reselection.

With reference to any one of the nineteenth aspect to the nineteenth possible implementation of the nineteenth aspect, in a twentieth possible implementation, the first measurement information is used to indicate a time of measuring a synchronization signal block in one or more neighboring cells when the first device performs cell reselection.

With reference to any one of the nineteenth aspect to the nineteenth possible implementation of the nineteenth aspect, in a twenty-first possible implementation, the first cell information is used by the first device to perform intra-frequency neighboring cell measurement or inter-frequency neighboring cell measurement when the first device performs cell reselection.

With reference to any one of the nineteenth aspect to the twenty-first possible implementation of the nineteenth aspect, in a twenty-second possible implementation, the frequency information includes at least an absolute radio frequency channel number or a frequency band number.

With reference to any one of the nineteenth aspect to the twenty-second possible implementation of the nineteenth aspect, in a twenty-third possible implementation, the measurement information includes at least one piece of synchronization signal block received signal strength indicator measurement information (or at least one piece of information about a synchronization signal block that needs to be measured).

With reference to any one of the nineteenth aspect to the twenty-third possible implementation of the nineteenth aspect, the cell information includes at least a cell identifier or a cell-level offset parameter used for cell selection or reselection.

According to a twentieth aspect, a network device is provided. The network device includes a first message determining unit and a first sending unit. The first message determining unit is configured to determine a first message. The first message herein includes or indicates at least one of the following: a first association relationship, a second association relationship, and a third association relationship. The first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information. The first message is used by a first device to determine at least one of the first frequency information, the first cell information, and the first measurement information. The at least one piece of frequency information herein includes the first frequency information, the at least one piece of cell information includes the first cell information, and the at least one piece of measurement information includes the first measurement information. The first sending unit is configured to send the first message determined by the first message determining unit.

With reference to the twentieth aspect, in a first possible implementation, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

With reference to the twentieth aspect or the first possible implementation of the twentieth aspect, in a second possible implementation, the first message determining unit may determine the first message based on adjacent-frequency information and/or neighboring cell information and/or neighboring cell measurement information obtained by a fourth device through measurement performed based on one or more synchronization signal blocks. The fourth device herein may be one or more first devices, or may be one or more drive test devices.

With reference to any one of the twentieth aspect to the second possible implementation of the twentieth aspect, in a third possible implementation, the first sending unit sends the first message to the first device by using a first synchronization signal block. The at least one synchronization signal block index includes a first synchronization signal block index, the first synchronization signal block index is determined by the first synchronization signal block, and a resource sending location of the first message is determined by the first synchronization signal block.

With reference to the third possible implementation of the twentieth aspect, in a fourth possible implementation, the first message and the first synchronization signal block index are used by the first device to determine at least one of the first frequency information, the first cell information, and the first measurement information.

With reference to the fourth possible implementation of the twentieth aspect, in a fifth possible implementation, the first message determining unit is further configured to determine a third message. The first sending unit is further configured to send the third message. The third message herein includes at least one of the following: the at least one piece of frequency information, the at least one piece of cell information, and the at least one piece of measurement information, and the third message and the first message are different messages. In this case, the first message, the first synchronization signal block index, and the third message may be used by the first device to determine at least one of the first frequency information, the first cell information, and the first measurement information.

With reference to any one of the twentieth aspect to the fourth possible implementation of the twentieth aspect, in a sixth possible implementation, the first message further includes at least one of the following: the at least one piece of frequency information, the at least one piece of cell information, and the at least one piece of measurement information.

With reference to the fourth possible implementation or the sixth possible implementation of the twentieth aspect, in a seventh possible implementation, when the first message includes the at least one piece of frequency information and the first association relationship, and/or the first message includes at least the at least one piece of cell information and the second association relationship, and/or the first message includes the third association relationship and the at least one piece of measurement information, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the at least one piece of cell information, and the second association relationship are used by the first device to determine the first cell information; and/or at least the first synchronization signal block index, the third association relationship, and the at least one piece of measurement information are used by the first device to determine the first measurement information.

With reference to the fourth possible implementation or the sixth possible implementation of the twentieth aspect, in an eighth possible implementation, when the first association relationship includes the at least one piece of frequency information, and/or the second association relationship includes the at least one piece of cell information, and/or the third association relationship includes the at least one piece of measurement information, the first synchronization signal block index, the at least one piece of frequency information, and the first association relationship are used by the first device to determine the first frequency information; and/or when the first cell information is the intra-frequency neighboring cell information, the first synchronization signal block index, the at least one piece of cell information, and the second association relationship are used by the first device to determine the first cell information; and/or when the first cell information is the inter-frequency neighboring cell information, the first synchronization signal block index, the at least one piece of frequency information, and the first association relationship are used by the first device to determine the first frequency information, and the first synchronization signal block index, the at least one piece of cell information, and the second association relationship are used by the first device to determine the first cell information; and/or the first synchronization signal block index and the third association relationship are used by the first device to determine the first measurement information.

With reference to the fifth possible implementation of the twentieth aspect, in a ninth possible implementation, when the third message includes the at least one piece of frequency information and the first message includes the first association relationship, and/or the third message includes the at least one piece of cell information and the first message includes the second association relationship, and/or the third message includes the at least one piece of measurement information and the first message includes the third association relationship, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the second association relationship, and the at least one piece of cell information are used by the first device to determine the first cell information; and/or the first synchronization signal block index, the third association relationship, and the at least one piece of measurement information are used by the first device to determine the first measurement information.

With reference to any one of the twentieth aspect to the ninth possible implementation of the twentieth aspect, in a tenth possible implementation, the first association relationship, the second association relationship, or the third association relationship is indicated based on a bitmap.

With reference to any one of the twentieth aspect to the tenth possible implementation of the twentieth aspect, in an eleventh possible implementation, the first association relationship is indicated based on a first bitmap. The first bitmap is used to indicate the association relationship between the at least one piece of frequency information and the at least one synchronization signal block index. Each bit in the first bitmap is used to indicate whether the at least one piece of frequency information is associated with the at least one synchronization signal block index.

Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

With reference to any one of the twentieth aspect to the ninth possible implementation of the twentieth aspect, in a twelfth possible implementation, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information.

With reference to any one of the twentieth aspect to the twelfth possible implementation of the twentieth aspect, in a thirteenth possible implementation, the first association relationship is indicated based on frequency priority information. The first message includes at least one piece of frequency priority information, and the frequency priority information is used to indicate a priority of the at least one piece of frequency information corresponding to at least one synchronization signal block. The at least one piece of frequency priority information herein includes first frequency priority information, and the first frequency priority information is used to indicate a priority of the first frequency information corresponding to the first synchronization signal block.

With reference to any one of the twentieth aspect to the thirteenth possible implementation of the twentieth aspect, in a fourteenth possible implementation, the third association relationship is indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

With reference to any one of the twentieth aspect to the thirteenth possible implementation of the twentieth aspect, in a fifteenth possible implementation, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information.

With reference to any one of the twentieth aspect to the fifteenth possible implementation of the twentieth aspect, in a sixteenth possible implementation, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index.

Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes.

Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

With reference to any one of the twentieth aspect to the fifteenth possible implementation of the twentieth aspect, in a seventeenth possible implementation, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information.

With reference to any one of the twentieth aspect to the seventeenth possible implementation of the twentieth aspect, in an eighteenth possible implementation, the second association relationship may be further indicated based on cell priority information. The cell priority information herein is used to indicate a priority of the at least one piece of cell information corresponding to the at least one synchronization signal block. The at least one cell priority indication includes first cell priority information, and the first cell priority information is used to indicate a priority of the first cell information corresponding to the first synchronization signal block.

With reference to any one of the twentieth aspect to the eighteenth possible implementation of the twentieth aspect, in a nineteenth possible implementation, the first frequency information is used by the first device to perform inter-frequency measurement when the first device performs cell reselection.

With reference to any one of the twentieth aspect to the nineteenth possible implementation of the twentieth aspect, in a twentieth possible implementation, the first measurement information is used to indicate a time of measuring a synchronization signal block in one or more neighboring cells when the first device performs cell reselection.

With reference to any one of the twentieth aspect to the twentieth possible implementation of the twentieth aspect, in a twenty-first possible implementation, the first cell information is used by the first device to perform intra-frequency neighboring cell measurement or inter-frequency neighboring cell measurement when the first device performs cell reselection.

With reference to any one of the twentieth aspect to the twenty-first possible implementation of the twentieth aspect, in a twenty-second possible implementation, the frequency information includes at least an absolute radio frequency channel number or a frequency band number.

With reference to any one of the twentieth aspect to the twenty-second possible implementation of the twentieth aspect, in a twenty-third possible implementation, the measurement information includes at least one piece of synchronization signal block received signal strength indicator measurement information or at least one piece of information about a synchronization signal block that needs to be measured.

With reference to any one of the twentieth aspect to the twenty-third possible implementation of the twentieth aspect, in a twenty-fourth possible implementation, the cell information includes at least a cell identifier or a cell-level offset parameter used for cell selection or reselection.

According to a twenty-first aspect, another network device is provided. The network device includes a second message determining unit and a second sending unit. The second message determining unit is configured to determine a fourth message. The fourth message is used to determine at least one of second frequency information, second cell information, and second measurement information, and a resource sending location of the fourth message may be determined by a first synchronization signal block. The second message determining unit is further configured to determine a fifth message. The fifth message is used to determine at least one of third frequency information, third cell information, and third measurement information, and a resource sending location of the fifth message is determined by a second synchronization signal block. Herein, the second frequency information is different from the third frequency information, or the second cell information is different from the third cell information, or the second measurement information is different from the third measurement information. The second sending unit is configured to send the fourth message and the fifth message.

With reference to the twenty-first aspect, in a first possible implementation, the second frequency information includes at least one piece of frequency information, and the third frequency information includes at least one piece of frequency information. The at least one piece of frequency information included in the second frequency information is different from the at least one piece of frequency information included in the third frequency information. Alternatively, an arrangement rank of the at least one piece of frequency information included in the second frequency information is different from an arrangement rank of the at least one piece of frequency information included in the third frequency information.

With reference to the first possible implementation of the twenty-first aspect, in a second possible implementation, in the at least one piece of frequency information included in the second frequency information and the at least one piece of frequency information included in the third frequency information, frequency information with a higher rank has a higher priority. A priority of the frequency information is used by a fifth device to perform frequency selection when the fifth device performs cell measurement, and the fifth device is a device that receives the fourth message or the fifth message sent by the second device.

With reference to any one of the twenty-first aspect to the second possible implementation of the twenty-first aspect, in a third possible implementation, the frequency information includes at least an absolute radio frequency channel number or a frequency band number.

With reference to any one of the twenty-first aspect to the third possible implementation of the twenty-first aspect, in a fourth possible implementation, the second cell information includes at least one piece of cell information, and the third cell information includes at least one piece of cell information. The at least one piece of cell information included in the second cell information is different from the at least one piece of cell information included in the third cell information. Alternatively, an arrangement rank of the at least one piece of cell information included in the second cell information is different from an arrangement rank of the at least one piece of cell information included in the third cell information.

With reference to the fourth possible implementation of the twenty-first aspect, in a fifth possible implementation, in the at least one piece of cell information included in the second cell information and the at least one piece of cell information included in the third cell information, cell information with a higher rank has a higher priority. A priority of the cell information is used by the fifth device to perform cell selection when the fifth device performs cell measurement, and the fifth device is the device that receives the fourth message or the fifth message sent by the second device.

With reference to any one of the twenty-first aspect to the fifth possible implementation of the twenty-first aspect, in a sixth possible implementation, the second measurement information includes at least one piece of measurement information, and the third measurement information includes at least one piece of measurement information. The at least one piece of measurement information included in the second measurement information is different from the at least one piece of measurement information included in the third measurement information.

With reference to any one of the twenty-first aspect to the sixth possible implementation of the twenty-first aspect, in a seventh possible implementation, the cell information is a cell identifier or a cell-level offset parameter used for cell selection or reselection.

With reference to any one of the twenty-first aspect to the seventh possible implementation of the twenty-first aspect, in an eighth possible implementation, the cell information includes intra-frequency neighboring cell information or inter-frequency neighboring cell information.

With reference to any one of the twenty-first aspect to the eighth possible implementation of the twenty-first aspect, in a ninth possible implementation, the measurement information includes at least synchronization signal block-based measurement timing configuration information, synchronization signal block received signal strength indicator measurement information, or a synchronization signal block that needs to be measured.

According to a twenty-second aspect, a terminal device is provided. The terminal device includes a second receiving unit and a first measurement unit. The second receiving unit is configured to receive a fourth message sent by a second device. A resource receiving location of the fourth message is determined by a first synchronization signal block. The fourth message includes at least one of the following: second frequency information, second cell information, and second measurement information. The first measurement unit is configured to perform measurement based on a frequency or a cell or a cell measurement time indicated by at least one of the second frequency information, the second cell information, and the second measurement information.

With reference to the twenty-second aspect, in a first possible implementation, the second frequency information includes or indicates a frequency list, and the frequency list includes at least one piece of frequency information. The first measurement unit is configured to perform a frequency search based on frequency information that has a higher rank in the frequency list and that is preferably selected by the fifth device.

With reference to the first possible implementation of the twenty-second aspect, in a second possible implementation, the second cell information includes or indicates a cell list, and the cell list includes at least one cell identifier. The first measurement unit is configured to preferably select a cell corresponding to a cell identifier with a higher rank in the cell list to perform cell measurement.

According to a twenty-third aspect, a network device is provided. The network device includes a third message determining unit and a third sending unit. The third message determining unit is configured to determine a second message, where the second message includes a first synchronization signal block. The first device determines a first synchronization signal block index based on the first synchronization signal block, where the at least one synchronization signal block index includes the first synchronization signal block index. The third sending unit is configured to send the second message, where the second message herein may be used by the first device to determine at least one of first frequency information, first cell information, and first measurement information with reference to a first message.

According to a twenty-fourth aspect, a communications system is provided. The communications system includes the terminal device according to the fourteenth aspect or the seventeenth aspect and the network device according to the fifteenth aspect, the sixteenth aspect, or the eighteenth aspect.

According to a twenty-fifth aspect, a terminal device is provided. The terminal device may include a processor, a memory, and a transceiver.

The memory, the processor, and the transceiver are connected to each other.

The memory is configured to store a group of program code.

The processor and the transceiver are configured to invoke the program code stored in the memory, to perform the message processing method according to the fourteenth aspect or the seventeenth aspect.

According to a twenty-sixth aspect, a network device is provided. The network device may include a processor, a memory, and a transceiver.

The memory, the processor, and the transceiver are connected to each other.

The memory is configured to store a group of program code.

The processor and the transceiver are configured to invoke the program code stored in the memory, to perform the message processing method according to any one of the fifteenth aspect, the sixteenth aspect, and the eighteenth aspect.

According to a twenty-seventh aspect, a computer storage medium is provided, and is configured to store a computer software instruction used by the foregoing terminal device. The computer software instruction includes a program designed for performing the fourteenth aspect or the seventeenth aspect.

According to a twenty-eighth aspect, a computer storage medium is provided, and is configured to store a computer software instruction used by the foregoing network device. The computer software instruction includes a program designed for performing the fifteenth aspect, the sixteenth aspect, or the eighteenth aspect.

According to a twenty-ninth aspect, a computer program product including an instruction is provided. When the computer program product is run on a computer, the computer is enabled to perform the message processing method according to the fourteenth aspect or the seventeenth aspect.

According to a thirtieth aspect, a computer program product including an instruction is provided. When the computer program product is run on a computer, the computer is enabled to perform the message processing method according to any one of the fifteenth aspect, the sixteenth aspect, and the eighteenth aspect.

In addition, according to a thirty-first aspect, a communications apparatus is provided, and includes a processor. The processor is coupled to a memory, and runs an instruction or a program in the memory, to perform the message processing method according to any one of the fourteenth aspect to the eighteenth aspect.

With reference to the thirty-first aspect, in a first possible implementation of the thirty-first aspect, the communications apparatus is a terminal device. The processor is coupled to the memory, and runs the instruction or the program in the memory, to perform the message processing method according to the fourteenth aspect or the seventeenth aspect.

With reference to the thirty-first aspect, in a second possible implementation of the thirty-first aspect, the communications apparatus is a chip. The processor is coupled to the memory, and runs the instruction or the program in the memory, to perform the message processing method according to any one of the first aspect to the eighteenth aspect.

With reference to the thirty-first aspect, in a third possible implementation of the thirty-first aspect, the communications apparatus is a network device. The processor is coupled to the memory, and runs the instruction or the program in the memory, to perform the message processing method according to any one of the fifteenth aspect, the sixteenth aspect, and the eighteenth aspect.

In conclusion, according to the technical solutions provided in the embodiments of this application, measurement energy consumption caused during cell reselection can be reduced, and cell reselection efficiency can be improved.

DESCRIPTION OF EMBODIMENTS

Figure 1:
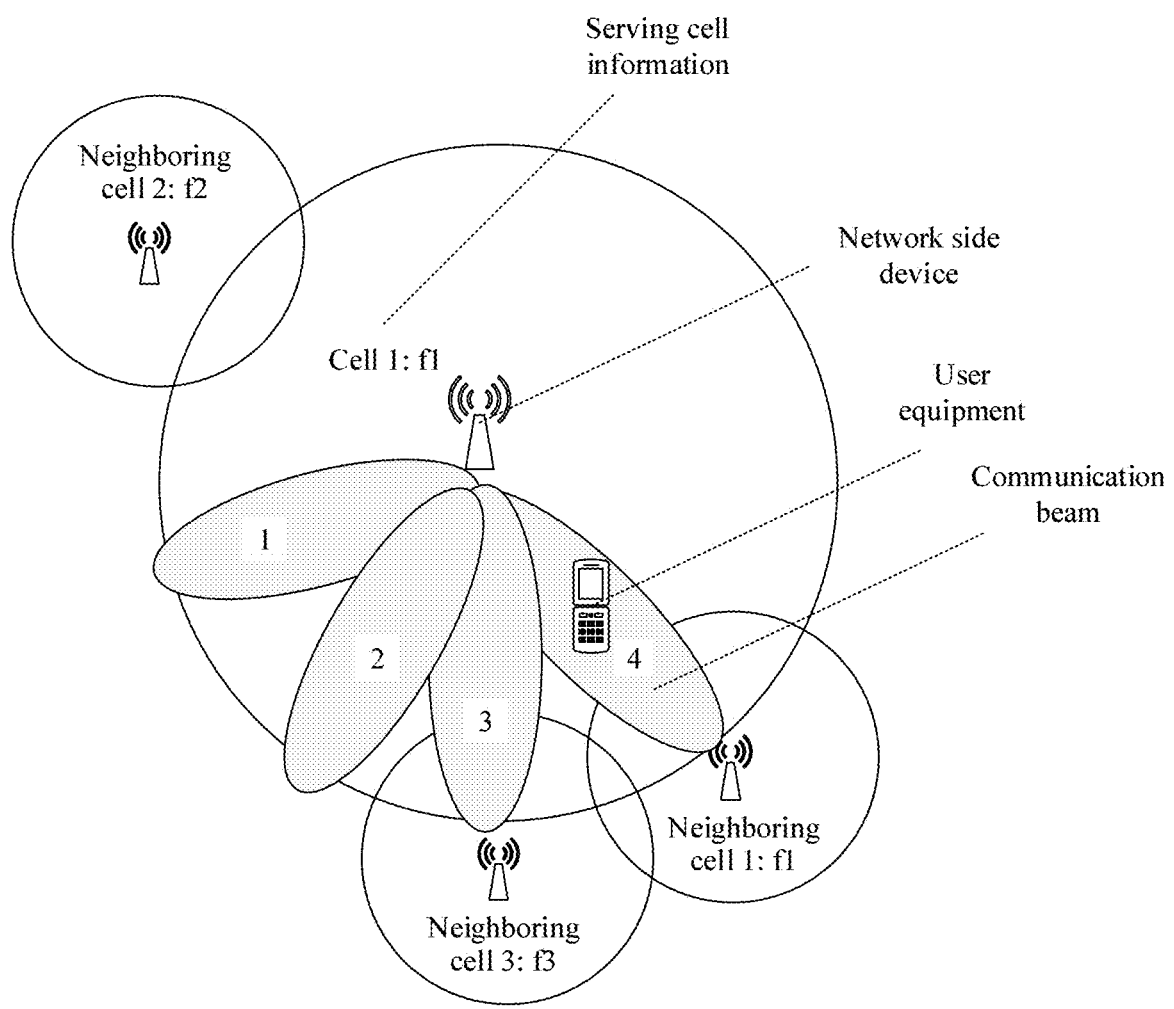
FIG. 1 is a schematic structural diagram of a communications system according to an embodiment of this application.

To make the objectives, technical solutions and advantages of the embodiments of this application clearer, the following further describes the embodiments of this application in detail with reference to the accompanying drawings.

Some terms of the embodiments of this application are described below, to facilitate understanding by a person skilled in the art.

(1) Terminal device: The terminal device includes a device that provides a user with voice and/or data connectivity, for example, may include a handheld device with a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a device-to-device (device-to-device, D2D) communications terminal device, a vehicle-to-everything (vehicle to everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus, or the like. For example, the terminal device may include a device such as a personal communications service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device alternatively includes a limited device, for example, a device with relatively low power consumption, a device with a limited storage capability, or a device with a limited computing capability. For example, the terminal device includes an information sensing device such as a bar code, a radio frequency identification (radio frequency identification, RFID) device, a sensor, a global positioning system (global positioning system, GPS), or a laser scanner.

As an example instead of a limitation, the terminal device in the embodiments of this application may alternatively be a wearable device. The wearable device may also be referred to as a wearable intelligent device, an intelligent wearable device, or the like, and is a general term for wearable devices that are developed by applying a wearable technology to perform intelligent design on daily wear, for example, glasses, gloves, a watch, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed in the vehicle or installed in the vehicle), the terminal devices may be considered as in-vehicle terminal devices. For example, the in-vehicle terminal devices are also referred to as on-board units (on-board unit, OBU).

(2) Network device: For example, the network device includes an access network (access network, AN) device, for example, a base station (for example, an access point), and may be a device that communicates with a wireless terminal device over an air interface by using one or more cells in an access network. Alternatively, for example, a network device in a V2X technology is a road side unit (road side unit, RSU). The base station may be configured to mutually convert a received over-the-air frame and an internet protocol (IP) packet and serve as a router between the terminal device and a rest portion of the access network, where the rest portion of the access network may include an IP network. The RSU may be a fixed infrastructure entity that supports a V2X application, and may exchange a message with another entity that supports the V2X application. The network device may further coordinate attribute management of the air interface. For example, the network device may include an evolved NodeB (NodeB, eNB, or e-NodeB, evolutional NodeB) in an LTE system or a long term evolution-advanced (long term evolution-advanced, LTE-A) system, or may include a next generation NodeB (next generation NodeB, gNB) in a 5G NR system, or may include a centralized unit (centralized unit, CU) and a distributed unit (distributed unit, DU) in a cloud access network (cloud radio access network, Cloud RAN) system. This is not limited in the embodiments of this application.

(3) The terms "system" and "network" may be used interchangeably in the embodiments of this application. "At least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between the associated objects. "At least one (piece) of the following" or a similar expression thereof means any combination of these items, including any combination of singular items (pieces) or plural items (pieces). For example, at least one (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, a first message and a second message are merely intended to distinguish between different messages, but do not indicate that the two messages are different in content, a priority, a sending sequence, importance, or the like.

The embodiments of this application include both technical solutions applicable to a terminal device in an idle mode and technical solutions applicable to a terminal device in a connected mode. Descriptions are separately provided below. The "idle (idle) mode" described in this specification may be a radio resource control (radio resource control, RRC) idle mode, and the "connected mode" described in this specification may be an RRC connected mode.

1. The terminal device is in the idle mode.

The following describes the embodiments of this application with reference to the accompanying drawings in the embodiments of this application.

A message processing method provided in the embodiments of this application is applicable to a long term evolution (long term evolution, LTE) system that supports establishment of dual connectivity (dual connectivity, DC) with a 5G system (also referred to as a new radio NR system) or a 5G system, or is applicable to other wireless communications systems using various radio access technologies, for example, systems using access technologies such as code division multiple access (code division multiple access, CDMA), frequency division multiple access (frequency division multiple access, FDMA), time division multiple access (time division multiple access, TDMA), orthogonal frequency division multiple access (orthogonal frequency division multiple access, OFDMA), single-carrier frequency division multiple access (single carrier-frequency division multiple access, SC-FDMA), and multiple-input multiple-output (multiple input multiple output, MIMO), and a future communications system. This is not limited herein.

In this application, the terms "include" and "have" respectively indicate "include at least" and "have at least". For example, if A includes B, A may include only B, or may include another item in addition to B. A meaning of the term "have" is similar to that of the term "include", and is not limited herein. In this application, the term "according to" indicates "according to at least", and the term "based on" indicates "based on at least". For example, if A determines C according to B, A may determine C according to only B, or may determine C according to both B and another item. A meaning of the term "based on" is similar to that of the term "according to", and is not limited herein.

Figure 2:
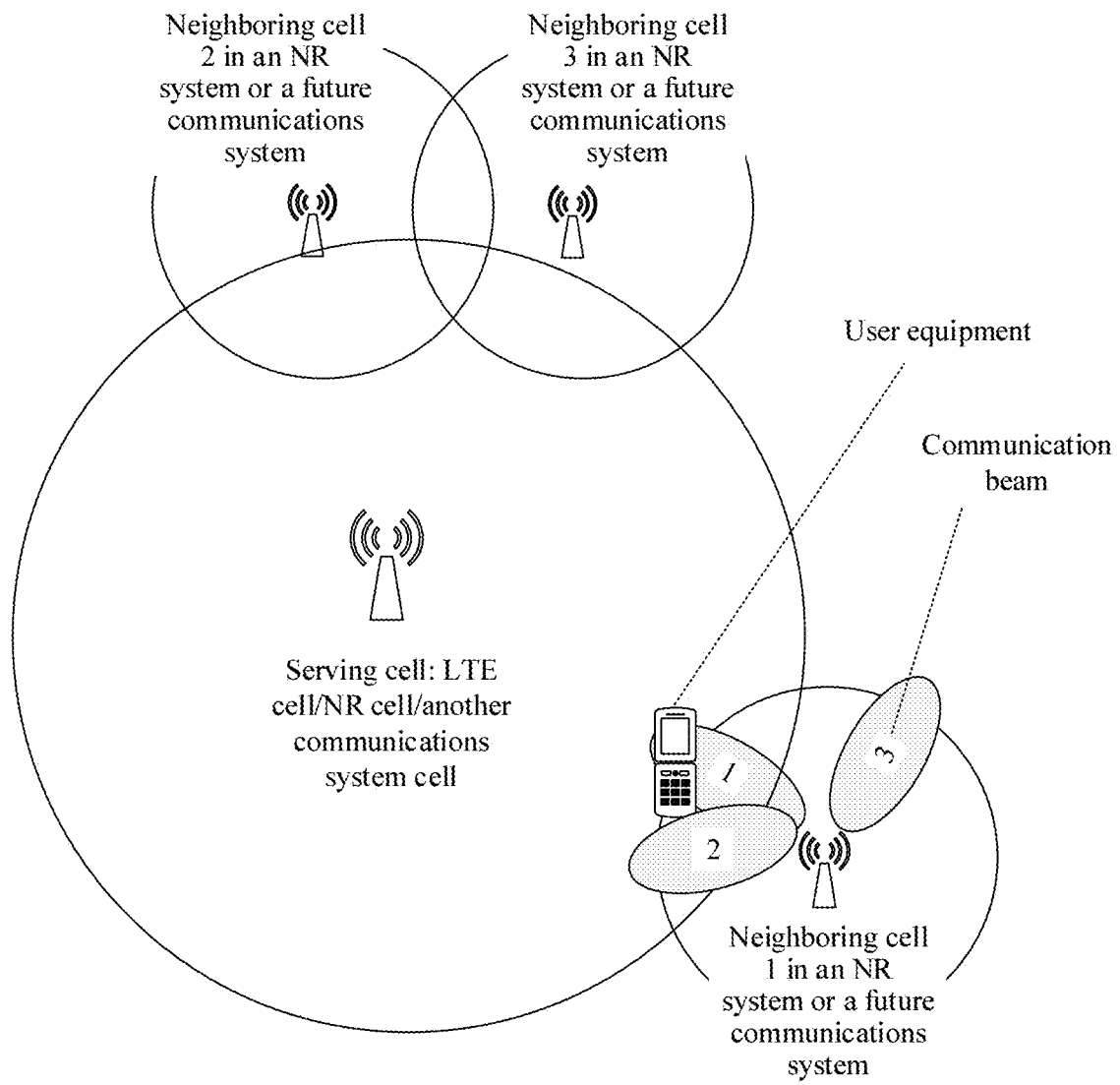
FIG. 2 is a schematic structural diagram of another communications system according to an embodiment of this application.

FIG. 1 is a schematic structural diagram of a communications system according to an embodiment of this application. For example, in a case of MIMO, it can be learned from FIG. 1 that antennas of a network device (namely, a base station in an NR system, briefly referred to as an NR base station below) based on the NR system may form beams (for example, a beam 1 and a beam 2 shown in FIG. 1) in different transmission directions at different times, and the beams are mapped to synchronization signal blocks with different indexes for sending, to form a current serving cell of the network device in a coverage manner. A terminal device within each beam coverage area may receive information about a synchronization signal block to camp on a network or establish a connection to the network device, so as to exchange data with the network device. FIG. 2 is a schematic structural diagram of another communications system according to an embodiment of this application. It can be learned from FIG. 2 that when a terminal device covered by a base station (briefly referred to as an LTE base station) in an LTE system or a base station (briefly referred to as an NR base station) in an NR system searches for a neighboring cell (briefly referred to as an NR neighboring cell) in the NR system and expects to camp on the neighboring cell, if the terminal device finds some cells (for example, cells that do not have a system information block 1 (system information block 1, SIB 1) or cells that are forbidden to be accessed) that meet camping receive power but on which the terminal device is not allowed to camp, the terminal device may determine that the terminal device is in a specific coverage area of a current serving cell, that is, the terminal device may determine that the terminal device is located in a beam coverage area of a specific NR neighboring cell. The terminal device in this application may be a wireless device that provides a user with voice and/or data connectivity. The wireless device may be a handheld device with a wireless connection function, or another processing device connected to a wireless modem, and may be a mobile terminal that communicates with one or more core networks through a radio access network. For example, the wireless terminal may be a mobile phone, a computer, a tablet computer, a personal digital assistant (personal digital assistant, PDA), a mobile internet device (mobile Internet device, MID), a wearable device, and an e-book reader (e-book reader). For another example, the wireless device may alternatively be a portable, pocket-sized, handheld, computer built-in, or in-vehicle mobile device. For still another example, the wireless device may alternatively be a mobile station (mobile station) or an access point (access point). User equipment is one type of the terminal device, and is a name in the LTE system. For ease of description, the terminal device is used as an example for description in the embodiments of this application. The network device in the embodiments of this application is an apparatus that is deployed in a radio access network (radio access network, RAN) and that is configured to provide a wireless communication function for the terminal device. The network device may include a macro base station, a micro base station, a relay station, an access point, a base station controller, and a transmission reception point (transmission reception point, TRP), and the like in various forms. Specific names of the network device in systems using different radio access technologies may be different. For example, in an LTE network, the network device is referred to as an evolved NodeB (evolved NodeB, eNB), and in a 5G system, the network device may be further referred to as a new radio NodeB (new radio NodeB, gNB). For ease of description, in subsequent descriptions of the embodiments of this application, the network device is described by using a base station as an example.

In the embodiments of this application, the base station may broadcast system information to the terminal device through a broadcast channel or receive a user request to send system information, and the terminal device in the idle mode or an inactive state may directly obtain the system information by hearing a broadcast or obtain the system information by sending a request to the base station. In a specific implementation, the NR base station sends a synchronization signal block on a time-frequency resource. The synchronization signal block includes a primary synchronization signal (primary synchronization signal, PSS), a secondary synchronization signal (secondary synchronization signal, SSS), and a physical broadcast channel (Physical Broadcast Channel, PBCH). The physical broadcast channel further includes a master information block (Master Information Block, MIB) and timing information (timing information), for example, time information of an 8-bit (bit) synchronization signal block. The timing information is a synchronization signal block index. The terminal device may be synchronized with the NR base station by using a primary synchronization signal and a secondary synchronization signal in a synchronization signal block, to determine a synchronization signal block corresponding to a current orientation of the terminal device. Then, the terminal device may obtain a master information block and a synchronization signal block index from the synchronization signal block corresponding to the current orientation of the terminal device, then obtain a system information block 1 by using a resource location of the system information block 1 indicated by the master information block, and finally, further obtain specific information about a system information block 2 (SIB 2), a system information block 3 (SIB 3), and a system information block 4 (SIB 4) by using scheduling information of other system information indicated in the system information block 1, for example, scheduling information of the system information block 2, the system information block 3, and the system information block 4 based on the scheduling information. The system information block 2 includes some measurement information obtained when the terminal device in the current serving cell performs cell reselection, the system information block 3 includes intra-frequency neighboring cell information of the current serving cell, and the system information block 4 includes adjacent-frequency information of the current serving cell and inter-frequency neighboring cell information of each adjacent frequency. An intra-frequency neighboring cell is a neighboring cell that works on a same frequency as a synchronization signal block in the current serving cell within a coverage area of the current serving cell and that may be found or detected by the terminal device. The adjacent frequency is not a frequency same as that of a current synchronization signal block within the coverage area of the current serving cell but is a frequency of the neighboring cell that may be found or detected. It may be understood that the NR base station sends the synchronization signal block in a specific direction. In other words, the NR base station sends different synchronization signal blocks within different beam coverage areas. Because a beam has a direction, a beam coverage area is only a part of the current serving cell. A neighboring cell or an adjacent frequency that can be found or detected by a terminal device within a part of a coverage area of a beam is only a subset of a set of all neighboring cells and adjacent frequencies of the current serving cell. If the terminal device searches for all the adjacent frequencies or neighboring cells of the current serving cell when performing cell reselection, measurement energy consumption is wasted. In another specific implementation, the LTE base station that supports dual connectivity broadcasts NR neighboring cell information (for example, a system information block 24) in an LTE information broadcast procedure, and the terminal device may need to find or detect a plurality of NR neighboring cells. When the terminal device finds that some NR neighboring cells meet receive power but cannot provide a camping condition, although the terminal device cannot camp on the NR neighboring cell, the terminal device may determine, based on a synchronization signal block index of the NR neighboring cell, that the terminal device is within a beam coverage area corresponding to a synchronization signal block in the NR neighboring cell. Because the synchronization signal block sent in the NR neighboring cell has a direction, after it is known that the terminal device is located in a sending coverage area of a synchronization signal block in a cell, it can be learned that a neighboring cell or an adjacent frequency that can be found or detected by the terminal device is only an adjacent frequency or a neighboring cell that is in all neighboring cells and adjacent frequencies of the current serving cell and that is within a beam coverage area corresponding to a synchronization signal block. If the terminal device continues to search for all the adjacent frequencies or neighboring cells of the current serving cell when performing cell reselection, measurement energy consumption is wasted. Herein, the current serving cell may also be referred to as a camped cell when the terminal device is the idle mode or the inactive state. The camped cell and the current serving cell may be interchanged in this specification. This is not limited herein.

A technical problem to be resolved in the message processing method provided in the embodiments of this application is how the base station indicates, by using a broadcast message, the terminal device to select a proper adjacent frequency, a proper neighboring cell, or proper measurement information for measurement in the communications systems shown in FIG. 1 and FIG. 2, to reduce a quantity of times of performing blind searching when the terminal device performs cell reselection, reduce measurement energy consumption, and improve resource utilization existing during cell reselection.

In the embodiments of this application, descriptive words such as "first" and "second" added before the objects are merely used to distinguish between different objects, and do not have other limiting functions. For example, a first association relationship and a second association relationship are merely used to distinguish between different association relationships, and do not have other limiting functions.

Embodiment 1

Figure 3:
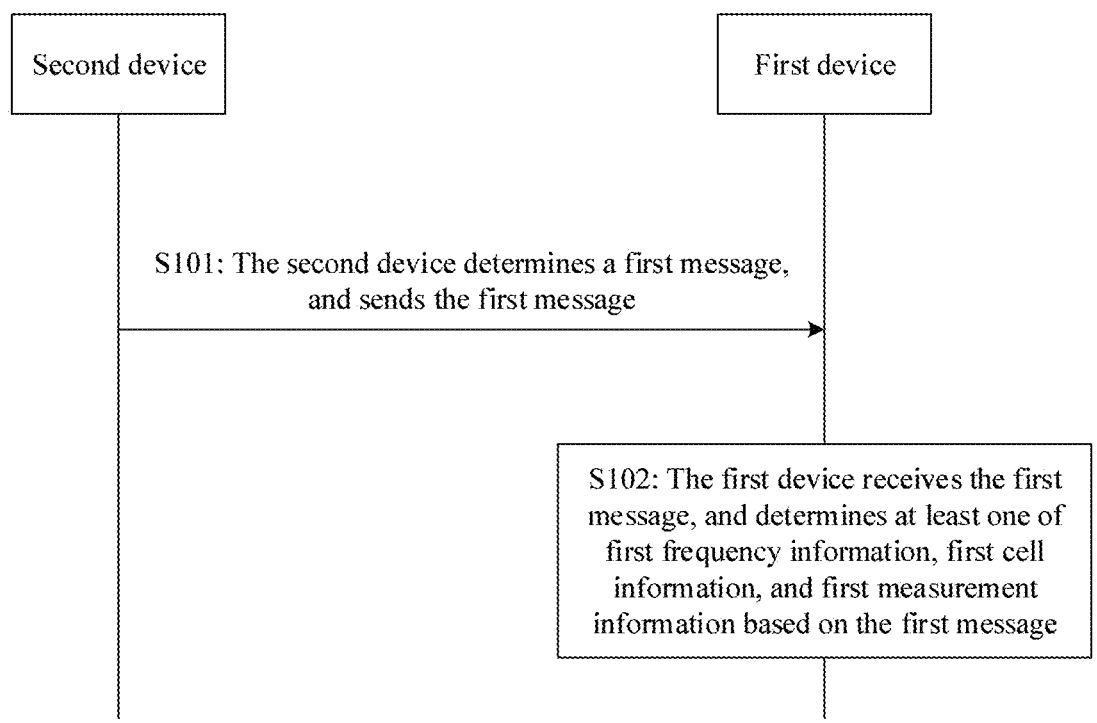
FIG. 3 is a schematic flowchart of Embodiment 1 of a message processing method according to an embodiment of this application.

FIG. 3 is a schematic flowchart of Embodiment 1 of a message processing method according to an embodiment of this application. The method is applicable to the communications system shown in FIG. 1. The method includes the following steps.

S101: A second device determines a first message, and sends the first message.

In some feasible implementations, the second device may determine and send the first message based on a synchronization signal block. The second device herein is the base station in FIG. 1. For ease of understanding, the base station is used to replace the second device for description in this embodiment. The base station may send the first message in a broadcast or unicast manner. This is not limited herein. The first message herein may include or indicate at least one of the following: a first association relationship, a second association relationship, and a third association relationship. In this way, when a first device (namely, a terminal device, for ease of understanding and description, the terminal device is used to replace the first device for description in this embodiment) needs to perform cell reselection, after the terminal device obtains the first message based on a synchronization signal block, the terminal device may determine at least one of first frequency information, first cell information, and first measurement information based on at least one of the first association relationship, the second association relationship, and the third association relationship in the first message and a synchronization signal block index corresponding to the synchronization signal block.

The first association relationship herein is an association relationship between at least one synchronization signal block index and at least one piece of frequency information. In a specific implementation, the at least one piece of frequency information includes the first frequency information. In other words, the first association relationship may specifically include an association relationship between one or more synchronization signal block indexes and the first frequency information. The first frequency information may indicate one or more frequencies that may need to be searched for by the terminal device when the terminal device performs cell reselection. The one or more frequencies are one or more frequencies that may be found by the terminal device within a beam coverage area. Optionally, the frequency information may include adjacent-frequency information of a current serving cell of the terminal device.

The second association information herein is an association relationship between at least one synchronization signal block index and at least one piece of cell information. The at least one piece of cell information includes the first cell information. In other words, the second association relationship may specifically include an association relationship between one or more synchronization signal block indexes and the first cell information. In this way, when the device needs to perform cell reselection, after obtaining the first message based on a synchronization signal block, the terminal device may determine the first cell information based on the second association relationship and a synchronization signal block index corresponding to the synchronization signal block. The first cell information indicates one or more cells that may need to be measured by the terminal device when the terminal device performs cell reselection. The one or more cells are one or more cells that may be measured by the terminal device when the terminal device is within a beam coverage area corresponding to a synchronization signal block. Optionally, the cell information may be intra-frequency neighboring cell information or adjacent-frequency neighboring cell information of a serving cell in which the terminal device is located.

The third association relationship herein is an association relationship between at least one synchronization signal block index and at least one piece of measurement information. The third association relationship may be used by the terminal device to determine the first measurement information. The at least one piece of measurement information includes the first measurement information. In other words, the third association relationship includes or indicates at least an association relationship between one or more synchronization signal block indexes and the first measurement information. The first measurement information includes one or more pieces of measurement information. The measurement information is included in intra-frequency cell reselection information of the current serving cell of the terminal device, and the measurement information is measurement time information of one or more intra-frequency neighboring cells on an intra-frequency of the serving cell in which the first device is located. Alternatively, the measurement information is included in adjacent-frequency measurement information of the current serving cell of the terminal. In this case, the measurement information is measurement time information of one or more inter-frequency neighboring cells on an adjacent frequency of the current serving cell of the terminal device. The first measurement information may be used to indicate time location information of measuring the one or more intra-frequency or inter-frequency neighboring cells when the terminal device performs cell reselection, and the measurement time information of the one or more intra-frequency or inter-frequency neighboring cells is time location information of measuring the one or more intra-frequency neighboring cells or inter-frequency neighboring cells by the terminal device within a beam coverage area corresponding to a synchronization signal block.

Optionally, the frequency information includes at least an absolute radio frequency channel number or a frequency band number. The cell information is a cell identifier or a cell-level offset parameter used for cell selection or reselection. The measurement information includes information about a synchronization signal block that needs to be measured (SSB-ToMeasure) or synchronization signal block received signal strength indicator measurement information (SS-RSSI-Measurement). SSB-ToMeasure herein may be used to determine a time pattern (pattern), namely, a time pattern including one or more time points at which synchronization signal blocks corresponding to one or more cells are measured. SS-RSSI-Measurement may be used to determine a time gap for measuring each of the synchronization signal blocks corresponding to the one or more cells.

In this embodiment of this application, the base station may determine the first message, so that the terminal device can subsequently determine, based on the first message including the first association relationship, the second association relationship, or the third association relationship, first frequency information that needs to be searched for by the terminal device, or first cell information that needs to be measured by the terminal device, or time information of measuring a cell. The frequency that needs to be searched for and the cell that needs to be measured are respectively a frequency that may be found by the terminal device and a cell that may be synchronized with the terminal device within a beam range in which the terminal device is currently located, and the specific time of measuring the cell is also a time at which a synchronization signal block is sent in the cell that may be measured by the terminal device within a beam coverage area. Therefore, when performing cell reselection, the terminal device within the beam coverage area does not search for or measure a cell that cannot be found by or synchronized with the terminal device, and does not measure some cells at a time at which no synchronization signal block is sent in the cells, so that measurement energy consumption caused when the terminal device performs cell reselection can be reduced, and cell reselection efficiency can be improved.

In some feasible implementations, specifically, the base station may determine, based on adjacent-frequency information, neighboring cell information, or measurement information obtained by a fourth device through measurement performed based on one or more synchronization signal blocks, the first association relationship, the second association relationship, or the third association relationship included in the first message. The fourth device may be one or more terminal devices connected to the base station, or may be one or more drive test devices that can exchange information with the base station. This is not limited herein. In a specific implementation, the base station may configure one or more terminal devices within a beam coverage area by using system information or dedicated signaling information, so that the terminal devices can detect adjacent-frequency information, neighboring cell information, or neighboring cell synchronization signal block sending time information. Then, the terminal devices may search for or measure the adjacent-frequency information, the neighboring cell information, or the neighboring cell synchronization signal block sending time information based on one or more synchronization signal blocks, to obtain adjacent-frequency information, neighboring cell information, or neighboring cell synchronization signal block sending time information corresponding to each of one or more synchronization signal block indexes. Further, the terminal devices may report, to the base station, the adjacent-frequency information, the neighboring cell information, or the neighboring cell synchronization signal block sending time information corresponding to each of the one or more synchronization signal block indexes. In this way, the base station may determine the first association relationship based on the adjacent-frequency information corresponding to the one or more synchronization signal block indexes. Alternatively, the base station may determine the second association relationship based on the neighboring cell information corresponding to the one or more synchronization signal blocks. Alternatively, the base station may determine the third association relationship based on the neighboring cell synchronization signal block sending time information corresponding to the one or more synchronization signal blocks. In another specific implementation, the drive test device such as a signal drive test vehicle may first detect adjacent-frequency information, neighboring cell information, or neighboring cell synchronization signal block sending time information within a beam coverage area in a current serving cell of the terminal device, to determine adjacent-frequency information, neighboring cell information, or neighboring cell synchronization signal block sending time information that can be detected by the terminal device within each beam coverage area. Then, the drive test device may report, to the base station, the adjacent-frequency information, the neighboring cell information, or the neighboring cell synchronization signal block sending time information that can be detected by the terminal device within each beam coverage area. Further, the base station may determine, based on the adjacent-frequency information, the neighboring cell information, or the neighboring cell synchronization signal block sending time information that can be detected by the terminal device within each beam coverage area, the first association relationship, the second association relationship, or the third association relationship included in the first message. Optionally, after the base station determines the first message, the base station may send the first message in different directions based on different signal blocks. Specifically, for example, the base station may send a first synchronization signal block in a direction, and then send the first message at a time-frequency resource location determined by the first synchronization signal block.

Optionally, in a specific implementation, for the foregoing three association relationships, the first message may include only the first association relationship. In this way, after obtaining the first message, the terminal device may determine the first frequency information based on the first association relationship in the first message. The first frequency information herein includes one or more pieces of adjacent-frequency information that needs to be searched for by the terminal device.

Optionally, in a specific implementation, for the foregoing three association relationships, the first message may include only the second association relationship. In this way, after obtaining the first message, the terminal device may determine the first cell information based on the second association relationship in the first message. The first cell information herein includes one or more intra-frequency neighboring cells that may need to be measured by the terminal device.

Optionally, for the foregoing three association relationships, the first message may include only the third association relationship. In this way, after obtaining the first message, the terminal device may determine the first measurement information based on the third association relationship included in the first message. The first measurement information herein includes time information of measuring one or more intra-frequency neighboring cells by the terminal device.

Optionally, for the foregoing three association relationships, the first message may include both the first association relationship and the second association relationship. In this way, after obtaining the first message, the terminal device may determine the first frequency information and the first cell information based on the first association relationship and the second association relationship in the first message. Herein, the first frequency information includes one or more adjacent frequencies that need to be searched for by the terminal device, and the first cell information includes cell information corresponding to one or more cells that need to be measured by the terminal device on the one or more adjacent frequencies.

Optionally, for the foregoing three association relationships, the first message may include both the second association relationship and the third association relationship. In this way, after obtaining the first message, the terminal device may determine the first cell information and the first measurement information based on the second association relationship and the third association relationship in the first message. Herein, the first measurement information includes time information of one or more intra-frequency neighboring cells that need to be measured by the terminal device, and the first cell information includes cell information corresponding to one or more cells that need to be measured by the terminal device when the one or more pieces of time information is reached.

Optionally, for the foregoing three association relationships, the first message may include both the first association relationship and the third association relationship. In this way, after obtaining the first message, the terminal device may determine the first frequency information and the first measurement information based on the first association relationship and the third association relationship in the first message. Herein, the first frequency information includes one or more adjacent frequencies that need to be searched for by the terminal device, and the first measurement information includes measurement time information of one or more adjacent-frequency neighboring cells on the one or more adjacent frequencies.

Optionally, for the foregoing three association relationships, the first message may include all of the first association relationship, the second association relationship, and the third association relationship. In this way, after obtaining the first message, the terminal device may determine the first frequency information, the first measurement information, and the first cell information based on the first message. Herein, the first measurement information includes time information of one or more adjacent-frequency neighboring cells that need to be measured by the terminal device, the first frequency information includes one or more adjacent frequencies that need to be searched for by the terminal device, and the first cell information includes information about one or more adjacent-frequency neighboring cells that need to be measured by the terminal device on each adjacent frequency found by the terminal device.

For possible combinations of the three association relationships in the first message, refer to Table 0-1.

TABLE 0-1

| | First association relationship | Second association relationship | Third association relationship | Applicable but not limited to the following scenarios: |
|---|---|---|---|---|
| Combination 1 | ✓ | | | Used to determine an adjacent frequency |
| Combination 2 | | ✓ | | Used to determine an intra-frequency neighboring cell |
| Combination 3 | | | ✓ | Used to determine an intra-frequency neighboring cell measurement time |

TABLE 0-1-continued

| | First association relationship | Second association relationship | Third association relationship | Applicable but not limited to the following scenarios: |
|---|---|---|---|---|
| Combination 4 | ✓ | ✓ | | Used to determine an adjacent frequency and an adjacent-frequency neighboring cell |
| Combination 5 | | ✓ | ✓ | Used to determine an intra-frequency neighboring cell measurement time and an intra-frequency neighboring cell |
| Combination 6 | ✓ | | ✓ | Used to determine an adjacent frequency and an adjacent-frequency neighboring cell measurement time |
| Combination 7 | ✓ | ✓ | ✓ | Used to determine an adjacent-frequency neighboring cell measurement time, an adjacent frequency, and an adjacent-frequency neighboring cell |

Optionally, the first association relationship, the second association relationship, and the third association relationship may also be carried in different messages for sending. For example, the base station may use a message A sent by the base station to carry the first association relationship, and use a message B sent by the base station to carry the second association relationship, and use a message C sent by the base station to carry the third association relationship. For another example, the base station may use a message A sent by the base station to carry the first association relationship and the third association relationship, and use a message B sent by the base station to carry the second association relationship. For another example, the first message sent by the base station may include all of a message A, a message B, and a message C. In this way, the terminal device may obtain the message A, the message B, or the message C based on a specific implementation requirement, and then determine the first frequency information, the first cell information, or the first measurement information.

Optionally, the first message may further include at least one of the following: at least one piece of frequency information, at least one piece of cell information, and at least one piece of measurement information. For specific combinations, refer to Table 0-2.

TABLE 0-2

| | At least one piece of frequency information | At least one piece of cell information | At least one piece of measurement information | Applicable but not limited to the following scenarios: |
|---|---|---|---|---|
| Combination 1 | ✓ | | | Used to determine an adjacent frequency |
| Combination 2 | | ✓ | | Used to determine an intra-frequency neighboring cell |
| Combination 3 | | | ✓ | Used to determine an intra-frequency neighboring cell measurement time |
| Combination 4 | ✓ | ✓ | | Used to determine an adjacent frequency and an adjacent-frequency neighboring cell |
| Combination 5 | | ✓ | ✓ | Used to determine an intra-frequency neighboring cell measurement time and an intra-frequency neighboring cell |
| Combination 6 | ✓ | | ✓ | Used to determine an adjacent frequency and an adjacent-frequency neighboring cell measurement time |

TABLE 0-2-continued

| | At least one piece of frequency information | At least one piece of cell information | At least one piece of measurement information | Applicable but not limited to the following scenarios: |
|---|---|---|---|---|
| Combination 7 | ✓ | ✓ | ✓ | Used to determine an adjacent-frequency neighboring cell measurement time, an adjacent frequency, and an adjacent-frequency neighboring cell |

Herein, it may be understood that in a specific implementation, the first association relationship may directly include the at least one piece of frequency information, the second association relationship may directly include the at least one piece of cell information, and the third association relationship may directly include the at least one piece of measurement information. In another feasible implementation, the first message may include both the at least one piece of frequency information and the first association relationship, that is, the first association relationship does not indicate that the at least one piece of frequency information is included. Similarly, the first message may include both the at least one piece of cell information and the second association relationship. The first message may include both the at least one piece of measurement information and the third association relationship.

In some feasible implementations, the first association relationship, the second association relationship, and the third association relationship each may be indicated based on a bitmap. The first association relationship, the second association relationship, or the third association relationship is indicated by using the bitmap, so that an information element corresponding to the frequency information, the cell information, or the measurement information does not need to appear repeatedly, a relationship indication manner is flexible, and signaling overheads are low.

In some feasible implementations, the first association relationship may be indicated in a form of a bitmap. To be specific, in a specific implementation, the association relationship between the at least one piece of frequency information and the at least one synchronization signal block index may be indicated by using one or more bitmaps that have a preset indication rule.

Optionally, the first association relationship may be indicated based on a first bitmap. The first bitmap may indicate a correspondence between the at least one piece of frequency information and the at least one synchronization signal block index.

In an implementation, any bit in the first bitmap may be used to indicate whether one piece of frequency information is associated with one synchronization signal block index. In a specific implementation, for example, Table 1-1 lists a first bitmap and a preset indication rule corresponding to the first bitmap. The preset indication rule of the first bitmap shown in Table 1-1 is that in the first bitmap, each row corresponds to one piece of frequency information, for example, the first row corresponds to frequency information f1; and each column corresponds to one synchronization signal block index, for example, the first column corresponds to a first synchronization signal block index (namely, an SSB index 1). The first bitmap indicates an association relationship between each of three pieces of frequency information—the frequency information f1, frequency information f2, and frequency information f3 and each of a total of three synchronization signal block indexes—the first synchronization signal block index, a second synchronization signal block index (namely, an SSB index 2), and a third synchronization signal block index (namely, an SSB index 3). It can be learned from Table 1-1 that the first row and the first column in the first bitmap correspond to a bit 0, that is, the frequency information f1 and the first synchronization signal block index SSB index 1 correspond to the bit 0, and therefore, the first bitmap may indicate that the frequency information f1 is not associated with the synchronization signal block index SSB index 1. In addition, the first row and the second column in the first bitmap correspond to a bit 1, that is, the frequency information f1 and the second synchronization signal block index SSB index 2 correspond to the bit 1, and therefore, the first bitmap may indicate that the frequency information f1 is associated with the second synchronization signal block SSB index 2.

TABLE 1-1

| | SSB index 1 | SSB index 2 | SSB index 3 |
|---|---|---|---|
| f1 | 0 | 1 | 0 |
| f2 | 1 | 1 | 1 |
| f3 | 1 | 0 | 0 |

In another implementation, any bit in the first bitmap may be used to indicate whether one piece of frequency information is associated with one or more groups of synchronization signal block indexes. In a specific implementation, for example, Table 1-2 lists another first bitmap and a preset indication rule corresponding to the first bitmap. The preset indication rule of the first bitmap shown in Table 1-2 is that each row in the bitmap corresponds to one piece of frequency information, for example, the first row corresponds to f1; and each column in the bitmap corresponds to one group of synchronization signal block indexes, for example, the first column corresponds to a first group of synchronization signal block indexes including an SSB index 1 and an SSB index 2. It can be learned from content of Table 1-2 that the first bitmap indicates a correspondence between each of three pieces of frequency information f1, f2, and f3 and each of three groups of synchronization signal block indexes. The first group of synchronization signal block indexes and the frequency information f1 in the first bitmap correspond to a bit 0, and therefore, the first bitmap may indicate that neither the first synchronization signal block SSB index 1 nor the second synchronization signal block SSB index 2 included in the first group of synchronization signal block indexes is associated with the frequency information f1. In addition, the first group of synchronization signal block indexes and the frequency information f2 in the first bitmap correspond to a bit 1, and therefore, the first bitmap may indicate that the SSB index 1 and/or the SSB index 2 included in the first group of synchronization signal block indexes are/is associated with the frequency information f2.

TABLE 1-2

|    | First group SSB index 1 SSB index 2 | Second group SSB index 3 SSB index 4 | Third group SSB index 5 SSB index 6 |
|----|---|---|---|
| f1 | 0 | 1 | 0 |
| f2 | 1 | 1 | 1 |
| f3 | 1 | 0 | 0 |

It should be noted that in the first bitmap, a quantity of pieces of frequency information corresponding to each bit and a quantity of synchronization signal block indexes corresponding to each bit are not limited. The frequency information indicated by the first bitmap may be one or more pieces of adjacent-frequency information of a current serving cell, and the synchronization signal block index indicated by the first bitmap may be an index corresponding to each of one or more synchronization signal blocks in the current serving cell. In addition, the preset indication rule corresponding to the first bitmap is not unique. For example, in the first bitmap, each row may also correspond to one synchronization signal block index or one group of synchronization signal block indexes, and each column may also correspond to one or more pieces of frequency information. Optionally, in a specific implementation form, the first bitmap may be a one-dimensional list in code. For example, in a specific implementation form, the first bitmap corresponding to Table 1-1 may be 01010|11100|10001. Optionally, a quantity of bits in each row in the first bitmap may be set. For example, it may be specified that each row corresponds to eight bits. If a quantity of bits is insufficient, the bits are padded with 0. For example, in a specific implementation form, the first bitmap in Table 1-1 may be 01010000|11100000|10001000.

Optionally, when the first bitmap does not appear, it may be understood that the frequency information indicated by the first message is associated with all synchronization signal block indexes. That is, all frequency information indicated by the first message is included in the first frequency information.

Optionally, the first association relationship may alternatively be indicated based on at least one second bitmap. Any one of the at least one second bitmap is used to indicate an association relationship between one synchronization signal block index or one group of synchronization signal block indexes and at least one piece of frequency information.

In an implementation, any bit in the second bitmap is used to indicate whether one synchronization signal block index is associated with one piece of frequency information. In a specific implementation, for example, for details, refer to Table 1-3 and Table 1-4. Table 1-3 and Table 1-4 list two second bitmaps (for ease of understanding and description, it is specified that Table 1-3 corresponds to a second bitmap A, and Table 1-4 corresponds to a second bitmap B). It can be learned from a preset indication rule corresponding to the second bitmap A shown in Table 1-3 that the second bitmap A is used to indicate an association relationship between a first synchronization signal block index SSB index 1 and each of frequency information f1 to frequency information f5. Further, it can be learned from Table 1-3 that the frequency information f1 and the first synchronization signal block index SSB index 1 in the second bitmap A correspond to a bit 0, and therefore, the second bitmap A may indicate that the frequency information f1 is not associated with the first synchronization signal block index SSB index 1. In addition, the frequency information f2 and the first synchronization signal block index SSB index 1 in the second bitmap A correspond to a bit 1, and therefore, the second bitmap A may indicate that the frequency information f2 is associated with the first synchronization signal block SSB index 1. It can be learned from a preset indication rule corresponding to the second bitmap B shown in Table 1-4 that the second bitmap B is used to indicate a correspondence between each of frequency information f1 to frequency information f5 and an SSB index 2. It can be learned from content of Table 1-4 that the frequency information f1 and the second synchronization signal block index SSB index 2 in the second bitmap B correspond to a bit 1, and therefore, the second bitmap B may indicate that the frequency information f1 is associated with the second synchronization signal block index SSB index 2. In addition, the frequency information f2 and the second synchronization signal block index SSB index 2 in the second bitmap B correspond to a bit 0, and therefore, the second bitmap B may indicate that the frequency information f2 is not associated with the second synchronization signal block SSB index 2. Herein, it may be understood that one synchronization signal block index corresponds to one second bitmap, and a specific quantity of second bitmaps may be determined based on an actual application scenario. This is not limited herein.

TABLE 1-3

|             | f1 | f2 | f3 |
|-------------|----|----|----|
| SSB index 1 | 0  | 1  | 0  |

TABLE 1-4

|             | f1 | f2 | f3 |
|-------------|----|----|----|
| SSB index 2 | 1  | 0  | 0  |

In another implementation, any bit in the second bitmap is used to indicate whether one group of synchronization signal block indexes is associated with one piece of frequency information. In a specific implementation, for example, for details, refer to Table 1-5 and Table 1-6. Table 1-5 and Table 1-6 list two second bitmaps (Table 1-5 corresponds to a second bitmap C, and Table 1-6 corresponds to a second bitmap D). Herein, preset indication rules corresponding to the second bitmap C and the second bitmap D are the same. To be specific, in the second bitmap, one row corresponds to one group of synchronization signal block indexes, and each column corresponds to one piece of frequency information. It can be learned from Table 1-5 that a first group of synchronization signal block indexes including an SSB index 1 and an SSB index 2 and frequency information f1 in the second bitmap C correspond to a bit 0, and therefore, the second bitmap C may indicate that neither the synchronization signal block index SSB index 1 nor the synchronization signal block index SSB index 2 is associated with the frequency information f1. In addition, the first group of synchronization signal block indexes and frequency information f2 in the second bitmap C correspond to a bit 1, and therefore, the second bitmap C may indicate that the synchronization signal block index SSB index 1 and/or the synchronization signal block index SSB index 2 are/is associated with f2. Similarly, an association relationship between a second group of synchronization signal block indexes and each of frequency information f1 to frequency information f4 may be determined based on a value of each bit in the second bitmap D. Details are not described herein again. Herein, it may be understood that one group of synchronization signal block indexes corresponds to one second bitmap, and a quantity of second bitmaps may be determined based on an actual application scenario. This is not limited herein.

TABLE 1-5

|  | f1 | f2 | f3 | f4 |
|---|---|---|---|---|
| First group<br>SSB index 1<br>SSB index 2 | 0 | 1 | 0 | 1 |

TABLE 1-6

|  | f1 | f2 | f3 | f4 |
|---|---|---|---|---|
| Second group<br>SSB index 3<br>SSB index 4 | 1 | 0 | 0 | 1 |

In another implementation, any bit in the second bitmap is used to indicate whether one synchronization signal block index is associated with one group of frequency information. In a specific implementation, for example, for details, refer to Table 1-7 and Table 1-8. Table 1-5 and Table 1-6 list two second bitmaps (Table 1-7 corresponds to a second bitmap E, and Table 1-8 corresponds to a second bitmap F). Herein, preset indication rules corresponding to the second bitmap E and the second bitmap F are the same. To be specific, in the map, one row corresponds to one synchronization signal block index, and each column corresponds to one group of frequency information. It can be learned from Table 1-7 that the second bitmap E is used to indicate a correspondence between each of four groups of frequency information and a first synchronization signal block SSB index 1. Herein, a first group of frequency information and the first synchronization signal block index SSB index 1 in the second bitmap E correspond to a bit 0, and therefore, the second bitmap E may indicate that frequency information f1 and frequency information f2 are not associated with the first synchronization signal block SSB index 1. In addition, a second group of frequency information and the first synchronization signal block index SSB index 1 in the second bitmap E correspond to a bit 1, and therefore, the second bitmap may indicate that the frequency information f1 and/or the frequency information f2 are/is associated with the first synchronization signal block SSB index 1. Similarly, an association relationship between a second synchronization signal block index SSB index 2 and each of four groups of frequency information may be determined based on a value of each bit in the second bitmap F. Details are not described herein again. Herein, it may be understood that one synchronization signal block index corresponds to one second bitmap, and a quantity of second bitmaps may be determined based on an actual application scenario. This is not limited herein.

TABLE 1-7

|  | First group<br>f1<br>f2 | Second group<br>f3<br>f4 | Third group<br>f5<br>f6 | Fourth group<br>f7<br>f8 |
|---|---|---|---|---|
| SSB index 1 | 0 | 1 | 0 | 1 |

TABLE 1-8

|  | First group<br>f1<br>f2 | Second group<br>f3<br>f4 | Third group<br>f5<br>f6 | Fourth group<br>f7<br>f8 |
|---|---|---|---|---|
| SSB index 2 | 1 | 0 | 0 | 1 |

In another implementation, any bit in the second bitmap is used to indicate whether one group of synchronization signal block indexes is associated with one group of frequency information. For a specific implementation of the second map, refer to a combination of Table 1-5 and Table 1-7. A correspondence is similar to that in the combination of Table 1-5 and Table 1-7. Details are not described herein again.

It may be understood that in a specific implementation form, the second bitmap may be a one-dimensional list in code. For example, in a specific implementation form, the bitmap corresponding to Table 1-3 may be 01010. Optionally, a quantity of bits in each row in the bitmap may be set. For example, it may be specified that each row corresponds to eight bits. If a quantity of bits is insufficient, the bits are padded with 0. In this way, in a specific implementation form, the second bitmap in Table 1-3 may be 01010000.

Optionally, in any one of the foregoing second bitmaps, a column location corresponding to one piece of frequency information or one group of frequency information is associated with a quantity of times that the one frequency or the group of frequencies in measurement information uploaded by a third device is searched for by the terminal device. A larger quantity of times that a frequency is searched for by the terminal device indicates a higher probability that the frequency is found by the terminal device that currently performs cell reselection. Therefore, the column location in the first association relationship may be further used to indicate a priority of searching for frequency information by the terminal device.

Optionally, when the second bitmap does not appear, it may be understood that the frequency information indicated by the first message is associated with all synchronization signal block indexes of a current serving cell. That is, all frequency information indicated by the first message is included in the first frequency information.

In some feasible implementations, the first association relationship may alternatively be indicated based on at least one third bitmap. Any one of the at least one third bitmap is used to indicate an association relationship between one piece of frequency information or one group of frequency information and at least one synchronization signal block index.

In an implementation, any bit in the third bitmap is used to indicate whether one piece of frequency information is associated with one synchronization signal block index. In a specific implementation, for example, for details, refer to Table 1-9 and Table 1-10. Table 1-9 and Table 1-10 list two third bitmaps (Table 1-9 corresponds to a third bitmap A, and Table 1-10 corresponds to a third bitmap B). Herein, preset indication rules corresponding to Table 1-9 and Table 1-10 are the same. To be specific, in the map, one row corresponds to one piece of frequency information, and each column corresponds to one synchronization signal block index. It can be learned from content of Table 1-9 that frequency information f1 and a first synchronization signal block index SSB index 1 in the third bitmap A correspond to a bit 0, and therefore, the third bitmap A may indicate that the frequency information f1 is not associated with the first synchronization signal block index SSB index 1. The frequency information f1 and a second synchronization signal block index SSB index 2 in the third bitmap correspond to a bit 1, and therefore, the third bitmap may indicate that the frequency information f1 is associated with the second synchronization signal block SSB index 2. Similarly, it can be learned from content of Table 1-8 that frequency information f2 and a second synchronization signal block index SSB index 1 in the third bitmap B correspond to a bit 1, and therefore, the third bitmap B may indicate that the frequency information f1 is associated with the second synchronization signal block index SSB index 1. The frequency information f1 and a second synchronization signal block index SSB index 2 in the third bitmap B correspond to a bit 0, and therefore, the third bitmap B may indicate that the frequency information f1 is not associated with the second synchronization signal block SSB index 2. Herein, it may be understood that one piece of frequency information corresponds to one third bitmap, and a quantity of third bitmaps is determined based on a quantity of pieces of frequency information that needs to be indicated. A specific quantity may be determined based on an actual application scenario, and is not limited herein.

TABLE 1-9

|  | SSB index 1 | SSB index 2 | SSB index 3 |
| --- | --- | --- | --- |
| f1 | 0 | 1 | 0 |

TABLE 1-10

|  | SSB index 1 | SSB index 2 | SSB index 3 |
| --- | --- | --- | --- |
| f2 | 1 | 0 | 0 |

In another implementation, any bit in the third bitmap is used to indicate whether one piece of frequency information is associated with one or more groups of synchronization signal block indexes. In a specific implementation, for example, for details, refer to Table 1-11 and Table 1-12. Table 1-11 and Table 1-12 list two third bitmaps (Table 1-11 corresponds to a third bitmap C, and Table 1-12 corresponds to a third bitmap D). Herein, preset indication rules corresponding to the third bitmap C and the third bitmap D are the same. To be specific, one row in the map corresponds to one piece of frequency information, and each column in the map corresponds to one group of synchronization signal block indexes. It can be learned from Table 1-11 that frequency information f1 and a first group of SSB indexes in the third bitmap C correspond to a bit 0, and therefore, the third bitmap C may indicate that the frequency information f1 is not associated with a first synchronization signal block index SSB index 1 and a second synchronization signal block index SSB index 2. The frequency information f1 and a second group of synchronization signal block indexes in the third bitmap C correspond to a bit 1, and therefore, the third bitmap C may indicate that the frequency information f1 is associated with a third synchronization signal block index SSB index 3 and/or a fourth synchronization signal block index SSB index 4. Similarly, it can be learned from Table 1-12 that frequency information f2 and a first group of SSB indexes in the third bitmap D correspond to a bit 1, and therefore, the third bitmap D may indicate that the frequency information f2 is associated with a first synchronization signal block index SSB index 1 and/or a second synchronization signal block index SSB index 2. Herein, it may be understood that one piece of frequency information corresponds to one third bitmap, and a quantity of third bitmaps is determined based on a quantity of pieces of frequency information that needs to be indicated. A specific quantity may be determined based on an actual application scenario, and is not limited herein.

TABLE 1-11

|  | First group SSB index 1 SSB index 2 | Second group SSB index 3 SSB index 4 | Third group SSB index 5 SSB index 6 | Fourth group SSB index 7 SSB index 8 |
| --- | --- | --- | --- | --- |
| f1 | 0 | 1 | 0 | 1 |

TABLE 1-12

|  | First group SSB index 1 SSB index 2 | Second group SSB index 3 SSB index 4 | Third group SSB index 5 SSB index 6 | Fourth group SSB index 7 SSB index 8 |
| --- | --- | --- | --- | --- |
| f2 | 1 | 0 | 0 | 1 |

It may be understood that in a specific implementation form, the third bitmap may be a one-dimensional list in code. For example, in a specific implementation form, the bitmap corresponding to Table 1-9 may be 01010. Optionally, a quantity of bits in each row in the bitmap may be set. For example, it may be specified that each row corresponds to eight bits. If a quantity of bits is insufficient, the bits are padded with 0. In this way, in a specific implementation form, the third bitmap in Table 1-9 may be 01010000.

In another implementation, any bit in the third bitmap is used to indicate an association relationship between one group of frequency information and one synchronization signal block index. Herein, for a specific implementation of the third bitmap, refer to Table 1-9 or Table 1-10. It should be noted that in this implementation, in the third bitmap, one row corresponds to one group of frequency information, and each column corresponds to one synchronization signal block index. A specific indication relationship corresponding to content included in the third bitmap is similar to the indication relationship corresponding to Table 1-9 or Table 1-10. Details are not described herein again.

In another implementation, any bit in the third bitmap is used to indicate an association relationship between one group of frequency information and one group of synchronization signal block indexes. Herein, for a specific implementation of the third bitmap, refer to Table 1-11 or Table 1-12. It should be noted that in this implementation, in the third bitmap, one row corresponds to one group of frequency information, and each column corresponds to one group of synchronization signal block indexes. A specific indication relationship corresponding to content included in the third bitmap is similar to the indication relationship corresponding to Table 1-11 or Table 1-12. Details are not described herein again.

Optionally, an arrangement rank of each of the one or more third bitmaps may be associated with a quantity of times that each frequency or each group of frequencies in the measurement information uploaded by the third device is searched for by the terminal device. A larger quantity of times that a frequency is searched for by the terminal device indicates a higher probability that the frequency is found by the terminal device that currently performs cell reselection. Therefore, the arrangement rank of each of the one or more third bitmaps may be further used to indicate a priority of searching for frequency information by the terminal device.

In some feasible implementations, when the first association relationship is indicated based on the first bitmap, the second bitmap, or the third bitmap, the first bitmap, the second bitmap, or the third bitmap corresponding to the first association relationship may be included in system information, for example, in a system information block 4 (SIB 4) or a system information block 24 (SIB 24). In this case, the first message includes the system information. It may be understood that there are a plurality of locations of the bitmap corresponding to the first association relationship in the system information block. It should be noted that only necessary content is listed in code implementations provided below, and irrelevant content is appropriately omitted. In addition, provided code in a form of 3GPP ASN.1 encoding is pseudo-code that is easily to be understood. "A::=B" indicates specific content B in current code segment A. "SEQUENCE{ . . . }" indicates that information elements in brackets are arranged in sequence, and "lateNonCriticalExtension" is an indication indicating that a new information element is added to ensure subsequent compatibility. "OPTIONAL" indicates that the code segment indicated above is optional in actual application, and a user determines, based on a value of "OPTIONAL" in actual code, whether the indicated code segment exists. "NEED" indicates how the terminal device processes a previously stored corresponding field if a currently indicated field does not appear. For example, NEED R indicates that the field is to be released to a previous configuration, and NEED N indicates that no action is performed. "SIZE(C) OF D" indicates that there are C information elements B. "BIT STRING(SIZE(E))" indicates that the indicated code segment is in a form of a bitmap and a length is E. "SIZE (1, . . . , and F)" indicates that a value of SIZE ranges from 1 to F.

In an implementation, the first bitmap, the second bitmap, or the third bitmap corresponding to the first association relationship may appear in parallel with an inter-frequency carrier frequency list (InterFreqCarrierFreqList). For a specific implementation, refer to Table 2-1. Table 2-1 shows a code implementation of an SIB 4 (corresponding to a first code segment to a third code segment in Table 2-1) or an SIB 24 (corresponding to a fourth code segment to a sixth code segment in Table 2-1) according to this embodiment of this application. It can be learned with reference to a code structure of the system information block 4 or the system information block 24 that in this embodiment of this application, when the first bitmap, the second bitmap, or the third bitmap exists in the system information block 4, a specific code implementation of the first association relationship indicated based on one first bitmap may be shown in the item Association in the first code segment in Table 2-1. A specific code implementation form of the first association relationship indicated based on one or more second bitmaps may be shown in the item FreqAssociation in the second code segment in Table 2-1. A specific implementation of the first association relationship indicated based on one or more third bitmaps may be shown in the item SSBAssociation in the third code segment in Table 2-1. When the first bitmap, the second bitmap, or the third bitmap exists in the system information block 24, a specific code implementation of the first association relationship indicated based on one first bitmap may be shown in the item Association::=BIT STRING(SIZE(maxSSBNum*maxFreqNum)) in the fourth code segment in Table 2-1. A specific code implementation form of the first association relationship indicated based on one or more second bitmaps may be shown in the item FreqAssociation::=BIT STRING(SIZE(maxFreqNum)) in the fifth code segment in Table 2-1. A specific implementation of the first association relationship indicated based on one or more third bitmaps may be shown in the item SSBAssociation::=BIT STRING(SIZE(maxSSBNum)) in the sixth code segment in Table 2-1. Herein, maxSSBNum may be a quantity of SSB indexes or a quantity of SSB index groups, and maxFreqNum may be a quantity of frequencies or a quantity of adjacent frequency groups. Therefore, after obtaining the SIB 4 or the SIB 24, the terminal device may extract, from the SIB 4, the first association relationship used to determine the first frequency information, to determine the first frequency information of the terminal device, namely, one or more pieces of adjacent-frequency information that may need to be searched for by the terminal device.

TABLE 2-1

First code segment:
SIB 4:: =        SEQUENCE {
    InterFreqCarrierFreqList,
    ...,
    lateNonCriticalExtension        { Association }        OPTIONAL
}
Association:: = BIT STRING(SIZE(maxSSBNum*maxFreqNum))
//The foregoing code indicates that the received SIB 4 includes an inter-frequency
carrier frequency list InterFreqCarrierFreqList, lateNonCriticalExtension
{Association} indicates newly added content: an Association code segment, and the
Association code segment is a bit string BIT STRING with a specific size of
maxSSBNum*maxFreqNum.
Second code segment:
SIB 4:: =        SEQUENCE {
    InterFreqCarrierFreqList,
    ...,
    lateNonCriticalExtension        { Association }        OPTIONAL
}
Association:: = SEQUENCE (SIZE (1...maxSSBNum)) OF FreqAssociation
FreqAssociation:: = BIT STRING(SIZE(maxFreqNum))
//The foregoing code indicates that an inter-frequency carrier frequency list
InterFreqCarrierFreqList is received, lateNonCriticalExtension {Association}

TABLE 2-1-continued indicates newly added content: an Assoication code segment, the Association code
segment includes one or more bitmaps FreqAssociation, that is, is divided into
groups based on an SSB, and FreqAssociation is a bit string BIT STRING with a
specific size of maxFreqNum.
Third code segment:
SIB 4:: =       SEQUENCE {
    InterFreqCarrierFreqList,
    ...,
    lateNonCriticalExtension        { Association }        OPTIONAL
}
Association:: = SEQUENCE (SIZE (1..maxFreqNum)) OF SSBAssociation
SSBAssociation:: = BIT STRING(SIZE(maxSSBNum))
//The foregoing code indicates that an inter-frequency carrier frequency list
InterFreqCarrierFreqList is received, lateNonCriticalExtension {Association}
indicates newly added content: an Assoication code segment, the Association code
segment includes one or more bitmaps SSBAssociation, that is, is divided into
groups based on a frequency, and SSBAssociation is a bit string BIT STRING with
a specific size of maxSSBNum, and indicates an association relationship with the
SSB.
Fourth code segment:
SystemInformationBlockType24-r15:: =           SEQUENCE {
    carrierFreqListNR-r15                       CarrierFreqListNR-r15
OPTIONAL,       -- Need OR
...
    lateNonCriticalExtension      { Association }
OPTIONAL,
    ...
}
Association:: = BIT STRING(SIZE(maxSSBNum*maxFreqNum))
//The foregoing code indicates that the received SIB 24 includes an NR carrier
frequency list carrierFreqListNR-r15, lateNonCriticalExtension {Association}
indicates newly added content: an Association code segment, and the Association
code segment is a bit string BIT STRING with a specific size of
maxSSBNum*maxFreqNum.
Fifth code segment:
SystemInformationBlockType24-r15:: =           SEQUENCE {
    carrierFreqListNR-r15                       CarrierFreqListNR-r15
OPTIONAL,       -- Need OR
...
    lateNonCriticalExtension      { Association }
OPTIONAL,
    ...
}
Association:: = SEQUENCE (SIZE (1..maxSSBNum)) OF FreqAssociation
FreqAssociation:: = BIT STRING(SIZE(maxFreqNum))
//The foregoing code indicates that the received SIB 24 includes an NR carrier
frequency list carrierFreqListNR-r15, lateNonCriticalExtension {Association}
indicates newly added content: an Assoication code segment, the Association code
segment includes one or more bitmaps FreqAssociation, that is, is divided into
groups based on an SSB, and FreqAssociation is a bit string BIT STRING with a
specific size of maxFreqNum.
Sixth code segment:
SystemInformationBlockType24-r15:: =           SEQUENCE {
    carrierFreqListNR-r15                       CarrierFreqListNR-r15
OPTIONAL,       -- Need OR
...
    lateNonCriticalExtension      { Association }
OPTIONAL,
    ...
}
Association:: = SEQUENCE (SIZE (1..maxFreqNum)) OF SSBAssociation
SSBAssociation:: = BIT STRING(SIZE(maxSSBNum))
//The foregoing code indicates that the received SIB 24 includes an NR carrier
frequency list carrierFreqListNR-r15, lateNonCriticalExtension {Association}
indicates newly added content: an Assoication code segment, the Association code
segment includes one or more bitmaps SSBAssociation, that is, is divided into
groups based on a frequency, and SSBAssociation is a bit string BIT STRING with
a specific size of maxSSBNum, and indicates an association relationship with the
SSB.

For example, the first message may include inter-frequency carrier frequency information corresponding to each of one or more adjacent frequencies of the current serving cell. When the first association relationship is indicated based on one or more third bitmaps, each piece of inter-frequency carrier frequency information in the first message may include one third bitmap. Assuming that fn is an adjacent frequency of a serving cell, the first message may include inter-frequency carrier frequency information corresponding to the frequency information fn. In addition, the inter-frequency carrier frequency information corresponding to fn may include one third bitmap, and the third bitmap is used to indicate an association relationship between the inter-frequency carrier frequency fn and one or more synchronization signal block indexes. For a specific implementation form of the third bitmap, refer to the foregoing implementation form of the third bitmap. Details are not described herein again. For a specific implementation of the third bitmap in the inter-frequency carrier frequency information, refer to content of Table 2-2. Table 2-2 shows another code implementation of an SIB 4 or an SIB 24 according to this embodiment of this application. It can be learned with reference to a code structure of the SIB 4 or the SIB 24 that each piece of inter-frequency carrier frequency information in the SIB 4 or the SIB 24 may include one third bitmap. A specific implementation of the third bitmap may be shown in the item SSBAssociation in a first code segment in Table 2-2, or may be shown in the item SSBAssociation in a second code segment. Therefore, after obtaining the SIB 4 or the SIB 24, the terminal device may extract, from each piece of inter-frequency carrier frequency information in the SIB 4 or the SIB 24, the third bitmap used to indicate the first association relationship, to determine the first association relationship, and the terminal device may determine, based on the SSB index corresponding to the terminal device and the first association relationship, one or more pieces of adjacent-frequency information (namely, the first frequency information) that may need to be searched for by the terminal device. In this way, the terminal device may search for only an adjacent frequency within a beam coverage area in which the terminal device is located, and does not need to search for all adjacent frequencies of the current serving cell, thereby reducing search energy consumption and improving cell reselection efficiency.

cell information and the at least one synchronization signal block index by using one or more bitmaps that have a preset indication rule.

Optionally, in a specific implementation, the second association relationship may be indicated based on a sixth bitmap. The sixth bitmap may indicate the association relationship between the at least one piece of cell information and the at least one synchronization signal block index. Optionally the cell information includes at least a cell identifier or a cell-level offset parameter used for cell selection or reselection. In this embodiment of this application, An example in which the cell information is the cell identifier is used for description. The cell information may include Cell 1, Cell 2, and the like, and is not limited herein.

In an implementation, any bit in the sixth bitmap is used to indicate whether one piece of cell information is associated with one synchronization signal block index. In a specific implementation, for example, for details, refer to Table 1-13. Table 1-13 lists a sixth bitmap and a preset indication rule of the sixth bitmap. The preset indication rule of the sixth bitmap listed in Table 1-13 is that each row in the map corresponds to one piece of cell information, and each column in the map corresponds to one synchronization signal block index. It can be learned from Table 1-13 that the sixth bitmap listed in Table 1-13 indicates an association relationship between each of three pieces of cell information and each of three synchronization signal block indexes. It can be learned from Table 1-20 that cell information Cell 1 and a synchronization signal block index SBB index 1 in the sixth bitmap correspond to a bit 0, that is, when the terminal

TABLE 2-2

First code segment: In an SIB 4:
InterFreqCarrierFreqInfo:: =    SEQUENCE {
    dl-CarrierFreq                  ARFCN-ValueNR,
    multiFrequencyBandListNR        MultiFrequencyBandListNR,
    SSBAssociation:: = BIT STRING(SIZE(maxSSBNum))
    ...
}
//The foregoing code indicates that each of a plurality of pieces of inter-frequency
carrier frequency information (InterFreqCarrierFreqInfo) included in the received
SIB 4 includes carrier frequency information (dl-CarrierFreq), where a value of the
carrier frequency information is indicated by an absolute radio frequency channel
number (ARFCN-ValueNR), an NR multi-frequency band list
multiFrequencyBandListNR, where the NR multi-frequency band list indicates a
frequency band number, and SSBAssociation, where SSBAssociation is a bit string
BIT STRING with a specific size of maxSSBNum.
Second code segment: In an SIB 24:
CarrierFreqNR-r15:: =           SEQUENCE {
    carrierFreq-r15                 ARFCN-ValueNR-r15,
    multiBandInfoList-r15           MultiFrequencyBandListNR-r15
OPTIONAL,-- Need OR
    measTimingConfig-r15            MTC-SSB-NR-r15         OPTIONAL,
-- Need OR
    cellReselectionPriority-r15     CellReselectionPriority OPTIONAL,
-- Need OP
    ...
    SSBAssociation                  BIT STRING(SIZE(maxSSBNum))
OPTIONAL, -- Need OR ...
}
//The foregoing code indicates that each of a plurality of pieces of NR carrier
frequency information (CarrierFreqNR-r15) included in the received SIB 24
includes carrier frequency information (carrierFreq-r15), where a value of the
carrier frequency information is indicated by an absolute radio frequency channel
number (ARFCN-ValueNR-r15), an NR multi-frequency band list
multiBandInfoList-r15, where the NR multi-frequency band list indicates a
frequency band number, and SSBAssociation, where SSBAssociation is a bit string
BIT STRING with a specific size of maxSSBNum.

In some feasible implementations, in a specific implementation, the second association relationship may indicate the association relationship between the at least one piece of device obtains the first message based on a first synchronization signal block, the sixth bitmap in the first message may indicate that the cell information Cell 1 is not associated with the synchronization signal block index SBB index 1, that is, the cell information Cell 1 is not included in the first cell information of the terminal device. Similarly, cell information Cell 2 and the synchronization signal block index SSB index 1 correspond to a bit 1, and it indicates that Cell 2 is included in the first cell information of the terminal device.

TABLE 1-13

|        | SSB index 1 | SSB index 2 | SSB index 3 |
|--------|-------------|-------------|-------------|
| Cell 1 | 0           | 1           | 0           |
| Cell 2 | 1           | 1           | 1           |
| Cell 3 | 1           | 0           | 0           |

In another implementation, any bit in the sixth bitmap may be used to indicate whether one piece of frequency information is associated with one or more groups of synchronization signal block indexes. In a specific implementation, Table 1-14 lists another sixth bitmap and a preset indication rule corresponding to the sixth bitmap. It can be learned from Table 1-14 that the sixth bitmap indicates an association relationship between each of three pieces of cell information—Cell 1, Cell 2, and Cell 3 and each of a total of eight synchronization signal block indexes—an SSB index 1 (namely, the first synchronization signal block index) to an SSB index 8. It can be learned from the preset indication rule corresponding to the sixth bitmap that in the map, each row corresponds to one piece of cell information, and each column corresponds to one group of synchronization signal block indexes. It can be learned from content of Table 1-14 that a first group of synchronization signal block indexes and the cell information Cell 1 correspond to a bit 0, and it indicates that neither the SSB index 1 nor the SSB index 2 included in the first group of synchronization signal block indexes is associated with the cell information Cell 1. To be specific, the first cell information indicated by the first message obtained by the terminal device based on a first synchronization signal block or a second synchronization signal block does not include the cell information Cell 1. Similarly, the first group of synchronization signal block indexes and the cell information Cell 2 correspond to a bit 1, and it indicates that the first synchronization signal block index and/or the second synchronization signal block index included in the first group of synchronization signal block indexes are/is associated with the cell information Cell 2. To be specific, the first cell information indicated by the first message obtained by the terminal device based on the first synchronization signal block or the second synchronization signal block includes the cell information Cell 2.

TABLE 1-14

|        | First group SSB index 1 SSB index 2 | Second group SSB index 3 SSB index 4 | Third group SSB index 5 SSB index 6 | Fourth group SSB index 7 SSB index 8 |
|--------|-------------------------------------|--------------------------------------|-------------------------------------|--------------------------------------|
| Cell 1 | 0                                   | 1                                    | 0                                   | 1                                    |
| Cell 2 | 1                                   | 1                                    | 1                                   | 0                                    |
| Cell 3 | 1                                   | 0                                    | 0                                   | 0                                    |

In another implementation, any bit in the sixth bitmap is used to indicate an association relationship between one group of cell information and one synchronization signal block index. Herein, for a specific implementation of the sixth bitmap, refer to Table 1-13. It should be noted that in this implementation, in the sixth bitmap, one row corresponds to one group of frequency information, and each column corresponds to one synchronization signal block index. A specific indication relationship corresponding to content included in the sixth bitmap is similar to the indication relationship corresponding to Table 1-13. Details are not described herein again.

In another implementation, any bit in the sixth bitmap is used to indicate an association relationship between one group of cell information and one group of synchronization signal block indexes. Herein, for a specific implementation of the third bitmap, refer to Table 1-14. It should be noted that in this implementation, in the third bitmap, one row corresponds to one group of frequency information, and each column corresponds to one group of synchronization signal block indexes. A specific indication relationship corresponding to content included in the sixth bitmap is similar to the indication relationship corresponding to Table 1-14. Details are not described herein again.

It may be understood that in the sixth bitmap, a quantity of pieces of cell information corresponding to each bit and a quantity of synchronization signal block indexes corresponding to each bit are not limited. The cell information associated with the sixth bitmap may be one or more pieces of neighboring cell information of a serving cell, and the synchronization signal block index associated with the sixth bitmap may be an index corresponding to each of one or more synchronization signal blocks in the serving cell. In addition, an indication rule of the sixth bitmap is not unique. To be specific, in the map, each row may correspond to one or more SSB indexes, and each column may correspond to one or more pieces of cell information. Optionally, in a specific implementation form, the sixth bitmap may be a one-dimensional list in a code. For example, in a specific implementation form, the bitmap corresponding to Table 1-13 may be 010|111|100. Optionally, a quantity of bits in each row in the bitmap may be set. For example, it is specified that each row corresponds to eight bits. If a quantity of bits is insufficient, the bits are padded with 0. For example, in a specific implementation form, the sixth bitmap in Table 1-13 may be 01010000|11100000|10001000.

Optionally, when the sixth bitmap does not appear, it may be understood that the cell information indicated by the first message is associated with all SSB indexes. That is, all cell information indicated by the first message is included in the first cell information.

In a feasible implementation, the second association relationship may alternatively be indicated based on at least one seventh bitmap. Any one of the at least one seventh bitmap is used to indicate an association relationship between one synchronization signal block index and at least one piece of cell information. In an implementation, each bit in the seventh bitmap is used to indicate an association relationship between one synchronization signal block index and one piece of cell information. In another implementation, each bit in the seventh bitmap is used to indicate an association relationship between one synchronization signal block index and one group of cell information. In an implementation, each bit in the seventh bitmap is used to indicate an association relationship between one group of synchronization signal block indexes and one piece of cell information. In an implementation, each bit in the seventh bitmap is used to indicate an association relationship between one group of synchronization signal block indexes and one group of cell information. It should be noted that for a specific implementation of the seventh bitmap, refer to the specific implementation of the second bitmap described above. It may be understood herein that the corresponding frequency information in the second bitmap described above is replaced with the cell information, so that the seventh bitmap described in this embodiment can be obtained. For details, refer to a similarity relationship between the sixth bitmap and the first bitmap. Details are not described herein again.

Optionally, the second association relationship may alternatively be indicated based on at least one eighth bitmap. Any one of the at least one eighth bitmap is used to indicate an association relationship between one piece of cell information or one group of cell information and at least one synchronization signal block index. Similarly, for a specific implementation of the eighth bitmap, refer to the specific implementation of the third bitmap. Details are not described herein again.

Optionally, when the second association relationship is indicated based on the sixth bitmap, the seventh bitmap, or the eighth bitmap, the sixth bitmap, the seventh bitmap, or the eighth bitmap corresponding to the second association relationship may be included in system information, for example, in a system information block 3 (SIB 3) and/or a system information block 4 (SIB 4) and/or a system information block 24 (SIB 24). It may be understood that there are a plurality of locations of the bitmap corresponding to the second association relationship in the system information block 3 and/or the system information block 4 and/or the system information block 24.

Optionally, in a specific implementation, when the first cell information determined by the terminal device is intra-frequency neighboring cell information, the first message may include only the second association relationship. The second association relationship may be included in the system information block SIB 3.

In an implementation, the sixth bitmap, the seventh bitmap, or the eighth bitmap corresponding to the second association relationship may appear in parallel with an intra-frequency neighboring cell list. For a specific code implementation of the bitmap used to indicate the second association relationship in the system information block 3, refer to the item Association in the first code segment in Table 2-3, or refer to the item CellAssociation in the second code segment, or refer to the item SSBAssociation in the third code segment.

TABLE 2-3

First code segment:
SIB 3:: =    SEQUENCE {
    intraFreqNeighCellList        IntraFreqNeighCellList    OPTIONAL,
-- Need R
    lateNonCriticalExtension      {Association}             OPTIONAL,
    ...
}
Association:: = BIT STRING(SIZE(maxSSBNum*maxCellNum))
//The foregoing code indicates that the received SIB 3 includes an intra-frequency
neighboring cell list intraFreqNeighCellList, lateNonCriticalExtension
{Association} indicates newly added content: an Association code segment, and the
Association code segment is a bit string BIT STRING with a specific size of
maxSSBNum*maxFreqNum.
Second code segment:
SIB 3:: =    SEQUENCE {
    intraFreqNeighCellList        IntraFreqNeighCellList    OPTIONAL,
-- Need R
    lateNonCriticalExtension      {Association}             OPTIONAL,
    ...
}
Association:: = SEQUENCE (SIZE (1..maxSSBNum)) OF CellAssociation
CellAssociation:: = BIT STRING(SIZE(maxCellNum))
//The foregoing code indicates that the received SIB 3 includes an intra-frequency
neighboring cell list intraFreqNeighCellList, lateNonCriticalExtension
{Association} indicates newly added content: an Assoication code segment, the
Association code segment includes one or more bitmaps CellAssociation, that is, is
divided into groups based on an SSB, and CellAssociation is a bit string BIT
STRING with a specific size of maxCellNum.
Third code segment:
SIB 3:: =    SEQUENCE {
    intraFreqNeighCellList        IntraFreqNeighCellList    OPTIONAL,
-- Need R
    lateNonCriticalExtension      {Association}             OPTIONAL,
    ...
}
Association:: = SEQUENCE (SIZE (1..maxCellNum)) OF SSBAssociation
SSBAssociation:: = BIT STRING(SIZE(maxSSBNum))
//The foregoing code indicates that the received SIB 3 includes an intra-frequency
neighboring cell list intraFreqNeighCellList, lateNonCriticalExtension
{Association} indicates newly added content: an Association code segment, the
Association code segment includes one or more bitmaps SSBassociation, that is, is
divided into groups based on a cell, and SSBAssociation is a bit string BIT
STRING with a specific size of maxSSBNum.

In another specific implementation, the first message may include intra-frequency neighboring cell information corresponding to one or more intra-frequency neighboring cells of the current serving cell, for example, one or more pieces of intra-frequency neighboring cell information (namely, a code item IntraFreqNeighCellInfo) included in the system information block SIB 3. When the second association relationship is indicated based on at least one eighth bitmap, each of the one or more pieces of intra-frequency neighboring cell information included in the first message may include one eighth bitmap. For example, if the SIB 3 includes three pieces of intra-frequency neighboring cell information—intra-frequency neighboring cell information Cell 1, intra-frequency neighboring cell information Cell 2, and intra-frequency neighboring cell information Cell 3 that correspond to intra-frequency neighboring cell information 1, intra-frequency neighboring cell information 2, and intra-frequency neighboring cell information 3, the intra-frequency neighboring cell information 1, the intra-frequency neighboring cell information 2, and the intra-frequency neighboring cell information 3 each include one eighth bitmap. One first bitmap included in the intra-frequency neighboring cell information 1 is used to indicate an association relationship between cell information Cell 1 and at least one synchronization signal block. For a specific code implementation of the eighth bitmap, refer to Table 2-4. Table 2-4 shows another code implementation of a system information block 3 according to this embodiment of this application. It can be learned with reference to a code structure of the system information block 3 that a specific implementation of the eighth bitmap may be shown in the item SSBAssociation in Table 2-4. Therefore, after obtaining the SIB 3, the terminal device may extract, from each piece of intra-frequency neighboring cell information in the SIB 3, the eighth bitmap used to indicate the second association relationship, to determine the second association relationship, and the terminal device may determine, based on the SSB index corresponding to the terminal device and the second association relationship, one or more pieces of intra-frequency neighboring cell information that may need to be searched for by the terminal device. In this way, the terminal device may search for and measure only an intra-frequency neighboring cell within a beam coverage area in which the terminal device is located, and does not need to search for and measure all intra-frequency neighboring cells of the current serving cell, thereby reducing measurement energy consumption and improving cell reselection efficiency.

In some feasible implementations, when the first cell information determined by the terminal device is inter-frequency neighboring cell information, the second association relationship is an association relationship between at least one piece of inter-frequency neighboring cell information and at least one synchronization signal block index. The second association relationship includes an association relationship between at least one synchronization signal block index and first cell information including one or more pieces of inter-frequency neighboring cell information. It should be noted herein that when the first cell information determined by the terminal device is the inter-frequency neighboring cell information, for a specific indication form of the second association relationship, reference may be made to the specific indication form of the second association relationship described when the first cell information is the intra-frequency neighboring cell information. Details are not described herein again. Further, the second association relationship used to indicate the one or more pieces of inter-frequency neighboring cell information may be included in the SIB 4 in the first message. It may be understood that there are a plurality of different implementation forms for a location of the second association relationship in the SIB 4.

In a specific implementation, the sixth bitmap, the seventh bitmap, or the eighth bitmap corresponding to the second association relationship may appear in parallel with an inter-frequency neighboring cell list (namely, a code item interFreqNeighCellList) included in the SIB 4. In a specific implementation, for details, refer to Table 2-5. Table 2-5 shows a specific implementation of a sixth bitmap, a seventh bitmap, or an eighth bitmap in an SIB 4. A specific code implementation form of the sixth bitmap, the seventh bitmap, or the eighth bitmap may be shown in the item Association in a first code segment in Table 2-5, or may be shown in the item CellAssociation in a second code segment, or may be shown in the item SSBAssociation in a third code segment. Therefore, after obtaining the SIB 4, the terminal device may extract, from the SIB 4, the second association relationship used to determine the first cell information, to determine the first cell information of the terminal device, namely, one or more pieces of inter-frequency neighboring cell information that may need to be measured by the terminal device.

TABLE 2-4

```
In an SIB 3:
IntraFreqNeighCellInfo:: =    SEQUENCE {
    physCellId                        PhysCellId,
    q-OffsetCell                      Q-OffsetRange,
    SSBAssoication     BIT STRING(SIZE(maxSSBNum))     OPTIONAL
    ...
}
```
//The foregoing code indicates that each of a plurality of pieces of intra-frequency neighboring cell information (IntraFreqNeighCellInfo) included in the received SIB 3 includes cell identifier information (physical cell ID physCellId), cell offset information (q-OffsetCell), and SSBAssociation, where SSBAssociation is a bit string BIT STRING with a specific size of maxSSBNum.

TABLE 2-5

First code segment:
InterFreqCarrierFreqInfo:: =    SEQUENCE {
    dl-CarrierFreq           ARFCN-ValueNR,
    ...
    Association              BIT STRING(SIZE(maxSSBNum*maxCellNum))
    ...
}
//The foregoing code indicates that each of a plurality of pieces of inter-frequency information (InterFreqCarrierFreqInfo) included in the received SIB 4 includes carrier frequency information (dl-CarrierFreq), where a value of the carrier frequency information is indicated by an absolute radio frequency channel number (ARFCN-ValueNR), and an Association code segment, where the Association code segment is a bit string BIT STRING with a specific size of maxSSBNum*maxFreqNum.
Second code segment:
InterFreqCarrierFreqInfo:: =    SEQUENCE {
    dl-CarrierFreq           ARFCN-ValueNR,
    ...
    Association              SEQUENCE (SIZE (1..maxSSBNum)) OF CellAssociation
    ...
}
CellAssociation:: = BIT STRING(SIZE(maxCellNum))
//The foregoing code indicates that each of a plurality of pieces of inter-frequency information (InterFreqCarrierFreqInfo) included in the received SIB 4 includes carrier frequency information (dl-CarrierFreq), where a value of the carrier frequency information is indicated by an absolute radio frequency channel number (ARFCN-ValueNR), an Association code segment, where the Association code segment includes one or more bitmaps CellAssociation, that is, is divided into groups based on an SSB, and CellAssociation, where CellAssociation is a bit string BIT STRING with a specific size of maxCellNum.
Third code segment:
InterFreqCarrierFreqInfo:: =    SEQUENCE {
    dl-CarrierFreq           ARFCN-ValueNR,
    ...
    Association              SEQUENCE (SIZE (1..maxCellNum)) OF SSBAssociation
    ...
}
SSBAssociation:: = BIT STRING(SIZE(maxSSBNum))
//The foregoing code indicates that each of a plurality of pieces of inter-frequency information (InterFreqCarrierFreqInfo) included in the received SIB 4 includes carrier frequency information (dl-CarrierFreq), where a value of the carrier frequency information is indicated by an absolute radio frequency channel number (ARFCN-ValueNR), an Association code segment, where the Association code segment includes one or more bitmaps SSBAssociation, that is, is divided into groups based on a cell, and SSBAssociation, where SSBAssociation is a bit string BIT STRING with a specific size of maxSSBNum.

For example, the first message may include inter-frequency neighboring cell information corresponding to one or more inter-frequency neighboring cells of the current serving cell. For example, the inter-frequency neighboring cell list in the SIB 4 includes one or more pieces of inter-frequency neighboring cell information. When the second association relationship is indicated based on one or more eighth bitmaps, each of the one or more pieces of inter-frequency neighboring cell information included in the first message may include one eighth bitmap. For example, assuming that a cell indicated by the cell information Cell 1 is an inter-frequency neighboring cell of the current serving cell, the first message may include inter-frequency neighboring cell information corresponding to the cell information Cell 1. In addition, the inter-frequency neighboring cell information corresponding to the cell information Cell 1 may include one eighth bitmap, and the eighth bitmap is used to indicate an association relationship between the cell information Cell 1 and one or more synchronization signal block indexes. The following describes a specific location of the eighth bitmap in the first message by using the inter-frequency neighboring cell information included in the SIB 4 as an example. Table 2-6 shows a code implementation form of a system information block 4 SIB 4. It can be learned from a code structure of the SIB 4 in the table that a specific implementation form of the eighth bitmap may be shown in the item SSBAssociation in Table 2-6. Therefore, after obtaining the SIB 4, the terminal device may extract, from each piece of inter-frequency neighboring cell information in the SIB 4, the eighth bitmap used to indicate the first association relationship, to determine the second association relationship, and the terminal device may determine, based on the SSB index corresponding to the terminal device, the first association relationship, and the second association relationship, one or more pieces of inter-frequency neighboring cell information (namely, the first cell information) that may need to be searched for by the terminal device. In this way, the terminal device may measure only an inter-frequency neighboring cell within a beam coverage area in which the terminal device is located, and does not need to measure all neighboring cells of the current serving cell, thereby reducing measurement energy consumption and improving resource utilization existing during cell reselection.

TABLE 2-6

| | |
|---|---|
| InterFreqNeighCellList:: = | SEQUENCE (SIZE (1..maxCellInter)) OF InterFreqNeighCellInfo |
| InterFreqNeighCellInfo:: = | SEQUENCE { |
| physCellId | PhysCellId, |
| q-OffsetCell | Q-OffsetRange, |
| SSBAssociation:: = BIT STRING(SIZE(maxSSBNum)) | OPTIONAL |
| ... | |
| } | |

//The foregoing code indicates that an inter-frequency neighboring cell list (InterFreqNeighCellList) included in the received SIB 4 includes a plurality of pieces of inter-frequency neighboring cell information (IntraFreqNeighCellInfo), and each piece of inter-frequency neighboring cell information includes cell identifier information (physical cell ID physCellId), cell offset information (q-OffsetCell), and SSBAssociation, where SSBAssociation is a bit string BIT STRING with a specific size of maxSSBNum.

In a feasible implementation, the second association relationship may alternatively be indicated by adding a neighboring cell list and the fourth bitmap, the seventh bitmap, or the eighth bitmap corresponding to the second association relationship to the SIB 24. The adding manner is similar to that of the SIB 4. Details are not described herein again.

In a feasible implementation, the second association relationship may alternatively be indicated by associating an SSB with a cell blacklist. To be specific, the SSB indicates cells that do not need to be measured in a current SSB index. A specific indication manner includes a bitmap indication method and a list indication method. A specific code implementation is similar to the implementation of the second relationship. Details are not described herein again.

In a feasible implementation, the third association relationship may indicate the association relationship between the at least one piece of measurement information and the at least one synchronization signal block index by using one or more bitmaps that have a preset indication rule.

Optionally, in a specific implementation, the third association relationship may be indicated based on a fourth bitmap. The fourth bitmap is used to indicate the association relationship between the at least one piece of measurement information and the at least one synchronization signal block index. The measurement information includes information about a synchronization signal block that needs to be measured (SSB-ToMeasure) or synchronization signal block received signal strength indicator measurement information (SS-RSSI-Measurement). SSB-ToMeasure herein may be used to determine a time pattern (pattern), namely, a time pattern including one or more time points at which synchronization signal blocks corresponding to one or more cells are measured. SS-RSSI-Measurement may be used to determine a time gap for measuring each of the synchronization signal blocks corresponding to the one or more cells.

In an implementation, any bit in the fourth bitmap is used to indicate whether one piece of measurement information is associated with one synchronization signal block index. In a specific implementation, Table 1-15 lists a fourth bitmap. A preset indication rule corresponding to Table 1-15 is that each row in the map corresponds to one piece of measurement information of one piece of frequency information, and each column in the map corresponds to one synchronization signal block index. It can be learned from content of Table 1-15 that measurement information M1 of frequency information f1 and a first synchronization signal block index in the fourth bitmap correspond to a bit 0. In this case, after the terminal device obtains the first message based on the first synchronization signal block index, the third association relationship in the first message may indicate that the first synchronization signal block index is not associated with the measurement information M1. To be specific, when performing cell reselection, the terminal device does not need to measure synchronization signal block signal strength based on a time of measuring one or more synchronization signal block indexes indicated by the measurement information M1. Similarly, measurement information M2 corresponding to the frequency information f1 and the first synchronization signal block index SSB index 1 in the fourth bitmap correspond to a bit 1. In this case, when the terminal device obtains the first message based on the first synchronization signal block index SSB index 1, the fourth bitmap included in the first message may indicate that the terminal device may measure a cell on the frequency information f2 based on a plurality of pieces of measurement time information determined based on the measurement information M2. For example, assuming that the measurement information M1 includes SSB-ToMeasure, and a total of three measurement moments t1, t2, and t3 are specified for the SSB-ToMeasure, the terminal device may measure the cell on the frequency f2 when the moment t1, t2, or t3 is expired.

TABLE 1-15

| | SSB index 1 | SSB index 2 | SSB index 3 |
|---|---|---|---|
| M1 of f1 | 0 | 0 | 1 |
| M2 of f2 | 1 | 0 | 0 |
| M3 of f3 | 0 | 1 | 0 |

In another specific implementation, any bit in the fourth bitmap is used to indicate whether one piece of measurement information is associated with one group of synchronization signal block indexes. In a specific implementation, for example, Table 1-16 lists another fourth bitmap and a preset indication rule corresponding to the fourth bitmap. Herein, the preset indication rule corresponding to the fourth bitmap is that in the map, each row corresponds to one piece of measurement information of one piece of frequency information, and each column corresponds to one group of synchronization signal block indexes. In a specific implementation, for a process in which the terminal device determines a cell measurement time based on the fourth bitmap, refer to a process in which the bitmap corresponding to Table 1-15 is used to indicate the terminal device to determine a cell measurement time. Details are not described herein again.

TABLE 1-16

|  | First group SSB index 1 SSB index 2 | Second group SSB index 3 SSB index 4 |
|---|---|---|
| M1 of f1 | 0 | 0 |
| M2 of f2 | 1 | 0 |
| M3 of f3 | 0 | 1 |

Optionally, in a specific implementation form, the fourth bitmap may be a one-dimensional list in a code. For example, in a specific implementation form, the bitmap corresponding to Table 1-15 may be 00|10|01. Optionally, a quantity of bits in each row in the bitmap may be set. For example, it is specified that each row corresponds to eight bits. If a quantity of bits is insufficient, the bits are padded with 0. For example, in a specific implementation form, the fourth bitmap in Table 1-15 may be 00000000|10000000|01000000.

In some feasible implementations, the third association relationship may be indicated based on at least one fifth bitmap. Any one of the at least one eighth map is used to indicate an association relationship between one piece of measurement information and one synchronization signal block index or one group of synchronization signal block indexes.

In an implementation, any bit in the fifth bitmap is used to indicate whether one piece of measurement information is associated with one synchronization signal block index. In a specific implementation, for details, refer to Table 1-17 and Table 1-18. Table 1-17 and Table 1-18 list two fifth bitmaps (Table 1-17 corresponds to a fifth bitmap A, and Table 1-18 corresponds to a fifth bitmap B). Herein, preset indication rules corresponding to the fifth bitmap A and the fifth bitmap B are the same. To be specific, in the map, one row corresponds to one piece of measurement information of one piece of frequency information, and each column corresponds to one synchronization signal block index. In a specific implementation, measurement information M1 of frequency information f1 and a first synchronization signal block index SSB index 1 in the fifth bitmap A corresponding to Table 1-17 correspond to a bit 0. In this case, when the terminal device obtains the first message based on the first synchronization signal block, the fifth bitmap A in the first message indicates that the terminal device does not need to measure a cell on the frequency information f1 based on time information indicated by the measurement information M2. Similarly, a first synchronization signal block index SSB index 1 and measurement information M2 of frequency information f2 in the fifth bitmap B correspond to a bit 1. In this case, when the terminal device obtains the first message based on the first synchronization signal block index, the fifth bitmap B in the first message indicates that the terminal device may measure a cell on the frequency f2 based on a series of measurement times determined based on the measurement information M2.

TABLE 1-17

|  | SSB index 1 | SSB index 2 | SSB index 3 |
|---|---|---|---|
| M1 of f1 | 0 | 0 | 1 |

TABLE 1-18

|  | SSB index 1 | SSB index 2 | SSB index 3 |
|---|---|---|---|
| M2 of f2 | 1 | 0 | 0 |

In another implementation, any bit in the fifth bitmap is used to indicate whether one piece of measurement information of one piece of frequency information is associated with one group of synchronization signal block indexes. In a specific implementation, for details, refer to Table 1-19 and Table 1-20. Herein, Table 1-19 and Table 1-20 list two fifth bitmaps (Table 1-19 corresponds to a fifth bitmap C, and Table 1-20 corresponds to a fifth bitmap D). Preset indication rules corresponding to the fifth bitmap C and the fifth bitmap D are the same. To be specific, in the map, one row corresponds to one piece of measurement information of one piece of frequency information, and each column corresponds to one group of synchronization signal block indexes. It can be learned from content of the fifth bitmap D that a first group of synchronization signal block indexes including a first synchronization signal block index SSB index 1 and a second synchronization signal block index SSB index 2 and measurement information M2 of frequency information f2 correspond to a bit 1. In this case, when the terminal device obtains the first message based on the first synchronization signal block or the second synchronization signal block, the fifth bitmap D in the first message indicates that the terminal device may measure a cell on the frequency f2 based on time information included in the measurement information M2. Similarly, it can be learned from content of the fifth bitmap C that when the terminal device obtains the first message based on a third synchronization signal block or a fourth synchronization signal block, the fifth bitmap C indicates that the terminal device may measure a cell on a frequency f1 based on time information included in measurement information M1.

TABLE 1-19

|  | First group SSB index 1 SSB index 2 | Second group SSB index 3 SSB index 4 |
|---|---|---|
| M1 of f1 | 0 | 1 |

TABLE 1-20

|  | First group SSB index 1 SSB index 2 | Second group SSB index 3 SSB index 4 |
|---|---|---|
| M2 of f2 | 1 | 0 |

Optionally, in a specific implementation, when the third association relationship is indicated based on the fourth bitmap or the at least one eighth bitmap, a bitmap corresponding to the third association relationship may be included in a system information block 2 or a system information block 4. Specifically, when the first measurement information determined based on the third association relationship is used to indicate measurement time information of an intra-frequency neighboring cell of a current serving cell, the bitmap corresponding to the third association relationship may specifically exist in SSB-ToMeasure or SS-RSSI-Measure included in intra-frequency cell reselection information in the system information block 2. When the first measurement information determined based on the third association relationship is used to indicate measurement time information of an inter-frequency neighboring cell of a current serving cell, the bitmap corresponding to the third association relationship may specifically exist in SSB-ToMeasure or SS-RSSI-Measure included in adjacent-frequency measurement information in the system information block 4. For a specific code implementation, refer to Table 2-7. For example, in a first code segment in Table 2-7, the item SSBAssociation is used to associate SSB-ToMeasure that needs to be measured with a synchronization signal block index of a serving cell. For another example, in a second code segment in Table 2-7, the item SSBAssociation is used to associate SS-RSSI-Measurement that needs to be measured with a synchronization signal block index of a current serving cell.

TABLE 2-7

```
First code segment:
SSB-ToMeasure:: =       SEQUENCE {
    Bitmap                         CHOICE {
    shortBitmap         BIT STRING (SIZE (4)),
    mediumBitmap        BIT STRING (SIZE (8)),
    longBitmap          BIT STRING (SIZE (64)),
    }
    SSBAssociation            BIT STRING(SIZE(maxSSBNum)).
OPTIONAL,-- Need R
}
```
//The foregoing code indicates that received SSB-ToMeasure indicates which length of bitmap (a 4-bit short map, an 8-bit middle map, and a 64-bit long map) is used to indicate a specific time pattern of an SSB. An SSBAssociation code segment is further included, where the SSBAssociation code segment is a bit string BIT STRING with a specific size of maxSSBNum, and indicates an association relationship with the SSB.
```
Second code segment:
SS-RSSI-Measurement:: =    SEQUENCE {
    measurementslots       BIT STRING (SIZE (1..80)),
    endSymbol              INTEGER(0..3)
SSBAssociation             BIT STRING(SIZE(maxSSBNum)),OPTIONAL,
-- Need R
}
```
//The foregoing code indicates that received SS-RSSI-Measurement indicates times at which measurement is performed, measurementSlots in a bitmap is used to indicate slots to be measured, and endSymbol is used to indicate an end symbol. An SSBAssociation code segment is further included, where the SSBAssociation code segment is a bit string BIT STRING with a specific size of maxSSBNum, and indicates an association relationship with an SSB.

In some feasible implementations, the first association relationship, the second association relationship, and the third association relationship each may be indicated in a form of a list.

In a specific implementation, the first association relationship included in the first message may be indicated based on a first list in which one synchronization signal block index or one group of synchronization signal block indexes corresponds to one frequency information list. For a specific implementation form of the first list, refer to Table 1-21 or Table 1-22. A first list corresponding to Table 1-21 indicates a correspondence between each of three synchronization signal block indexes and each of three frequency information lists. Each synchronization signal block index in Table 1-21 corresponds to one frequency information list. For example, a frequency information list corresponding to a first synchronization signal block index SSB index 1 includes frequency information f1, frequency information f2, and frequency information f3, and the first list corresponding to Table 1-21 may indicate that the SSB index 1 is associated with the frequency information f1, the frequency information f2, and the frequency information f3, that is, the frequency information f1, the frequency information f2, and the frequency information f3 belong to the first frequency information that needs to be searched for by the terminal device. Further, an arrangement rank of each piece of frequency information in each frequency information list in the list may be determined based on a probability of searching for each frequency by the terminal device, and the arrangement rank may be used to indicate a rank of measuring each frequency by the terminal device. For example, referring to Table 1-21, it can be learned from Table 1-21 that the first synchronization signal block index SSB index 1 is associated with the frequency information f1, the frequency information f2, and the frequency information f3, and an arrangement rank of the frequency information f1 is higher than that of the frequency information f2 and that of the frequency information f3. In this case, after the terminal device determines, based on the SSB index 1, that frequencies that need to be searched for are the frequency information f1, the frequency information f2, and the frequency information f3, the terminal device preferably searches for the frequency information f1, and then sequentially searches for the frequency information f2 and the frequency information f3. Similarly, referring to Table 1-22, a first list corresponding to Table 1-22 indicates an association relationship between each of three groups of synchronization signal block indexes and each of three frequency information lists. Each group of synchronization signal block indexes in Table 1-22 corresponds to one frequency information list. In Table 1-22, if a frequency information list corresponding to a first group of synchronization signal block indexes including a first synchronization signal block index SSB index 1 and a second synchronization signal block SSB index 2 includes frequency information f1, frequency information f2, and frequency information f3, the first list corresponding to Table 1-22 may indicate that both the first synchronization signal block index SSB index 1 and the second synchronization signal block SSB index 2 are associated with the frequency information f1, the frequency information f2, and the frequency information D.

TABLE 1-21

| SSB index 1 | SSB index 2 | SSB index 3 |
|---|---|---|
| f1 | f1 | f3 |
| f2 | f5 | f4 |
| f3 | f7 | f5 |

TABLE 1-22

| First group | Second group | Third group |
|---|---|---|
| SSB index 1 | SSB index 3 | SSB index 5 |
| SSB index 2 | SSB index 4 | SSB index 6 |
| f1 | f1 | f3 |
| f2 | f5 | f4 |
| f3 | f7 | f5 |

Optionally, when the first association relationship included in the first message is indicated based on a first list in which one synchronization signal block index or one group of synchronization signal block indexes corresponds to one frequency information list, for a specific code implementation of the first association relationship, reference may be to Table 2-8. Table 2-8 shows another code implementation of an SIB 4 according to this embodiment of this application. In this embodiment, each synchronization signal block index or each group of synchronization signal block indexes corresponds to one frequency information list. A specific code implementation of the first association relationship indicated based on the first list may be shown in the item {interFreqCarrierFreqListassociateSSBIndex} in a first code segment in Table 2-8, or may be shown in the item interFreqCarrierFreqListassociateSSBIndex in a second code segment in Table 2-8. Therefore, after obtaining the SIB 4, the terminal device may extract, from the SIB 4, the first association relationship indicated based on a form in which one synchronization signal block index or one group of synchronization signal block indexes corresponds to one frequency information list, and the terminal device may determine, based on the synchronization signal block index corresponding to the terminal device and the first association relationship, one or more pieces of adjacent-frequency information (namely, the first frequency information) that may need to be searched for by the terminal device.

TABLE 2-8

First code segment:
SIB 4:: =      SEQUENCE {
    InterFreqCarrierFreqList,
    ...,
    lateNonCriticalExtension { interFreqCarrierFreqListassociateSSBIndex}
    -OPTIONAL,
}
interFreqCarrierFreqListassociateSSBIndex:: =      SEQUENCE_
(SIZE(1,..MaxSSBNum))OF InterFreqCarrierFreqList
InterFreqCarrierFreqList:: =      SEQUENCE (SIZE (1..maxFreqSSBindex))
OF
InterFreqCarrierFreqInfo
//The foregoing code segment indicates that the received SIB 4 includes an inter-
frequency carrier frequency list (InterFreqCarrierFreqList) and an inter-frequency
carrier frequency list (interFreqCarrierFreqListassociateSSBIndex) associated with
an SSB index. In this case, InterFreqCarrierFreqList is ignored.
interFreqCarrierFreqListassociateSSBIndex includes a plurality of inter-frequency
carrier frequency lists based on the SSB index or an SSB index group, and each
inter-frequency carrier frequency list includes a plurality of pieces of inter-
frequency carrier frequency information (InterFreqCarrierFreqInfo).
Second code segment:
SIB 4:: =      SEQUENCE {
    interFreqCarrierFreqListassociateSSBIndex,
    ...,
    lateNonCriticalExtension      OCTET STRING      OPTIONAL
}
interFreqCarrierFreqListassociateSSBIndex:: =      SEQUENCE_
(SIZE(1,..MaxSSBNum))OF InterFreqCarrierFreqList
InterFreqCarrierFreqList:: =      SEQUENCE (SIZE (1..maxFreqSSBindex))
OF
InterFreqCarrierFreqInfo
//The foregoing code segment indicates that the received SIB 4 includes an inter-
frequency carrier frequency list (interFreqCarrierFreqListassociateSSBIndex)
associated with an SSB index. In this case, a backward compatibility modification
method exists. interFreqCarrierFreqListassociateSSBIndex includes a plurality of
inter-frequency carrier frequency lists based on the SSB index or an SSB index
group, and each inter-frequency carrier frequency list includes a plurality of pieces
of inter-frequency carrier frequency information (InterFreqCarrierFreqInfo).

Optionally, the second association relationship included in the first message may alternatively be indicated based on a second list in which one synchronization signal block index or one group of synchronization signal block indexes corresponds to one cell information list.

In a specific implementation, the second association relationship included in the first message may be indicated based on a second list in which one synchronization signal block index corresponds to one cell information list. For a specific implementation form of the second list, refer to Table 1-23. Table 1-23 lists a second list corresponding to the second association relationship. It can be learned from a preset indication rule corresponding to Table 1-23 that the second list shown in Table 1-23 indicates an association relationship between each of two synchronization signal block indexes and each of two cell information lists. In the two cell information lists, if a cell information list corresponding to a first synchronization signal block index SSB index 1 includes cell information Cell 1, cell information Cell 2, and cell information Cell 3, it indicates that the SSB index 1 is associated with the cell information Cell 1, the cell information Cell 2, and the cell information Cell 3. To be specific, after obtaining the first message based on the SSB index 1, the terminal device may determine, based on the second association relationship included in the first message, that the cell information Cell 1, the cell information Cell 2, and the cell information Cell 3 belong to the first cell information corresponding to the terminal device. Further, an arrangement rank of each piece of cell information in each cell information list in the list may be determined based on a quantity that is of times of searching for each intra-frequency neighboring cell by the terminal device and that is obtained by a third device, and the arrangement rank may be used to indicate a priority of measuring a cell corresponding to each piece of cell information in the first cell information by the terminal device. For example, referring to Table 1-23, it can be learned from Table 1-23 that a second synchronization signal block index SSB index 2 is associated with cell information Cell 2, cell information Cell 5, and cell information Cell 3. In this case, after obtaining the first message based on the second synchronization signal block, the terminal device may determine, based on the second association relationship in the first message, that the first cell information includes at least the cell information Cell 2, the cell information Cell 5, and the cell information Cell 3. In addition, because an arrangement rank of the cell information Cell 2 is higher, when measuring each cell corresponding to the first cell information, the terminal device preferably measures a cell corresponding to the cell information Cell 2.

TABLE 1-23

| SSB index 1 | Cell 1 | Cell 2 | Cell 3 |
| SSB index 2 | Cell 2 | Cell 5 | Cell 3 |

In a specific implementation, the second association relationship included in the first message may be indicated based on a second list in which one or more groups of synchronization signal block indexes correspond to one cell information list. For a specific implementation form of the second association relationship, refer to Table 1-24. Table 1-24 lists another second list corresponding to the second association relationship. It can be learned from Table 1-24 that the second list indicates a correspondence between each of two groups of synchronization signal block indexes and each of two cell information lists. In the second list, if a cell information list corresponding to a first group of synchronization signal block indexes including an SSB index 1 and an SSB index 2 includes cell information Cell 1, cell information Cell 2, and cell information Cell 3, the second list may indicate that the SSB index 1 and the SSB index 2 are associated with the cell information Cell 1, the cell information Cell 2, and the cell information Cell 3. To be specific, after the terminal device obtains the first message based on the first synchronization signal block (whose index is the SSB index 1) or the second synchronization signal block (whose index is the SSB index 2), the cell information Cell 1, the cell information Cell 2, and the cell information Cell 3 belong to the first cell information determined by the terminal device based on the first message. Further, an arrangement rank of each piece of cell information in each cell information list in the list may be determined based on a quantity that is of times of searching for each intra-frequency neighboring cell by the terminal device and that is obtained by a third device through measurement, and the arrangement rank may be used to indicate a rank of searching for and measuring each cell by the terminal device when the terminal device performs cell reselection. For example, referring to Table 1-24, it can be learned from Table 1-24 that a third synchronization signal block index SSB index 3 is associated with cell information Cell 2, cell information Cell 5, and cell information Cell 3. In this case, the first cell information determined by the terminal device based on the third synchronization signal block includes at least the cell information Cell 2, the cell information Cell 5, and the cell information Cell 3. In addition, because an arrangement rank of the cell information Cell 2 is higher, when measuring a cell corresponding to the first cell information, the terminal device preferably measures a cell corresponding to the cell information Cell 2.

TABLE 1-24

| First group | SSB index 1<br>SSB index 2 | Cell 1 | Cell 2 | Cell 3 |
| Second group | SSB index 3<br>SSB index 4 | Cell 2 | Cell 5 | Cell 3 |

Optionally, in a specific implementation, the first association relationship indicated based on a second list in which one or more groups of synchronization signal block indexes correspond to one cell information list may appear in parallel with an intra-frequency neighboring cell list in a system information block 3 in the first message. For example, referring to Table 2-9, Table 2-9 shows a code implementation of an SIB 3 according to this embodiment of this application. It can be learned with reference to a code structure of the SIB 3 that for a specific implementation form of the first association relationship, reference may be made to content in the item intraFreqNeighCellListassociateSSBIndex in Table 2-9. In this way, after obtaining the SIB 3 based on the first synchronization signal block, the terminal device may extract the first association relationship from the SIB 3, to determine the first cell information.

TABLE 2-9

```
SIB 3:: =            SEQUENCE {
       intraFreqNeighCellList        IntraFreqNeighCellList      OPTIONAL,
-- Need N
       ...,
       lateNonCriticalExtension      { intraFreqNeighCellListassociateSSBIndex }
            OPTIONAL
}
intraFreqNeighCellListassociateSSBIndex:: = SEQUENCE
(SIZE(1,..MaxSSBIndex))OF intraFreqNeighCellList
//The foregoing code segment indicates that the received SIB 3 includes an intra-
frequency neighboring cell list (intraFreqNeighCellList) and an intra-frequency
neighboring cell list (intraFreqNeighCellListassociateSSBIndex) associated with an
SSB index. In this case, intraFreqNeighCellList is ignored.
intraFreqNeighCellListassociateSSBIndex includes a plurality of intra-frequency
neighboring cell lists based on the SSB index or an SSB index group, and each
intra-frequency neighboring cell list includes a plurality of pieces of intra-frequency
neighboring cell information.
```

In another specific implementation, when the second association relationship included in the third message is indicated based on the second list, the second association relationship may appear in parallel with an inter-frequency neighboring cell list included in the first message. For a specific implementation of the second association relationship, refer to Table 2-10. Table 2-10 shows another code implementation of an SIB 4 according to this embodiment of this application. Herein, a location of the second association relationship that is in the SIB 4 and that is indicated based on an indication list in which one SSB index or one group of SSB indexes corresponds to one cell information list may be specifically shown in the item interFreqNeighCellListassociateSSB in Table 2-10. Therefore, after obtaining the SIB 4, the terminal device may extract, from the SIB 4, the second association relationship indicated based on an indication list in which one synchronization signal block index or one group of synchronization signal block indexes corresponds to one cell information list, and the terminal device may determine, based on the synchronization signal block index corresponding to the terminal device, the first association relationship, and the second association relationship, one or more pieces of inter-frequency neighboring cell information that may need to be searched for by the terminal device.

In some feasible implementations, the third association relationship may alternatively be indicated based on a third list. The third list may be used to indicate at least one piece of measurement information corresponding to one synchronization signal block index or one group of synchronization signal block indexes. Each unit in the third list correspondingly indicates one piece of measurement information or one group of measurement information. For a specific implementation process, refer to Table 1-25 and Table 1-26. Table 1-25 lists a third list (which is replaced with a third list A below for description), and Table 1-26 lists another third list (which is replaced with a third list B below for description). The third list A herein indicates measurement information M1 of frequency information f1 and measurement information M2 of frequency information M2 that correspond to a first synchronization signal block index. When the terminal device obtains the first message based on the first synchronization signal block, the terminal device measures a cell on the frequency information f1 based on a measurement time indicated by the measurement information M1, or may measure a cell on the frequency information f2 based on a measurement time indicated by the measurement information M2. The third list B herein indicates a first group of measurement information and a second group of measurement information that correspond to a second synchronization signal block index. When the terminal device obtains

TABLE 2-10

```
In an SIB 4:
InterFreqCarrierFreqInfo:: =    SEQUENCE {
       dl-CarrierFreq                   ARFCN-ValueNR,
           q-OffsetFreq                 Q-OffsetRange
       DEFAULT dB0,
       interFreqNeighCellListassociateSSB       SEQUENCE
(SIZE(1,..MaxSSBNum))OF InterFreqNeighCellList
       ...
}
InterFreqNeighCellList:: =        SEQUENCE (SIZE (1..maxCellInter)) OF
InterFreqNeighCellInfo
...
//The foregoing code indicates that each of a plurality of pieces of inter-frequency
information (InterFreqCarrierFreqInfo) included in the received SIB 4 includes
carrier frequency information (dl-CarrierFreq), where a value of the carrier
frequency information is indicated by an absolute radio frequency channel number
(ARFCN-ValueNR), frequency offset information (q-OffsetFreq), and an inter-
frequency neighboring cell list (interFreqNeighCellListassociateSSB) associated
with an SSB index, where interFreqNeighCellListassociateSSB includes a plurality
of inter-frequency neighboring cell lists based on the SSB index or an SSB index,
and each inter-frequency neighboring cell list includes a plurality of pieces of inter-
frequency neighboring cell information (InterFreqNeighCellInfo).
``` the first message based on the second synchronization signal block, the terminal device may measure cells on some frequencies based on measurement times determined based on the first group of measurement information and the second group of measurement information that are in the third list B.

TABLE 1-25

|  | f1 | f2 |
|---|---|---|
| SSB index 1 | M1 | M2 |

TABLE 1-26

|  | First group | Second group |
|---|---|---|
| SSB index 2 | M1 and M2 | M3 and M4 |

In a specific implementation, the third association relationship may be indicated by using a third list. A code implementation is shown in Table 2-11. Specifically, when the first measurement information determined based on the third association relationship is used to indicate measurement time information of an intra-frequency neighboring cell of a current serving cell, the bitmap corresponding to the third association relationship may specifically exist in SSB-ToMeasure or SS-RSSI-Measure included in intra-frequency cell reselection information in the system information block 2. For a specific code implementation, refer to an implementation form provided by the item SSBAssociation-list in a third code segment or the item SSBAssociationlist in a fourth code segment in Table 2-11. When the first measurement information determined based on the third association relationship is used to indicate measurement time information of an inter-frequency neighboring cell of a current serving cell, the bitmap corresponding to the third association relationship may specifically exist in SSB-ToMeasure or SS-RSSI-Measure included in adjacent-frequency measurement information in the system information block 4. For a specific code implementation form, refer to an implementation form provided by the item SSBAssociation-list in a first code segment or the item SSBAssociationlist in a second code segment in Table 2-11.

TABLE 2-11

```
First code segment:
SIB 4:: =       SEQUENCE {
    interFreqCarrierFreqList         InterFreqCarrierFreqList,
    lateNonCriticalExtension         OCTET STRING       OPTIONAL,
    ...
}
InterFreqCarrierFreqList:: =                    SEQUENCE (SIZE (1..maxFreq)) OF
InterFreqCarrierFreqInfo
InterFreqCarrierFreqInfo:: =    SEQUENCE {
...
    SSBAssociationlist                SEQUENCE (SIZE(1...MaxSSBNum) OF
SSB-ToMeasure )                                  OPTIONAL,-- Need R
    ....
}
//The foregoing code indicates that each of a plurality of pieces of inter-frequency
information (InterFreqCarrierFreqInfo) included in the received SIB 4 includes
carrier frequency information (dl-CarrierFreq), where a value of the carrier
frequency information is indicated by an absolute radio frequency channel number
(ARFCN-ValueNR), frequency offset information (q-OffsetFreq), and a list
(SSBAssociationlist) that is of SSBs (SSB-ToMeasure) that need to be measured
and that is associated with an SSB index, where SSB-ToMeasure appears in
sequence based on the SSB index or an SSB index group.
Second code segment:
SIB 4:: =       SEQUENCE {
    interFreqCarrierFreqList         InterFreqCarrierFreqList,
    lateNonCriticalExtension         OCTET STRING       OPTIONAL,
    ...
}
InterFreqCarrierFreqList:: =                    SEQUENCE (SIZE (1..maxFreq)) OF
InterFreqCarrierFreqInfo
InterFreqCarrierFreqInfo:: =    SEQUENCE {
    ...
    SSBAssociationlist                SEQUENCE (SIZE(1...MaxSSBNum)
OF SS-RSSI-Measurement )                         OPTIONAL,
-- Need R
    ...
}
//The foregoing code indicates that each of a plurality of pieces of inter-frequency
information (InterFreqCarrierFreqInfo) included in the received SIB 4 includes
carrier frequency information (dl-CarrierFreq), where a value of the carrier
frequency information is indicated by an absolute radio frequency channel number
(ARFCN-ValueNR), frequency offset information (q-OffsetFreq), and a list
(SSBAssociationlist) that is of SSB measurement slots (SSB-RSSI-Measurement)
and that is associated with an SSB index, where SS-RSSI-Measurement appears in
sequence based on the SSB index or an SSB index group.
```

TABLE 2-11-continued

```
Third code segment:
SIB 2:: =      SEQUENCE {
    ...
    intraFreqCellReselectionInfo    SEQUENCE {
        q-RxLevMin                          Q-RxLevMin,
        ...
        SSBAssociationlist              SEQUENCE
(SIZE(1...MaxSSBNum) OF SSB-ToMeasure)
    },
    ...
}
//The foregoing code indicates that the received SIB 2 includes intra-frequency cell
reselection information (intraFreqCellReselectionInfo), a receive power decision
threshold (q-RxLevMin), and a list (SSBAssociationlist) that is of SSBs (SSB-
ToMeasure) that need to be measured and that is associated with an SSB index,
where SSB-ToMeasure appears in sequence based on the SSB index or an SSB
index group.
Fourth code segment:
SIB 2:: =      SEQUENCE {
    intraFreqCellReselectionInfo    SEQUENCE {
        q-RxLevMin                          Q-RxLevMin,
        ...
        SSBAssociationlist          SEQUENCE (SIZE(1...MaxSSBNum) OF
SS-RSSI-Measurement )
},
    ...
}
//The foregoing code indicates that the received SIB 2 includes intra-frequency cell
reselection information (intraFreqCellReselectionInfo), a receive power decision
threshold (q-RxLevMin), and a list (SSBAssociationlist) that is of SSB
measurement slots (SSB-RSSI-Measurement) and that is associated with an SSB
index, where SS-RSSI-Measurement appears in sequence based on the SSB index
or an SSB index group.
```

In some feasible implementations, the third association relationship may be indicated by adding a corresponding list of SS-RSSI-Measurement or SSB-ToMeasure to the SIB 24, to associate a neighboring cell measurement time and an SSB index. The adding manner is similar to that in the SIB 4 or the SIB 2. Details are not described herein again.

In some feasible implementations, when obtaining the one or more adjacent frequencies through measurement, the third device may further collect statistics about a quantity of times that each adjacent frequency is searched for by the terminal device within the beam coverage area, and then upload the one or more adjacent frequencies and the quantity of times that each adjacent frequency is searched for by the terminal device to the base station. In this way, the base station may determine the first association relationship after obtaining the adjacent-frequency information and the quantity of search times corresponding to each piece of adjacent-frequency information that are uploaded by the third device. The first association relationship herein is not only used to indicate one or more pieces of frequency information that may need to be searched for by the terminal device, but also can indicate a rank in which each of the plurality of pieces of frequency information is searched for by the terminal device. In this case, the first association relationship may be indicated based on frequency priority information. Optionally, when obtaining the one or more cells through measurement, the third device may further collect statistics about a quantity of times that each cell is searched for by the terminal device within the beam coverage area, and then upload the one or more cells and the quantity of times that each cell is searched for by the terminal device to the base station. In this way, the base station may determine the second association relationship after obtaining the cell information and the quantity of search times corresponding to each piece of cell information that are uploaded by the third device. The first association relationship herein is not only used to indicate one or more pieces of cell information that may need to be searched for by the terminal device, but also can indicate a rank in which each of the plurality of pieces of cell information is searched for by the terminal device. In this case, the second association relationship may be indicated based on cell priority information.

In some feasible implementations, the first association relationship may alternatively be indicated based on frequency priority information. To be specific, the first message further includes at least one piece of frequency priority information. The frequency priority information herein is used to indicate a priority of the at least one piece of frequency information corresponding to at least one synchronization signal block. The at least one piece of frequency priority information includes first frequency priority information, and the first frequency priority information is used to indicate a priority of the first frequency information corresponding to the first synchronization signal block.

Optionally, the frequency priority information may be implemented based on a first frequency priority map. The first frequency priority map may indicate a priority of the at least one piece of frequency information corresponding to the at least one synchronization signal block index.

In an implementation, any priority flag in the first frequency priority map is used to indicate a priority of one piece of frequency information corresponding to one synchronization signal block index. For a specific implementation form of the first frequency priority map, refer to Table 1-27. Table 1-27 lists a first frequency priority map. Herein, a preset indication rule corresponding to the first frequency priority map listed in Table 1-27 is that in the map, each row corresponds to one piece of frequency information, and each column corresponds to one synchronization signal block index. It can be learned from content of Table 1-27 that the first frequency priority map indicates priorities of frequency information f1, frequency information f2, and frequency information f3 that correspond to an SSB index 1, an SSB index 2, and an SSB index 3. In the first frequency priority map, the first synchronization signal block index SSB index 1 and the frequency information f1, the first synchronization signal block index SSB index 1 and the frequency information f2, and the first synchronization signal block index SSB index 1 and the frequency information f3 sequentially correspond to priority flags 1, 2, and 3, that is, a priority of the frequency information f1 corresponding to the first synchronization signal block index SSB index 1 is 1, a priority of the frequency information f2 corresponding to the first synchronization signal block index SSB index 1 is 2, and a priority of the frequency information f3 corresponding to the first synchronization signal block index SSB index 1 is 3. In this case, after obtaining the first message based on the first synchronization signal block, the terminal device may determine, based on the first association relationship that is indicated based on the frequency priority and that is included in the first message, to preferably search for the frequency information f1, and then sequentially search for the frequency information f2 and the frequency information f3. Similarly, if the terminal device obtains the first message based on a second synchronization signal block, the terminal device may determine to preferably search for frequency information f2, and then sequentially search for frequency information f1 and frequency information f3. It may be understood that a higher priority herein corresponds to a smaller value of a priority flag. In a specific implementation, a larger value of a priority flag may alternatively indicate a higher priority. This is not limited herein. Herein, when values of priority flags are the same, it may indicate that degrees of priorities are the same.

TABLE 1-27

|    | SSB index 1 | SSB index 2 | SSB index 3 |
|----|-------------|-------------|-------------|
| f1 | 1           | 2           | 3           |
| f2 | 2           | 1           | 2           |
| f3 | 3           | 3           | 1           |

In another implementation, any priority flag in the first frequency priority map is used to indicate a priority of one piece of frequency information corresponding to one group of synchronization signal block indexes. In this case, for a specific implementation of the first frequency priority map, refer to Table 1-28. Table 1-28 lists another first frequency priority map. A preset indication rule corresponding to the first frequency priority map is that in the map, each row corresponds to one piece of frequency information, and each column corresponds to one group of synchronization signal block indexes. The first frequency priority map listed in Table 1-28 indicates priorities of a total of three pieces of frequency information—frequency information f1, frequency information f2, and frequency information f3 that correspond to two groups of synchronization signal block indexes. It can be learned from content of Table 1-28 that in the first frequency map, a priority of the frequency information f1 corresponding to a first group of synchronization signal block indexes is 1, a priority of the frequency information f2 corresponding to the first group of synchronization signal block indexes is 2, and a priority of the frequency information f3 corresponding to the first group of synchronization signal block indexes is 3. In this case, when the terminal device obtains the first message based on the first synchronization signal block, the first frequency priority map may indicate that a sequence of searching for the three pieces of frequency information—the frequency information f1, the frequency information f2, and the frequency information f3 is sequentially f1, f2, and f3. It may be understood that a higher priority herein corresponds to a smaller value of a priority flag. In a specific implementation, a larger value of a priority flag may alternatively indicate a higher priority. This is not limited herein. Herein, when values of priority flags are the same, it indicates that degrees of priorities are the same.

TABLE 1-28

|    | First group<br>SSB index 1<br>SSB index 2 | Second group<br>SSB index 3<br>SSB index 4 |
|----|-------------------------------------------|---------------------------------------------|
| f1 | 1                                         | 3                                           |
| f2 | 2                                         | 2                                           |
| f3 | 3                                         | 1                                           |

In another implementation, any priority flag in the first frequency priority map is alternatively used to indicate a priority of one group of frequency information corresponding to one synchronization signal block index. In this case, for a specific implementation form of the first frequency priority map, refer to the map listed in Table 1-27. Herein, only the preset indication rule of the map in Table 1-27 needs to be changed from a case in which each row corresponds to one piece of frequency information to a case in which each row corresponds to one group of frequency information.

In another implementation, any priority flag in the first frequency priority map is alternatively used to indicate a priority of one group of frequency information corresponding to one group of synchronization signal block indexes. In this case, for a specific implementation form of the first frequency priority map, refer to the map listed in Table 1-28. Herein, only the preset indication rule of the map in Table 1-28 needs to be changed from a case in which each row corresponds to one piece of frequency information to a case in which each row corresponds to one group of frequency information.

It may be understood that in the first frequency priority map, a quantity of pieces of frequency information corresponding to each priority flag and a quantity of synchronization signal block indexes corresponding to each priority flag are not limited. The frequency information associated with the first frequency priority map may be one or more pieces of adjacent-frequency information of a serving cell, and the synchronization signal block index associated with the first frequency priority map may be an index corresponding to each of one or more synchronization signal blocks in the serving cell.

Optionally, the frequency priority information may alternatively be indicated based on one or more second frequency priority maps. Each priority flag in the second frequency priority map is used to indicate a priority of one piece of frequency information or one group of frequency information corresponding to one or more synchronization signal block indexes.

In an implementation, any priority flag in the second frequency priority map is used to indicate a priority of one piece of frequency information corresponding to one synchronization signal block index. For a specific implementation form of the second frequency priority map, refer to Table 1-29 and Table 1-30 (Table 1-29 corresponds to a second frequency priority map A, and Table 1-30 corresponds to a second frequency priority map B). Herein, preset indication rules corresponding to the second frequency priority map A and the second frequency priority map B are the same. To be specific, in the map, one row corresponds to one piece of frequency information, and each column corresponds to one synchronization signal block index. It can be learned from content of Table 1-29 and Table 1-30 that a priority flag of frequency information f1 corresponding to a first synchronization signal block index SSB index 1 in the second frequency priority map A is 1, and a priority of frequency information f2 corresponding to a first synchronization signal block index SSB index 1 in the second frequency priority map B is 2. In this case, if the terminal device obtains the first message based on the first synchronization signal block, the first frequency priority maps may indicate that the terminal device needs to first search for the frequency information f1 and then search for the frequency information f2. It may be understood that a higher priority herein corresponds to a smaller value of a priority flag. In a specific implementation, a larger value of a priority flag may alternatively indicate a higher priority. This is not limited herein. Herein, when values of priority flags are the same, it indicates that degrees of priorities are the same.

TABLE 1-29

| | SSB index 1 | SSB index 2 |
|---|---|---|
| f1 | 1 | 2 |

TABLE 1-30

| | SSB index 1 | SSB index 2 |
|---|---|---|
| f2 | 2 | 1 |

In another implementation, each priority flag in the second frequency priority map is used to indicate a priority of one piece of frequency information corresponding to one or more groups of synchronization signal block indexes. In this case, for a specific implementation form of the second frequency priority map, refer to Table 1-31 and Table 1-32 (Table 1-31 corresponds to a second frequency priority map C, and Table 1-32 corresponds to a second frequency priority map D). Herein, preset indication rules corresponding to the second frequency priority map C and the second frequency priority map D are the same. To be specific, in the map, one row corresponds to one piece of frequency information, and each column corresponds to one group of synchronization signal block indexes. It can be learned from the preset indication rules corresponding to Table 1-31 and Table 1-32 that frequency information f1 and one group of synchronization signal block indexes including a first synchronization signal block index SSB index 1 and a second synchronization signal block index SSB index 2 in the second frequency priority map C correspond to a priority flag 1, and frequency information f2 and the group of synchronization signal block indexes in the second frequency priority map D correspond to a priority flag 2. In this case, after the terminal device obtains the first message based on the first synchronization signal block or the second synchronization signal block, the second frequency priority maps in the first message may indicate that the terminal device first searches for the frequency information f1, and then searches for the frequency information f2. It may be understood that a higher priority herein corresponds to a smaller value of a priority flag. In a specific implementation, a larger value of a priority flag may alternatively indicate a higher priority. This is not limited herein. Herein, when values of priority flags are the same, it indicates that degrees of priorities are the same.

TABLE 1-31

| | First group<br>SSB index 1<br>SSB index 2 | Second group<br>SSB index 3<br>SSB index 4 |
|---|---|---|
| f1 | 1 | 2 |

TABLE 1-32

| | First group<br>SSB index 1<br>SSB index 2 | Second group<br>SSB index 3<br>SSB index 4 |
|---|---|---|
| f2 | 2 | 1 |

In another implementation, any priority flag in the second frequency priority map is alternatively used to indicate a priority of one group of frequency information corresponding to one synchronization signal block index. In this case, for a specific implementation form of the first frequency priority map, refer to the map listed in Table 1-29. Herein, only the preset indication rule corresponding to the map in Table 1-29 needs to be changed from a case in which each row corresponds to one piece of frequency information to a case in which each row corresponds to one group of frequency information. For a specific indication process of the second frequency priority map, refer to the indication process of the second frequency priority map listed in Table 1-17. Details are not described herein again.

In another implementation, any priority flag in the first frequency priority map is alternatively used to indicate a priority of one group of frequency information corresponding to one group of synchronization signal block indexes. In this case, for a specific implementation form of the first frequency priority map, refer to the map listed in Table 1-30. Herein, only the preset indication rule corresponding to the map in Table 1-30 needs to be changed from a case in which each row corresponds to one piece of frequency information to a case in which each row corresponds to one group of frequency information. For a specific indication process of the second frequency priority map, refer to the indication process of the second frequency priority map listed in Table 1-30. Details are not described herein again.

Optionally, the frequency priority information may alternatively be indicated based on one or more third frequency priority maps. Any one of the one or more third frequency priority maps is used to indicate a priority of one or more pieces of frequency information corresponding to one synchronization signal block index or one group of synchronization signal block indexes.

In an implementation, any priority flag in the third frequency priority map is used to indicate a priority of one piece of frequency information corresponding to one synchronization signal block index. For a specific implementation form of the third frequency priority map, refer to Table 1-33 and Table 1-34 (Table 1-33 corresponds to a third frequency priority map A, and Table 1-34 corresponds to a third frequency priority map B). Herein, preset indication rules corresponding to the third frequency priority map A and the third frequency priority map B are the same. To be specific, in the map, one row corresponds to one synchronization signal block index, and each column corresponds to one piece of frequency information. It can be learned from content of Table 1-33 and Table 1-34 that in the third frequency priority map A, a priority flag of frequency information f1 corresponding to a first synchronization signal block index is 1, and a priority of frequency information f2 corresponding to the first synchronization signal block index is 2. In this case, if the terminal device obtains the first message based on the first synchronization signal block, the third frequency priority map A in the first message may indicate that the terminal device first searches for the frequency information f1 and then searches for the frequency information f2. Similarly, It can be learned from content of Table 1-34 that when the terminal device obtains the first message based on a second synchronization signal block, the third frequency priority map B may indicate that the terminal device first searches for frequency information f2 and then searches for frequency information f1. It may be understood that a higher priority herein corresponds to a smaller value of a priority flag. In a specific implementation, a larger value of a priority flag may alternatively indicate a higher priority. This is not limited herein. Herein, when values of priority flags are the same, it indicates that degrees of priorities are the same.

TABLE 1-33

|  | f1 | f2 |
|---|---|---|
| SSB index 1 | 1 | 2 |

TABLE 1-34

|  | f1 | f2 |
|---|---|---|
| SSB index 2 | 2 | 1 |

In another implementation, any priority flag in the third frequency priority map is used to indicate a priority of one or more groups of frequency information corresponding to one synchronization signal block index. For a specific implementation form, refer to Table 1-35 and Table 1-36 (Table 1-35 corresponds to a third frequency priority map C, and Table 1-36 corresponds to a third frequency priority map D). Herein, preset indication rules corresponding to the third frequency priority map C and the third frequency priority map D are the same. To be specific, one row in the map corresponds to one synchronization signal block index, and each column in the map corresponds to one group of frequency information. It can be learned from Table 1-35 that in the third frequency priority map C, a priority of a first group of frequency information that includes frequency information f1 and frequency information f2 and that corresponds to a first synchronization signal block index SSB index 1 is 1, and a priority of a second group of frequency information that includes frequency information f3 and frequency information f4 and that corresponds to the first synchronization signal block index SSB index 1 is 2. In this case, after the terminal device obtains the first message based on the first synchronization signal block index, the third frequency priority map C in the first message may indicate that the terminal device first searches for the frequency information f2 or the frequency information f3 and then searches for the frequency information f3 or the frequency information f4. Similarly, It can be learned from Table 1-36 that after the terminal device obtains the first message based on a second synchronization signal block, the third frequency priority map D may indicate that the terminal device first searches for frequency information f3 or f4 and then searches for frequency information f1 or f2. It may be understood that a higher priority herein corresponds to a smaller value of a priority flag. In a specific implementation, a larger value of a priority flag may alternatively indicate a higher priority. This is not limited herein. Herein, when values of priority flags are the same, it indicates that degrees of priorities are the same.

TABLE 1-35

|  | First group f1 and f2 | Second group f3 and f4 |
|---|---|---|
| SSB index 1 | 1 | 2 |

TABLE 1-36

|  | First group f1 and f2 | Second group f3 and f4 |
|---|---|---|
| SSB index 2 | 2 | 1 |

In another implementation, any priority flag in the third frequency priority map is used to indicate a priority of one piece of frequency information corresponding to one group of synchronization signal block indexes. Herein, for a specific implementation of the third frequency priority map, refer to Table 1-33 or Table 1-34. It should be noted that in this implementation, in the third frequency priority map, one row corresponds to one group of synchronization signal block indexes, and each column corresponds to one piece of frequency information. A specific indication relationship corresponding to content included in the third frequency priority map is similar to the indication relationship corresponding to Table 1-33 or Table 1-34. Details are not described herein again.

In another implementation, any priority flag in the third frequency priority map is used to indicate an association relationship between one group of synchronization signal block indexes and one group of frequency information. Herein, for a specific implementation of the third frequency priority map, refer to Table 1-35 or Table 1-36. It should be noted that in this implementation, in the third frequency priority map, one row corresponds to one group of synchronization signal block indexes, and each column corresponds to one group of frequency information. A specific indication relationship corresponding to content included in the third frequency priority map is similar to the indication relationship corresponding to Table 1-35 or Table 1-36. Details are not described herein again.

Optionally, when the first association relationship is indicated based on the frequency priority information, the first frequency priority map, the second frequency priority map, or the third frequency priority map corresponding to the first association relationship may be included in system information, for example, in a system information block 4 (SIB 4) or a system information block 24 (SIB 24). In this case, the first message includes the system information. It may be understood that there are a plurality of locations of the priority map corresponding to the first association relationship in the system information block 4 or the system information block 24.

Herein, for a specific implementation of a location of the first frequency priority map in the system information block 4 or the system information block 24, refer to the foregoing specific implementation of the location of the first bitmap in the system information block 4 or the system information block 24. For a specific implementation of a location of the second frequency priority map in the system information block 4 or the system information block 24, refer to the foregoing specific implementation of the location of the second bitmap in the system information block 4 or the system information block 24. For a specific implementation of a location of the third frequency priority map in the system information block 4, refer to the foregoing specific implementation of the location of the third bitmap in the system information block 4. Details are not described herein again.

In a specific implementation, the first association relationship may be indicated based on the first frequency priority map, the second frequency priority map, or the third frequency priority map. A code implementation is shown in Table 2-12. Table 2-12 lists code implementation forms of an SIB 4 and an SIB 24. Specifically, when the first association relationship exists in the SIB 4, for a specific code implementation of the priority map corresponding to the first association relationship, reference may be made to an implementation form provided in the item cellReselectionPrioritylist in a first code segment in Table 2-12. When the first association relationship exists in the SIB 24, for a specific code implementation of the priority map corresponding to the first association relationship, reference may be made to an implementation form provided in the item cellReselectionPrioritylist in a second code segment in Table 2-12.

includes at least one piece of cell priority information. The cell priority information herein is used to indicate a priority of the at least one piece of cell information corresponding to the at least one synchronization signal block. The at least one piece of cell priority information includes first cell priority information, and the first cell priority information is used to indicate a priority of the first cell information corresponding to the first synchronization signal block.

Optionally, the cell priority information may be indicated based on one first cell priority map. The first cell priority map may indicate a priority of the at least one piece of cell information corresponding to the at least one synchronization signal block index. The first cell priority map includes at least one cell priority flag. Any one of the at least one cell priority flag may be used to indicate a priority of one piece of cell information or one group of cell information corresponding to one synchronization signal block index. In a specific implementation, for a specific implementation process in which the cell priority information is indicated based on the first cell priority map, refer to the specific implementation of the first frequency priority map described above. Herein, it should be noted that the first cell priority map may be correspondingly obtained by replacing the corresponding frequency information in the first frequency priority map with the cell information. Details are not described herein again. In this way, after obtaining the first message based on the first synchronization signal block, the terminal device

---

First code segment:
In an SIB 4:
InterFreqCarrierFreqInfo:: =    SEQUENCE {
    dl-CarrierFreq              ARFCN-ValueNR,
    multiFrequencyBandListNR    MultiFrequencyBandListNR,
    ...
    cellReselectionPrioritylist         SEQUENCE (SIZE(1...MaxSSBNum))OF
CellReselectionPriority         OPTIONAL,     -- Need R
    ...
}
//The foregoing code indicates that each of a plurality of pieces of inter-frequency information (InterFreqCarrierFreqInfo) included in the received SIB 4 includes carrier frequency information (dl-CarrierFreq), where a value of the carrier frequency information is indicated by an absolute radio frequency channel number (ARFCN-ValueNR), an NR multi-frequency band list multiFrequencyBandListNR, where the NR multi-frequency band list indicates a frequency band number, and a priority list (cellReselectionPrioritylist) of different SSBs corresponding to the frequency, where cellReselectionPrioritylist corresponds to a plurality of cell reselection priorities (CellReselectionPriority).
Second code segment:
In an SIB 24:
CarrierFreqNR-r15:: =           SEQUENCE {
    carrierFreq-r15                 ARFCN-ValueNR-r15,
    multiBandInfoList-r15           MultiFrequencyBandListNR-r15
    OPTIONAL,-- Need OR
    cellReselectionPrioritylist     SEQUENCE (SIZE(1...MaxSSBNum))OF
CellReselectionPriority         OPTIONAL,     -- Need OP
    }                                            OPTIONAL, -
- Cond RSRQ
}
//The foregoing code indicates that each of a plurality of pieces of NR carrier frequency information (CarrierFreqNR-r15) included in the received SIB 24 includes carrier frequency information (carrierFreq-r15), where a value of the carrier frequency information is indicated by an absolute radio frequency channel number (ARFCN-ValueNR-r15), an NR multi-frequency band list multiBandInfoList-r15, where the NR multi-frequency band list indicates a frequency band number, and a priority list (cellReselectionPrioritylist) of different SSBs corresponding to the frequency, where cellReselectionPrioritylist corresponds to a plurality of cell reselection priorities (CellReselectionPriority).

---

In some feasible implementations, the second association relationship may alternatively be indicated based on cell priority information. To be specific, the first message further may determine, based on the first cell priority map included in the first message, a priority of measuring each of cells that need to be measured by the terminal device.

Optionally, the cell priority information may alternatively be indicated based on one or more second cell priority maps. One cell priority flag included in any one of the one or more second cell priority maps may be used to indicate a priority of one piece of cell information or one group of cell information corresponding to one synchronization signal block index or one group of synchronization signal block indexes. In a specific implementation, for a specific implementation process in which the cell priority information is indicated based on the first cell priority map, refer to the specific implementation of the second frequency priority map described above. Herein, it should be noted that the second cell priority map may be correspondingly obtained by replacing the corresponding frequency information in the second frequency priority map with the cell information. Details are not described herein again. In this way, after obtaining the first message based on the first synchronization signal block, the terminal device may determine, based on the second cell priority map included in the first message, a priority of measuring each of cells that need to be measured by the terminal device.

Optionally, the cell priority information may alternatively be indicated based on one or more third cell priority maps. Any cell priority flag in the third cell priority map may be used to indicate a priority of one synchronization signal block index or one group of synchronization signal block indexes corresponding to one piece of cell information or one group of cell information. In a specific implementation, for a specific implementation process in which the cell priority information is indicated based on the third cell priority map, refer to the specific implementation of the third frequency priority map described above. Herein, it should be noted that the third cell priority map may be correspondingly obtained by replacing the corresponding frequency information in the third frequency priority map with the cell information. Details are not described herein again. In this way, after obtaining the first message based on the first synchronization signal block, the terminal device may determine, based on the third cell priority map included in the first message, a priority of measuring each of cells that need to be measured by the terminal device.

Optionally, when the second association relationship is indicated based on the cell priority information, the first cell priority map, the second cell priority map, or the third cell priority map corresponding to the second association relationship may be included in system information, for example, in a system information block 3 or a system information block 4 (SIB 4). In this case, the first message includes the system information. It may be understood that there are a plurality of locations of the priority map corresponding to the first association relationship in the system information block 2 or the system information block 4.

Herein, for a specific implementation of a location of the first cell priority map in the system information block, refer to the foregoing specific implementation of the location of the first bitmap in the system information block. For a specific implementation of a location of the second cell priority map in the system information block, refer to the foregoing specific implementation of the location of the second bitmap in the system information block. For a specific implementation of a location of the third cell priority map in the system information block, refer to the foregoing specific implementation of the location of the third bitmap in the system information block. Details are not described herein again.

S102: The first device receives the first message, and determines at least one of the first frequency information, the first cell information, and the first measurement information based on the first message.

In some feasible implementations, the terminal device may obtain the first message based on the synchronization signal block index. In a specific implementation, for example, the terminal device may be synchronized with the base station based on the first synchronization signal block, and determine, by using the first synchronization signal block, the first synchronization signal block index corresponding to the first synchronization signal block. Specifically, the terminal device first receives the first synchronization signal block, and determines that timing information (timing information) in a physical broadcast channel (Physical Broadcast Channel, PBCH) included in the first received synchronization signal block is the first synchronization signal block index corresponding to the first synchronization signal block. In addition, the terminal device may further obtain a resource receiving location determined based on the first synchronization signal block, and then receive the first message on a time-frequency resource specified by the resource receiving location. Herein, in a specific implementation, after receiving the first synchronization signal block, the terminal device may determine a resource receiving location of a system information block 1 (system information block 1, SIB 1) by using a master information block (Master Information Block, MIB) in the physical broadcast channel (Physical Broadcast Channel, PBCH) included in the first received synchronization signal block. Then, the terminal device may determine scheduling information of the first message, for example, a resource receiving location, based on content of the SIB 1, to receive the first message. In addition, it may be further understood that the base station sends the first synchronization signal block by using a beam. All terminal devices within a beam coverage area may receive the first synchronization signal block by using the beam, and determine the first synchronization signal block index. Therefore, all synchronization signal block indexes corresponding to the terminal devices within the beam coverage area belong to the first synchronization signal block index. The following uses an implementation scenario in which the terminal device is synchronized with the base station based on the first synchronization signal block as an example for description.

In some feasible implementations, after obtaining the first message based on the first synchronization signal block, the terminal device may determine the first frequency information based on the first synchronization signal block index corresponding to the terminal device and the association relationship that is between the at least one synchronization signal block index and the first frequency information and that is included in the first association relationship. The first frequency information is used to indicate one or more pieces of frequency information that may be searched for by the terminal device.

In a specific implementation, it is assumed that an index corresponding to the first synchronization signal block is the first synchronization signal block index SSB index 1. After obtaining the first message, the terminal device may extract the first association relationship from the first message. For example, the terminal device may extract a plurality of third bitmaps from each piece of inter-frequency carrier frequency information in the system information block 4. For a specific implementation of the third bitmap, refer to Table 1-9 or Table 1-10. Then, the terminal device may select one or more pieces of frequency information based on the synchronization signal block index SSB index 1 and the association relationship indicated by the third bitmap, and determine that the one or more pieces of frequency information belong to the first frequency information of the terminal device. For example, as indicated in Table 1-9 and Table 1-10, if the frequency information f2 is associated with the first synchronization signal block index SSB index 1, the frequency information f2 belongs to the first frequency information of the terminal device. Similarly, the terminal device may traverse all third bitmaps included in the first message, to finally determine all frequency information included in the first frequency information. Herein, it may be understood that the first association relationship is further indicated based on the first bitmap, the second bitmap, the frequency information list corresponding to the synchronization signal block index, and the like. For a process in which the terminal device determines the first frequency information based on the first association relationship in the foregoing indication manners, refer to the foregoing description of the specific implementation form of the first association relationship. Details are not described herein again.

In some feasible implementations, when the first association relationship is indicated based on the frequency priority information, the terminal device may determine, based on the synchronization signal block index corresponding to the terminal device and the first association relationship, one or more pieces of frequency information that may need to be searched for by the terminal device and a rank of searching for each of the one or more pieces of frequency information. For the foregoing determining process, refer to the foregoing specific description of the process in which the first association relationship is indicated based on the frequency priority information. Details are not described herein again.

Optionally, in a specific implementation, the first association relationship may be indicated based on both a bitmap and a frequency priority map. To be specific, the first association relationship includes the association relationship between the at least one synchronization signal block and the at least one piece of frequency information, and the priority of the at least one piece of frequency information corresponding to the at least one synchronization signal block. In this way, after obtaining the first message, the terminal device may determine the first frequency information based on the synchronization signal block index corresponding to the terminal device and the bitmap in the first message, and then may determine, based on the frequency priority map in the first message, a priority of searching for each frequency in the first frequency information by the terminal device. According to this embodiment of this application, the terminal device can search for only a neighboring cell frequency that may be found by the terminal device in a beam range corresponding to the first synchronization signal block, and preferably search for a neighboring cell frequency that is most likely to be found by the terminal device, thereby reducing a blind searching probability, and improving cell reselection efficiency.

In some feasible implementations, after obtaining the first message, the terminal device may determine the first cell information based on the first synchronization signal block index corresponding to the terminal device and the association relationship that is between the at least one synchronization signal block index and the first cell information and that is included in the first message. The first cell information is used to indicate one or more pieces of cell information that may be searched for and measured by the terminal device.

In a specific implementation, after obtaining the first message, the terminal device may extract the second association relationship from the first message or obtain the second association relationship based on the first message. For example, the terminal device may extract the sixth bitmap from the system information block 4. For a specific implementation of the sixth bitmap, refer to Table 1-13. Then, the terminal device may select one or more pieces of cell information based on the first synchronization signal block index SSB index 1 and the association relationship indicated by the sixth bitmap, and determine that the one or more pieces of cell information belong to the first cell information of the terminal device. For example, as indicated in Table 1-13, if both the cell information Cell 2 and the cell information Cell 3 are associated with the first synchronization signal block index SSB index 1, both the cell information Cell 2 and the cell information Cell 3 belong to the first cell information of the terminal device. A process in which the terminal device determines the first cell information after obtaining the first message based on another synchronization signal block index is similar to the foregoing process. Details are not described herein again. Herein, it may be understood that the second association relationship is further indicated based on the seventh bitmap, the eighth bitmap, the indication list in which the synchronization signal block index corresponds to the cell information list, and the like. For a process in which the terminal device determines the first cell information based on the first association relationship in the foregoing indication manners, refer to the foregoing description of the specific implementation form of the first association relationship. Details are not described herein again.

Optionally, when the second association relationship is indicated based on the cell priority information, the terminal device may determine, based on the synchronization signal block index corresponding to the terminal device and the second association relationship, one or more pieces of cell information that may need to be searched for and measured by the terminal device and a rank of measuring each of the one or more pieces of cell information. For the foregoing determining process, refer to the foregoing specific description of the process in which the first association relationship is indicated based on the frequency priority information. Details are not described herein again. Optionally, the second association relationship may be indicated based on both a bitmap and a cell priority map. To be specific, the first association relationship includes the association relationship between the at least one synchronization signal block and the at least one piece of cell information, and the priority of the at least one piece of cell information corresponding to the at least one synchronization signal block. It may be understood that after obtaining the first message, the terminal device may determine the first cell information based on the synchronization signal block index corresponding to the terminal device and the bitmap in the first message, and then may determine, based on the cell priority map in the first message, a priority of searching for and measuring each cell in the first cell information by the terminal device.

In some feasible implementations, after obtaining the first message, the terminal device may further determine the first measurement information based on the first synchronization signal block index corresponding to the terminal device and the third association relationship included in the first message. In a specific implementation, after obtaining the first message, the terminal device may extract, from the first message, the fourth bitmap, the fifth bitmap, or the third list corresponding to the third association relationship. Then, the terminal device may find, through matching, one or more pieces of measurement information corresponding to the first synchronization signal block index in the fourth bitmap, the fifth bitmap, or the third indication list corresponding to the third association relationship. For example, for details, refer to Table 1-25. It can be learned from content of Table 1-25 that measurement information corresponding to the first synchronization signal block index is the measurement information M2 of the frequency information f2. Then, the terminal device may measure one or more cells on the frequency information f2 based on a measurement time indicated by the measurement information M2. For a specific process in which the terminal device determines the first measurement information based on the third association relationship, refer to the specific implementation process of the third association relationship described above. Details are not described herein again.

Optionally, in a specific implementation, the first message may include or indicate both the first association relationship and the second association relationship. In this way, after obtaining the first message, the terminal device may subsequently determine the first frequency information and the first measurement information. Then, the terminal device may determine, based on the first frequency information included in the first message, one or more frequencies that need to be searched for by the terminal device, and then determine, based on the first measurement information, a specific time of measuring a cell on the one or more frequencies, so that blind searching for the frequency and a waste of a cell measurement time can be avoided, and cell reselection efficiency can be improved.

Optionally, in a specific implementation, the first message may include or indicate both the second association relationship and the third association relationship. In this way, after obtaining the first message, the terminal device may determine the first cell information and the first measurement information. Then, when performing cell reselection, the terminal device needs to measure, at a measurement time point indicated by the first measurement information, only an individual cell indicated by the first cell information, so that a waste of measurement resources can be avoided, and cell reselection efficiency can be improved.

Optionally, in a specific implementation, the first message may alternatively include or indicate all of the first association relationship, the second association relationship, and the third association relationship. In this way, after obtaining the first message, the terminal device may subsequently determine the first frequency information, the first cell information, and the first measurement information based on the first association relationship, the second association relationship, and the third association relationship. Therefore, the terminal device may determine, based on the first frequency information, one or more frequencies that need to be searched for by the terminal device, determine, based on the first cell information, a cell that needs to be measured on the one or more frequencies that need to be searched for by the terminal device, and then determine, based on the first measurement information, a specific time of measuring the cell that needs to be measured on the one or more frequencies that need to be searched for by the terminal device, so that search resources of the terminal device can be fully used, blind searching for the frequency, measurement performed on an invalid cell, and a waste of a cell measurement time can be avoided, and cell reselection efficiency can be improved.

In this application, the first device (namely, the terminal device) within a beam coverage area (that is, corresponding to a synchronization signal block) may determine, based on the first association relationship and/or the second association relationship and/or the third association relationship included or indicated by the first message sent by the second device (namely, the base station), an adjacent frequency that may be found by the first device, and/or a cell that may need to be measured by the terminal device, and/or a specific time of measuring some cells by the terminal device. In this way, the terminal device can be prevented from searching for and measuring another cell outside the beam coverage area, and the terminal device can also be prevented from searching for and measuring a cell in which no synchronization signal block is sent, so that measurement energy consumption of the terminal device can be reduced, and cell reselection efficiency can be improved.

Embodiment 2

Figure 4:
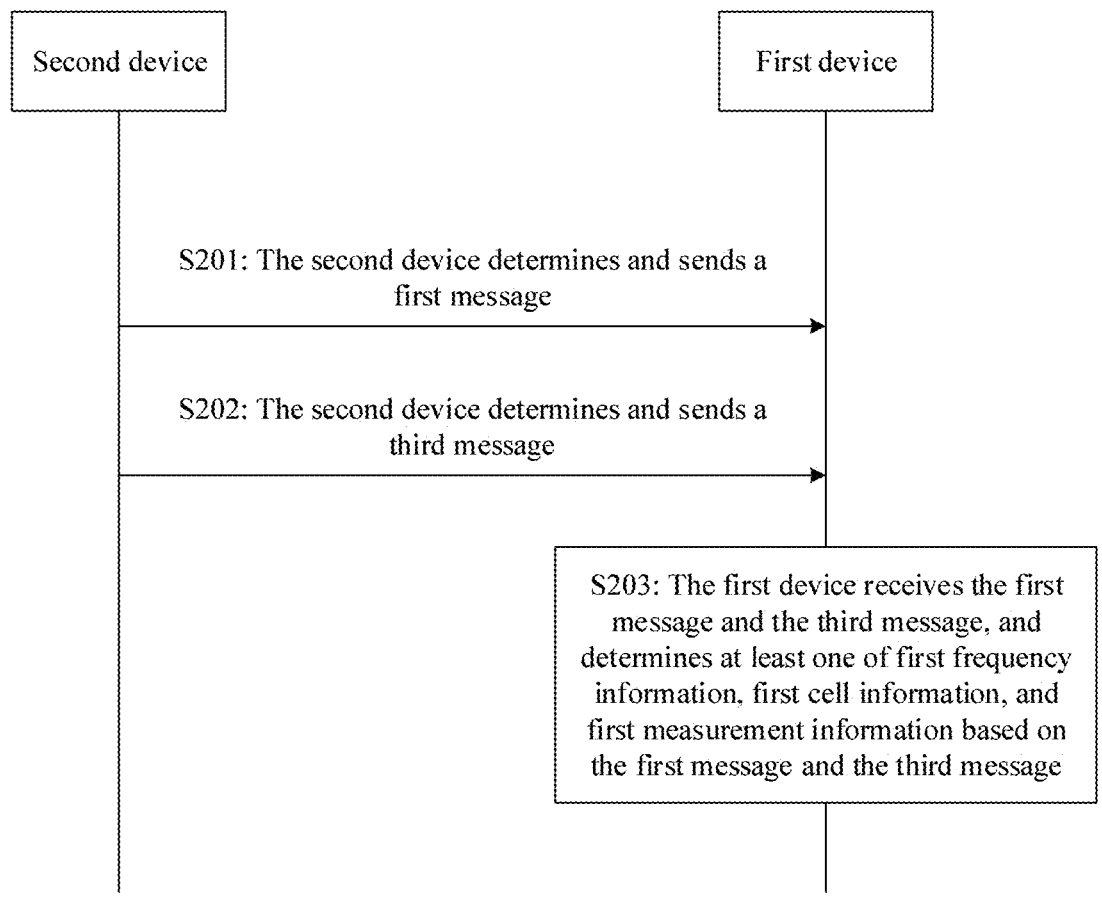
FIG. 4 is a schematic flowchart of Embodiment 2 of a message processing method according to an embodiment of this application.

FIG. 4 is a schematic flowchart of Embodiment 2 of a message processing method according to an embodiment of this application. The message processing method is applicable to the communications system shown in FIG. 1. The method includes the following steps.

S201: A second device determines and sends a first message.

In some feasible implementations, the second device (namely, a base station) may determine and send the first message based on a synchronization signal block. The base station may send the first message in a broadcast or unicast manner. This is not limited herein. The first message herein may include or indicate at least one of the following: a first association relationship, a second association relationship, and a third association relationship. In this way, when a first device (namely, a terminal device) needs to perform cell reselection, after the terminal device obtains the first message based on a synchronization signal block, the terminal device may determine at least one of first frequency information, first cell information, and first measurement information based on at least one of the first association relationship, the second association relationship, and the third association relationship in the first message and a synchronization signal block index corresponding to the synchronization signal block. The first association relationship is an association relationship between at least one synchronization signal block index and at least one piece of frequency information. The second association information is an association relationship between at least one synchronization signal block index and at least one piece of cell information. The third association relationship is an association relationship between at least one synchronization signal block index and at least one piece of measurement information. Herein, for specific indication information of the first association relationship, the second association relationship, and the third association relationship, refer to the specific indication content of the first association relationship, the second association relationship, and the third association relationship described in step S101 in Embodiment 1. Details are not described herein again. It should be noted that in this embodiment, the first message does not include or specifically indicate the at least one piece of frequency information, the at least one piece of cell information, and the at least one piece of measurement information.

Optionally, the base station may determine, based on adjacent-frequency information, neighboring cell information, or measurement information obtained by a fourth device through measurement performed based on one or more synchronization signal blocks, the first association relationship, the second association relationship, or the third association relationship included in the first message. The fourth device may be one or more terminal devices connected to the base station, or may be one or more drive test devices that can exchange information with the base station. This is not limited herein. In a specific implementation, the base station may configure one or more terminal devices within a beam coverage area by using system information or dedicated signaling information, so that the terminal devices can detect adjacent-frequency information, neighboring cell information, or neighboring cell synchronization signal block sending time information. For a specific detection process, refer to the detection process described in step S101 in Embodiment 1. Details are not described herein again. In this way, the base station may determine the first association relationship based on the adjacent-frequency information corresponding to the one or more synchronization signal block indexes. Alternatively, the base station may determine the second association relationship based on the neighboring cell information corresponding to the one or more synchronization signal blocks. Alternatively, the base station may determine the third association relationship based on the neighboring cell synchronization signal block sending time information corresponding to the one or more synchronization signal blocks. In another specific implementation, the drive test device such as a signal drive test vehicle may first determine, based on a detection result of adjacent-frequency information, cell information, or measurement information within each beam coverage area in a current serving cell of the terminal device, the first association relationship, the second association relationship, or the third association relationship included in the first message. For a specific process, refer to the process described in step S101 in Embodiment 1. Details are not described herein again.

S202: The second device determines and sends a third message.

In some feasible implementations, after determining the first message based on detection results of the adjacent-frequency information, the neighboring cell information, and the measurement information of the fourth device, the base station may further obtain adjacent-frequency information, neighboring cell information, or neighboring cell measurement information of a current serving cell of the fourth device. The adjacent-frequency information includes all adjacent frequencies of the current serving cell, the neighboring cell information includes all intra-frequency neighboring cells and inter-frequency neighboring cells of the current serving cell, and the neighboring cell measurement information includes sending times of synchronization signal blocks in all intra-frequency neighboring cells or inter-frequency neighboring cells of the current serving cell, so that the third message can include the at least one piece of frequency information, and/or the at least one piece of cell information, and/or the at least one piece of measurement information.

A sequence of S201 and S202 may be randomly changed.

S203: The first device receives the first message and the third message, and determines at least one of the first frequency information, the first cell information, and the first measurement information based on the first message and the third message.

In a feasible implementation, after obtaining the first message and the third message, the terminal device may extract at least one of the first association relationship, the second association relationship, and the third association relationship from the first message or obtain at least one of the first association relationship, the second association relationship, and the third association relationship based on the first message, and then extract at least one of the at least one piece of frequency information, the at least one piece of cell information, and the at least one piece of measurement information from the third message. Then, the terminal device may determine at least one of the first cell information, the first frequency information, and the first measurement information based on at least one of the first association relationship, the second association relationship, and the third association relationship and at least one of the at least one piece of frequency information, the at least one piece of cell information, and the at least one piece of measurement information. For a specific determining process, refer to a process in which the terminal device determines the first cell information and/or the first frequency information and/or the first measurement information based on the first association relationship and/or the second association relationship and/or the third association relationship and the at least one piece of frequency information and/or the at least one piece of cell information and/or the at least one piece of measurement information described in step S102 in Embodiment 1. Details are not described herein again.

In this application, the terminal device within a beam coverage area (that is, corresponding to a synchronization signal block) may determine, based on at least one of the first association relationship, the second association relationship, and the third association relationship included or indicated by the first message sent by the base station, an adjacent frequency that may be found by the terminal device, and/or a cell that may need to be measured by the terminal device, and/or a specific time of measuring some cells by the terminal device. In this way, the terminal device can be prevented from searching for and measuring another cell outside the beam coverage area, and the terminal device can also be prevented from searching for and measuring a cell in which no synchronization signal block is sent, so that measurement energy consumption of the terminal device can be reduced, and cell reselection efficiency can be improved. Specific information and the association relationship are separately sent, and the terminal device requests to send the specific information and the association relationship as required, to avoid periodic sending of the association relationship and reduce signaling overheads of the base station.

Embodiment 3

Figure 5:
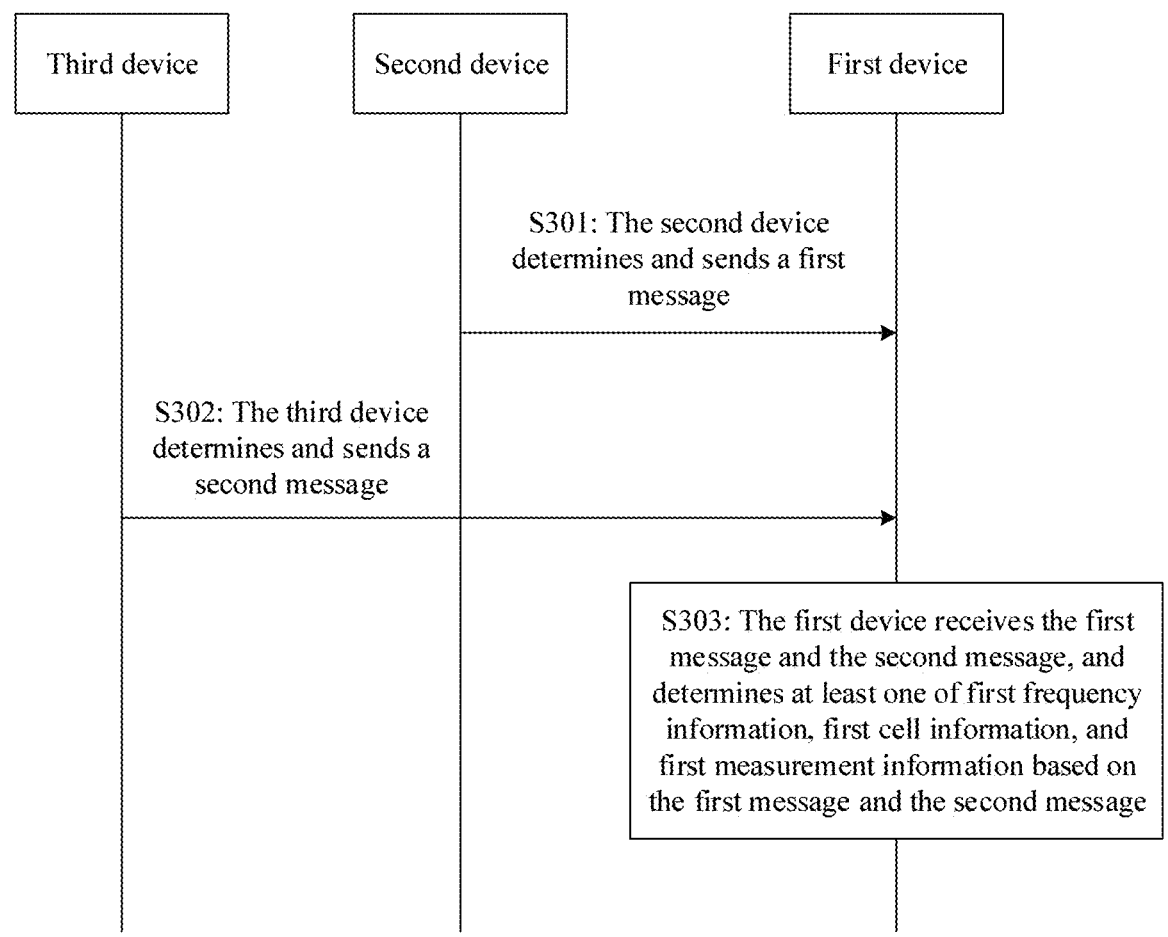
FIG. 5 is a schematic flowchart of Embodiment 3 of a message processing method according to an embodiment of this application.

FIG. 5 is a schematic flowchart of Embodiment 3 of a message processing method according to an embodiment of this application. The message processing method is applicable to the communications system shown in FIG. 1 and the communications system shown in FIG. 2. The method includes the following steps.

S301: A second device determines and sends a first message.

In some feasible implementations, the second device may be the LTE base station in the communications system shown in FIG. 2, or may be the NR base station in the communications system shown in FIG. 1. In this embodiment of this application, for ease of understanding and description, an example in which a base station replaces the second device is used below for description. The base station may send the first message in a broadcast or unicast manner. This is not limited herein. The first message herein may include or indicate at least one of the following: a first association relationship, a second association relationship, and a third association relationship. In this way, when a first device (namely, a terminal device) needs to perform cell reselection, after the terminal device obtains the first message based on a synchronization signal block, the terminal device may determine at least one of first frequency information, first cell information, and first measurement information based on at least one of the first association relationship, the second association relationship, and the third association relationship in the first message and a synchronization signal block index corresponding to the synchronization signal block. The first association relationship is an association relationship between at least one synchronization signal block index and at least one piece of frequency information. The second association information is an association relationship between at least one synchronization signal block index and at least one piece of cell information. The third association relationship is an association relationship between at least one synchronization signal block index and at least one piece of measurement information. Herein, for specific indication information and specific implementation forms of the first association relationship, the second association relationship, and the third association relationship, refer to the specific indication content and specific implementation forms of the first association relationship, the second association relationship, and the third association relationship described in step S101 in Embodiment 1. Details are not described herein again. It should be noted that in this embodiment, the at least one piece of frequency information, the at least one piece of cell information, or the at least one piece of measurement information is specifically frequency information, cell information, or cell measurement information that may be searched for or measured by the terminal device in one or more NR neighboring cells of a current serving cell. To be specific, the first frequency information indicates a frequency that needs to be searched for by the terminal device within a beam coverage area of a beam in an NR neighboring cell, the first cell information indicates a cell that needs to be measured by the terminal device within a beam coverage area in an NR neighboring cell, and the first measurement information indicates a time at which the terminal device needs to perform cell measurement within a beam coverage area in an NR neighboring cell.

Optionally, the base station may determine, based on adjacent-frequency information, neighboring cell information, or measurement information obtained by a fourth device through measurement performed based on one or more synchronization signal blocks, the first association relationship, the second association relationship, or the third association relationship included in the first message. The fourth device may be one or more terminal devices connected to the base station, or may be one or more drive test devices that can exchange information with the base station. This is not limited herein. For a specific process, refer to the process described in step S101 in Embodiment 1. Details are not described herein again. It should be noted that in this case, the adjacent-frequency information, the neighboring cell information, or the measurement information obtained by the fourth device through measurement is adjacent-frequency information, neighboring cell information, or measurement information that can be detected by the fourth device within each beam coverage area in all NR neighboring cells of a current serving cell.

S302: A third device determines and sends a second message.

In some feasible implementations, the third device may determine and send the second message. The third device herein is an NR base station corresponding to each of one or more NR neighboring cells of the current serving cell. In a specific implementation, when the terminal device in the current serving cell needs to perform cell reselection, the terminal device may perform signal quality detection on a synchronization signal block transmitted by an NR base station of each of one or more NR neighboring cells of the current serving cell, and when the terminal device detects that a signal of a synchronization signal block sent by an NR base station meets a preset condition, the terminal device may obtain the second message sent by the NR base station. The second message herein includes a synchronization signal block.

A sequence of S301 and S302 may be randomly changed.

S303: The first device receives the first message and the second message, and determines at least one of the first frequency information, the first cell information, and the first measurement information based on the first message and the second message.

In a feasible implementation, the first device may receive the first message, and extract at least one of the first association relationship, the second association relationship, and the third association relationship from the first message or obtain at least one of the first association relationship, the second association relationship, and the third association relationship based on the first message. For a specific process, refer to the process of extracting at least one of the first association relationship, the second association relationship, and the third association relationship from the first message described in step S102 in Embodiment 1. Details are not described herein again.

Then, the terminal device may extract the synchronization signal block included in the second message, and determine a synchronization signal block index based on the synchronization signal block. Optionally, if the synchronization signal block is a first synchronization signal block, the terminal device may determine a first synchronization signal block index based on the first synchronization signal block. In a specific implementation, for a process of determining the synchronization signal block index by the terminal device based on the synchronization signal block, refer to the process of determining the synchronization signal block index described in Embodiment 1. Details are not described herein again.

Then, the terminal device may determine at least one of the first frequency information, the first cell information, and the first measurement information based on at least one of the first association relationship, the second association relationship, and the third association relationship included in the first message and the synchronization signal block index determined by using the second message. For a specific process, refer to the process of determining at least one of the first frequency information, the first cell information, and the first measurement information based on the first message and the synchronization signal block index described in step S102 in Embodiment 1. Details are not described herein again.

According to this embodiment of this application, when performing cell reselection, the terminal device may determine, based on the association relationship included in the first message sent by the base station and the synchronization signal block index in the second message, an adjacent frequency that needs to be searched for by the terminal device within a beam coverage area, a cell that needs to be measured by the terminal device, or a time of measuring a cell by the terminal device. In this way, the terminal device does not need to search for an adjacent frequency in another beam coverage beam, does not need to measure a neighboring cell within the another beam coverage area, and does not need to measure some neighboring cells when base stations in the neighboring cells send no synchronization signal block, so that measurement energy consumption can be reduced, and cell reselection efficiency can be improved.

Embodiment 4

Figure 6:
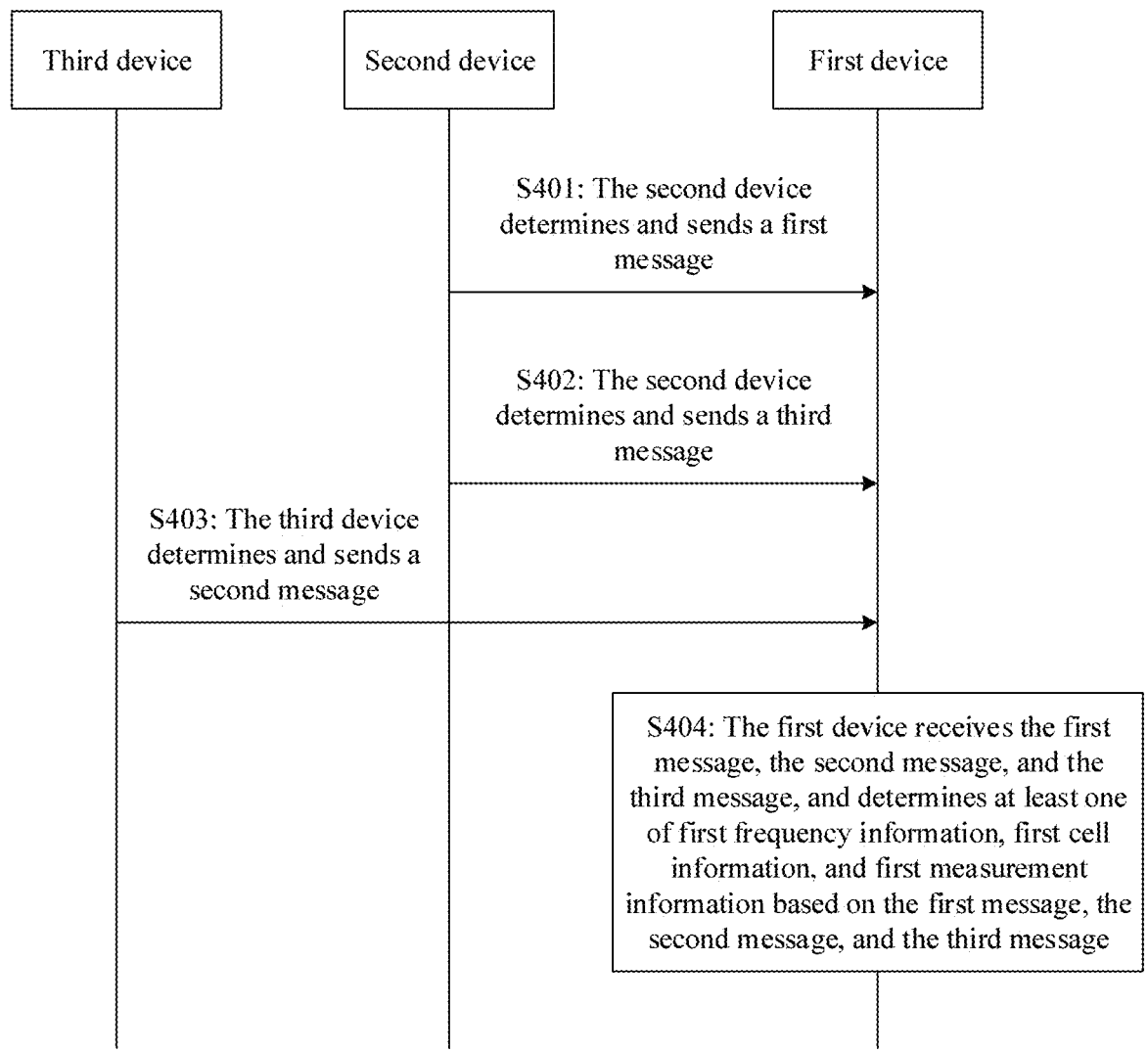
FIG. 6 is a schematic flowchart of Embodiment 4 of a message processing method according to an embodiment of this application.

FIG. 6 is a schematic flowchart of Embodiment 4 of a message processing method according to an embodiment of this application. The method is applicable to the communications system shown in FIG. 1, and is also applicable to the communications system shown in FIG. 2. The method includes the following steps.

S401: A second device determines and sends a first message.

In some feasible implementations, the second device (namely, an LTE base station or an NR base station, which is replaced with a base station below for description) may determine the first message based on at least one of adjacent-frequency information, neighboring cell information, and measurement information detected by a fourth device. The first message includes or indicates at least one of the following: a first association relationship, a second association relationship, and a third association relationship. The first association relationship is an association relationship between at least one synchronization signal block index and at least one piece of frequency information. The second association information is an association relationship between at least one synchronization signal block index and at least one piece of cell information. The third association relationship is an association relationship between at least one synchronization signal block index and at least one piece of measurement information. Herein, for specific indication information of the first association relationship, the second association relationship, and the third association relationship, refer to the specific indication content of the first association relationship, the second association relationship, and the third association relationship described in step S101 in Embodiment 1. Details are not described herein again. It should be noted that in this embodiment, the first message does not include or specifically indicate the at least one piece of frequency information, the at least one piece of cell information, and the at least one piece of measurement information.

Optionally, for a process in which the base station determines the first message based on at least one of the adjacent-frequency information, the neighboring cell information, and the measurement information detected by the fourth device, refer to the process of determining the first message described in step S101 in Embodiment 1. Details are not described herein again.

S402: The second device determines and sends a third message.

In some feasible implementations, after determining the first message based on detection results of the adjacent-frequency information, the neighboring cell information, and the measurement information of the fourth device, the base station may further obtain adjacent-frequency information, neighboring cell information, or neighboring cell measurement information of a current serving cell of the base station, and determine the third message. The adjacent-frequency information includes all adjacent frequencies of the current serving cell, the neighboring cell information includes all intra-frequency neighboring cells and inter-frequency neighboring cells of the current serving cell, and the neighboring cell measurement information includes sending times of synchronization signal blocks in all intra-frequency neighboring cells or inter-frequency neighboring cells of the current serving cell, so that the third message can include at least one of the following: the at least one piece of frequency information, the at least one piece of cell information, and the at least one piece of measurement information.

S403: A third device determines and sends a second message.

In some feasible implementations, the third device may determine and send the second message. The third device herein is an NR base station or a future base station corresponding to each of one or more NR neighboring cells of the current serving cell. In a specific implementation, when a terminal device in the current serving cell needs to perform cell reselection, the terminal device may perform signal quality detection on a synchronization signal block transmitted by an NR base station of each of one or more NR neighboring cells of the current serving cell, and when the terminal device detects that a signal of a synchronization signal block sent by an NR base station meets a preset condition, the terminal device may obtain the second message sent by the NR base station. The second message herein includes a synchronization signal block.

A sequence of S401, S402, and S403 may be randomly changed.

S404: A first device receives the first message, the second message, and the third message, and determines at least one of first frequency information, first cell information, and first measurement information based on the first message, the second message, and the third message.

In some feasible implementations, the first device may receive the first message, and extract at least one of the first association relationship, the second association relationship, and the third association relationship from the first message. For a specific process, refer to the process of extracting at least one of the first association relationship, the second association relationship, and the third association relationship from the first message or obtaining at least one of the first association relationship, the second association relationship, and the third association relationship based on the first message described in step S102 in Embodiment 1. Details are not described herein again. The terminal device may extract at least one of the at least one piece of frequency information, the at least one piece of cell information, and the at least one piece of measurement information from the third message. Then, the terminal device may extract a synchronization signal block from the second message, and extract, from the synchronization signal block, a synchronization signal block index corresponding to the synchronization signal block. Herein, optionally, the synchronization signal block is a first synchronization signal block. In this way, the first synchronization signal block index is an index of a synchronization signal block corresponding to a beam on which the terminal device is located. Finally, the terminal device may determine at least one of the first frequency information, the first cell information, and the first measurement information based on the first synchronization signal block index, at least one of the first association relationship, the second association relationship, and the third association relationship included in the first message, and at least one of the at least one piece of frequency information, the at least one piece of cell information, and the at least one piece of measurement information included in the third message. The first frequency information is information about an adjacent frequency that can be found by the terminal device within a beam coverage area in which the terminal device is located, the first cell information is information about an intra-frequency neighboring cell or an adjacent-frequency neighboring cell that may need to be measured by the terminal device within the beam coverage area in which the terminal device is located, and the first measurement information is information about a time at which the terminal device needs to perform cell measurement within the beam coverage area in which the terminal device is located.

According to this embodiment of this application, the terminal device can determine, based on the first message, the second message, and the third message that are received by the terminal device, an adjacent frequency that needs to be searched for, a cell that needs to be measured, or a time of measuring a cell when the terminal device performs cell reselection, so that measurement energy consumption can be reduced, and cell reselection efficiency can be improved.

Embodiment 1 and Embodiment 2, and Embodiment 3 and Embodiment 4 each may be randomly combined to help the terminal device further determine the first frequency information, the first cell information, and the first measurement information. For example, the terminal device may first determine a range of a neighboring cell, an adjacent frequency, or measurement information based on synchronization signal block information (that is, Embodiment 1, Embodiment 2, or a combination of Embodiment 1 and Embodiment 2) of a serving cell, and then further reduce the range of the neighboring cell, the adjacent frequency, or the measurement information based on synchronization signal block information (that is, Embodiment 3, Embodiment 4, or a combination of Embodiment 3 and Embodiment 4) that is of a neighboring cell and that is obtained by measuring the neighboring cell.

Embodiment 5

Figure 7:
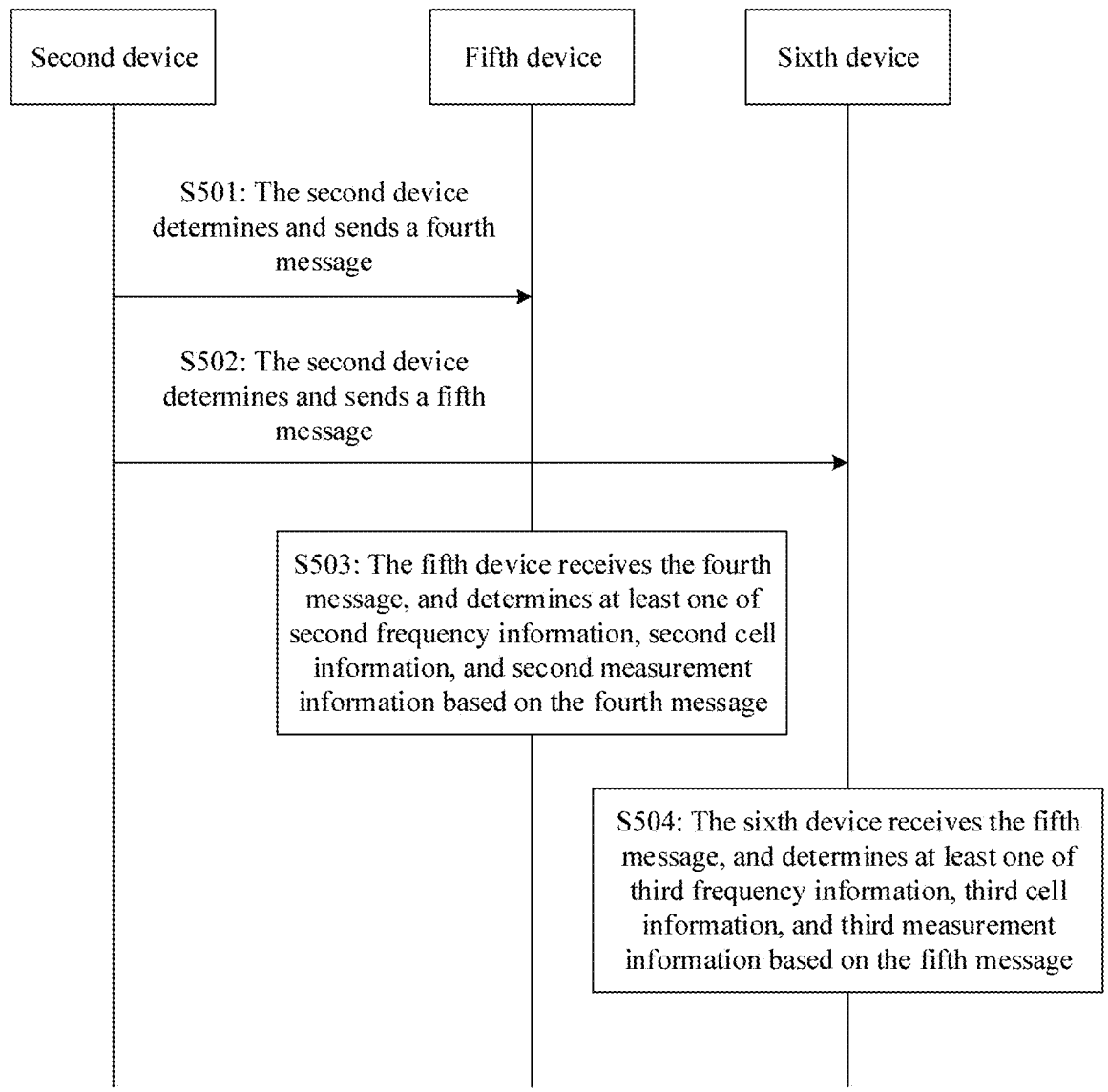
FIG. 7 is a schematic flowchart of Embodiment 5 of a message processing method according to an embodiment of this application.

FIG. 7 is a schematic flowchart of Embodiment 5 of a message processing method according to an embodiment of this application. The method is applicable to the communications system shown in FIG. 1. A sequence of S503 and S504 may be randomly changed. The method includes the following steps.

S501: A second device determines and sends a fourth message.

S502: The second device determines and sends a fifth message.

In some feasible implementations, after obtaining frequency information and/or cell information and/or measurement information that are/is obtained by a fourth device through measurement performed based on one or more synchronization signal blocks, the second device (which is replaced with the base station below for description) may determine a fourth message or a fifth message based on the frequency information and/or the cell information and/or the measurement information. The fourth message includes at least one of the following: second frequency information, second cell information, and second measurement information. Related functions of the second frequency information, the second cell information, and the second measurement information are the same as those of the first frequency information, the first cell information, and the first measurement information described in S101 in Embodiment 1. Details are not described herein again. The fifth message includes at least one of the following: third frequency information, third cell information, and third measurement information. Related functions of the third frequency information, the third cell information, and the third measurement information are the same as those of the first frequency information, the first cell information, and the first measurement information described in S101 in Embodiment 1. Details are not described herein again.

The base station may send the fourth message and the fifth message by using different synchronization signal blocks. For example, the base station may send the fourth message by using a first synchronization signal block, and send the fifth message by using a second synchronization signal block.

Optionally, the second frequency information includes at least one piece of frequency information, and the third frequency information includes at least one piece of frequency information. However, the at least one piece of frequency information included in the second frequency information is different from the at least one piece of frequency information included in the third frequency information. For example, the second frequency information includes frequency information that can be found by the terminal device within a beam coverage area corresponding to the first synchronization signal block, and the third frequency information includes frequency information that can be found by the terminal device within a beam coverage area corresponding to the second synchronization signal block. Alternatively, an arrangement rank of the at least one piece of frequency information included in the second frequency information is different from an arrangement rank of the at least one piece of frequency information included in the third frequency information. For example, an arrangement rank/arrangement ranks of one or more pieces of frequency information included in the second frequency information may indicate a rank in which the terminal device searches for the frequency information within the beam coverage area corresponding to the first synchronization signal block. An arrangement rank/arrangement ranks of one or more pieces of frequency information included in the third frequency information may indicate a rank in which the terminal device searches for the frequency information within the beam coverage area corresponding to the second synchronization signal block. Optionally, in the at least one piece of frequency information included in the second frequency information and the at least one piece of frequency information included in the third frequency information, frequency information with a higher rank has a higher priority. In other words, the terminal device needs to preferably search for the frequency information with the higher rank.

Similarly, the third cell information includes at least one piece of cell information, and the second cell information includes at least one piece of cell information. The at least one piece of cell information included in the third cell information is different from the at least one piece of cell information included in the second cell information. Alternatively, an arrangement rank of the at least one piece of cell information included in the third cell information is different from an arrangement rank of the at least one piece of cell information included in the second cell information. Further, in the at least one piece of cell information included in the second cell information and the at least one piece of cell information included in the third cell information, cell information with a higher rank has a higher priority. Optionally, the second measurement information includes at least one piece of measurement information, and the third measurement information includes at least one piece of measurement information. The at least one piece of measurement information included in the second measurement information is different from the at least one piece of measurement information included in the third measurement information. For example, the at least one piece of measurement information included in the second measurement information may be information about a time at which the terminal device performs cell measurement within the beam coverage area corresponding to the first synchronization signal block, and the at least one piece of measurement information included in the third measurement information may be information about a time at which the terminal device performs cell measurement within the beam coverage area corresponding to the second synchronization signal block.

Optionally, the frequency information includes at least an absolute radio frequency channel number or a frequency band number. The cell information is a cell identifier or a cell-level offset parameter used for cell selection or reselection. The measurement information includes SSB-ToMeasure, SS-RSSI-Measurement, or synchronization signal block-based measurement timing configuration (SS/PBCH block measurement timing configuration, SMTC) information. The SMTC herein may be used to configure a measurement time within a specific range. SSB-ToMeasure may be used to determine a time pattern (pattern), namely, a time pattern including one or more time points at which synchronization signal blocks corresponding to one or more cells are measured. SS-RSSI-Measurement may be used to determine a time gap for measuring each of the synchronization signal blocks corresponding to the one or more cells.

S503: A fifth device receives the fourth message, and determines at least one of the second frequency information, the second cell information, and the second measurement information based on the fourth message.

S504: A sixth device receives the fifth message, and determines at least one of the third frequency information, the third cell information, and the third measurement information based on the fifth message.

In some feasible implementations, the fifth device and the sixth device are terminal devices within different beam coverage areas. Based on the foregoing content in steps S501 and S501, if the fifth device is within the beam coverage area corresponding to the first synchronization signal block, the fifth device may obtain the fourth message based on the first synchronization signal block. After obtaining the fourth message based on the first synchronization signal block, the fifth device may extract at least one of the second frequency information, the second cell information, and the second measurement information from the fourth message. In a specific implementation, after obtaining the fourth message, the fifth device may extract the second frequency information from some information elements in the fourth message according to a preset communications protocol. The second frequency information includes or indicates a frequency list, and the frequency list includes at least one piece of frequency information. Alternatively, after obtaining the fourth message, the fifth device may extract the second cell information from some information elements in the fourth message according to a preset communications protocol. The second cell information includes or indicates a cell list, and the cell list includes at least one piece of cell information. Alternatively, after obtaining the fourth message, the fifth device may extract the second measurement information from some information elements in the fourth message according to a preset communications protocol. Then, the fifth device may perform cell searching and measurement based on a frequency or a cell or a cell measurement time indicated by at least one of the second frequency information, the second cell information, and the second measurement information.

Optionally, the second frequency information includes or indicates a frequency list, and the frequency list includes at least one piece of frequency information. The fifth device may preferably select frequency information with a higher rank in the frequency list to perform a frequency search. Further, the second cell information includes or indicates a cell list, and the cell list includes at least one cell identifier. The fifth device may preferably select a cell corresponding to a cell identifier with a higher rank in the cell list to perform cell measurement.

Similarly, the sixth device may receive the fifth message based on the second synchronization signal block, and determine at least one of the third frequency information, the third cell information, and the third measurement information based on the fifth message. For specific indication functions of the frequency information, the cell information, and the measurement information, refer to the indication functions described in steps S501 and S502. Details are not described herein again. Then, the sixth device may perform cell measurement based on a frequency or a cell or a cell measurement time indicated by at least one of the third frequency information, the third cell information, and the third measurement information.

Optionally, the third frequency information includes or indicates a frequency list, and the frequency list includes at least one piece of frequency information. The sixth device may preferably select frequency information with a higher rank in the frequency list to perform a frequency search. Further, the third cell information includes or indicates a cell list, and the cell list includes at least one cell identifier. The sixth device may preferably select a cell corresponding to a cell identifier with a higher rank in the cell list to perform cell measurement.

It should be noted that the terminal device may further obtain a sixth message, a seventh message, or the like, and determine frequency information, cell information, or measurement information based on the message. For a specific process, refer to the foregoing process in which the terminal device determines the second frequency information, the second cell information, or the second measurement information based on the fourth message. Details are not described herein again.

According to this embodiment of this application, a message sent by the base station by using a synchronization signal block includes or indicates only frequency information, cell information, or measurement information corresponding to the terminal device within a beam coverage area corresponding to the synchronization signal block, and each message includes a small data amount. In addition, different messages are in a one-to-one correspondence with different synchronization signal blocks, so that the terminal device can directly obtain frequency information, cell information, or measurement information corresponding to a beam coverage area in which the terminal device is located. This reduces a data processing amount and improves cell reselection efficiency.

Figure 8:
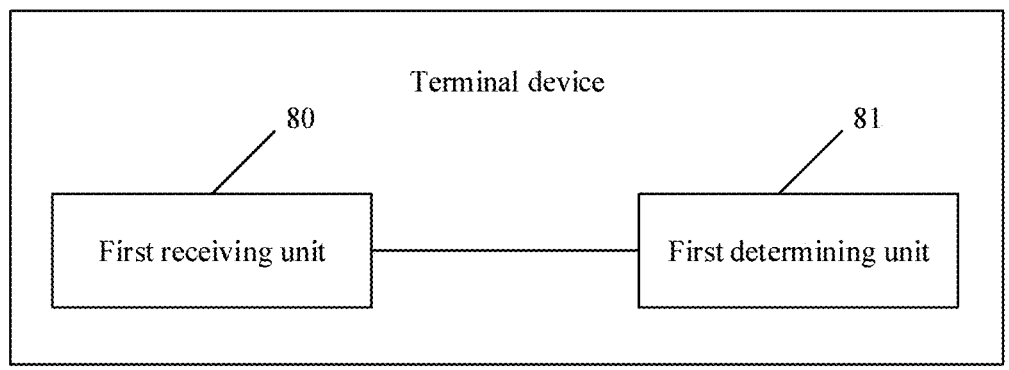
FIG. 8 is a schematic structural diagram of a terminal device according to an embodiment of this application.

FIG. 8 is a schematic structural diagram of a terminal device according to an embodiment of this application. The terminal device includes:

a first receiving unit 80, configured to receive a first message sent by a second device, where the first message includes or indicates at least one of the following: a first association relationship, a second association relationship, and a third association relationship, the first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information; and a first determining unit 81, configured to determine at least one of first frequency information, first cell information, and first measurement information based on the first message received by the first receiving unit 80, where the at least one piece of frequency information herein includes the first frequency information, the at least one piece of cell information includes the first cell information, and the at least one piece of measurement information includes the first measurement information.

In some feasible implementations, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

In some feasible implementations, the first receiving unit may receive the first message based on a first synchronization signal block, where a resource receiving location of the first message is determined by the first synchronization signal block, the at least one synchronization signal block index includes a first synchronization signal block index, and the first synchronization signal block index is determined by the first synchronization signal block.

In some feasible implementations, the first receiving unit 80 may receive a second message sent by a third device, where the second message includes a first synchronization signal block. The first device determines a first synchronization signal block index based on the first synchronization signal block, where the at least one synchronization signal block index includes the first synchronization signal block index.

In some feasible implementations, the first determining unit 80 is configured to determine at least one of the first frequency information, the first cell information, and the first measurement information based on the first signal block index and the first message.

In some feasible implementations, the first receiving unit 80 is further configured to receive a third message sent by the second device, where the third message herein includes at least one of the following: the at least one piece of frequency information, the at least one piece of cell information, and the at least one piece of measurement information, and the third message and the first message are different messages. The first determining unit is further configured to determine at least one of the first frequency information, the first cell information, and the first measurement information based on the first synchronization signal block index, the first message, and the third message.

In some feasible implementations, the first message further includes at least one of the following: the at least one piece of frequency information, the at least one piece of cell information, and the at least one piece of measurement information.

In some feasible implementations, when the first message includes at least one of the following: the at least one piece of frequency information and the first association relationship, the at least one piece of cell information and the second association relationship, and the third association relationship and the at least one piece of measurement information, the first determining unit is configured to determine the first frequency information based on the first synchronization signal block index, the at least one piece of frequency information, and the first association relationship; and/or when the first cell information is the intra-frequency neighboring cell information, the first determining unit is configured to determine the first cell information based on the first synchronization signal block index, the at least one piece of cell information, and the second association relationship; and/or when the first cell information is the inter-frequency neighboring cell information, the first determining unit is configured to: determine the first frequency information based on the first synchronization signal block index, the at least one piece of frequency information, and the first association relationship, and determine the first cell information based on the first synchronization signal block index, the at least one piece of cell information, and the second association relationship; and/or the first determining unit is configured to determine the first measurement information based on the first synchronization signal block index, the at least one piece of measurement information, and the third association relationship.

In some feasible implementations, when the first association relationship includes the at least one piece of frequency information, and/or the second association relationship includes the at least one piece of cell information, and/or the third association relationship includes the at least one piece of measurement information, the first determining unit is configured to determine the first frequency information based on the first synchronization signal block index and the first association relationship; and/or when the first cell information is the intra-frequency neighboring cell information, the first determining unit is configured to determine the first cell information based on the first synchronization signal block index and the second association relationship; and/or when the first cell information is the inter-frequency neighboring cell information, the first determining unit is configured to: determine the first frequency information based on the first synchronization signal block index and the first association relationship, and determine the first cell information based on the first synchronization signal block index and the second association relationship; and/or the first determining unit determines the first measurement information based on the first synchronization signal block index and the third association relationship.

In some feasible implementations, when the third message includes at least the at least one piece of frequency information and the first message includes at least the first association relationship, and/or the third message includes at least the at least one piece of cell information and the first message includes at least the second association relationship, and/or the third message includes at least the at least one piece of measurement information and the first message includes at least the third association relationship, the first determining unit determines the first frequency information based on the first synchronization signal block index, the at least one piece of frequency information, and the first association relationship; and/or when the first cell information is the intra-frequency neighboring cell information, the first determining unit determines the first cell information based on the first synchronization signal block index, the at least one piece of cell information, and the second association relationship; and/or when the first cell information is the inter-frequency neighboring cell information, the first determining unit determines the first frequency information based on the first synchronization signal block index, the at least one piece of frequency information, and the first association relationship, and determines the first cell information based on the first synchronization signal block index, the at least one piece of cell information, and the second association relationship; and/or the first determining unit determines the first measurement information based on the first synchronization signal block index, the at least one piece of measurement information, and the third association relationship.

In some feasible implementations, the first association relationship, the second association relationship, or the third association relationship is indicated based on a bitmap.

In some feasible implementations, the first association relationship is indicated based on a first bitmap. The first bitmap is used to indicate the association relationship between the at least one piece of frequency information and the at least one synchronization signal block index. Each bit in the first bitmap is used to indicate whether the at least one piece of frequency information is associated with the at least one synchronization signal block index.

Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

In some feasible implementations, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information.

In some feasible implementations, the first association relationship is indicated based on frequency priority information. The first message includes at least one piece of frequency priority information, and the frequency priority information is used to indicate a priority of the at least one piece of frequency information corresponding to at least one synchronization signal block. The at least one piece of frequency priority information includes first frequency priority information, and the first frequency priority information is used to indicate a priority of the first frequency information corresponding to the first synchronization signal block.

In some feasible implementations, the third association relationship is indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

In some feasible implementations, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information.

In some feasible implementations, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index.

Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes.

Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

In some feasible implementations, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information.

In some feasible implementations, the second association relationship is indicated based on at least one piece of cell priority information, and the cell priority information is used to indicate a priority of the at least one piece of cell information corresponding to the at least one synchronization signal block. The at least one piece of cell priority information includes first cell priority information, and the first cell priority information is used to indicate a priority of the first cell information corresponding to the first synchronization signal block.

In some feasible implementations, the first frequency information is used by the first device to perform inter-frequency measurement when the first device performs cell reselection.

In some feasible implementations, the first measurement information is used to indicate a time of measuring a synchronization signal block in one or more neighboring cells when the first device performs cell reselection.

In some feasible implementations, the first cell information is used by the first device to perform intra-frequency neighboring cell measurement or inter-frequency neighboring cell measurement when the first device performs cell reselection.

In some feasible implementations, the frequency information includes at least an absolute radio frequency channel number or a frequency band number.

In some feasible implementations, the measurement information includes at least one piece of synchronization signal block received signal strength indicator measurement information or at least one piece of information about a synchronization signal block that needs to be measured.

In some feasible implementations, the cell information includes at least a cell identifier or a cell-level offset parameter used for cell selection or reselection.

In a specific implementation, the first receiving unit 80 is configured to perform the process of receiving the first message described in step S102 in the method embodiment shown in FIG. 3, or may be configured to perform the process of receiving the first message and the third message described in step S203 in the method embodiment shown in FIG. 4, or may be configured to perform the process of receiving the first message and the second message described in step S303 in the method embodiment shown in FIG. 5, or may be configured to perform the process of receiving the first message, the second message, and the third message described in step S404 in the embodiment shown in FIG. 6. Details are not described herein again. The first determining unit 81 is configured to perform the process of determining any one of the first frequency information, the first cell information, and the first measurement information based on the first message described in step S102 in the method embodiment shown in FIG. 3, or may be configured to perform the process of determining any one of the first frequency information, the first cell information, and the first measurement information based on the first message and the third message described in step S203 in the embodiment shown in FIG. 4, or may be configured to perform the process of determining any one of the first frequency information, the first cell information, and the first measurement information based on the first message and the second message described in step S303 in the method embodiment shown in FIG. 5, or may be configured to perform the process of determining any one of the first frequency information, the first cell information, and the first measurement information based on the first message, the second message, and the third message described in step S404 in the method embodiment shown in FIG. 6. Details are not described herein again.

Figure 9:
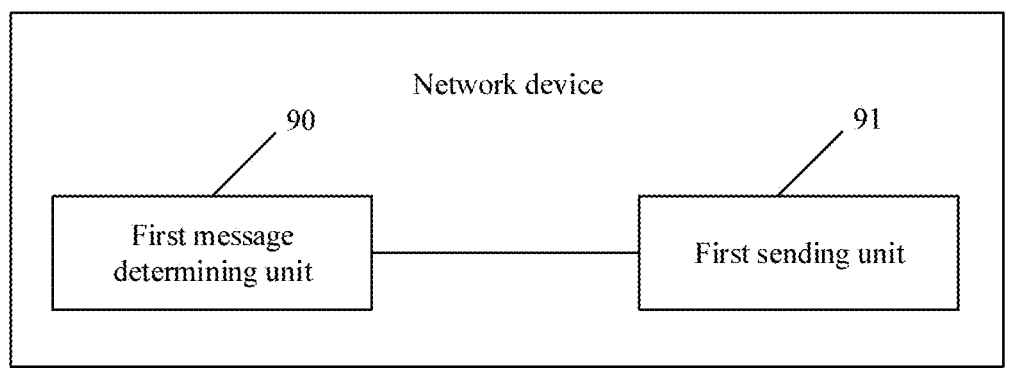
FIG. 9 is a schematic structural diagram of a network side device according to an embodiment of this application.

FIG. 9 is a schematic structural diagram of a network device according to an embodiment of this application. The network device includes:

a first message determining unit 90, configured to determine a first message, where the first message herein includes or indicates at least one of the following: a first association relationship, a second association relationship, and a third association relationship, the first association relationship is an association relationship between at least one synchronization signal block index and at least one piece of frequency information, the second association relationship is an association relationship between at least one synchronization signal block index and at least one piece of cell information, and the third association relationship is an association relationship between at least one synchronization signal block index and at least one piece of measurement information, where the first message herein is used by a first device to determine at least one of the first frequency information, the first cell information, and the first measurement information, the at least one piece of frequency information includes the first frequency information, the at least one piece of cell information includes the first cell information, and the at least one piece of measurement information includes the first measurement information; and a first sending unit, configured to send the first message determined by the first message determining unit 90, where the first sending unit 91 herein may send the first message in a broadcast or unicast manner, and this is not limited herein.

In some feasible implementations, the frequency information is adjacent-frequency information of a serving cell in which the first device is located. Alternatively, the cell information is intra-frequency neighboring cell information of a serving cell in which the first device is located. Alternatively, the cell information is inter-frequency neighboring cell information of a serving cell in which the first device is located. Alternatively, the measurement information is included in intra-frequency cell reselection information of a serving cell in which the first device is located, and the measurement information is measurement time information of one or more intra-frequency neighboring cells of the serving cell in which the first device is located. Alternatively, the measurement information is included in adjacent-frequency measurement information of a serving cell in which the first device is located, and the measurement information is measurement time information of one or more inter-frequency neighboring cells of the serving cell in which the first device is located.

In some feasible implementations, the first message determining unit 90 may determine the first message based on adjacent-frequency information and/or neighboring cell information and/or neighboring cell measurement information obtained by a fourth device through measurement performed based on one or more synchronization signal blocks. The fourth device herein may be one or more first devices, or may be one or more drive test devices.

In some feasible implementations, the first sending unit 91 sends the first message to the first device by using a first synchronization signal block. The at least one synchronization signal block index includes a first synchronization signal block index, the first synchronization signal block index is determined by the first synchronization signal block, and a resource sending location of the first message is determined by the first synchronization signal block.

In some feasible implementations, the first message and the first synchronization signal block index are used by the first device to determine at least one of the first frequency information, the first cell information, and the first measurement information.

In some feasible implementations, the first message determining unit 90 is further configured to determine a third message. The third message herein includes at least one of the following: the at least one piece of frequency information, the at least one piece of cell information, and the at least one piece of measurement information, and the third message and the first message are different messages. In this case, the first message, the first synchronization signal block index, and the third message may be used by the first device to determine at least one of the first frequency information, the first cell information, and the first measurement information.

In some feasible implementations, the first message further includes at least one of the following: the at least one piece of frequency information, the at least one piece of cell information, and the at least one piece of measurement information.

In some feasible implementations, when the first message includes the at least one piece of frequency information and the first association relationship, and/or the first message includes the at least one piece of cell information and the second association relationship, and/or the first message includes the third association relationship and the at least one piece of measurement information, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the at least one piece of cell information, and the second association relationship are used by the first device to determine the first cell information; and/or at least the first synchronization signal block index, the third association relationship, and the at least one piece of measurement information are used by the first device to determine the first measurement information.

In some feasible implementations, when the first association relationship includes the at least one piece of frequency information, and/or the second association relationship includes the at least one piece of cell information, and/or the third association relationship includes the at least one piece of measurement information, the first synchronization signal block index, the at least one piece of frequency information, and the first association relationship are used by the first device to determine the first frequency information; and/or when the first cell information is the intra-frequency neighboring cell information, the first synchronization signal block index, the at least one piece of cell information, and the second association relationship are used by the first device to determine the first cell information; and/or when the first cell information is the inter-frequency neighboring cell information, the first synchronization signal block index, the at least one piece of frequency information, and the first association relationship are used by the first device to determine the first frequency information, and the first synchronization signal block index, the at least one piece of cell information, and the second association relationship are used by the first device to determine the first cell information; and/or the first synchronization signal block index and the third association relationship are used by the first device to determine the first measurement information.

In some feasible implementations, when the third message includes the at least one piece of frequency information and the first message includes at least the first association relationship, and/or the third message includes the at least one piece of cell information and the first message includes the second association relationship, and/or the third message includes at least the at least one piece of measurement information and the first message includes at least the third association relationship, the first synchronization signal block index, the first association relationship, and the at least one piece of frequency information are used by the first device to determine the first frequency information; and/or when the first cell information is the intra-frequency neighboring cell information, the first synchronization signal block index, the second association relationship, and the at least one piece of cell information are used by the first device to determine the first cell information; and/or when the first cell information is the inter-frequency neighboring cell information, the first synchronization signal block index, the first association relationship, and the at least one piece of frequency information are used by the first device to determine the first frequency information, and the first synchronization signal block index, the second association relationship, and the at least one piece of cell information are used by the first device to determine the first cell information; and/or the first synchronization signal block index, the third association relationship, and the at least one piece of measurement information are used by the first device to determine the first measurement information.

In some feasible implementations, the first association relationship, the second association relationship, or the third association relationship is indicated based on a bitmap.

In some feasible implementations, the first association relationship is indicated based on a first bitmap. The first bitmap is used to indicate the association relationship between the at least one piece of frequency information and the at least one synchronization signal block index. Each bit in the first bitmap is used to indicate whether the at least one piece of frequency information is associated with the at least one synchronization signal block index. Alternatively, the first association relationship is indicated based on at least one second bitmap. Any one of the at least one second bitmap is used to indicate an association relationship between one synchronization signal block index or one group of synchronization signal block indexes and at least one piece of frequency information. Each bit in the any second bitmap is used to indicate whether the at least one piece of frequency information is associated with the one synchronization signal block index or the group of synchronization signal block indexes.

Alternatively, the first association relationship is indicated based on at least one third bitmap. Any one of the at least one third bitmap is used to indicate an association relationship between one piece of frequency information or one group of frequency information and at least one synchronization signal block index. Each bit in the any third bitmap is used to indicate whether the at least one synchronization signal block index is associated with the one piece of frequency information or the group of frequency information.

In some feasible implementations, the first association relationship is indicated based on a first list. The first list is used to indicate at least one piece of frequency information corresponding to one synchronization signal block index or one group of synchronization signal block indexes. Each unit in the first list correspondingly indicates one piece of frequency information or one group of frequency information.

In some feasible implementations, the first association relationship is indicated based on frequency priority information. The first message includes at least one piece of frequency priority information, and the frequency priority information is used to indicate a priority of the at least one piece of frequency information corresponding to at least one synchronization signal block. The at least one piece of frequency priority information herein includes first frequency priority information, and the first frequency priority information is used to indicate a priority of the first frequency information corresponding to the first synchronization signal block.

In some feasible implementations, the third association relationship is indicated based on a fourth bitmap. The fourth bitmap is used to indicate the association relationship between the at least one piece of measurement information and the at least one synchronization signal block index. Each bit in the fourth bitmap is used to indicate whether the at least one piece of measurement information is associated with the at least one synchronization signal block index.

Alternatively, the third association relationship is indicated based on at least one fifth bitmap. Any one of the at least one fifth bitmap is used to indicate an association relationship between one piece of measurement information or one group of measurement information and at least one synchronization signal block index. Each bit in the any fifth bitmap is used to indicate whether the one piece of measurement information or the group of measurement information is associated with the at least one synchronization signal block index.

In some feasible implementations, the third association relationship is indicated based on a third list. The third list is used to indicate at least one piece of measurement information corresponding to one synchronization signal block index or one group of synchronization signal block indexes. Each unit in the third list correspondingly indicates one piece of measurement information or one group of measurement information.

In some feasible implementations, the second association relationship is indicated based on a sixth bitmap. The sixth bitmap is used to indicate the association relationship between the at least one piece of cell information and the at least one synchronization signal block index. Each bit in the sixth bitmap is used to indicate whether the at least one piece of cell information is associated with the at least one synchronization signal block index. Alternatively, the second association relationship is indicated based on at least one seventh bitmap. Any one of the at least one seventh bitmap is used to indicate an association relationship between one synchronization signal block index or one group of synchronization signal block indexes and at least one piece of cell information. Each bit in the any seventh bitmap is used to indicate whether the at least one piece of cell information is associated with the one synchronization signal block index or the group of synchronization signal block indexes.

Alternatively, the second association relationship is indicated based on at least one eighth bitmap. Any one of the at least one eighth bitmap is used to indicate an association relationship between one piece of cell information or one group of cell information and at least one synchronization signal block index. Each bit in the any eighth bitmap is used to indicate whether the at least one synchronization signal block index is associated with the one piece of cell information or the group of cell information.

In some feasible implementations, the second association relationship is indicated based on a second list. The second list is used to indicate at least one piece of cell information corresponding to one synchronization signal block index or one group of synchronization signal block indexes. Each unit in the second list correspondingly indicates one piece of cell information or one group of cell information.

In some feasible implementations, the second association relationship may alternatively be indicated based on cell priority information. The cell priority information herein is used to indicate a priority of the at least one piece of cell information corresponding to the at least one synchronization signal block. The at least one cell priority indication includes first cell priority information, and the first cell priority information is used to indicate a priority of the first cell information corresponding to the first synchronization signal block.

In some feasible implementations, the first frequency information is used by the first device to perform inter-frequency measurement when the first device performs cell reselection.

In some feasible implementations, the first measurement information is used to indicate a time of measuring a synchronization signal block in one or more neighboring cells when the first device performs cell reselection.

In some feasible implementations, the first cell information is used by the first device to perform intra-frequency neighboring cell measurement or inter-frequency neighboring cell measurement when the first device performs cell reselection.

In some feasible implementations, the frequency information includes at least an absolute radio frequency channel number or a frequency band number.

In some feasible implementations, the measurement information includes at least one piece of synchronization signal block received signal strength indicator measurement information or at least one piece of information about a synchronization signal block that needs to be measured.

In some feasible implementations, the cell information includes at least a cell identifier or a cell-level offset parameter used for cell selection or reselection.

In a specific implementation, the first message determining unit 90 is configured to perform the process of determining the first message described in step S101 in the method embodiment shown in FIG. 3, or may be configured to perform the process of determining the first message and the third message described in step S201 or step S202 in the method embodiment shown in FIG. 4, or may be configured to perform the process of determining the first message described in step S301 in the method embodiment shown in FIG. 5, or may be configured to perform the process of determining the first message and the third message described in step S401 or step S402 in the embodiment shown in FIG. 6. Details are not described herein again. The first sending unit 91 is configured to perform the process of sending the first message described in step S101 in the method embodiment shown in FIG. 3, or may be configured to perform the process of sending the first message and the third message described in step S201 or step S202 in the embodiment shown in FIG. 4, or may be configured to perform the process of sending the first message described in step S301 in the method embodiment shown in FIG. 5, or may be configured to perform the process of sending the first message and the third message described in step S401 or step S402 in the method embodiment shown in FIG. 6. Details are not described herein again.

Figure 10:
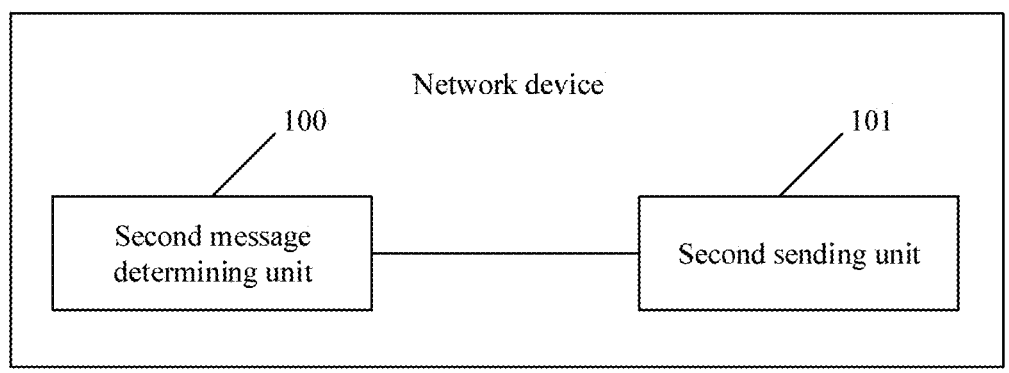
FIG. 10 is another schematic structural diagram of a terminal device according to an embodiment of this application.

FIG. 10 is another schematic structural diagram of a network device according to an embodiment of this application. The network device includes:

- a second message determining unit 100, configured to determine a fourth message, where the fourth message is used to determine at least one of second frequency information, second cell information, and second measurement information, and a resource sending location of the fourth message may be determined by a first synchronization signal block, where the second message determining unit 100 is further configured to determine a fifth message, where the fifth message is used to determine at least one of third frequency information, third cell information, and third measurement information, and a resource sending location of the fifth message is determined by a second synchronization signal block, where herein, the second frequency information is different from the third frequency information, or the second cell information is different from the third cell information, or the second measurement information is different from the third measurement information; and the second sending unit is configured to send the fourth message and the fifth message; and
- a second sending unit 101, configured to send the fourth message and the fifth message determined by the second message determining unit 100.

In some feasible implementations, the second frequency information includes at least one piece of frequency information, and the third frequency information includes at least one piece of frequency information. The at least one piece of frequency information included in the second frequency information is different from the at least one piece of frequency information included in the third frequency information. Alternatively, an arrangement rank of the at least one piece of frequency information included in the second frequency information is different from an arrangement rank of the at least one piece of frequency information included in the third frequency information.

In some feasible implementations, in the at least one piece of frequency information included in the second frequency information and the at least one piece of frequency information included in the third frequency information, frequency information with a higher rank has a higher priority. A priority of the frequency information is used by a first device to perform frequency selection when the first device performs cell measurement, and the first device is a device that receives the fourth message or the fifth message sent by the second device.

In some feasible implementations, the frequency information includes at least an absolute radio frequency channel number or a frequency band number.

In some feasible implementations, the second cell information includes at least one piece of cell information, and the third cell information includes at least one piece of cell information. The at least one piece of cell information included in the second cell information is different from the at least one piece of cell information included in the third cell information. Alternatively, an arrangement rank of the at least one piece of cell information included in the second cell information is different from an arrangement rank of the at least one piece of cell information included in the third cell information.

In some feasible implementations, in the at least one piece of cell information included in the second cell information and the at least one piece of cell information included in the third cell information, cell information with a higher rank has a higher priority. A priority of the cell information is used by the first device to perform cell selection when the first device performs cell measurement, and the first device is the device that receives the fourth message or the fifth message sent by the second device.

In some feasible implementations, the second measurement information includes at least one piece of measurement information, and the third measurement information includes at least one piece of measurement information. The at least one piece of measurement information included in the second measurement information is different from the at least one piece of measurement information included in the third measurement information.

In some feasible implementations, the cell information is a cell identifier or a cell-level offset parameter used for cell selection or reselection.

In some feasible implementations, the cell information includes intra-frequency neighboring cell information or inter-frequency neighboring cell information.

In some feasible implementations, the measurement information includes at least synchronization signal block-based measurement timing configuration information, synchronization signal block received signal strength indicator measurement information, or a synchronization signal block that needs to be measured.

In a specific implementation, the second message determining unit 100 may be configured to perform the process of determining the fourth message or the fifth message described in step S501 or step S502 in the method embodiment shown in FIG. 7. Details are not described herein again. The second sending unit 101 is configured to perform the process of sending the fourth message or the fifth message described in step S501 or step S502 in the method embodiment shown in FIG. 7. Details are not described herein again.

Figure 11:
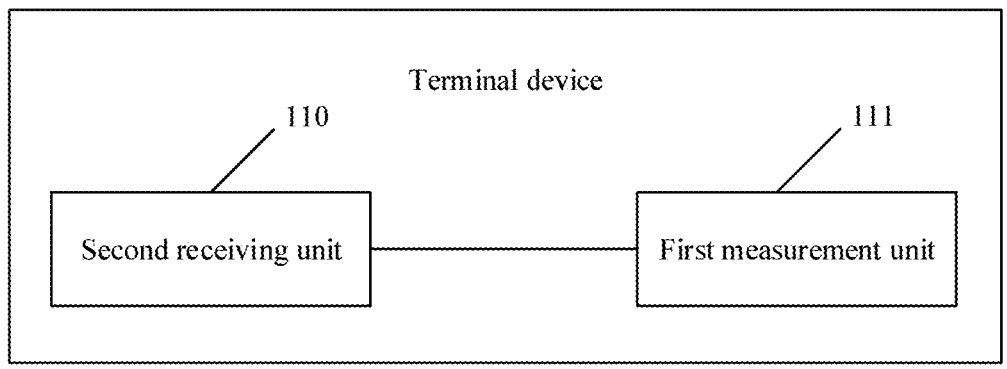
FIG. 11 is another schematic structural diagram of a network device according to an embodiment of this application.

FIG. 11 is another schematic structural diagram of a terminal device according to an embodiment of this application. The terminal device includes:

- a second receiving unit 110, configured to receive a fourth message sent by a second device, where a resource receiving location of the fourth message is determined by a first synchronization signal block, and the fourth message includes at least one of the following: second frequency information, second cell information, and second measurement information; and
- a first measurement unit 111, configured to perform measurement based on a frequency or a cell or a cell measurement time indicated by at least one of the second frequency information, the second cell information, and the second measurement information included in the fourth message received by the second receiving unit 110.

In some feasible implementations, the second frequency information includes or indicates a frequency list, and the frequency list includes at least one piece of frequency information. The first measurement unit 111 may preferably select frequency information with a higher rank in the frequency list to perform a frequency search.

In some feasible implementations, the second cell information includes or indicates a cell list, and the cell list includes at least one cell identifier. The first measurement unit 111 may preferably select a cell corresponding to a cell identifier with a higher rank in the cell list to perform cell measurement.

Figure 12:
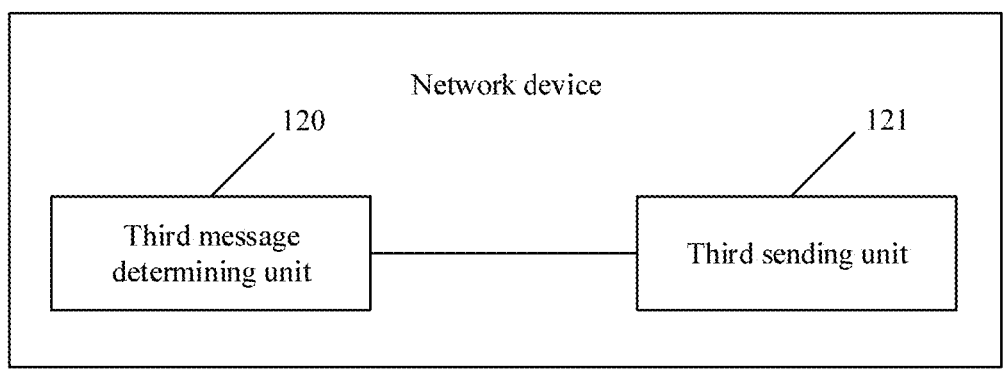
FIG. 12 is another schematic structural diagram of a network device according to an embodiment of this application.

In a specific implementation, the second receiving unit 110 is configured to perform the process of receiving the fourth message described in step S503 in the method embodiment shown in FIG. 7. The first measurement unit 111 is configured to describe the processes of determining at least one of the second frequency information, the second cell information, and the second measurement information based on the fourth message described in step S503 in the method embodiment shown in FIG. 7, and performing cell measurement based on at least one of the second frequency information, the second cell information, and the second measurement information FIG. 12 is another schematic structural diagram of a network device according to an embodiment of this application. The network device includes:
- a third message determining unit 120, configured to determine a second message, where the second message includes a first synchronization signal block, where the first device determines a first synchronization signal block index based on the first synchronization signal block, where the at least one synchronization signal block index includes the first synchronization signal block index; and
- a third sending unit 121, configured to send the second message determined by the third message determining unit 120, where the second message herein may be used by the first device to determine at least one of first frequency information, first cell information, and first measurement information with reference to a first message.

In a specific implementation, the third message determining unit 120 is configured to perform the process of determining the second message described in step S302 in the method embodiment shown in FIG. 5 or step S402 in the method embodiment shown in FIG. 6. The third sending unit 121 is configured to perform the process of sending the second message described in step S302 in the method embodiment shown in FIG. 5 or step S403 in the method embodiment shown in FIG. 6.

Figure 13:
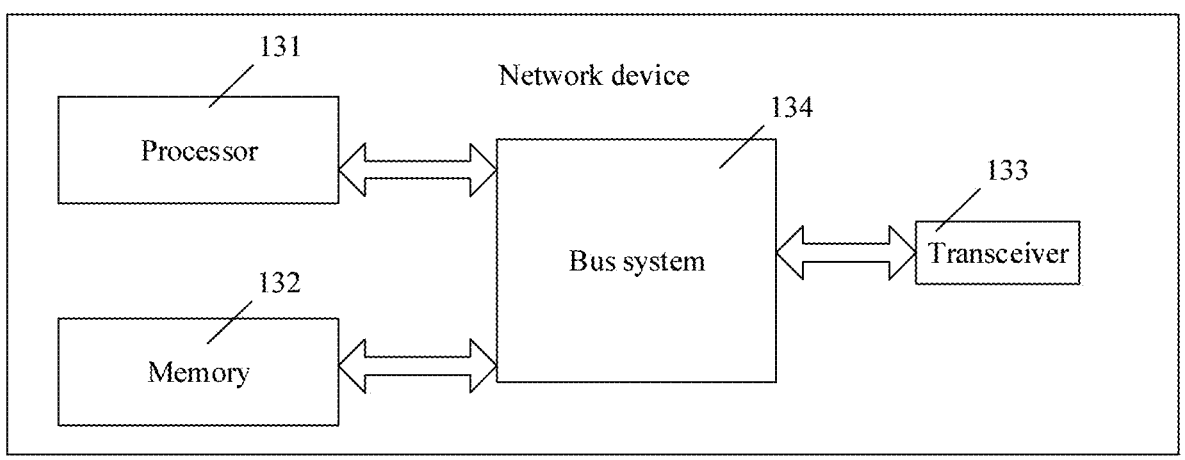
FIG. 13 is another schematic structural diagram of a network device according to an embodiment of this application.

FIG. 13 is another schematic structural diagram of a network device according to an embodiment of this application. The network device includes:
- a processor 131, a memory 132, and a transceiver 133. Optionally, the processor 131, the memory 132, and the transceiver 133 may be connected by using a bus system 134.

The memory 132 includes but is not limited to a RAM, a ROM, an EPROM, or a CD-ROM. The memory 132 is configured to store a related instruction and data. The memory 132 stores the following elements: an executable module or a data structure, a subset thereof, or an extended set thereof:
- an operation instruction: including various operation instructions, used to implement various operations; and
- an operating system: including various system programs, used to implement various basic services and process a hardware-based task.

The transceiver 133 may be a communications module or a transceiver circuit, and is configured to transmit information such as data or signaling between the network device and a terminal device.

In this embodiment of this application, the transceiver 133 is configured to perform the step of sending the first message, the second message, the third message, the fourth message, or the fifth message by the network device in the method embodiments shown in FIG. 3 to FIG. 7.

The processor 131 may be a controller, a CPU, a general purpose processor, a DSP, an ASIC, an FPGA, or another programmable logic device, a transistor logic device, a hardware component, or any combination thereof. The processor 131 may implement or execute various example logical blocks, modules, and circuits described with reference to content disclosed in the embodiments of this application. Alternatively, the processor 131 may be a combination of processors implementing a computing function, for example, a combination of one or more microprocessors, or a combination of a DSP and a microprocessor.

In this embodiment of this application, the processor 131 is configured to perform the step of determining the first message, the second message, the third message, the fourth message, or the fifth message by the network device in the method embodiments shown in FIG. 3 to FIG. 7.

Figure 14:
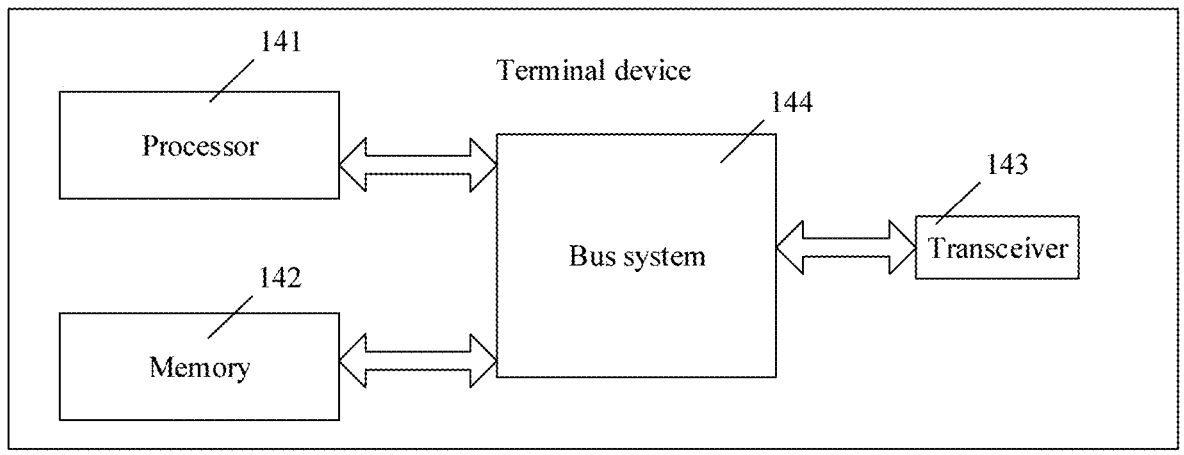
FIG. 14 is another schematic structural diagram of a terminal device according to an embodiment of this application.

FIG. 14 is another schematic structural diagram of a terminal device according to an embodiment of this application. The terminal device includes:
- a processor 141, a memory 142, and a transceiver 143, where optionally, the processor 141, the memory 142, and the transceiver 143 may be connected by using a bus system 144.

The memory 141 includes but is not limited to a RAM, a ROM, an EPROM, or a CD-ROM. The memory 141 is configured to store a related instruction and data. The memory 141 stores the following elements: an executable module or a data structure, a subset thereof, or an extended set thereof:
- an operation instruction: including various operation instructions, used to implement various operations; and
- an operating system: including various system programs, used to implement various basic services and process a hardware-based task.

The transceiver 143 may be a communications module or a transceiver circuit, and is configured to transmit information such as data or signaling between a network device and the terminal device. In this embodiment of this application, the transceiver 143 is configured to perform the step of receiving the first message, the second message, the third message, the fourth message, or the fifth message by the terminal device in the method embodiments shown in FIG. 3 to FIG. 7.

The processor 141 may be a controller, a CPU, a general purpose processor, a DSP, an ASIC, an FPGA, or another programmable logic device, a transistor logic device, a hardware component, or any combination thereof. The processor 141 may implement or execute various example logical blocks, modules, and circuits described with reference to content disclosed in the embodiments of this application. Alternatively, the processor 141 may be a combination of processors implementing a computing function, for example, a combination of one or more microprocessors, or a combination of a DSP and a microprocessor. In this embodiment of this application, the processor 141 is configured to perform the step of determining at least one of the first frequency information, the first cell information, and the first measurement information by the terminal device based on any one of the first message, the second message, and the third message in the method embodiments shown in FIG. 3 to FIG. 6, or may be configured to perform the process of determining at least one of the second frequency information, the second cell information, and the second measurement information by the terminal device based on the fourth message or determining at least one of the third frequency information, the third cell information, and the third measurement information by the terminal device based on the fifth message in the method embodiment shown in FIG. 7.

The foregoing describes the technical solutions that may be applied when the terminal device is in the idle mode. The following describes technical solutions that may be applied when the terminal device is in the connected mode.

2. The terminal device is in the connected mode. Certainly, in the following description process, some described technical features is also applicable to the terminal device in the idle mode.

The foregoing describes some concepts in the embodiments of this application. The following describes technical features in the embodiments of this application.

In a current system, to manage mobility of the terminal device in the connected mode, that is, to determine a cell that needs to be selected by the terminal device to continue to serve the terminal device when the terminal device moves, a base station configures corresponding measurement information for the terminal device, and the terminal device performs measurement based on the measurement information and reports a measurement result. The base station determines, based on the measurement result reported by the terminal device, to hand over the terminal device to a corresponding target cell.

For example, in the 5th generation (the $5^{th}$ generation, 5G) mobile communications technology new radio (new radio, NR) system, the base station configures measurement information for the terminal device, for example, configures a measurement object (measurement object, MO) and report configuration (reportConfig) information. One MO may include one or more pieces of frequency information, where one piece of frequency information corresponds to one reference signal, and one piece of report configuration information may indicate a measurement manner, a reporting condition, and the like of a cell (cell) on a frequency corresponding to one reference signal. The frequency information included in the MO may include adjacent-frequency information, or may include information about a frequency that is the same as that of a current serving cell of the terminal device. An adjacent frequency may also be referred to as an adjacent frequency, and is a frequency of a cell adjacent to the current serving cell of the terminal device. The base station may associate one measurement object with one piece of report configuration information by configuring a measurement identifier (measID). When performing measurement, the terminal device may determine, based on measID configured by the base station, a cell that is on a frequency corresponding to a reference signal in a specific MO and that needs to be measured, and reports, based on measID configured by the base station, a measurement result of the cell when a corresponding reporting condition is met. That the terminal device measures the cell may be measuring a reference signal sent in the cell. For example, measID is used to be associated with an MO 1 and report configuration information 1. The MO 1 includes two pieces of frequency information, one piece of frequency information corresponds to a synchronization signal block (synchronization signal block, SSB), and the other piece of frequency information corresponds to a channel state information reference signal (channel state information reference signal, CSI-RS). The report configuration information 1 is used to indicate cells on a frequency on which the SSB is located that need to be measured, and indicate a reporting condition of a measurement result of the cells. In this case, the terminal device may determine, based on the MO 1 and the report configuration information 1 that are associated with measID, the cells on the frequency on which the SSB is located that need to be measured. Specifically, the terminal device may measure SSBs sent in these cells, and reports the measurement result of these cells to the base station when the reporting condition indicated by the report configuration information 1 is met.

In an example of the SSB, if the terminal device needs to measure the cells on the frequency on which the SSB in the MO is located, the terminal device may find a plurality of cells, and the base station may provide corresponding offsets for some of the cells. For example, if the terminal device measures a cell 1, an obtained measurement value is a first value, and the base station sets an offset for the cell, the terminal device adds the first value and the offset. If a result obtained after the adding is greater than a reporting threshold, after a period of time in which the result is greater than the reporting threshold, the terminal device may report a measurement result of the cell 1 to the base station, that is, report the first value.

For the terminal device in the connected mode, the base station may serve the terminal device by using a beam (beam). Different beams may have a same direction as beams represented by different reference signal indexes (index). For example, the different beams may have a same direction as a beam represented by an SSB index, or may have a same direction as beams represented by different CSI-RS indexes.

Figure 15:
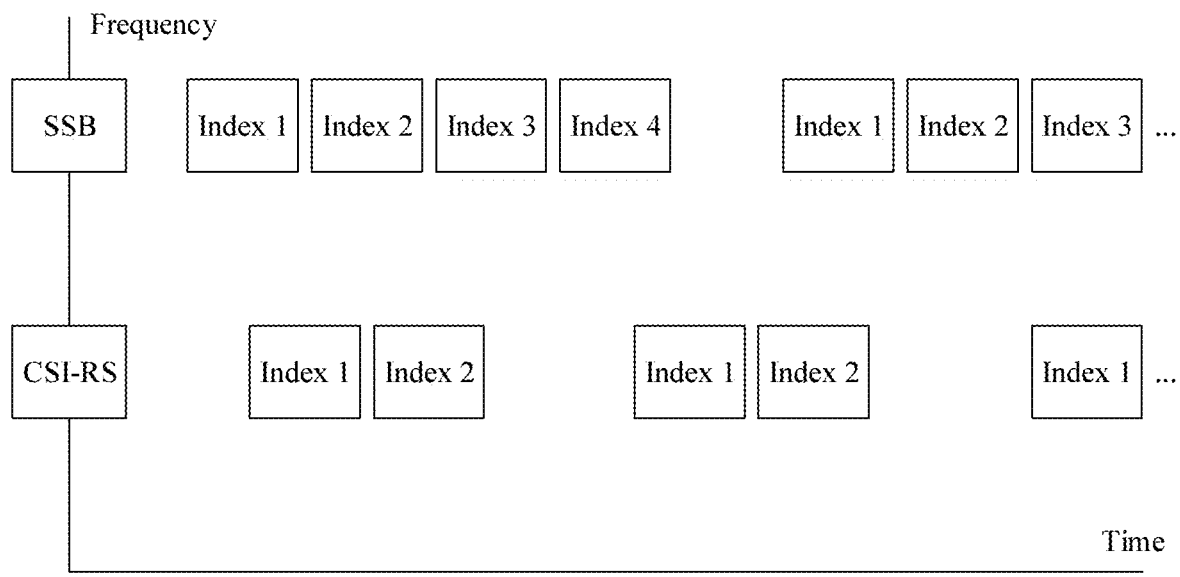
FIG. 15 is a schematic diagram of sending a reference signal by a base station.

Referring to FIG. 15, the base station may send reference signals, and cyclically send the reference signals (an SSB and a CSI-RS) by using beams in different directions at different times at a same frequency location. The terminal device may measure at least one beam sent by the base station, and report a measurement result to the base station, for example, the terminal device may report, to the base station, a best measurement result that is of an SSB index 2 and that is obtained during measurement of the SSB. The base station may choose, based on the measurement result reported by the terminal device, to send downlink data to the terminal device in a direction of a beam whose measurement result of the terminal device is relatively good. For example, the base station may choose to send the downlink data to the terminal device in a direction of a beam in which the SSB index 2 is located.

Figure 16:
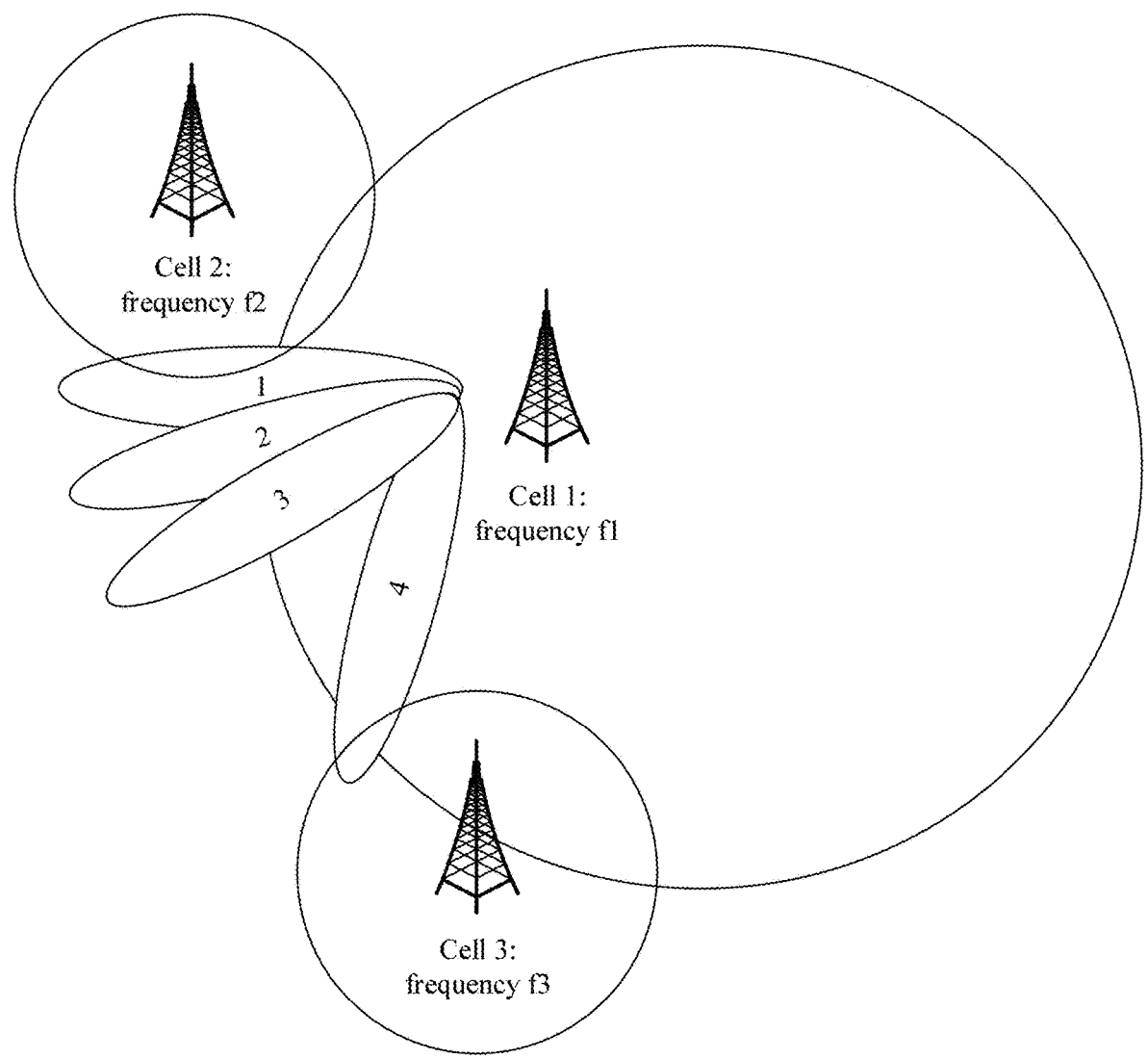
FIG. 16 is a schematic diagram in which MOs found by a terminal device at different locations may be different.

A terminal device may find different MOs at different locations, or even if the terminal device can find a same MO at different locations, cells of the found MO may be different. For example, when the terminal device moves between different beams, MOs that may be found may be different. Referring to FIG. 16, a terminal device that is in a cell 1 and that is covered by a beam 1 can find an MO whose frequency is f2 but cannot find an MO whose frequency is f3. The terminal device that is in the cell 1 and that is covered by a beam 4 can find an MO whose frequency is f3 but cannot find an MO whose frequency is f2.

Currently, the base station may learn of a beam in which the terminal device receives a service. Therefore, the base station may configure, for the terminal device, measurement information corresponding to the beam, so that the terminal device can perform measurement. For example, the measurement information is MO information. However, when the terminal device moves between different beams, the base station needs to frequently deliver MO information to the terminal device, and therefore signaling overheads are relatively high. In addition, for example, if the terminal device is initially in the beam 1, the base station delivers, to the terminal device, MO information corresponding to the beam 1. Then, if the terminal device moves to a beam 2, the base station delivers, to the terminal device, MO information corresponding to the beam 2, and if the terminal device moves back to the beam 1 again, the base station re-delivers, to the terminal device, the MO information corresponding to the beam 1. Consequently, transmission resources are wasted due to this repeated delivery.

Alternatively, the base station may configure, for the terminal device, all measurement information corresponding to a serving cell of the terminal device, or configure, for the terminal device, all measurement information corresponding to all beams of a serving cell of the terminal device. For example, the measurement information is MO information. In this case, the terminal device needs to measure all MOs regardless of which beam the terminal device is in. However, in some conditions, the terminal device may not completely find all the MOs provided by the network device. Therefore, if the terminal device performs searching and measurement based on the MO provided by the network device, the terminal device may ineffectively search for and measure some MOs that cannot be found by the terminal device. Consequently, power consumption of the terminal device is relatively high, and measurement efficiency is relatively low.

In view of this, the technical solutions in the embodiments of this application are provided. In this embodiment of this application, the network device may send the first relationship to the terminal device, where the first relationship is used to indicate the association relationship between the index of the reference signal and the measurement configuration information, and the terminal device may determine the index of the reference signal corresponding to the terminal device, so that the terminal device can determine, from the first relationship based on the index of the reference signal corresponding to the terminal device, the first measurement configuration information corresponding to the terminal device, and the terminal device performs measurement based on the first measurement configuration information. Based on the first relationship, the network device does not need to frequently send the measurement configuration information to the terminal device when the terminal device moves. If the terminal device moves, the terminal device determines, from the first relationship based on an index of a corresponding reference signal obtained after the movement, the measurement configuration information corresponding to the terminal device, and the terminal device does not need to perform measurement each time based on measurement configuration information corresponding to an entire cell, but only needs to perform measurement based on the measurement configuration information corresponding to the terminal device. This can effectively reduce power consumption of the terminal device and improve measurement efficiency.

The technical solutions provided in the embodiments of this application may be applied to a 5G system, for example, an NR system, or may be applied to a next generation mobile communications system or another similar communications system. This is not specifically limited.

Figure 17:
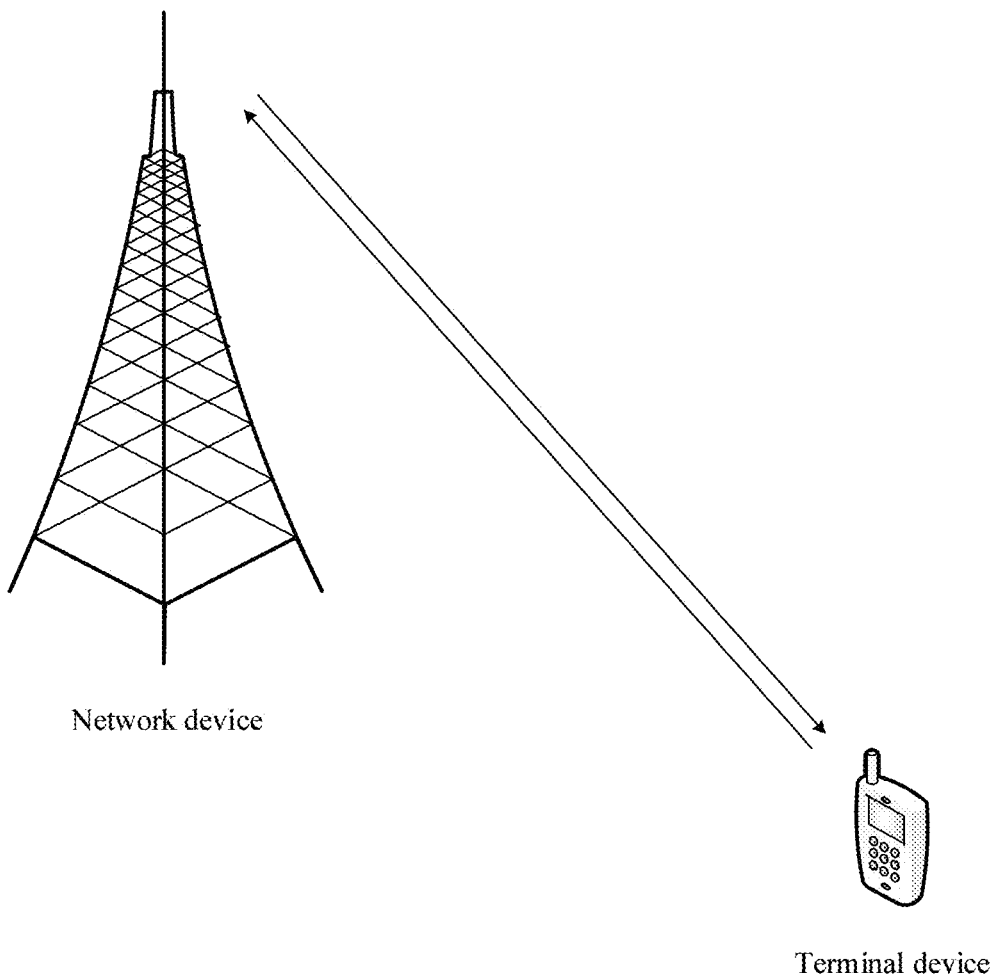
FIG. 17 is a schematic diagram of an application scenario according to an embodiment of this application.

FIG. 17 is a schematic diagram of an application scenario according to an embodiment of this application. FIG. 17 includes a network device and a terminal device. The terminal device is covered by the network device. Certainly, a quantity of terminal devices in FIG. 17 is merely an example. In actual application, the network device may provide services for a plurality of terminal devices.

For example, the network device in FIG. 17 is an access network device, for example, a base station, or may be an RSU. The base station is used as an example in FIG. 17. The access network device corresponds to different devices in different systems. An NR system is used as an example in FIG. 17. Therefore, the access network device may correspond to an access network device in NR, for example, a gNB.

An example in which the terminal device in FIG. 17 is a smartphone is used. However, the terminal device in this embodiment of this application is not limited thereto.

The following describes the technical solutions in the embodiments of this application with reference to the accompanying drawings.

Figure 18:
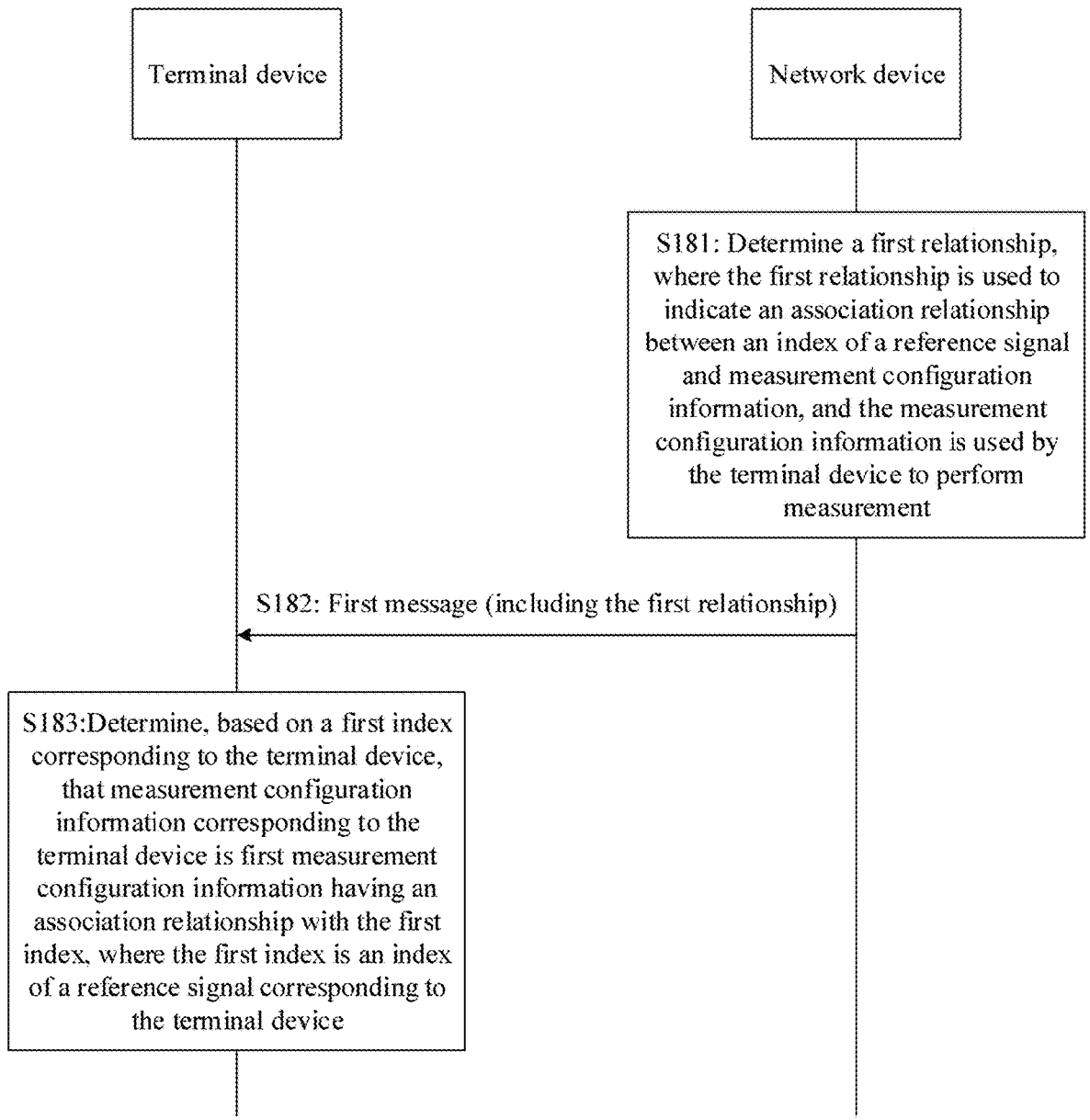
FIG. 18 is a flowchart of a measurement configuration determining method according to an embodiment of this application.

FIG. 18 is a flowchart of a first measurement configuration determining method according to an embodiment of this application. In the following description process, an example in which the method is applied to the network architecture shown in FIG. 17 is used. In addition, the method may be performed by two communications apparatuses. For example, the two communications apparatuses are a first communications apparatus and a second communications apparatus. The first communications apparatus may be a network device or a communications apparatus that can support a network device in implementing a function required for the method, or may be a terminal device or a communications apparatus that can support a terminal device in implementing a function required for the method. Certainly, the first communications apparatus may alternatively be another communications apparatus, for example, a chip system. Similarly, the second communications apparatus may be a network device or a communications apparatus that can support a network device in implementing a function required for the method, or may be a terminal device or a communications apparatus that can support a terminal device in implementing a function required for the method. Certainly, the second communications apparatus may alternatively be another communications apparatus, for example, a chip system. In addition, implementations of the first communications apparatus and the second communications apparatus are not limited. For example, the two communications apparatuses may be implemented in a same form, for example, the two communications apparatuses are implemented in a form of a device. Alternatively, the two communications apparatuses may be implemented in different forms, for example, the first communications apparatus is implemented in a form of a device, and the second communications apparatus is implemented in a manner of a chip system, or the like. For example, the network device is a base station.

For ease of description, the following uses an example in which the method is performed by a network device and a terminal device, that is, an example in which the first communications apparatus is the network device and the second communications apparatus is the terminal device. An example in which this embodiment is applied to the network architecture shown in FIG. 17 is used. Therefore, a network device described below may be the network device in the network architecture shown in FIG. 17, and a terminal device described below may be the terminal device in the network architecture shown in FIG. 17.

S181: The network device determines a first relationship, where the first relationship is used to indicate an association relationship between an index of a reference signal and measurement configuration information, and the measurement configuration information is used by the terminal device to perform measurement.

The network device may determine, based on a factor such as big data, drive test information, or information reported by a user, measurement configuration information that can be found within a beam coverage area represented by the index of the reference signal, to determine the first relationship. Alternatively, the network device may determine the first relationship based on measurement configuration information that corresponds to the first N cells or frequencies with best signals and that is obtained by measuring big data, drive test information, or information reported by a user. Alternatively, the network device may determine the first relationship based on measurement configuration information that corresponds to several cells or frequencies that are higher than a specified threshold and that is in big data, drive test information, or information reported by a user.

Figure 19:
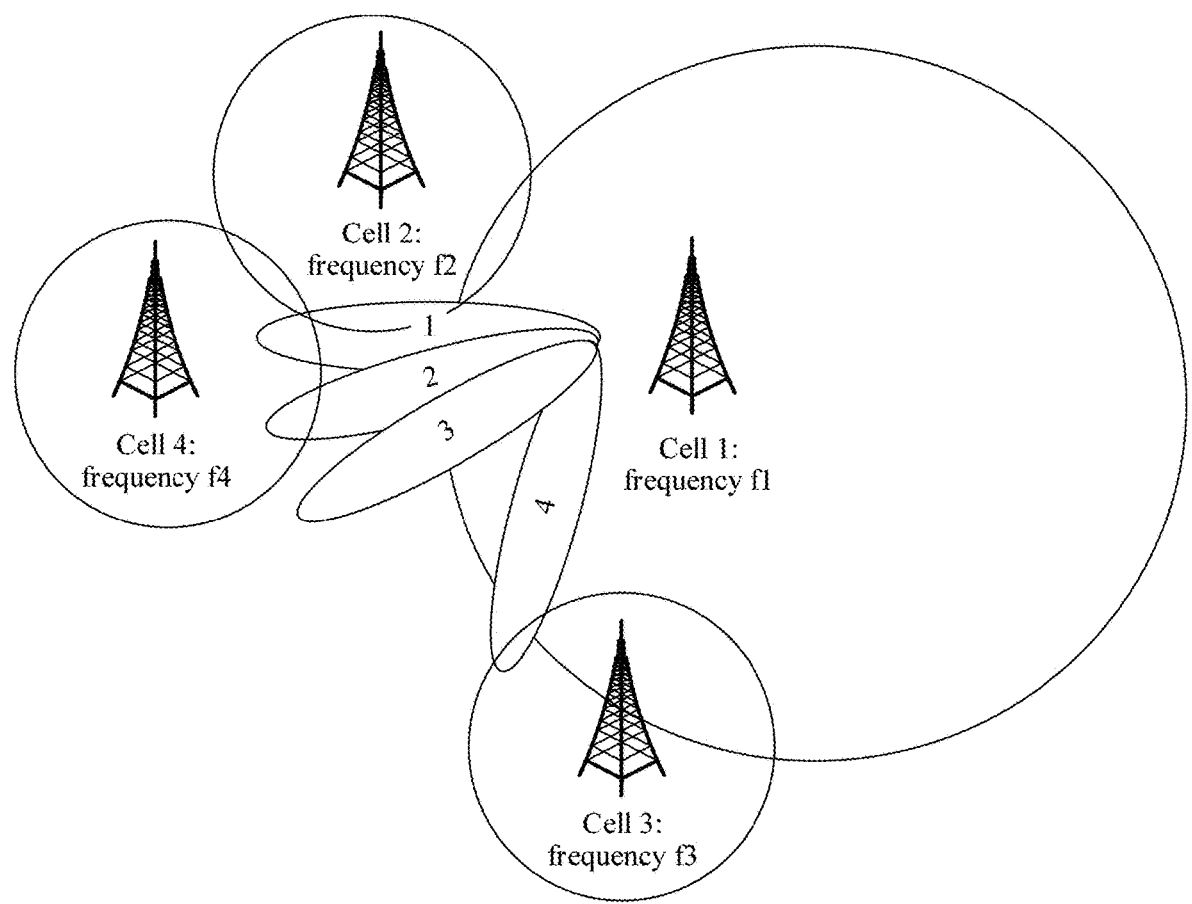
FIG. 19 is a schematic diagram of a manner of determining a first relationship by a network device according to an embodiment of this application.

For example, for details, refer to FIG. 19. A number in a beam in FIG. 19 represents an index of the beam, or may be considered as an index of a reference signal. When the terminal device corresponds to an index 1 of a reference signal in a serving cell (namely, a cell 1) of the terminal device, valid MOs are an MO 1 including a frequency f2 and an MO 2 including a frequency f4, and in this case, the network device may determine that the MO 1 and the MO 2 have an association relationship with the index 1. When the terminal device corresponds to an index 2 of a reference signal in a cell 1, a valid MO is an MO 2 including a frequency f4, and in this case, the network device may determine that the MO 2 has an association relationship with the index 2. When the terminal device corresponds to an index 3 of a reference signal in a cell 1, there is no valid MO. When the terminal device corresponds to an index 4 of a reference signal in a cell 1, a valid MO is an MO 3 including a frequency f3, and in this case, the network device may determine that the MO 3 has an association relationship with the index 4.

The first relationship may be specific to the terminal device, and different first relationships may be configured for different terminal devices. Alternatively, more properly, the first relationship may be specific to a cell, and one first relationship may be configured for one cell. In this case, all terminal devices in the cell may use the first relationship corresponding to the cell. An example in which the first relationship is specific to the cell is used in this specification. For example, the first relationship may include indexes of all reference signals corresponding to a first cell of the network device. For example, the reference signal includes an SSB and/or a CSI-RS. Specifically, the reference signal may include the SSB or the CSI-RS, or include the SSB and the CSI-RS. For example, the terminal device may be located in coverage areas of both the SSB and the CSI-RS, and the terminal device may jointly determine corresponding measurement configuration information based on a reference signal index of the SSB and a reference signal index of the CSI-RS.

In this embodiment of this application, the first relationship may include one or more indexes of reference signals. However, in the first relationship, the index of the reference signal is in a one-to-one correspondence with the measurement configuration information. It may be understood that one index corresponds to one piece of measurement configuration information. One piece of measurement configuration information may include one or any combination of the following: an MO; cell information of a frequency included in the MO, synchronization signal block-based measurement timing configuration (SS/PBCH block measurement timing configuration, SMTC) information of each of at least one piece of frequency information in one or more pieces of frequency information included in the MO; first indication information corresponding to the SMTC in the MO; measID; report configuration information; a quantity of to-be-measured cells; a quantity of to-be-measured frequencies; a measurement threshold; or a measurement gap (gap). For example, if one piece of measurement configuration information includes only the MO, the first relationship includes an association relationship between an index of a reference signal and the MO. Alternatively, if one piece of measurement configuration information includes only the MO and the cell information of the frequency included in the MO, the first relationship includes an association relationship between an index of a reference signal and a combination of the MO and the cell information of the frequency included in the MO. Alternatively, if one piece of measurement configuration information includes only measID and the report configuration information, the first relationship includes an association relationship between an index of a reference signal and a combination of measID and the report configuration information. Alternatively, if one measurement configuration includes only the MO and the quantity of to-be-measured cells, the first relationship includes an association relationship between an index of a reference signal and a combination of the MO and the quantity of cells that need to be measured. Alternatively, if one piece of measurement configuration information includes only the MO and the gap, the first relationship includes an association relationship between an index of a reference signal and a combination of the MO and the gap, or the like. Content included in one piece of measurement configuration information is not limited.

In the first relationship, measurement configuration information corresponding to different indexes may be the same or different. Provided that two pieces of measurement configuration information include different types of information, it indicates that the two pieces of measurement configuration information are different. For example, if one piece of measurement configuration information includes only the MO and the cell information of frequency included in the MO, and the other piece of measurement configuration information includes only the MO, the two pieces of measurement configuration information are different. Alternatively, if one piece of measurement configuration information includes only the MO and the cell information of the frequency included in the MO, and the other piece of measurement configuration information includes only the gap, the two pieces of measurement configuration information are different. Alternatively, if two pieces of measurement configuration information include a same type of information, but the two pieces of measurement configuration information include different content for the same type of information, it also indicates that the two pieces of measurement configuration information are different. For example, if the two pieces of measurement configuration information both include only the MO, but one piece of measurement configuration information includes only the MO 1 and the MO 2, and the other piece of measurement configuration information includes only the MO 2 and the MO 3, the two pieces of measurement configuration information are different. Alternatively, if the two pieces of measurement configuration information both include only the MO, but one piece of measurement configuration information includes only the MO 2, and the other piece of measurement configuration information includes only the MO 2 and the MO 3, the two pieces of measurement configuration information are different. It may be understood that if two pieces of measurement configuration information include a same type of information, and the two pieces of measurement configuration information also include same content for the same type of information, it indicates that the two pieces of measurement configuration information are the same.

One MO may include one or more pieces of frequency information, and one piece of frequency information may correspond to one reference signal. For example, one MO may include one piece of frequency information. The frequency information corresponds to an SSB, and the frequency information is frequency information of the SSB. Alternatively, one MO may include two pieces of frequency information. One piece of frequency information corresponds to an SSB, and the frequency information is frequency information of the SSB. The other piece of frequency information corresponds to a CSI-RS, and the frequency information is frequency information of the CSI-RS. Alternatively, one MO may include three pieces of frequency information. A first piece of frequency information corresponds to an SSB, and the frequency information is frequency information of the SSB. A second piece of frequency information corresponds to a first CSI-RS, and the frequency information is frequency information of the first CSI-RS. A second frequency information corresponds to a second CSI-RS, and the frequency information is frequency information of the second CSI-RS.

Each piece of frequency information included in one MO may also correspond to one or more pieces of cell information. Therefore, the measurement configuration information may further include cell information corresponding to each of at least one piece of frequency information included in the MO. For example, if one piece of measurement configuration information includes an MO 1, and the MO 1 includes a frequency 1 and a frequency 2, the measurement configuration information may further include information about a cell 1 on the frequency 1, information about a cell 2 on the frequency 1, and information about a cell 3 on the frequency 2. Alternatively, if one piece of measurement configuration information includes an MO 1, and the MO 1 includes a frequency 1 and a frequency 2, the measurement configuration information may further include information about a cell 1 on the frequency 1 and information about a cell 2 on the frequency 1. If the measurement configuration information includes the cell information corresponding to each of the at least one piece of frequency information included in the MO, the terminal device may not need to measure a cell corresponding to cell information that is not included in the measurement configuration information, so that a measurement workload of the terminal device can be reduced. For example, if one piece of measurement configuration information includes an MO 1, and the MO 1 includes a frequency 1 and a frequency 2, the measurement configuration information further includes information about a cell 1 on the frequency 1 and information about a cell 2 on the frequency 1, and if there is a cell 4 on the frequency 1, but information about the cell 4 is not included in the measurement configuration information, the terminal device may not need to measure the cell 4. Certainly, the measurement configuration information may not include the cell information corresponding to the frequency information included in the MO. In this case, the terminal device may need to measure all cell information corresponding to each piece of the frequency information included in the MO.

One piece of measurement configuration information may further include the quantity of to-be-measured cells, where the to-be-measured cell may also be understood as a cell that needs to be measured. For example, if the quantity of to-be-measured cells that is included in the measurement configuration information corresponding to the terminal device is P, the terminal device needs to measure only P cells, and does not need to measure more cells. In this manner, the quantity of cells that needs to be measured by the terminal device can be greatly reduced, power consumption of the terminal device can be reduced, and measurement efficiency can be improved. P is a positive integer. The terminal device may select the P cells in different manners. For example, the terminal device may randomly select P cells for measurement, or the terminal device may select P cells with best channel quality for measurement. A manner of selecting the P cells by the terminal device is not limited in this embodiment of this application.

One piece of measurement configuration information may further include the quantity of to-be-measured frequencies, where the to-be-measured frequency may also be understood as a frequency that needs to be measured. For example, if the quantity of to-be-measured frequencies that is included in the measurement configuration information corresponding to the terminal device is Q, the terminal device needs to measure only Q frequencies, and does not need to measure more frequencies. In this manner, the quantity of frequencies that needs to be measured by the terminal device can be greatly reduced, power consumption of the terminal device can be reduced, and measurement efficiency can be improved. Q is a positive integer. The terminal device may select the Q frequencies in different manners. For example, the terminal device may randomly select Q frequencies for measurement, or the terminal device may select Q corresponding frequencies with best channel quality for measurement. A manner of selecting the Q frequencies by the terminal device is not limited in this embodiment of this application.

One piece of measurement configuration information may further include the measurement threshold, and the measurement threshold may be used to indicate the terminal device to measure a cell or a frequency whose value of a first parameter is greater than or equal to the measurement threshold. For example, that the measurement threshold corresponds to the first parameter of the cell (which may be understood as that the measurement threshold is used to indicate the terminal device to measure the cell whose value of the first parameter is greater than or equal to the measurement threshold) may be understood as that the measurement threshold is a value of the first parameter. In this case, when performing measurement based on the measurement configuration information, the terminal device may choose to measure the cell whose value of the first parameter is greater than or equal to the measurement threshold, and the terminal device may not measure a cell whose value of a first parameter is less than the measurement threshold, thereby reducing the quantity of cells that need to be measured by the terminal device, reducing power consumption of the terminal device, and improving measurement efficiency. Alternatively, for example, that the measurement threshold corresponds to the first parameter of the frequency (which may be understood as that the measurement threshold is used to indicate the terminal device to measure the frequency whose value of the first parameter is greater than or equal to the measurement threshold) may be understood as that the measurement threshold is a value of the first parameter. In this case, when performing measurement based on the measurement configuration information, the terminal device may choose to measure the frequency whose value of the first parameter is greater than or equal to the measurement threshold, and the terminal device may not measure a frequency whose value of a first parameter is less than the measurement threshold, thereby reducing the quantity of frequencies that need to be measured by the terminal device, reducing power consumption of the terminal device, and improving measurement efficiency.

The first parameter is, for example, a channel quality parameter, and the channel quality parameter includes, for example, at least one of reference signal received power (reference signal receiving power, RSRP), reference signal received quality (reference signal receiving quality, RSRQ), or a signal to interference plus noise ratio (signal to interference plus noise ratio, SINR), or the first parameter may be another type of parameter. This is not specifically limited. Certainly, when the first parameters are used as a parameter of the cell and a parameter of the frequency, the first parameters may be a same parameter, or may be different parameters.

One piece of measurement configuration information may further include the SMTC of each of the at least one piece of frequency information in the one or more pieces of frequency information included in the MO, where the SMTC of one piece of frequency information may be used to indicate a time window that corresponds to the frequency information and that is used for measurement, and the terminal device performs measurement only in the time window used for measurement. Different frequency information may correspond to different SMTCs, or may correspond to a same SMTC.

In addition, one piece of frequency information may correspond to one or more SMTCs, and each of the SMTCs indicates one type of configured time window. For example, the network device may configure one SMTC for one piece of frequency information, and the SMTC indicates one type of time window. For example, the SMTC may indicate at least one of a time domain location, a duration length, or a period of the time window. For example, the SMTC may indicate a time domain location and a duration length of the time window, or indicate a time domain location and a period of the time window (for example, may indicate a time domain location of a time window and a period of the time window), or indicate a duration length and a period of the time window, or indicate a time domain location, a duration length, and a period of the time window, or the like. Alternatively, the network device may configure a plurality of SMTCs for one piece of frequency information. Each of the plurality of SMTCs indicates one type of time window, and a plurality of types of time windows indicated by the plurality of SMTCs may be different. Two types of time windows are different, for example, at least one type of information such as time domain locations, duration lengths, or periods of the two types of time windows is different. For example, if the two types of time windows have different time domain locations, it may be considered that the two types of time windows are different; or if the two types of time windows have different duration lengths, it may be considered that the two types of time windows are different; or if the two types of time windows have different periods, it may be considered that the two types of time windows are different; or if the two types of time windows have different time domain locations and different duration lengths, it may be considered that the two types of time windows are different; or if the two types of time windows have different time domain locations and different periods, it may be considered that the two types of time windows are different; or if the two types of time windows have different duration lengths and different periods, it may be considered that the two types of time windows are different; or if the two types of time windows have different time domain locations, different duration lengths, and different periods, it may be considered that the two types of time windows are different. The time domain location of the time window may include a time domain start location and/or a time domain end location. In addition, one type of time window may include one or more time windows. Because a concept of a period is involved, there may be a plurality of same type of configured time windows. Therefore, description of "type" is used to distinguish between time windows corresponding to different SMTCs.

If the network device configures one SMTC for one piece of frequency information, the first relationship may indicate an association relationship between the SMTC and an index of a reference signal. Alternatively, if the network device configures a plurality of SMTCs for one piece of frequency information, an association relationship may be established between different SMTCs and a same index of reference signals, or an association relationship may be established between different SMTCs and different indexes of reference signals. In other words, the first relationship may indicate an association relationship between the plurality of SMTCs and at least one index of the reference signal, and a quantity of the at least one index is less than or equal to a quantity of the plurality of SMTCs.

If the terminal device determines that the measurement configuration information associated with the index of the reference signal corresponding to the terminal device includes a plurality of SMTCs corresponding to one piece of frequency information, and an association relationship is established between at least two of the plurality of SMTCs and a same index, the terminal device may select one SMTC from the at least two SMTCs, and perform measurement based on the selected SMTC. For example, the terminal device may select a relatively energy-saving SMTC from the at least two SMTCs for measurement. For example, the terminal device may select an SMTC with a relatively long period from the at least two SMTCs, or may select an SMTC with relatively short duration from the at least two SMTCs. A duration length of a time window indicated by an SMTC determined based on a possible target cell is not greater than a duration length of a time window indicated by an SMTC determined based on all neighboring cells, or a period of a time window indicated by an SMTC determined based on a possible target cell is not less than a period of a time window indicated by an SMTC determined based on all neighboring cells. Therefore, the terminal device saves more energy when performing measurement based on an SMTC selected based on an index of a corresponding reference signal.

Alternatively, if the terminal device determines that each piece of the frequency information included in the measurement configuration information associated with the index of the reference signal corresponding to the terminal device corresponds to only one SMTC, or only one of SMTCs corresponding to each piece of frequency information is associated with the index of the reference signal corresponding to the terminal device, the terminal device directly performs measurement based on the corresponding SMTC.

Alternatively, if SMTCs corresponding to all frequency information included in one piece of measurement configuration information are the same, one piece of measurement configuration information needs to include only one SMTC. This helps reduce an amount of information in the measurement configuration information.

Figure 20:
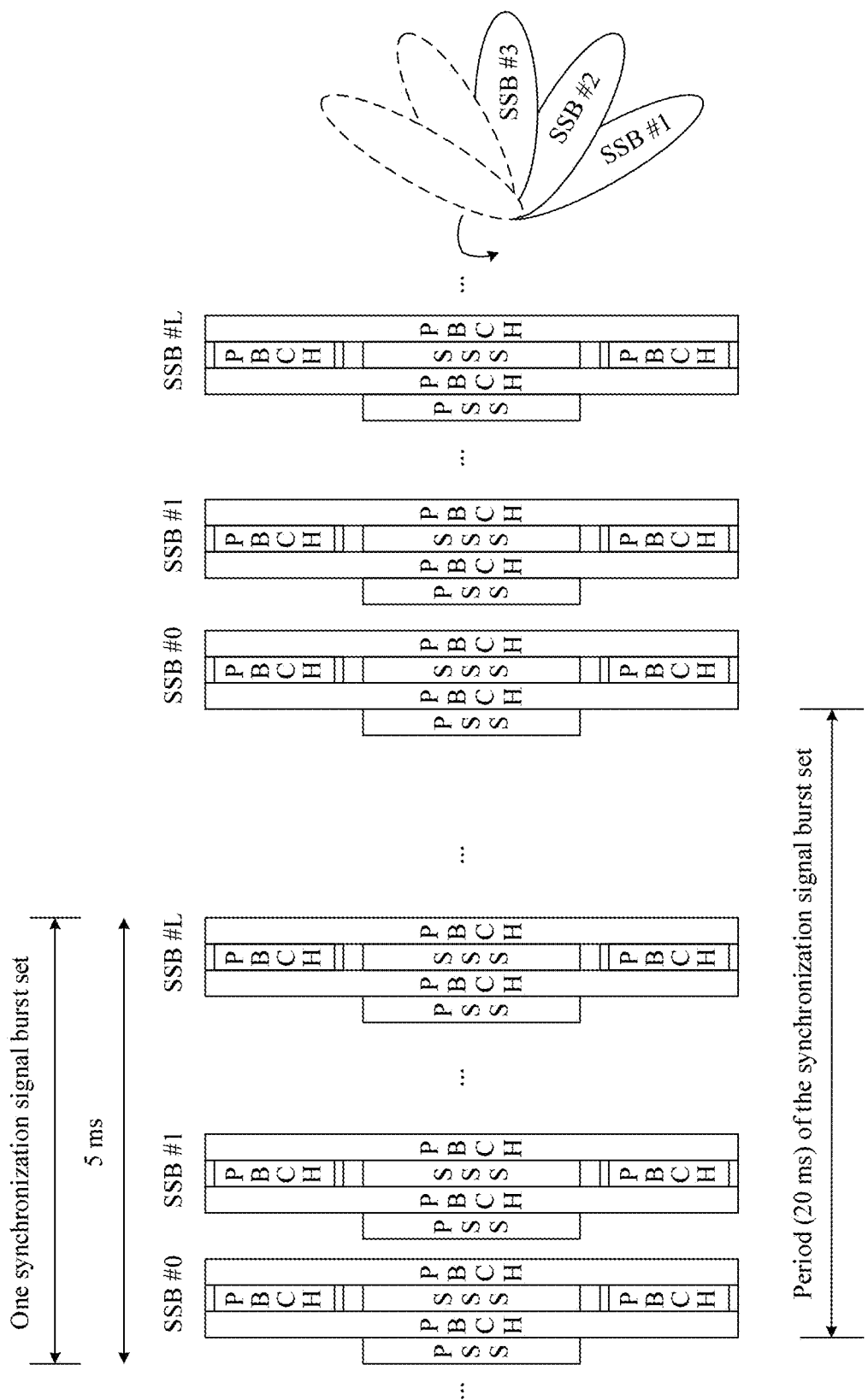
FIG. 20 is a schematic diagram of an SS burst set according to an embodiment of this application.

For example, one SMTC may be used to indicate a time window that corresponds to an SSB in one MO and that is used for measurement, including a measurement time length, a measurement period, and a measurement offset. For example, one synchronization burst set (synchronization signal burst set, SS burst set) is a set of SSBs included in one beam sweep (beam sweep). A period of the SS burst set is a period of an SSB corresponding to a specific beam, and may be configured as 5 ms (millisecond), 10 ms, 20 ms, 40 ms, 80 ms, 160 ms, or the like, where 20 ms is a default period, namely, a period assumed when the terminal device initially searches for a cell. Currently, there are a maximum of $L_{max}$ SSBs in one SS burst set period, where $L_{max}$=4, 8, or 64. When a carrier frequency is less than or equal to 3 GHz, $L_{max}$=4. To be specific, there are a maximum of four SSBs in one SS burst set period, and a maximum of four beam sweeps can be supported. Each SS burst set is always located in a time length of 5 ms, which is a first half part or a second half part of a frame (frame) of 10 ms. One SMTC may indicate a time length of one SS burst set corresponding to one MO, and the time length may be referred to as a time window. For example, a length of the time window is 5 ms. In addition, one SMTC may not only indicate a time length of one SS burst set corresponding to one MO, but also indicate a period of the SS burst set corresponding to one MO. The terminal device learns of the time length of the SS burst set corresponding to the MO and the period of the SS burst set, that is, learns of a location of the time window including the SS burst set, so that the terminal device can perform measurement. For a schematic diagram of the SS burst set, refer to FIG. 20. In FIG. 20, in an example in which a period of the SS burst set is 20 ms and one SS burst set includes L SSBs, 0 to L may be used as indexes of the SSBs. In FIG. 20, an example in which one SSB includes a primary synchronization signal (primary synchronization signal, PSS), a secondary synchronization signal (secondary synchronization signal, SSS), and a physical broadcast channel (physical broadcast channel, PBCH) is used.

It can be learned from the foregoing descriptions that the SMTC indicates the time domain location of the time window, and there is no SSB at all moments in a time window, but there is a specific time interval between a plurality of SSBs included in a time window. If the terminal device monitors only the time domain location of the time window, because the terminal device does not know a specific time domain location of the SSB in the time window, the terminal device needs to monitor all time domain locations in the time window. This also increases power consumption of the terminal device to some extent. In view of this, this embodiment of this application proposes that one piece of measurement configuration information may further include the first indication information corresponding to the SMTC in the MO, and the first indication information is used to indicate the measurement location in the time window indicated by the corresponding SMTC. For example, one SMTC may correspond to one piece of first indication information, or all SMTCs is applicable to one piece of first indication information.

For example, in an implementation, the first indication information may be SSB to Measure (SSB to Measure), where SSB to Measure may be in a form of a bitmap (bitmap), a bit included in the bitmap is in a one-to-one correspondence with an index of an SSB included in a time window, and the bitmap is used to indicate an index corresponding to an SSB that needs to be measured. For example, if one time window includes four SSBs, that is, includes four indexes, SSB to Measure may include four bits (bit), where one bit corresponds to one index. If a value of a bit is "1", it indicates that an SSB indicated by an index corresponding to the bit needs to be measured, or if a value of a bit is "0", it indicates that an SSB indicated by an index corresponding to the bit does not need to be measured. An indication granularity of a time domain location that needs to be measured can be further refined by using SSB to Measure, so that measurement of the terminal device is more targeted, and power consumption of the terminal device is reduced. Certainly, an implementation form of the first indication information is not limited thereto. For example, the first indication information may further include one or more bits. The one or more bits are used to indicate a time domain location that needs to be measured in a time window, for example, may indicate that time domain locations that need to be measured in a time window are specifically $1^{st}$ ms and $3^{rd}$ ms in the time window. Alternatively, the first indication information may further include one or more bits. The one or more bits may be used to indicate a proportion of duration that is in a time window and that needs to be measured in the time window, and indicate a time domain location of duration that is in a time window and that needs to be measured in the time window, for example, may indicate that a proportion of duration that is in a time window and that needs to be measured in the time window is 20%, and may indicate that a start location of 20% is $1^{st}$ ms in the time window, or may indicate that a period of the time window becomes longer or a frequency of the time window becomes lower. An implementation of the first indication information is not limited in this embodiment of this application.

As described above, measID may be associated with one MO and one piece of report configuration information. When performing measurement, the terminal device may perform measurement based on measID. Therefore, one piece of measurement configuration information may further include measID. Certainly, if one piece of measurement configuration information does not include specific measID, and the terminal device needs to perform measurement based on the measurement configuration information, the terminal device may perform measurement based on all measID. For example, the terminal device needs to measure all MOs included in the measurement configuration information.

As described above, the report configuration information is used to indicate a reference signal that needs to be measured in a corresponding MO and a manner of reporting a measurement result of the reference signal. Therefore, the measurement configuration information may include the report configuration information.

In addition, when some frequencies on which a serving cell of the terminal device is not located are measured, a gap may be configured for the terminal device. The gap may be understood as a time period configured by the network device for the terminal device. In the time period, the network device does not schedule the terminal device on a frequency band or all frequency bands, and the terminal device does not need to listen to, on the frequency band on which the network device does not perform scheduling, a signal sent by the network device, but may perform measurement on a frequency other than a frequency on which the serving cell of the terminal device is located. Currently, regardless of a quantity of MOs that need to be measured by the terminal device, the MOs need to be measured by sharing one gap or a high-frequency MO and a low-frequency MO each are measured by using one gap. If different beams may correspond to different quantities of MOs, measurement duration required by terminal devices in the different beams is also different. However, currently, the network device configures only one gap for the terminal device, or configures two gaps for the terminal device. The two gaps respectively correspond to low-frequency measurement and high-frequency measurement. Regardless of whether one or two gaps are configured, a length of the configured gap is fixed. Regardless of a quantity of MOs that need to be measured by the terminal device, measurement needs to be performed in the fixed configured gap. If the network device configures relatively long duration of the gap, because a terminal device in a beam with a relatively small quantity of MOs does not require too much time to measure another frequency, it is clear that time is wasted. Consequently, a time at which the network device can perform scheduling is reduced, and performance of the terminal device is reduced. However, if the network device configures relatively short duration of the gap, a terminal device in a beam with a relatively large quantity of MOs may be unable to complete a measurement task.

In view of this, in this embodiment of this application, one piece of measurement configuration information may further include the gap, and the gap is used by the terminal device to measure a reference signal on the frequency other than the frequency of the serving cell of the terminal device. The measurement configuration information is associated with the index of the reference signal, and the index of the reference signal may also be understood as an index of a beam. That is, in this embodiment of this application, an association relationship is established between the gap and the beam. Duration of a gap included in measurement configuration information corresponding to a beam including a relatively small quantity of MOs may be relatively short. This can ensure that the terminal device completes measurement, reduce a waste of time, increase a time at which the network device can perform scheduling, and also help improve performance of the terminal device. However, duration of a gap included in measurement configuration information corresponding to a beam including a relatively large quantity of MOs may be relatively long, so that it can be ensured as much as possible that the terminal device can complete a measurement task.

In addition, if the terminal device is in the idle mode, measurement configuration information corresponding to the terminal device in the idle mode does not include the MO. For example, for the terminal device in the idle mode, one piece of measurement configuration information included in the first relationship may include one or any combination of the following: frequency information, cell information, or measurement time information. If the first relationship includes the frequency information and the measurement time information, the measurement time information may be used to indicate a time of measuring the frequency information. Alternatively, if the first relationship includes the cell information and the measurement time information, the measurement time information may be used to indicate a time of measuring the cell information. Alternatively, if the first relationship includes the frequency information, the cell information, and the measurement time information, the measurement time information may be used to indicate a time of measuring the frequency information and a time of measuring the cell information. Certainly, for the terminal device in the idle mode, one piece of measurement configuration information included in the first relationship may further include other content. This is not specifically limited.

The frequency information included in one piece of measurement configuration information may include adjacent-frequency information of a frequency on which a serving cell of the terminal device is located, or may include information about a frequency on which a serving cell of the terminal device is located. The cell information included in one piece of measurement configuration information may include cell information on an adjacent frequency of a frequency on which the serving cell of the terminal device is located, or may include cell information on a frequency on which the serving cell of the terminal device is located.

The foregoing merely lists the content that may be included in the measurement configuration information. The other content that may be further included in the measurement configuration information is not limited in this embodiment of this application.

S182: The network device sends the first message, where the first message includes the first relationship, and the terminal device receives the first message from the network device.

For example, the first message reuses an existing message. For example, the first message may be a measurement configuration message. Alternatively, the first message may reuse another existing message, or the first message may not reuse an existing message, but is dedicated signaling. For example, the measurement configuration message is an RRC reconfiguration message.

In this embodiment of this application, the first relationship may exist in different forms in the first message.

1. A First Implementation Form of the First Relationship

The first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information.

One piece of measurement configuration information may include one or more types of information, and each type of information may further include one or more pieces of information. For example, one type of information included in one piece of measurement configuration information is an MO, and for the MO, the measurement configuration information may include two MOs. In this case, for the MO, the measurement configuration information further specifically includes two pieces of information about the MO.

For example, the first message is specifically a measurement configuration message, and the measurement configuration message includes one or more pieces of measurement configuration information. For example, the measurement configuration message may include all measurement configuration information corresponding to one cell. In this case, the measurement configuration message may include at least one piece of second indication information, the second indication information is in a one-to-one correspondence with information included in the measurement configuration information, and one piece of second indication information may be used to indicate an index that is of a reference signal and that is associated with the corresponding information. It may be considered that the second indication information and the information corresponding to the second indication information constitute the first relationship.

The second indication information may be implemented in different manners. For example, one piece of second indication information may be one bitmap, and a quantity of bits included in one bitmap may be equal to all indexes of reference signals corresponding to one cell. It may be understood that the bits included in one bitmap are in a one-to-one correspondence with the indexes of the reference signals corresponding to one cell. If a value of a bit is "1", it indicates that information corresponding to the bitmap has an association relationship with an index corresponding to the bit, or if a value of a bit is "0", it indicates that information corresponding to the bitmap has no association relationship with an index corresponding to the bit. Alternatively, one piece of second indication information may be implemented by using one or more bits, and the one or more bits may be used to indicate an index of one reference signal. Compared with a bitmap-based implementation, this implementation form can reduce a quantity of bits included in the second indication information, thereby reducing signaling overheads of the first message.

For example, the measurement configuration message includes three measID: measID 1, measID 2, and measID 3. Each of three measID corresponds to one piece of second indication information. For example, all the three pieces of second indication information are bitmaps. There are a total of eight indexes of reference signals corresponding to a serving cell in which the terminal device is located. In this case, each of the three bitmaps may include eight bits, and the eight bits are in a one-to-one correspondence with the eight indexes. For one bitmap, if a value of a bit is "1", it indicates that measID corresponding to the bitmap has an association relationship with an index corresponding to the bit, or if a value of a bit is "0", it indicates that measID corresponding to the bitmap has no association relationship with an index corresponding to the bit. For example, the eight bits included in the bitmap respectively correspond to an index 1 to an index 8 from a low-order bit to a high-order bit. In the three bitmaps, if a bitmap corresponding to measID 1 is 00010100, it indicates that measID 1 has an association relationship with the index 3 and the index 5, that is, it indicates that measID 1 has an association relationship with a reference signal corresponding to the index 3 and a reference signal corresponding to the index 5. In this case, for the terminal device, if an index of a reference signal corresponding to the terminal device is the index 3 or the index 5, the terminal device may perform measurement based on measID 1, or if an index of a reference signal corresponding to the terminal device is neither the index 3 nor the index 5, the terminal device does not perform measurement based on measID 1.

For another example, one piece of frequency information in one MO included in the measurement configuration message corresponds to three SMTCs: an SMTC 1, an SMTC 2, and an SMTC 3. Each of the three SMTCs corresponds to one piece of second indication information, for example, all the three pieces of second indication information are bitmaps. There are a total of eight indexes of reference signals corresponding to a serving cell in which the terminal device is located. In this case, each of the three bitmaps may include eight bits, and the eight bits are in a one-to-one correspondence with the eight indexes. For one bitmap, if a value of a bit is "1", it indicates that an SMTC corresponding to the bitmap has an association relationship with an index corresponding to the bit, or if a value of a bit is "0", it indicates that an SMTC corresponding to the bitmap has no association relationship with an index corresponding to the bit. For example, the eight bits included in the bitmap respectively correspond to an index 1 to an index 8 from a low-order bit to a high-order bit. In the three bitmaps, if a bitmap corresponding to the SMTC 1 is 00010100, it indicates that the SMTC 1 has an association relationship with the index 3 and the index 5, that is, it indicates that the SMTC has an association relationship with a reference signal corresponding to the index 3 and a reference signal corresponding to the index 5. In this case, for the terminal device, if an index of a reference signal corresponding to the terminal device is the index 3 or the index 5, the terminal device may perform measurement on the frequency of the MO based on the SMTC 1, or if an index of a reference signal corresponding to the terminal device is neither the index 3 nor the index 5, the terminal device does not perform measurement based on the SMTC 1.

For example, one piece of measurement configuration information includes an MO. For example, if the first message is a measurement configuration message, content that is in the first relationship and that corresponds to the MO may be included in configuration information of the MO in the measurement configuration message (the configuration information of the MO may include configuration information of an MO on a frequency of the serving cell of the terminal device and/or configuration information of an MO on a frequency other than the frequency of the serving cell of the terminal device). Alternatively, if the first message may be a message including serving cell configuration (serving cell config) information, content that is in the first relationship and that corresponds to the MO may be included in the message.

For example, one piece of measurement configuration information includes measID. For example, if the first message is a measurement configuration message, content that is in the first relationship and that corresponds to measID may be included in configuration information of measID in the measurement configuration message. For example, the configuration information of measID is implemented in a form of a list. Alternatively, if the first message may be a message including serving cell config information, content that is in the first relationship and that corresponds to the MO may be included in the message.

For example, one piece of measurement configuration information includes cell information corresponding to an MO. For example, if the first message is a measurement configuration message, content that is in the first relationship and that corresponds to the cell information corresponding to the MO may be included in configuration information of the cell information that corresponds to the MO and that is in the measurement configuration message. Alternatively, for example, if the first message is a measurement configuration message, content that is in the first relationship and that corresponds to the cell information corresponding to the MO may be included in configuration information of the MO in the measurement configuration message. Alternatively, if the first message may be a message including serving cell config information, content that is in the first relationship and that corresponds to the MO may be included in the message.

For example, one piece of measurement configuration information includes an SMTC. For example, if the first message is a measurement configuration message, content that is in the first relationship and that corresponds to the SMTC may be included in configuration information of the SMTC that corresponds to an MO and that is in the measurement configuration message. Alternatively, for example, if the first message is a measurement configuration message, content that is in the first relationship and that corresponds to the SMTC may be included in configuration information of an MO in the measurement configuration message. Alternatively, if the first message may be a message including serving cell config information, content that is in the first relationship and that corresponds to the MO may be included in the message.

For example, one piece of measurement configuration information includes report configuration information. For example, if the first message is a measurement configuration message, content that is in the first relationship and that corresponds to the report configuration information may be included in configuration information corresponding to the report configuration information in the measurement configuration message.

For example, one piece of measurement configuration information includes a quantity of to-be-measured cells. For example, if the first message is a measurement configuration message, content that is in the first relationship and that corresponds to the quantity of to-be-measured cells may be included in the measurement configuration message. Alternatively, for example, if the first message is a measurement configuration message, content that is in the first relationship and that corresponds to the quantity of to-be-measured cells corresponding to an MO may be included in configuration information of the MO in the measurement configuration message. Alternatively, if the first message may be a message including serving cell config information, content that is in the first relationship and that corresponds to the quantity of to-be-measured cells may be included in the message.

For example, one piece of measurement configuration information includes a quantity of to-be-measured frequencies. For example, if the first message is a measurement configuration message, content that is in the first relationship and that corresponds to the quantity of to-be-measured frequencies may be included in the measurement configuration message. Alternatively, for example, if the first message is a measurement configuration message, content that is in the first relationship and that corresponds to the quantity of to-be-measured frequencies corresponding to an MO may be included in configuration information of the MO in the measurement configuration message. Alternatively, if the first message may be a message including serving cell config information, content that is in the first relationship and that corresponds to the quantity of to-be-measured frequencies may be included in the message.

For example, one piece of measurement configuration information includes a gap. For example, if the first message is a measurement configuration message, content that is in the first relationship and that corresponds to report configuration information may be included in configuration information corresponding to the gap in the measurement configuration message.

In the first implementation form of the first relationship, an original structure of the measurement configuration message may not be changed as much as possible, and only corresponding second indication information is added to the original message. This helps be compatible with an existing message.

2. A Second Implementation Form of the First Relationship

The first relationship includes at least one index of a reference signal and measurement configuration information associated with each of the at least one index.

The second implementation form of the first relationship is relatively simple. In this implementation form, the first relationship may not be included in any sub-configuration information of the first message, but may exist independently in the first message. It may be understood that the first relationship is a list, the list is included in the first message, the list includes the at least one index of the reference signal, and in the list, each of the at least one index corresponds to one piece of measurement configuration information. This implementation form is relatively direct, and helps the terminal device clearly determine the association relationship between the index of the reference signal and the measurement configuration information.

An implementation form used for the first relationship may be configured by the network device and notified to the terminal device in advance, or may be specified by using a protocol. Certainly, the first relationship may alternatively be implemented in another form. This is not specifically limited.

When the two implementation forms of the first relationship are described, an example in which the first message includes specific measurement configuration information indicated by the first relationship is used. For example, if one piece of measurement configuration information indicated by the first relationship includes an MO 1 and an MO 2, the first message may include specific content of the MO 1 and specific content of the MO 2. In this manner, the first message may be used to indicate the first relationship and the specific measurement configuration information, so that the terminal device can obtain all content by using one message. In addition, alternatively, the measurement configuration information indicated by the first relationship included in the first message may not be specific information, but is only an index of the information.

For example, in the first implementation form of the first relationship, each piece of information included in one or more pieces of measurement configuration information included in the first relationship may not be specific information, but is only an index of the information. For example, the first message includes three MOs, and the three MOs are respectively an MO 1, an MO 2, and an MO 3. The first message may include only indexes of the three MOs, but does not include specific content of the three MOs. In this case, the second indication information may correspond to the indexes of the MOs.

For another example, in the second implementation form of the first relationship, each piece of one or more pieces of measurement configuration information included in the first relationship may not be specific measurement configuration information, but is only an index of the measurement configuration information. For example, the first message includes the first relationship, and the first relationship includes an association relationship between an index 1 of a reference signal and measurement configuration information 1, and includes an association relationship between an index 2 of a reference signal and measurement configuration information 2. In this case, the first message may include only an index of the measurement configuration information 1 and an index of the measurement configuration information 2, but does not include specific content of the measurement configuration information 1 and specific content of the measurement configuration information 2.

In this manner, the first message may not need to include the specific content of the measurement configuration information. This helps reduce signaling overheads of the first message.

If the first message does not include the specific content of the measurement configuration information, the network device may further send a second message to the terminal device. The second message may include the measurement configuration information indicated by the first relationship, in other words, include specific content of the measurement configuration information indicated by the first relationship. After receiving the second message, the terminal device may obtain the specific content of the measurement configuration information indicated by the first relationship. For example, the second message may be a measurement configuration message, and the first message is another message. For example, the first message is system information that is always broadcast or on-demand system information, or an RRC message, or a media access control control element (media access control control element, MAC CE), or downlink control information (downlink control information, DCI). This not specifically limited.

S183: The terminal device determines, based on a first index corresponding to the terminal device, that measurement configuration information corresponding to the terminal device is first measurement configuration information having an association relationship with the first index, where the first index is an index of a reference signal corresponding to the terminal device.

The terminal device may first determine the index of the reference signal corresponding to the terminal device. Alternatively, it may be understood that the terminal device determines an index of a beam in which the terminal device is located. For example, the index of the reference signal corresponding to the terminal device is referred to as the first index.

In this embodiment of this application, the terminal device may determine the first index in a plurality of determining manners. In addition, determining manners listed below are applicable to both the terminal device in the idle mode and the terminal device in the connected mode.

First determining manner: The terminal device determines that an index of a measured reference signal with best channel quality is the first index.

For example, the terminal device measures an SSB and/or a CSI-RS, and may determine that an index of a reference signal with best channel quality that is obtained through measurement is the first index. The first index may be an index of the SSB, or may be an index of the CSI-RS.

Second determining manner: The terminal device determines that an index of a reference signal in measured reference signals whose channel quality is greater than or equal to a channel quality threshold is the first index.

For example, the network device may configure the channel quality threshold, or the channel quality threshold may be specified by using a protocol. The terminal device may measure an SSB and/or a CSI-RS, and obtain, through screening after measurement, a measured reference signal whose channel quality is greater than or equal to a channel quality threshold. If there is only one measured reference signal whose channel quality is greater than or equal to the channel quality threshold, an index of the reference signal is the first index, or if there are a plurality of measured reference signals whose channel quality is greater than or equal to the channel quality threshold, the terminal device may select one reference signal from the plurality of reference signals, and an index of the reference signal is the first index. For example, the terminal device may perform random selection. Alternatively, the terminal device may perform selection based on a value of an index of a reference signal, for example, may select a largest index as the first index. Alternatively, the terminal device may perform selection in another manner. The first index may be an index of the SSB, or may be an index of the CSI-RS.

Third determining manner: The terminal device determines that an index of an SSB with best channel quality that is measured by the terminal device is the first index.

The terminal device may measure both an SSB and a CSI-RS, but the third manner is specific to only the SSB. The terminal device may measure a plurality of SSBs. In this case, the terminal device determines that an index of a measured SSB with best channel quality is the first index.

Fourth determining manner: The terminal device determines that an index of an SSB used by the terminal device to perform random access is the first index.

For example, after a beam failure (beam failure), the terminal device performs random access. In this case, an index of a beam in which the terminal device successfully performs random access is used as the first index, or an index of an SSB used when the terminal device successfully performs random access is used as the first index.

Fifth determining manner: The terminal device determines that an index of an SSB used to receive system information is the first index.

For example, the system information includes a master information block (master information block, MIB) and/or a system information block (system information block, SIB).

Sixth determining manner: The terminal device determines that an index of an SSB used to receive the first message is the first index.

In the foregoing six determining manners, the terminal device may select one of the six determining manners for use. A determining manner selected by the terminal device may be determined by the terminal device, or may be configured by the network device and notified to the terminal device, or may be specified by using a protocol. In addition, the foregoing determining manners are merely examples. A manner of determining the first index by the terminal device is not limited in this embodiment of this application.

It can be learned that in the first determining manner or the second determining manner, the first index may be the index of the SSB, or may be the index of the CSI-RS, but in any one of the third determining manner to the sixth determining manner, the first index is the index of the SSB. A beam corresponding to the SSB is usually wider than a beam corresponding to the CSI-RS. In this case, measurement configuration information corresponding to the SSB may be more comprehensive than measurement configuration information corresponding to the CSI-RS. The terminal device performs measurement based on the measurement configuration information corresponding to the SSB, so that more measurement results can be obtained, and an optional range is larger when cell reselection or cell handover is performed.

After determining the first index, the terminal device may determine that the measurement configuration information corresponding to the terminal device is measurement configuration information that is in the first relationship and that has an association relationship with the first index. For example, measurement configuration information that is in the first relationship and that has an association relationship with the first index is referred to as the first measurement configuration information. In this case, the terminal device may determine that the measurement configuration information corresponding to the terminal device is the first measurement configuration information, so that the terminal device can perform measurement based on the first measurement configuration information.

Because the first relationship may include a plurality of pieces of measurement configuration information, to prevent the terminal device from confusing the measurement configuration information, in this embodiment of this application, that the terminal device determines that the terminal device corresponds to the first measurement configuration information may also be understood as that the terminal device determines that the first measurement configuration information included in the first relationship is in an active state, and determines that measurement configuration information that is in the first relationship and that has no association relationship with the first index is in an inactive state. The active state may be understood as that the terminal device needs to perform measurement based on the measurement configuration information in the active state, and the inactive state may be understood as that the terminal device does not perform measurement based on the measurement configuration information in the inactive state. Certainly, after determining that the first measurement configuration information is in the active state, the terminal device may perform measurement when measurement needs to be performed. For example, if measurement needs to be performed immediately, after determining that the first measurement configuration information is in the active state, the terminal device may immediately perform measurement based on the first measurement configuration information. Alternatively, if the terminal device does not need to perform measurement when determining that the first measurement configuration information is in the active state, the terminal device may perform measurement based on the first measurement configuration information after a period of time.

As described above, when performing measurement, the terminal device performs measurement based on measID. In this case, if one piece of measurement configuration information that is in the first relationship and that has no association relationship with the first index includes measID, the terminal device may directly determine that measID is in an inactive state, and does not perform measurement based on measID. Alternatively, if the measurement configuration information does not include measID, but includes an MO (for example, referred to as a first MO) and/or report configuration information (for example, referred to as first report configuration information), corresponding measID may be directly determined based on the MO, and corresponding measID may also be directly determined based on the report configuration information, the terminal device may directly determine corresponding measID based on the first MO and/or the first report configuration information, to determine that measID is in an inactive state, and does not perform measurement based on measID. Alternatively, if the measurement configuration information does not include measID, an MO, or report configuration information, the terminal device cannot determine which measID is in an inactive state. In this case, the terminal device performs measurement based on measID even if measID is in the inactive state. However, in this embodiment of this application, the association relationship has been established between the index of the reference signal and the measurement configuration information. Therefore, even if the terminal device needs to measure all measID, a measurement workload required by the terminal device is greatly reduced compared with that in the prior art.

After determining that the first index corresponds to the first measurement configuration information, the terminal device may perform measurement based on the first measurement configuration information. Subsequently, the terminal device may further move from one beam to another beam. In this case, the index of the reference signal corresponding to the terminal device may change, and the measurement configuration information corresponding to the terminal device also correspondingly changes. In this embodiment of this application, the terminal device may determine, periodically or after the terminal device moves, the index of the reference signal corresponding to the terminal device. For example, if the terminal device determines that the index of the reference signal of the terminal device is changed from the first index to a second index, the terminal device may re-determine, based on the first relationship, the measurement configuration information corresponding to the terminal device, for example, the terminal device determines that measurement configuration information that is in the first relationship and that corresponds to the second index is second measurement configuration information. In other words, the terminal device determines that the measurement configuration information corresponding to the terminal device is the second measurement configuration information, and therefore the terminal device may perform measurement based on the second measurement configuration information. For example, if the terminal device determines that the index of the reference signal of the terminal device is changed from the first index to the second index, the terminal device may activate the second measurement configuration information based on the first relationship, so that the second measurement configuration information enters the active state from the inactive state; and deactivate the first measurement configuration information, so that the first measurement configuration information enters the inactive state from the active state. Therefore, the terminal device may perform measurement based on the second measurement configuration information, and no longer perform measurement based on the first measurement configuration information. In this manner, even if the terminal device moves, the terminal device can determine corresponding measurement configuration information in a timely manner, and the network device does not need to deliver the measurement configuration information for a plurality of times when the terminal device moves, to help reduce signaling overheads. In addition, the terminal device does not need to perform measurement based on all measurement configuration information, to reduce power consumption of the terminal device.

After moving, the terminal device may independently determine the second index as described above, to determine corresponding measurement configuration information based on the second index and the first relationship. Alternatively, after the terminal device moves, the network device may determine that the index of the reference signal corresponding to the terminal device is changed from the first index to the second index, and may determine that the measurement configuration information that is in the first relationship and that corresponds to the second index is the second measurement configuration information. The network device may send a third message to the terminal device, where the third message may indicate the second index and/or the second measurement configuration information (specifically, the third message may indicate the second index or the second measurement configuration information, or indicate the second index and the second measurement configuration information). After receiving the third message, the terminal device may determine that the measurement configuration information corresponding to the terminal device is changed to the second measurement configuration information, to perform measurement based on the second measurement configuration information. If the third message indicates the second index, the terminal device may determine, from the first relationship, the second measurement configuration information corresponding to the second index. For example, if the third message indicates the second index, the terminal device may activate the second measurement configuration information that has an association relationship with the second index based on the first relationship, so that the second measurement configuration information enters the active state from the inactive state; and deactivate the first measurement configuration information, so that the first measurement configuration information enters the inactive state from the active state. In addition, in this manner, the third message only needs to indicate the second index. In this way, the terminal device can independently determine corresponding measurement configuration information, and the network device does not need to deliver specific measurement configuration information, to help reduce signaling overheads.

For example, the third message is an RRC message, a MAC CE, or DCI. This is not specifically limited.

For ease of understanding, the following describes the technical solutions in the embodiments of this application by using several specific examples.

Example 1

Figure 21:
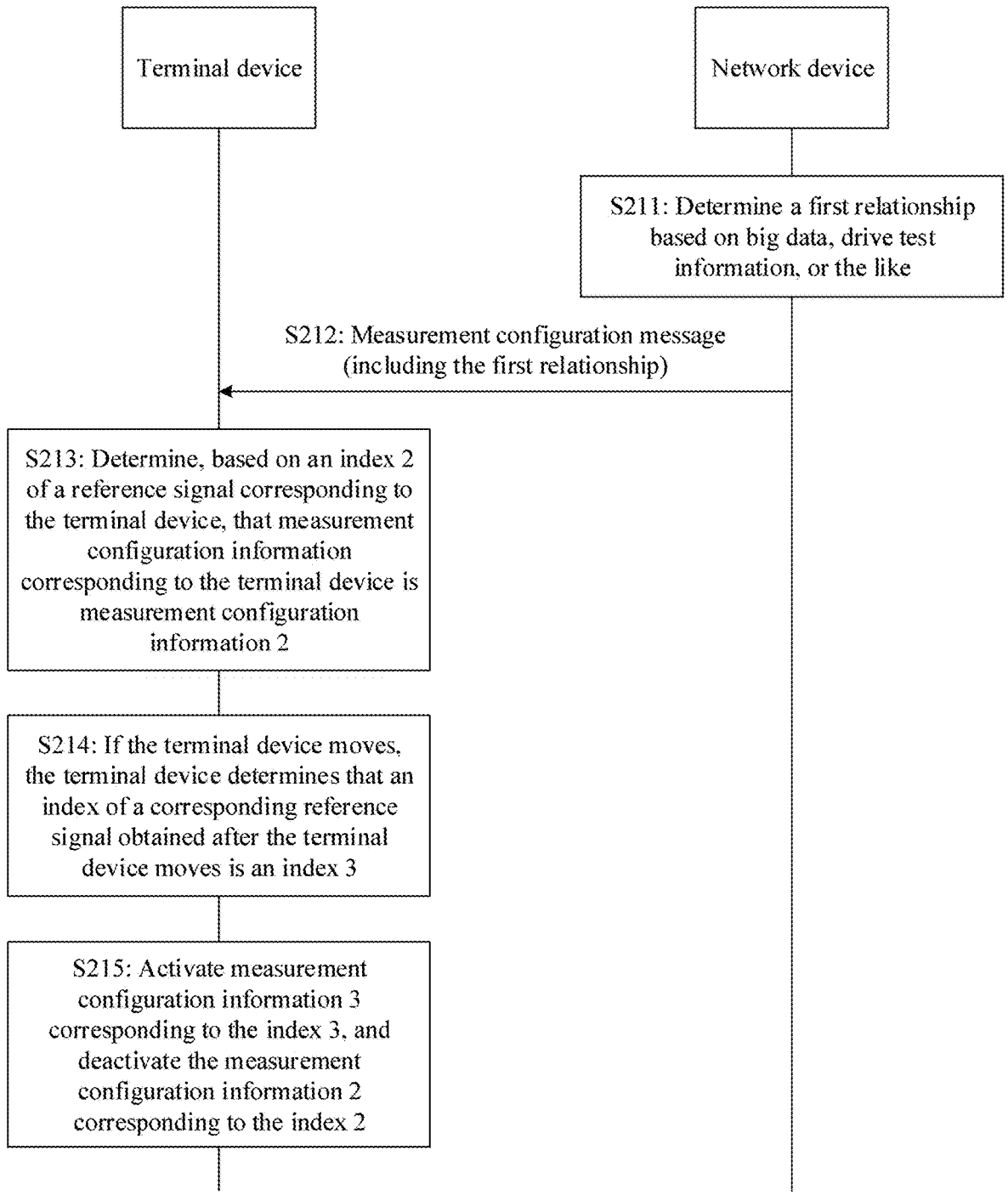
FIG. 21 is a flowchart of a specific example of a measurement configuration determining method according to an embodiment of this application.

For example, FIG. 21 shows a specific example of a measurement configuration determining method according to an embodiment of this application.

S211: The network device determines a first relationship based on big data, drive test information, or the like.

For example, the first relationship includes an association relationship between an index 1 of an SSB and measurement configuration information 1, an association relationship between an index 2 of a CSI-RS and measurement configuration information 2, and an association relationship between an index 3 of a CSI-RS and measurement configuration information 3.

S212: The network device sends a first message, and the terminal device receives the first message from the network device, where the first relationship is included in the first message.

In this example, the first implementation form is used for the first relationship in the first message, and the first message includes specific measurement configuration information. In FIG. 21, for example, the first message is a measurement configuration message. Configuration information of an MO in the measurement configuration message includes information about an MO 1, information about an MO 2, and information about an MO 3, configuration information of an SMTC that corresponds to the MO and that is in the measurement configuration message includes information about an SMTC 1, and configuration information corresponding to a gap in the measurement configuration message includes information about a gap 1. The network device has determined that the measurement configuration information 1 includes the information about the MO 1, the measurement configuration information 2 includes the information about the MO 1 and the information about the SMTC 1 corresponding to the MO 1, and the measurement configuration information 3 includes the information about the MO 2 and the information about the gap 1. In this case, the network device may add one piece of second indication information to each of the information about the MO 1, the information about the MO 2, the information about the MO 3, the information about the SMTC 1, and the information about the gap 1 that are included in the measurement message, to indicate an index of a reference signal corresponding to corresponding information. For example, the second indication information is implemented by using a bitmap. For example, there are a total of three indexes of reference signals corresponding to a serving cell in which the terminal device is located, and the three indexes are respectively an index 1 to the index 3. In this case, each of the bitmaps may include three bits, and the three bits are in a one-to-one correspondence with the three indexes. Specifically, the three bits included in the bitmap respectively correspond to the index 1 to the index 3 from a low-order bit to a high-order bit. For example, if a bitmap corresponding to the MO 1 is 010, it indicates that the MO 1 has an association relationship with the index 2, but has no association relationship with the index 1 or the index 3, that is, it indicates that the MO 1 has an association relationship with the CSI-RS corresponding to the index 2, but has no association relationship with the SSB corresponding to the index 1 or the CSI-RS corresponding to the index 3. If the MO 1 does not include a bitmap, it indicates that the MO 1 has an association relationship with all indexes.

S213: The terminal device determines, based on an index 2 of a reference signal corresponding to the terminal device, that measurement configuration information corresponding to the terminal device is the measurement configuration information 2.

The terminal device may determine an index of a reference signal corresponding to the terminal device. For example, the terminal device determines that an index of a measured reference signal with best channel quality is the index of the reference signal corresponding to the terminal device, for example, is the index 2. In this case, after receiving the first message, the terminal device may determine, from the first relationship, that the measurement configuration information 2 corresponding to the index 2 includes the information about the MO 1 and the information about the SMTC 1 corresponding to the MO 1. For example, the terminal device may determine that the measurement configuration information 2 corresponding to the index 2 is in an active state, and determine that the measurement configuration information 1 corresponding to the index 1 and the measurement configuration information 3 corresponding to the index 3 each are in an inactive state. Therefore, the terminal device may perform measurement based on the measurement configuration information 2. To be specific, the terminal device performs measurement based on the MO 1 and the SMTC 1, but does not perform measurement based on the measurement configuration information 1 or perform measurement based on the measurement configuration information 3. In this example, the first message includes the specific measurement configuration information. In other words, the first message includes the measurement configuration information 1, the measurement configuration information 2, and the measurement configuration information 3. In this case, the terminal device does not need to obtain the measurement configuration information in another manner.

S214: If the terminal device moves, the terminal device determines that an index of a corresponding reference signal obtained after the terminal device moves is the index 3.

Subsequently, if the terminal device moves, the terminal device may independently determine that the index of the corresponding reference signal obtained after the terminal device moves is, for example, changed to the index 3. The terminal device may determine, based on the first relationship, that measurement configuration information corresponding to the index 3 is the measurement configuration information 3.

S215: The terminal device activates the measurement configuration information 3 corresponding to the index 3, and deactivates the measurement configuration information 2 corresponding to the index 2.

For example, the terminal device may activate the measurement configuration information 3 corresponding to the index 3 based on the first relationship, so that the measurement configuration information 3 enters the active state from the inactive state; and deactivate the measurement configuration information 2 corresponding to the index 2, so that the measurement configuration information 2 enters the inactive state from the active state. Therefore, the terminal device may perform measurement based on the measurement configuration information 3, and no longer perform measurement based on the measurement configuration information 2.

Example 2

Figure 22:
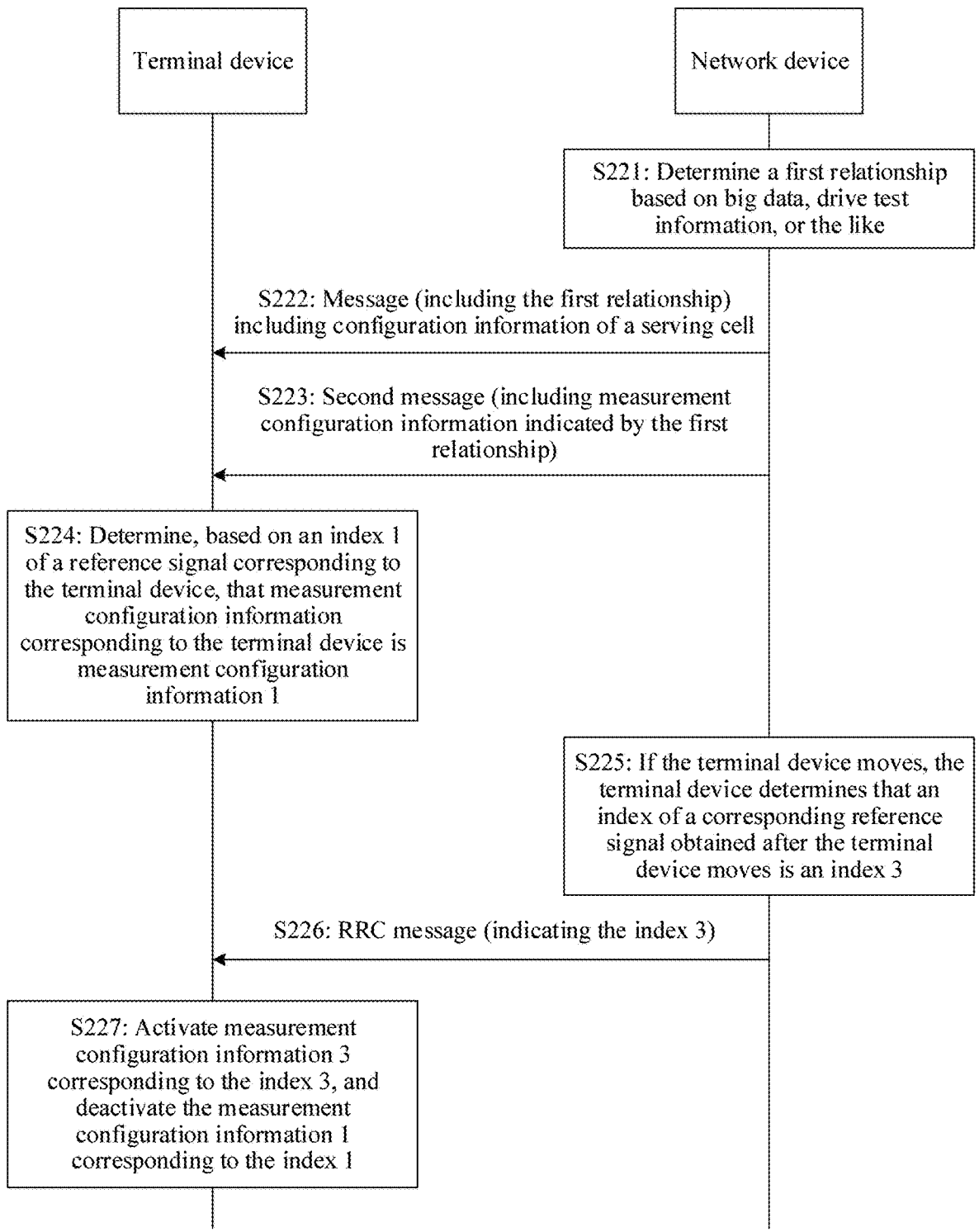
FIG. 22 is a flowchart of a specific example of a measurement configuration determining method according to an embodiment of this application.

For example, FIG. 22 shows a specific example of a measurement configuration determining method according to an embodiment of this application.

S221: The network device determines a first relationship based on big data, drive test information, or the like.

For example, the first relationship includes an association relationship between an index 1 of an SSB and measurement configuration information 1, an association relationship between an index 2 of a CSI-RS and measurement configuration information 2, and an association relationship between an index 3 of a CSI-RS and measurement configuration information 3. The measurement configuration information 1 includes information about an MO 1, the measurement configuration information 2 includes the information about the MO 1 and information about an SMTC 1 corresponding to the MO 1, and the measurement configuration information 3 includes information about an MO 2 and information about a gap 1.

S222: The network device sends a first message, and the terminal device receives the first message from the network device, where the first relationship is included in the first message.

In this example, the second implementation form is used for the first relationship in the first message. In FIG. 22, for example, the first message is a message including serving cell config information. The first relationship may be in a form of a list, and the list includes the index 1 and the measurement configuration information 1 corresponding to the index 1, the index 2 and the measurement configuration information 2 corresponding to the index 2, and the index 3 and the measurement configuration information 3 corresponding to the index 3. In this example, the first message does not include specific measurement configuration information. For example, the first message includes only an index of the measurement configuration information 1, an index of the measurement configuration information 2, and an index of the measurement configuration information 3.

S223: The network device sends a second message to the terminal device, and the terminal device receives the second message from the network device, where the second message includes specific measurement configuration information, or includes a correspondence between an index of measurement configuration information and the measurement configuration information.

The network device may first send the first message and then send the second message, or the network device may first send the second message and then send the first message, or the network device may simultaneously send the first message and the second message. In other words, a sequence of performing S222 and S223 is not limited.

For example, the second message includes the index of the measurement configuration information 1 and the measurement configuration information 1 corresponding to the index of the measurement configuration information 1, the index of the measurement configuration information 2 and the measurement configuration information 2 corresponding to the index of the measurement configuration information 2, and the index of the measurement configuration information 3 and the measurement configuration information 3 corresponding to the index of the measurement configuration information 3. In this case, the terminal device may obtain the first relationship based on the first message, and may obtain the specific measurement configuration information based on the second message.

S224: The terminal device determines, based on an index 1 of a reference signal corresponding to the terminal device, that measurement configuration information corresponding to the terminal device is the measurement configuration information 1.

The terminal device may determine an index of a reference signal corresponding to the terminal device. For example, the terminal device determines that an index of a measured SSB with best channel quality is the index of the reference signal corresponding to the terminal device, for example, is the index 1. In this case, after receiving the first message, the terminal device may determine, from the first relationship, that the measurement configuration information 2 corresponding to the index 1 includes the information about the MO 1. For example, the terminal device may determine that the measurement configuration information 1 corresponding to the index 1 is in an active state, and determine that the measurement configuration information 2 corresponding to the index 2 and the measurement configuration information 3 corresponding to the index 3 each are in an inactive state. Therefore, the terminal device may perform measurement based on the measurement configuration information 1. To be specific, the terminal device performs measurement based on the MO 1, but does not perform measurement based on the measurement configuration information 2 or perform measurement based on the measurement configuration information 3.

S225: If the terminal device moves, the network device determines that an index of a corresponding reference signal obtained after the terminal device moves is the index 3.

Subsequently, if the terminal device moves, in this example, the network device determines corresponding measurement configuration information obtained after the terminal device moves. For example, after the terminal device moves, the network device may determine that the index of the corresponding reference signal obtained after the terminal device moves is, for example, changed to the index 3.

S226: The network device sends a third message to the terminal device, and the terminal device receives the third message from the network device, where the third message is used to indicate the index 3.

In FIG. 22, for example, the third message is an RRC message.

S227: The terminal device activates the measurement configuration information 3 corresponding to the index 3, and deactivates the measurement configuration information 1 corresponding to the index 1.

For example, the terminal device may activate the measurement configuration information 3 corresponding to the index 3 based on the first relationship, so that the measurement configuration information 3 enters the active state from the inactive state; and deactivate the measurement configuration information 1 corresponding to the index 1, so that the measurement configuration information 1 enters the inactive state from the active state. Therefore, the terminal device may perform measurement based on the measurement configuration information 3, and no longer perform measurement based on the measurement configuration information 1. In addition, in this manner, the third message only needs to indicate the second index. In this way, the terminal device can independently determine corresponding measurement configuration information, and the network device does not need to deliver specific measurement configuration information, to help reduce signaling overheads.

According to the two examples shown in FIG. 21 and FIG. 22, the measurement configuration determining method provided in the embodiments of this application should be clearly understood, and therefore no more examples are provided.

In this embodiment of this application, the network device may send the first relationship to the terminal device, where the first relationship is used to indicate the association relationship between the index of the reference signal and the measurement configuration information, and the terminal device may determine the index of the reference signal corresponding to the terminal device, so that the terminal device can determine, from the first relationship based on the index of the reference signal corresponding to the terminal device, the first measurement configuration information corresponding to the terminal device, and the terminal device performs measurement based on the first measurement configuration information. Based on the first relationship, the network device does not need to frequently send the measurement configuration information to the terminal device when the terminal device moves. If the terminal device moves, the terminal device determines, from the first relationship based on the index of the corresponding reference signal obtained after the movement, the measurement configuration information corresponding to the terminal device, and the terminal device does not need to perform measurement each time based on measurement configuration information corresponding to an entire cell, but only needs to perform measurement based on the measurement configuration information corresponding to the terminal device. This can effectively reduce power consumption of the terminal device and improve measurement efficiency.

The following describes, with reference to the accompanying drawings, apparatuses configured to implement the foregoing methods in the embodiments of this application. Therefore, all the foregoing content may be used in subsequent embodiments, and repeated content is not described again.

An embodiment of this application provides a first communications apparatus. For example, the communications apparatus is a first communications apparatus. Referring to FIG. 5, for example, the communications apparatus is a communications apparatus 2300. The communications apparatus 2300 may implement functions of the terminal device described above. The communications apparatus 2300 may be the terminal device described above, or may be a chip disposed in the terminal device described above. The communications apparatus 2300 may include a processor 2301 and a transceiver 2302. The processor 2301 may be configured to perform S183 in the embodiment shown in FIG. 18, and/or configured to support another process of the technology described in this specification. The transceiver 2302 may be configured to perform S182 in the embodiment shown in FIG. 3, and/or configured to support another process of the technology described in this specification.

For example, the transceiver 2302 is configured to receive a first message from a network device, where the first message includes a first relationship, the first relationship is used to indicate an association relationship between an index of a reference signal and measurement configuration information, and the measurement configuration information is used by the communications apparatus 2300 to perform measurement.

The processor 2301 is configured to determine, based on a first index corresponding to the communications apparatus 2300, that measurement configuration information corresponding to the communications apparatus 2300 is first measurement configuration information having an association relationship with the first index, where the first index is an index of a reference signal corresponding to the communications apparatus 2300.

In a possible implementation, the communications apparatus 2300 is in a connected mode.

In a possible implementation, the communications apparatus 2300 is in an idle mode.

In a possible implementation, the measurement configuration information includes one or any combination of the following:
an MO, where the MO includes one or more pieces of frequency information;
cell information corresponding to the frequency information included in the MO;
an SMTC of each of at least one piece of frequency information in the one or more pieces of frequency information included in the MO, where the SMTC of each piece of frequency information is used to indicate a time window that corresponds to each piece of frequency information and that is used for measurement;
first indication information corresponding to the SMTC in the MO, where the first indication information is used to indicate a measurement location in the time window indicated by the SMTC;
a measurement ID, where the measurement ID is used to indicate a correspondence between the MO and report configuration information, and the report configuration information is used to indicate a reference signal that needs to be measured in a corresponding MO and a manner of reporting a measurement result;
the report configuration information;
a quantity of to-be-measured cells;
a quantity of to-be-measured frequencies;
a measurement threshold, where the measurement threshold is used to indicate to measure a cell or a frequency whose value of a first parameter is greater than or equal to the measurement threshold; or
a gap, where the gap is used by the terminal device to measure a reference signal on a frequency other than a frequency of a serving cell of the communications apparatus 2300.

In a possible implementation,
the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or
the first relationship includes at least one index of a reference signal and measurement configuration information associated with each of the at least one index.

In a possible implementation,
the first message further includes the measurement configuration information indicated by the first relationship; or
the transceiver 2302 is further configured to receive a second message from the network device, where the second message includes the measurement configuration information indicated by the first relationship.

In a possible implementation, the processor 2301 is further configured to:
  determine the first index, where the processor 2301 determines the first index in the following manner:
  determining that an index of a measured reference signal with best channel quality is the first index; or
  determining that an index of a reference signal in measured reference signals whose channel quality is greater than or equal to a channel quality threshold is the first index; or
  determining that an index of an SSB with best channel quality that is measured by the communications apparatus 2300 is the first index; or
  determining that an index of an SSB used by the communications apparatus 2300 to perform random access is the first index; or
  determining that an index of an SSB used to receive system information is the first index; or
  determining that an index of an SSB used to receive the first message is the first index.

In a possible implementation,
  the first measurement configuration information is in an active state, and measurement configuration information that is in the first relationship and that has no association relationship with the first index is in an inactive state, where the communications apparatus 2300 performs measurement based on the measurement configuration information in the active state, and does not perform measurement based on the measurement configuration information in the inactive state.

In a possible implementation, the measurement configuration information that has no association relationship with the first index includes a first MO and/or first report configuration information, but does not include a measurement ID; and
  the processor 2301 is configured to determine, based on the first MO and/or the first report configuration information in the inactive state, that the measurement ID corresponding to the measurement configuration information that has no association relationship with the first index is in the inactive state.

In a possible implementation, the processor 2301 is further configured to:
  determine that the index of the reference signal corresponding to the communications apparatus 2300 is changed from the first index to a second index; and
  activate second measurement configuration information that has an association relationship with the second index based on the first relationship, and deactivate the first measurement configuration information.

In a possible implementation,
  the transceiver 2302 is further configured to receive a third message from the network device, where the third message is used to indicate the second index, and the second index is an index of a corresponding reference signal obtained after the communications apparatus 2300 moves; and
  the processor 2301 is further configured to: activate the second measurement configuration information that has an association relationship with the second index based on the first relationship, and deactivate the first measurement configuration information.

In a possible implementation, the reference signal includes an SSB and/or a CSI-RS.

In a possible implementation, the measurement configuration information includes one or any combination of the following:
  frequency information;
  cell information; or
  measurement time information, where the measurement time information is used to indicate a time of measuring the frequency information included in the measurement configuration information, and/or is used to indicate a time of measuring the cell information included in the measurement configuration information.

All related content of the steps in the foregoing method embodiments may be cited in function descriptions of corresponding function modules. Details are not described herein again.

Figure 23:
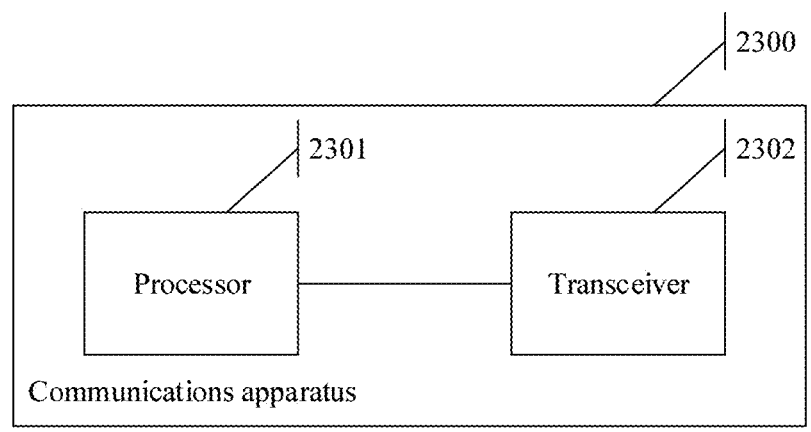
FIG. 23 is a schematic structural diagram of a communications apparatus according to an embodiment of this application.

An embodiment of this application provides a second communications apparatus. For example, the communications apparatus is a second communications apparatus. The communications apparatus may implement functions of the network device described above. The communications apparatus may be the network device described above, or may be a chip disposed in the network device described above. The communications apparatus may include a processor and a transceiver. The processor may be configured to perform S181 in the embodiment shown in FIG. 18, and/or configured to support another process of the technology described in this specification. The transceiver may be configured to perform S182 in the embodiment shown in FIG. 18, and/or configured to support another process of the technology described in this specification. For an accompanying drawing of the communications apparatus, still refer to FIG. 23. To be specific, the processor may be the processor 2301, and the transceiver may be the transceiver 2302. The two communications apparatuses share one accompanying drawing. This does not mean that the two communications apparatuses are a same communications apparatus, but only components included in the two communications apparatuses are of similar types. Therefore, the two communications apparatuses are represented by using one accompanying drawing.

For example, the processor 2301 is configured to determine a first relationship, where the first relationship is used to indicate an association relationship between an index of a reference signal and measurement configuration information, and the measurement configuration information is used by the terminal device to perform measurement.

The transceiver 2302 is configured to send a first message to the terminal device, where the first message includes the first relationship.

In a possible implementation, the measurement configuration information includes one or any combination of the following:
  an MO, where the MO includes one or more pieces of frequency information;
  cell information corresponding to the frequency information included in the MO;
  an SMTC of each of at least one piece of frequency information in the one or more pieces of frequency information included in the MO, where the SMTC of each piece of frequency information is used to indicate a time window that corresponds to each piece of frequency information and that is used for measurement;
  first indication information corresponding to the SMTC in the MO, where the first indication information is used to indicate a measurement location in the time window indicated by the SMTC;
  a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;

a quantity of to-be-measured cells;

a quantity of to-be-measured frequencies;

a measurement threshold, where the measurement threshold is used to indicate to measure a cell or a frequency whose value of a first parameter is greater than or equal to the measurement threshold; or a gap, where the gap is used by the terminal device to measure a reference signal on a frequency other than a frequency of a serving cell of the terminal device.

In a possible implementation, the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or the first relationship includes at least one index of a reference signal and measurement configuration information associated with each of the at least one index.

In a possible implementation, the first message further includes the measurement configuration information indicated by the first relationship; or the transceiver 2302 is further configured to send a second message to the terminal device, where the second message includes the measurement configuration information indicated by the first relationship.

In a possible implementation, the processor 2301 is further configured to determine that an index of a reference signal corresponding to the terminal device is changed from the first index to a second index; and the transceiver 2302 is further configured to send a third message to the terminal device, where the third message is used to indicate second measurement configuration information, and the second measurement configuration information is measurement configuration information that has an association relationship with the second index and that is indicated by the first relationship.

In a possible implementation, the reference signal includes an SSB and/or a CSI-RS.

In a possible implementation, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

All related content of the steps in the foregoing method embodiments may be cited in function descriptions of corresponding function modules. Details are not described herein again.

Figure 24A:
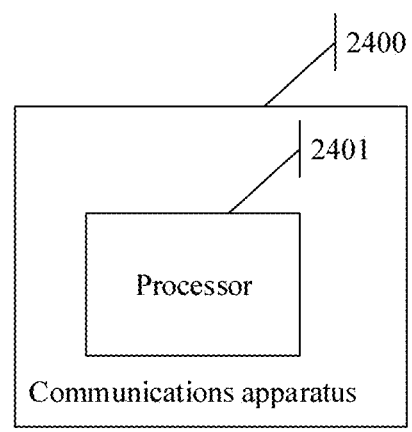
FIG. 24A and FIG. 24B are schematic diagrams of two structures of a communications apparatus according to an embodiment of this application.

In a simple embodiment, a person skilled in the art can figure out that the communications apparatuses described above may alternatively be implemented by using a structure of a communications apparatus 2400 shown in FIG. 24A. The communications apparatus 2400 may implement functions of the terminal device or the network device described above. The communications apparatus 2400 may include a processor 2401.

When the communications apparatus 2400 is configured to implement the functions of the terminal device described above, the processor 2401 may be configured to perform S183 in the embodiment shown in FIG. 18, and/or configured to support another process of the technology described in this specification. Alternatively, when the communications apparatus 2400 is configured to implement the functions of the network device described above, the processor 2401 may be configured to perform S181 in the embodiment shown in FIG. 18, and/or configured to support another process of the technology described in this specification.

The communications apparatus 2400 may be implemented by using a field-programmable gate array (field-programmable gate array, FPGA), an application-specific integrated circuit (application specific integrated circuit, ASIC), a system on chip (system on chip, SoC), a central processing unit (central processor unit, CPU), a network processor (network processor, NP), a digital signal processor (digital signal processor, DSP), a micro controller unit (micro controller unit, MCU), a programmable logic device (programmable logic device, PLD), or another integrated chip. The communications apparatus 2400 may be disposed in the terminal device or the network device in the embodiments of this application, so that the terminal device or the network device implements the method provided in the embodiments of this application.

In an optional implementation, the communications apparatus 2400 may include a transceiver component, configured to communicate with another device. When the communications apparatus 2400 is configured to implement the functions of the terminal device or the network device described above, the transceiver component may be configured to perform S182 in the embodiment shown in FIG. 18, and/or configured to support another process of the technology described in this specification.

Figure 24B:
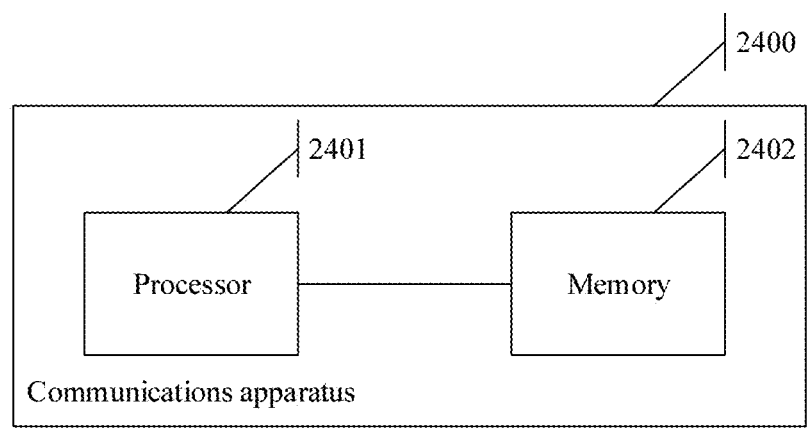

In an optional implementation, the communications apparatus 2400 may further include a memory 2402. Referring to FIG. 24B, the memory 2402 is configured to store computer programs or instructions, and the processor 2401 is configured to: decode and execute the computer programs or the instructions. It should be understood that the computer programs or the instructions may include function programs of the terminal device or the network device. When the function programs of the terminal device are decoded and executed by the processor 2401, the terminal device can be enabled to implement the functions of the terminal device in the method provided in the embodiment shown in FIG. 18 in the embodiments of this application. When the function programs of the network device are decoded and executed by the processor 2401, the network device can be enabled to implement the functions of the network device in the method provided in the embodiment shown in FIG. 18 in the embodiments of this application.

In another optional implementation, the function programs of the terminal device or the network device are stored in an external memory of the communications apparatus 2400. When the function programs of the terminal device are decoded and executed by the processor 2401, the memory 2402 temporarily stores some or all content of the function programs of the terminal device. When the function programs of the network device are decoded and executed by the processor 2401, the memory 2402 temporarily stores some or all content of the function programs of the network device.

In another optional implementation, the function programs of the terminal device or the network device are set to be stored in the memory 2402 in the communications apparatus 2400. When the memory 2402 in the communications apparatus 2400 stores the function programs of the terminal device, the communications apparatus 2400 may be disposed in the terminal device in the embodiments of this application. When the memory 2402 in the communications apparatus 2400 stores the function programs of the network device, the communications apparatus 2400 may be disposed in the network device in the embodiments of this application.

In still another optional implementation, some content of the function programs of the terminal device is stored in an external memory of the communications apparatus 2400, and the other content of the function programs of the terminal device is stored in the memory 2402 in the communications apparatus 2400. Alternatively, some content of the function programs of the network device is stored in an external memory of the communications apparatus 2400, and the other content of the function programs of the network device is stored in the memory 2402 in the communications apparatus 2400.

In the embodiments of this application, the communications apparatus 2300 and the communications apparatus 2400 are presented in a form in which function modules are obtained through division based on corresponding functions, or may be presented in a form in which function modules are obtained through division in an integrated manner. The "module" herein may be an ASIC, a processor and a memory that execute one or more software or firmware programs, an integrated logic circuit, and/or another component that can provide the foregoing functions.

In addition, the first communications apparatus described above may alternatively be implemented in another form. For example, the communications apparatus includes a processing module and a transceiver module. For example, the processing module may be implemented by the processor 2301, and the transceiver module may be implemented by the transceiver 2302. The processing module may be configured to perform S183 in the embodiment shown in FIG. 18, and/or configured to support another process of the technology described in this specification. The transceiver module may be configured to perform S182 in the embodiment shown in FIG. 18, and/or configured to support another process of the technology described in this specification.

For example, the transceiver module is configured to receive a first message from a network device, where the first message includes a first relationship, the first relationship is used to indicate an association relationship between an index of a reference signal and measurement configuration information, and the measurement configuration information is used by the communications apparatus to perform measurement.

The processing module is configured to determine, based on a first index corresponding to the communications apparatus, that measurement configuration information corresponding to the communications apparatus is first measurement configuration information having an association relationship with the first index, where the first index is an index of a reference signal corresponding to the communications apparatus.

In a possible implementation, the communications apparatus is in a connected mode.

In a possible implementation, the communications apparatus is in an idle mode.

In a possible implementation, the measurement configuration information includes one or any combination of the following:
  an MO, where the MO includes one or more pieces of frequency information;
  cell information corresponding to the frequency information included in the MO;
  an SMTC of each of at least one piece of frequency information in the one or more pieces of frequency information included in the MO, where the SMTC of each piece of frequency information is used to indicate a time window that corresponds to each piece of frequency information and that is used for measurement;
  first indication information corresponding to the SMTC in the MO, where the first indication information is used to indicate a measurement location in the time window indicated by the SMTC;
  a measurement ID, where the measurement ID is used to indicate a correspondence between the MO and report configuration information, and the report configuration information is used to indicate a reference signal that needs to be measured in a corresponding MO and a manner of reporting a measurement result;
  the report configuration information;
  a quantity of to-be-measured cells;
  a quantity of to-be-measured frequencies;
  a measurement threshold, where the measurement threshold is used to indicate to measure a cell or a frequency whose value of a first parameter is greater than or equal to the measurement threshold; or
  a gap, where the gap is used by the terminal device to measure a reference signal on a frequency other than a frequency of a serving cell of the communications apparatus 2300.

In a possible implementation,
  the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or
  the first relationship includes at least one index of a reference signal and measurement configuration information associated with each of the at least one index.

In a possible implementation,
  the first message further includes the measurement configuration information indicated by the first relationship; or
  the transceiver module is further configured to receive a second message from the network device, where the second message includes the measurement configuration information indicated by the first relationship.

In a possible implementation, the processing module is further configured to:
  determine the first index, where the processing module determines the first index in the following manner:
  determining that an index of a measured reference signal with best channel quality is the first index; or
  determining that an index of a reference signal in measured reference signals whose channel quality is greater than or equal to a channel quality threshold is the first index; or determining that an index of an SSB with best channel quality that is measured by the communications apparatus is the first index; or determining that an index of an SSB used by the communications apparatus to perform random access is the first index; or determining that an index of an SSB used to receive system information is the first index; or determining that an index of an SSB used to receive the first message is the first index.

In a possible implementation, the first measurement configuration information is in an active state, and measurement configuration information that is in the first relationship and that has no association relationship with the first index is in an inactive state, where the communications apparatus performs measurement based on the measurement configuration information in the active state, and does not perform measurement based on the measurement configuration information in the inactive state.

In a possible implementation, the measurement configuration information that has no association relationship with the first index includes a first MO and/or first report configuration information, but does not include a measurement ID; and the processing module is configured to determine, based on the first MO and/or the first report configuration information in the inactive state, that the measurement ID corresponding to the measurement configuration information that has no association relationship with the first index is in the inactive state.

In a possible implementation, the processing module is further configured to:

determine that the index of the reference signal corresponding to the communications apparatus is changed from the first index to a second index; and activate second measurement configuration information that has an association relationship with the second index based on the first relationship, and deactivate the first measurement configuration information.

In a possible implementation, the transceiver module is further configured to receive a third message from the network device, where the third message is used to indicate the second index, and the second index is an index of a corresponding reference signal obtained after the communications apparatus moves; and the processing module is further configured to: activate the second measurement configuration information that has an association relationship with the second index based on the first relationship, and deactivate the first measurement configuration information.

In a possible implementation, the reference signal includes an SSB and/or a CSI-RS.

In a possible implementation, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

All related content of the steps in the foregoing method embodiments may be cited in function descriptions of corresponding function modules. Details are not described herein again.

The second communications apparatus described above may alternatively be implemented in another form. For example, the communications apparatus includes a processing module and a transceiver module. For example, the processing module may be implemented by the processor 2301, and the transceiver module may be implemented by the transceiver 2302. The processing module may be configured to perform S181 in the embodiment shown in FIG. 18, and/or configured to support another process of the technology described in this specification. The transceiver module may be configured to perform S182 in the embodiment shown in FIG. 18, and/or configured to support another process of the technology described in this specification.

For example, the processing module is configured to determine a first relationship, where the first relationship is used to indicate an association relationship between an index of a reference signal and measurement configuration information, and the measurement configuration information is used by the terminal device to perform measurement.

The transceiver module is configured to send a first message to the terminal device, where the first message includes the first relationship.

In a possible implementation, the measurement configuration information includes one or any combination of the following:

an MO, where the MO includes one or more pieces of frequency information;

cell information corresponding to the frequency information included in the MO;

an SMTC of each of at least one piece of frequency information in the one or more pieces of frequency information included in the MO, where the SMTC of each piece of frequency information is used to indicate a time window that corresponds to each piece of frequency information and that is used for measurement;

first indication information corresponding to the SMTC in the MO, where the first indication information is used to indicate a measurement location in the time window indicated by the SMTC;

a measurement ID, where the measurement ID is used to indicate a correspondence between the MO and report configuration information, and the report configuration information is used to indicate a reference signal that needs to be measured in a corresponding MO and a manner of reporting a measurement result;

the report configuration information;

a quantity of to-be-measured cells;

a quantity of to-be-measured frequencies;

a measurement threshold, where the measurement threshold is used to indicate to measure a cell or a frequency whose value of a first parameter is greater than or equal to the measurement threshold; or a gap, where the gap is used by the terminal device to measure a reference signal on a frequency other than a frequency of a serving cell of the terminal device.

In a possible implementation, the first relationship includes at least one piece of second indication information, the at least one piece of second indication information corresponds to at least one piece of information included in the measurement configuration information, and one piece of the at least one piece of second indication information is used to indicate an index that is of a reference signal and that is associated with the corresponding information; or the first relationship includes at least one index of a reference signal and measurement configuration information associated with each of the at least one index.

In a possible implementation, the first message further includes the measurement configuration information indicated by the first relationship; or the transceiver module is further configured to send a second message to the terminal device, where the second message includes the measurement configuration information indicated by the first relationship.

In a possible implementation, the processing module is further configured to determine that an index of a reference signal corresponding to the terminal device is changed from the first index to a second index; and the transceiver module is further configured to send a third message to the terminal device, where the third message is used to indicate second measurement configuration information, and the second measurement configuration information is measurement configuration information that has an association relationship with the second index and that is indicated by the first relationship.

In a possible implementation, the reference signal includes an SSB and/or a CSI-RS.

In a possible implementation, the measurement configuration information includes one or any combination of the following:

frequency information;

cell information; or measurement time information, where the measurement time information is used to indicate a time of measuring the frequency information included in the measurement configuration information, and/or is used to indicate a time of measuring the cell information included in the measurement configuration information.

All related content of the steps in the foregoing method embodiments may be cited in function descriptions of the corresponding function modules. Details are not described herein again.

The first communications apparatus, the second communications apparatus, and the communications apparatus 2400 provided in the embodiments of this application may be configured to perform the method provided in the embodiment shown in FIG. 18. Therefore, for technical effects that can be achieved by the first communications apparatus, the second communications apparatus, and the communications apparatus 2400, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or the processor of another programmable data processing device generate an apparatus for implementing a specific function in one or more procedures in the flowcharts and/or in one or more blocks in the block diagrams.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer readable storage medium, or may be transmitted from a computer readable storage medium to another readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid state disk (solid state disk, SSD)), or the like.

It is clear that a person skilled in the art can make various modifications and variations to the embodiments of this application without departing from the spirit and scope of this application. Therefore, this application is intended to cover these modifications and variations provided that these modifications and variations of the embodiments of this application fall within the scope of the following claims of this application and equivalent technologies thereof.

What is claimed is:

1. A measurement configuration method comprising:
receiving, from a network device, a first message comprising a first relationship, wherein the first relationship indicates a first association relationship between a first index of a first reference signal corresponding to a terminal device and first measurement configuration information, wherein the first measurement configuration information is in an active state, wherein second measurement configuration information of the first relationship does not associate with the first index and is in an inactive state, and wherein the first measurement configuration information is adapted for performing a measurement;
determining, based on the first index, the first measurement configuration information;
performing the measurement based on the first measurement configuration information that is in the active state; and
avoiding performing the measurement based on the second measurement configuration information that is in the inactive state.

2. The measurement configuration method of claim 1, further comprising performing the receiving and the determining in a connected mode.

3. The measurement configuration method of claim 1, further comprising performing the receiving and the determining in an idle mode.

4. The measurement configuration method of claim 1, wherein the first measurement configuration information comprises at least one of:
  a first measurement object (MO) comprising a first piece of frequency information;
  cell information corresponding to the first piece of frequency information;
  first synchronization signal block-based measurement timing configuration (SMTC) information of the first piece of frequency information indicating a time window that corresponds to the first piece of frequency information for the measurement;
  first indication information corresponding to the first SMTC and indicating a measurement location in the time window;
  a first measurement identifier (ID) indicating a correspondence between the first MO and first report configuration information, wherein the first report configuration information indicates a second reference signal to be measured in the first MO and a manner of reporting a measurement result;
  the first report configuration information;
  a quantity of to-be-measured cells;
  a quantity of to-be-measured frequencies;
  a measurement threshold indicating to measure a cell or a frequency, wherein a first parameter value of the cell or the frequency is greater than or equal to the measurement threshold; or
  a measurement gap for measuring a third reference signal on a first frequency other than a second frequency of a serving cell of the terminal device.

5. The measurement configuration method of claim 1, wherein the first relationship comprises second indication information corresponding to the first measurement configuration information, wherein the second indication information indicates a second index of a fourth reference signal associated with the first measurement configuration information.

6. The measurement configuration method of claim 1, wherein the first message further comprises the first measurement configuration information, or wherein the measurement configuration determining method further comprises receiving, from the network device, a second message comprising the first measurement configuration information.

7. The measurement configuration method of claim 1, further comprising:
  setting a third index of a first measured reference signal with a best channel quality as the first index;
  setting a fourth index of a fifth reference signal in second measured reference signals as the first index, wherein a channel quality of the fifth reference signal is greater than or equal to a channel quality threshold;
  measuring channel qualities of first synchronization signal blocks (SSBs) to obtain a channel quality measurement result and setting, based on the channel quality measurement result, a fifth index of a second SSB with the highest channel quality among the first SSBs as the first index;
  performing random access using a third SSB that comprises a sixth index and setting the sixth index as the first index;
  setting a seventh index of a fourth SSB that receives system information as the first index; or
  setting an eighth index of a fifth SSB that receives the first message as the first index.

8. The measurement configuration method of claim 1, wherein the second measurement configuration information comprises a second measurement object (MO) or second report configuration information, and wherein the measurement configuration determining method further comprises determining, based on the second MO or the second report configuration information in the inactive state, that a second measurement identifier (ID) corresponding to the second measurement configuration information is in the inactive state.

9. The measurement configuration method of claim 1, further comprising:
  changing the first index into a ninth index;
  activating third measurement configuration information comprising a second association relationship with the ninth index based on the first relationship; and
  deactivating the first measurement configuration information.

10. The measurement configuration method of claim 9, wherein before activating the third measurement configuration information and deactivating the first measurement configuration information, the measurement configuration determining method further comprises receiving, from the network device, a third message indicating the ninth index, and wherein the ninth index is of a corresponding reference signal obtained after the terminal device moves.

11. The measurement configuration method of claim 1, wherein the first reference signal comprises a sixth synchronization signal block (SSB) or a channel state information reference signal (CSI-RS).

12. The measurement configuration method of claim 3, wherein the first measurement configuration information comprises at least one of:
  frequency information;
  cell information; or
  measurement time information indicating either a first time of measuring the frequency information or a second time of measuring the cell information.

13. A measurement configuration method implemented by a network device, wherein the measurement configuration method comprises:
  determining a first relationship indicating a first association relationship between a first index of a first reference signal and first measurement configuration information, wherein the first measurement configuration information is for a terminal device to perform a measurement;
  sending, to the terminal device, a first message comprising the first relationship;
  determining that the first index is changed to a third index; and
  sending, to the terminal device, a third message indicating second measurement configuration information, wherein the second measurement configuration information has a second association relationship with the third index and is indicated by the first relationship.

14. The measurement configuration method of claim 13, wherein the first measurement configuration information comprises at least one of:
  a measurement object (MO) comprising a first piece of frequency information;
  cell information corresponding to the first piece of frequency information;
  first synchronization signal block-based measurement timing configuration (SMTC) information of the first piece of frequency information indicating a time window that corresponds to the first piece of frequency information for the measurement;
first indication information corresponding to the first SMTC and indicating a measurement location in the time window;
a measurement identifier (ID) indicating a correspondence between the MO and report configuration information, wherein the report configuration information indicates a second reference signal to be measured in the MO and a manner of reporting a measurement result;
the report configuration information;
a quantity of to-be-measured cells;
a quantity of to-be-measured frequencies;
a measurement threshold indicating to measure a cell or a first frequency, wherein a first parameter value of the cell or the first frequency is greater than or equal to the measurement threshold; or
a measurement gap enabling the terminal device to measure a third reference signal on a second frequency other than a third frequency of a serving cell of the terminal device.

15. The measurement configuration method of claim 13, wherein the first relationship comprises second indication information corresponding to the first measurement configuration information, wherein the second indication information indicates a second index of a fourth reference signal and associated with the first measurement configuration information.

16. The measurement configuration method of claim 13, wherein the first message further comprises the first measurement configuration information, or wherein the measurement configuration determining method further comprises sending, to the terminal device, a second message comprising the first measurement configuration information.

17. The measurement configuration method of claim 13, wherein the first reference signal comprises a synchronization signal block (SSB) or a channel state information reference signal (CSI-RS).

18. A communications apparatus comprising:
a transceiver configured to receive, from a network device, a first message comprising a first relationship, wherein the first relationship indicates a first association relationship between a first index of a first reference signal corresponding to the communications apparatus and first measurement configuration information, wherein the first measurement configuration information is in an active state, wherein second measurement configuration information of the first relationship does not associate with the first index and is in an inactive state, and wherein the first measurement configuration information is for performing a measurement; and
one or more processors coupled to the transceiver and configured to:
determine, based on the first index, the first measurement configuration information;
perform the measurement based on the first measurement configuration information that is in the active state; and
avoid performing the measurement based on the second measurement configuration information that is in the inactive state.

19. The measurement configuration method of claim 1, wherein the first relationship comprises:
second indication information corresponding to the first measurement configuration information, wherein the second indication information indicates a second index of a fourth reference signal; and
the first measurement configuration information.

20. The measurement configuration method of claim 13, wherein the first relationship comprises:
second indication information corresponding to the first measurement configuration information, wherein the second indication information indicates a second index of a fourth reference signal; and
the first measurement configuration information.

* * * * *